US012755083B2

(12) United States Patent
Chen et al.

(10) Patent No.: US 12,755,083 B2
(45) Date of Patent: Oct. 6, 2026

(54) MANIPULATION OF HANDWRITTEN CONTENT ON AN ELECTRONIC DEVICE

(71) Applicant: Apple Inc., Cupertino, CA (US)

(72) Inventors: Jennifer P. Chen, Mountain View, CA (US); Elizabeth J. Board, Campbell, CA (US); Christopher D. Soli, San Francisco, CA (US); Thomas Deselaers, Zurich (CH); Aditya Galada, Santa Clara, CA (US); Michael P. Condon, Santa Clara, CA (US); Ryan S. Dixon, Redwood City, CA (US); Hannah Morgan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 206 days.

(21) Appl. No.: 18/325,968

(22) Filed: May 30, 2023

(65) Prior Publication Data

US 2023/0385523 A1 Nov. 30, 2023

Related U.S. Application Data

(60) Provisional application No. 63/365,592, filed on May 31, 2022.

(51) Int. Cl.

| | |
|---|---|
| ***G06F 3/0482*** | (2013.01) |
| ***G06F 3/04883*** | (2022.01) |
| ***G06F 40/103*** | (2020.01) |
| ***G06F 40/279*** | (2020.01) |

(52) U.S. Cl.
CPC .......... *G06F 40/103* (2020.01); *G06F 3/0482* (2013.01); *G06F 3/04883* (2013.01); *G06F 40/279* (2020.01)

(58) Field of Classification Search
CPC .. G06F 40/103; G06F 3/0482; G06F 3/04883; G06F 40/279; G06F 3/04842; G06F 3/04886; G06F 40/171
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |

(Continued)

FOREIGN PATENT DOCUMENTS

| | | | |
|---|---|---|---|
| EP | 3835934 | A1 | 6/2021 |
| WO | 2013169849 | A2 | 11/2013 |

(Continued)

*Primary Examiner* — Phuong H Nguyen
(74) *Attorney, Agent, or Firm* — Kubota & Basol LLP

(57) ABSTRACT

Some embodiments described in this disclosure are directed to electronic devices that provide for manipulation of handwritten content in a content-entry region, including straightening of handwritten text in the content-entry region. Some embodiments described in this disclosure are directed to electronic devices that provide for manipulation of handwritten content in a content-entry region, including wrapping of handwritten text in the content-entry region.

47 Claims, 61 Drawing Sheets

(56) References Cited

U.S. PATENT DOCUMENTS

| | | | | |
|---|---|---|---|---|
| 7,663,607 | B2 | 2/2010 | Hotelling et al. | |
| 7,844,914 | B2 | 11/2010 | Andre et al. | |
| 7,957,762 | B2 | 6/2011 | Herz et al. | |
| 8,006,002 | B2 | 8/2011 | Kalayjian et al. | |
| 8,239,784 | B2 | 8/2012 | Hotelling et al. | |
| 8,279,180 | B2 | 10/2012 | Hotelling et al. | |
| 8,381,135 | B2 | 2/2013 | Hotelling et al. | |
| 8,479,122 | B2 | 7/2013 | Hotelling et al. | |
| 9,348,458 | B2 | 5/2016 | Hotelling et al. | |
| 9,933,937 | B2 | 4/2018 | Lemay et al. | |
| 2002/0015024 | A1 | 2/2002 | Westerman et al. | |
| 2003/0053084 | A1* | 3/2003 | Geidl | G06F 40/166 358/1.6 |
| 2005/0190059 | A1 | 9/2005 | Wehrenberg | |
| 2006/0017692 | A1 | 1/2006 | Wehrenberg et al. | |
| 2006/0033724 | A1 | 2/2006 | Chaudhri et al. | |
| 2006/0197753 | A1 | 9/2006 | Hotelling | |
| 2013/0314337 | A1 | 11/2013 | Asano | |
| 2016/0147723 | A1* | 5/2016 | Lee | G06F 40/171 715/268 |
| 2017/0161866 | A1* | 6/2017 | Baudry | G06T 7/60 |
| 2023/0177648 | A1* | 6/2023 | Kim | G06F 3/0482 715/268 |

FOREIGN PATENT DOCUMENTS

| | | | |
|---|---|---|---|
| WO | 2014105276 | A1 | 7/2014 |
| WO | 2020/227445 | A1 | 11/2020 |
| WO | 2021/231494 | A2 | 11/2021 |

* cited by examiner

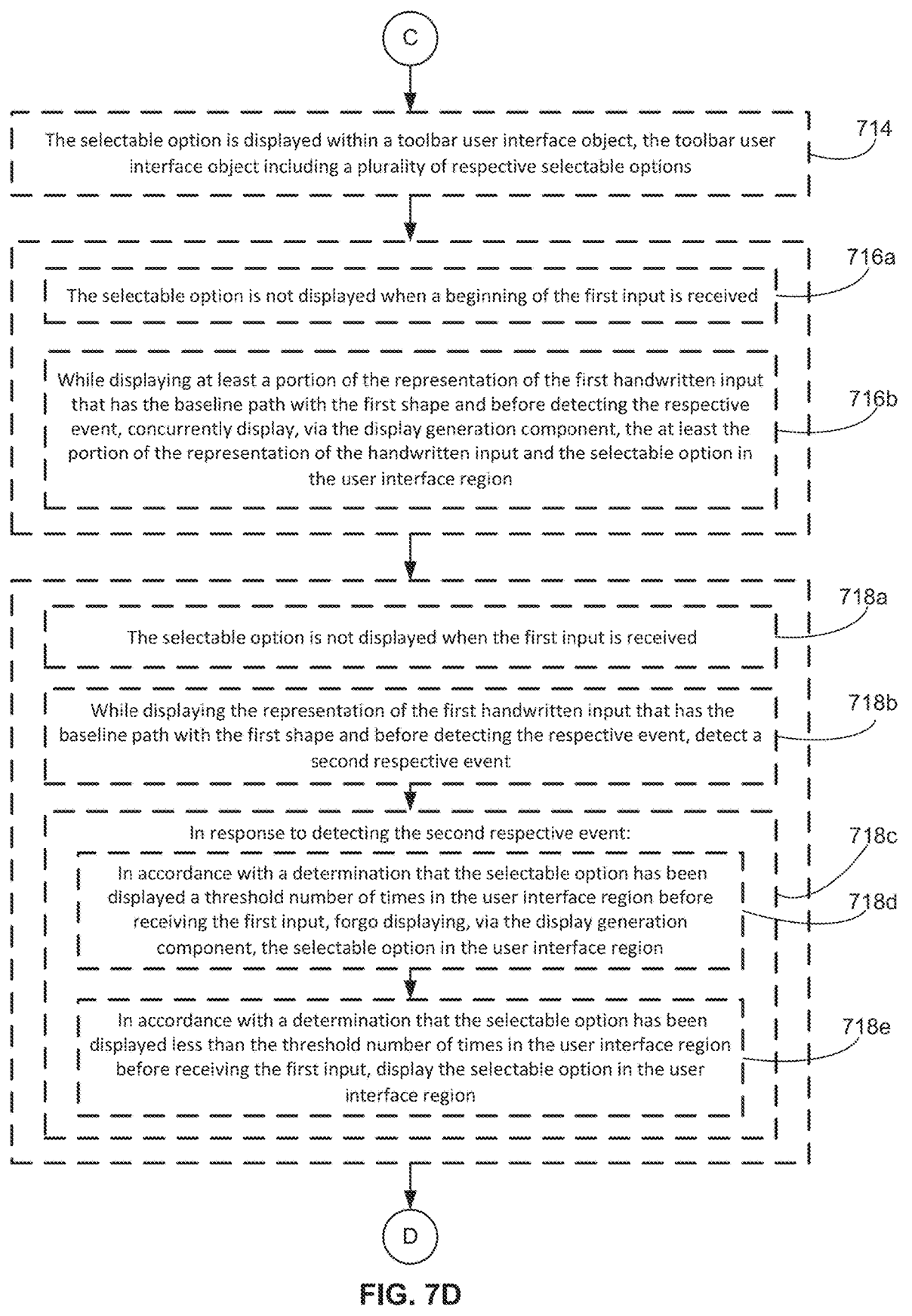

C

714 The selectable option is displayed within a toolbar user interface object, the toolbar user interface object including a plurality of respective selectable options 716a The selectable option is not displayed when a beginning of the first input is received 716b While displaying at least a portion of the representation of the first handwritten input that has the baseline path with the first shape and before detecting the respective event, concurrently display, via the display generation component, the at least the portion of the representation of the handwritten input and the selectable option in the user interface region 718a The selectable option is not displayed when the first input is received 718b While displaying the representation of the first handwritten input that has the baseline path with the first shape and before detecting the respective event, detect a second respective event 718c In response to detecting the second respective event:

718d In accordance with a determination that the selectable option has been displayed a threshold number of times in the user interface region before receiving the first input, forgo displaying, via the display generation component, the selectable option in the user interface region 718e In accordance with a determination that the selectable option has been displayed less than the threshold number of times in the user interface region before receiving the first input, display the selectable option in the user interface region

D

FIG. 7D

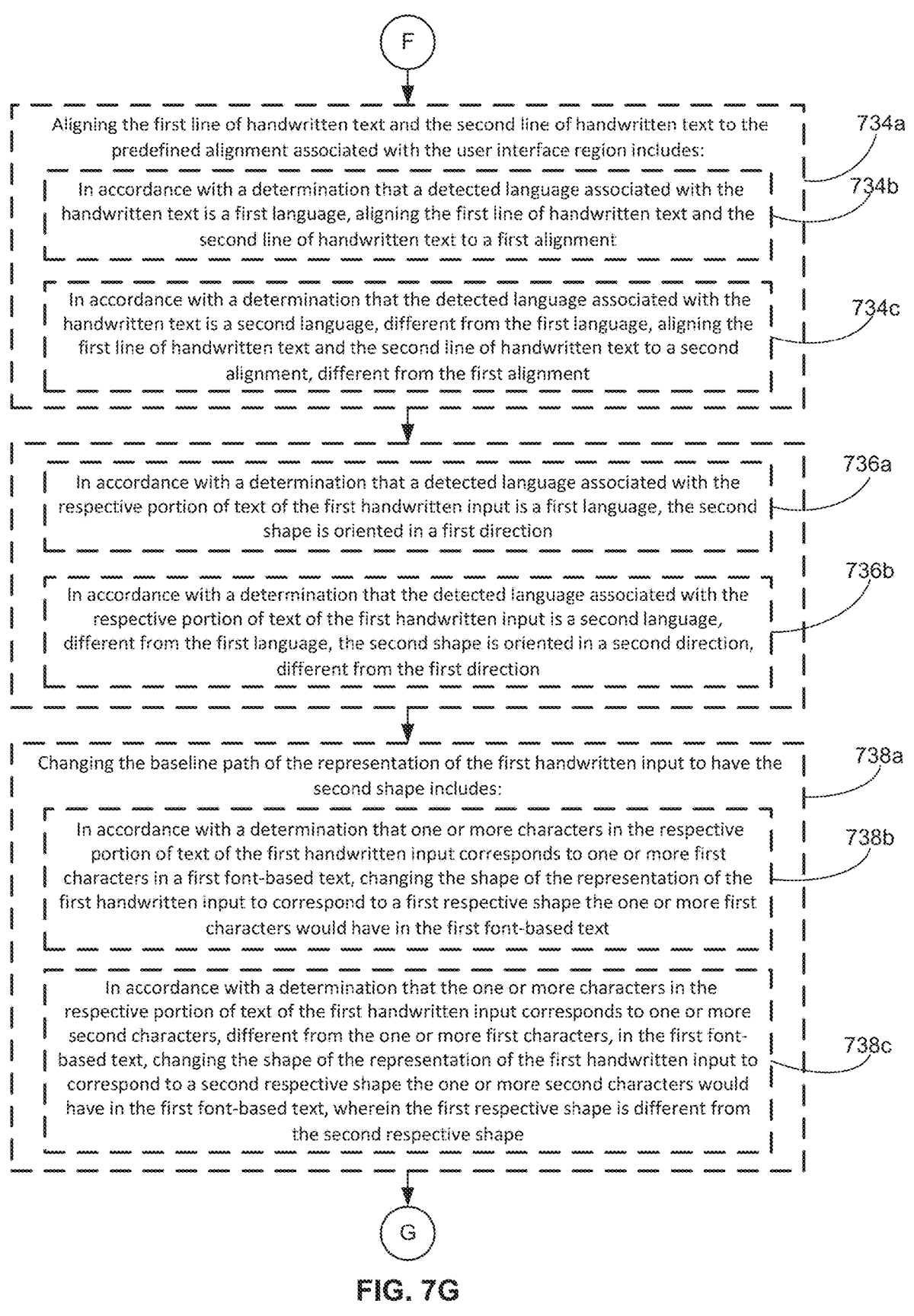

F

734a: Aligning the first line of handwritten text and the second line of handwritten text to the predefined alignment associated with the user interface region includes:

734b: In accordance with a determination that a detected language associated with the handwritten text is a first language, aligning the first line of handwritten text and the second line of handwritten text to a first alignment 734c: In accordance with a determination that the detected language associated with the handwritten text is a second language, different from the first language, aligning the first line of handwritten text and the second line of handwritten text to a second alignment, different from the first alignment 736a: In accordance with a determination that a detected language associated with the respective portion of text of the first handwritten input is a first language, the second shape is oriented in a first direction 736b: In accordance with a determination that the detected language associated with the respective portion of text of the first handwritten input is a second language, different from the first language, the second shape is oriented in a second direction, different from the first direction 738a: Changing the baseline path of the representation of the first handwritten input to have the second shape includes:

738b: In accordance with a determination that one or more characters in the respective portion of text of the first handwritten input corresponds to one or more first characters in a first font-based text, changing the shape of the representation of the first handwritten input to correspond to a first respective shape the one or more first characters would have in the first font-based text 738c: In accordance with a determination that the one or more characters in the respective portion of text of the first handwritten input corresponds to one or more second characters, different from the one or more first characters, in the first font-based text, changing the shape of the representation of the first handwritten input to correspond to a second respective shape the one or more second characters would have in the first font-based text, wherein the first respective shape is different from the second respective shape

G

FIG. 7G

MANIPULATION OF HANDWRITTEN CONTENT ON AN ELECTRONIC DEVICE

CROSS-REFERENCE TO RELATED APPLICATIONS

This application claims the benefit of U.S. Provisional Application No. 63/365,592, filed May 31, 2022, the content of which is incorporated herein by reference in its entirety for all purposes.

FIELD OF THE DISCLOSURE

This relates generally to electronic devices that display handwritten content, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to insert handwritten content on an electronic device or otherwise interact with an electronic device with a stylus. In some circumstances, users wish to select or otherwise interact with previously written handwritten text. In some circumstances, users desire to manipulate previously written handwritten text. Enhancing these interactions improves the user's experience with the device and decreases user interaction time, which is particularly important where input devices are battery-operated.

SUMMARY

Some embodiments described in this disclosure are directed to electronic devices that provide for manipulation of handwritten content in a content-entry region, including straightening of handwritten text in the content-entry region. Some embodiments described in this disclosure are directed to electronic devices that provide for manipulation of handwritten content in a content-entry region, including wrapping of handwritten text in the content-entry region.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7J is a flowchart illustrating an exemplary method of selecting and providing for manipulation of handwritten content in accordance with some embodiments.

DETAILED DESCRIPTION

Figure 1A:
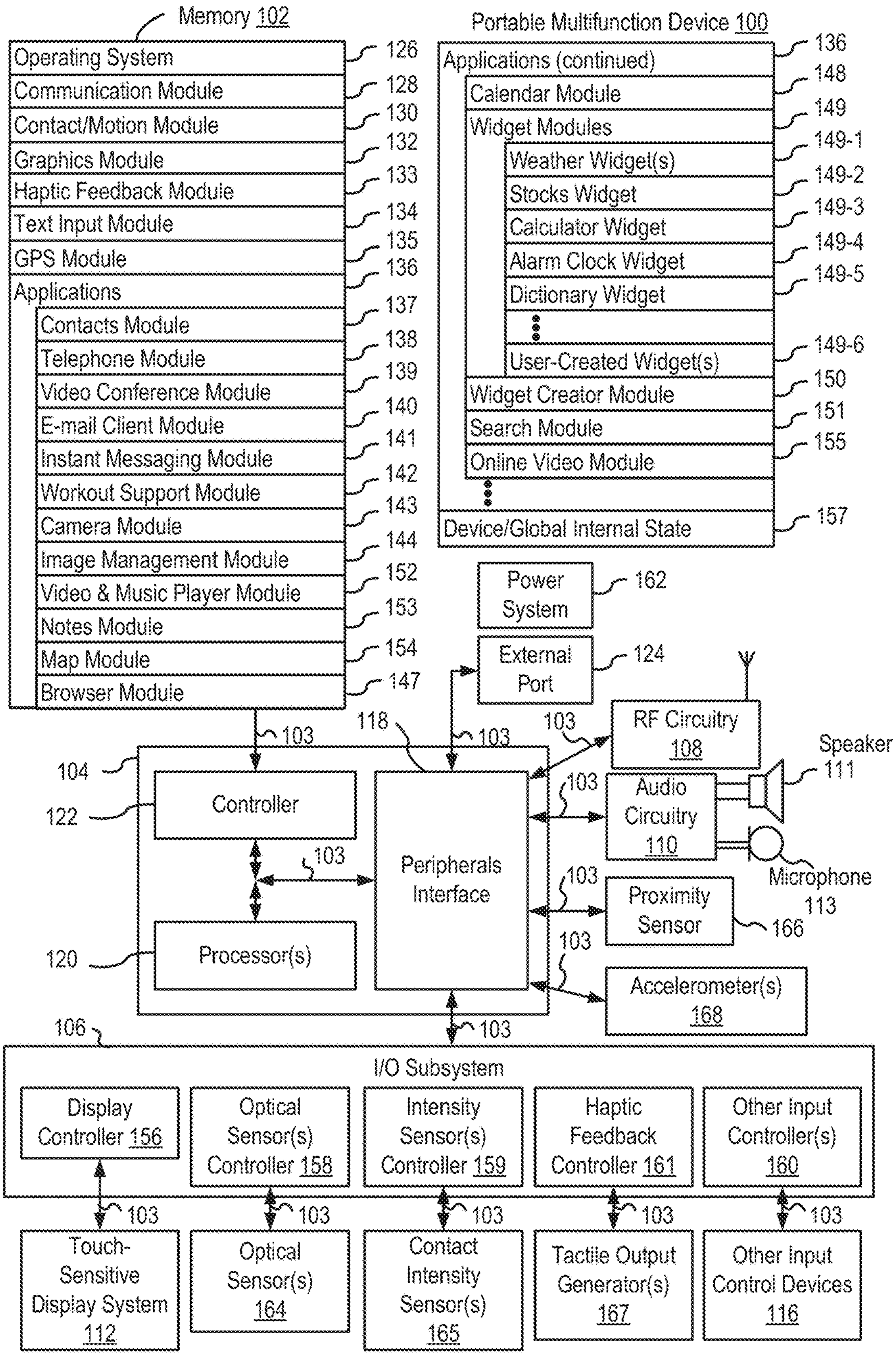
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for selecting and providing for manipulation of handwritten content in a content-entry region, including straightening of handwritten text in the content-entry region. In some embodiments, an electronic device straightens handwritten text in the content-entry region in response to detecting a respective event. In some embodiments, the respective event includes selection of a straighten option displayed in the content-entry region, detecting lift-off of an object providing the handwritten text, and/or writing a new line of handwritten text. Such techniques can reduce the cognitive burden on a user who uses such devices. Further, such techniques can reduce processor and battery power otherwise wasted on redundant user inputs.

There is a need for electronic devices that provide efficient methods for providing for manipulation of handwritten content in a content-entry region, including wrapping of handwritten text in the content-entry region. In some embodiments, an electronic device changes a number of lines in which the handwritten content is displayed in the content-entry region in response to detecting input directed to the handwritten content. In some embodiments, the electronic device wraps the handwritten text in response to detecting movement of one or more resizing handles displayed in the content-entry region. Such techniques can reduce the cognitive burden on a user who uses such devices. Further, such techniques can reduce processor and battery power otherwise wasted on redundant user inputs.

Although the following description uses terms “first,” “second,” etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

The term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a “touch screen” for convenience and is sometimes known as or called a “touch-sensitive display system.” Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term “intensity” of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, touch screen 112, etc.). In some embodiments, the display generation component is separate from the computer system (e.g., an external monitor, a projection system, etc.). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
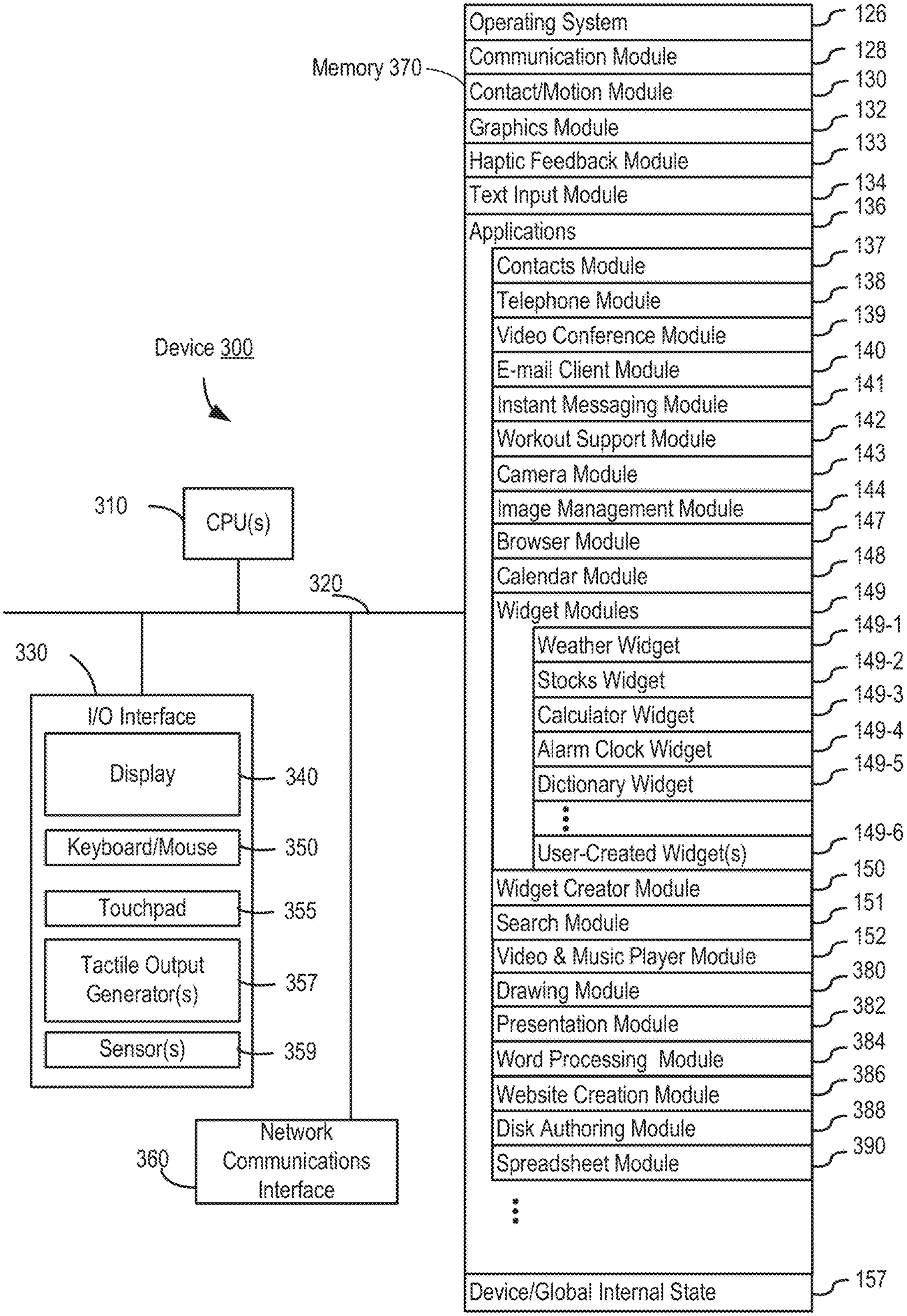
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
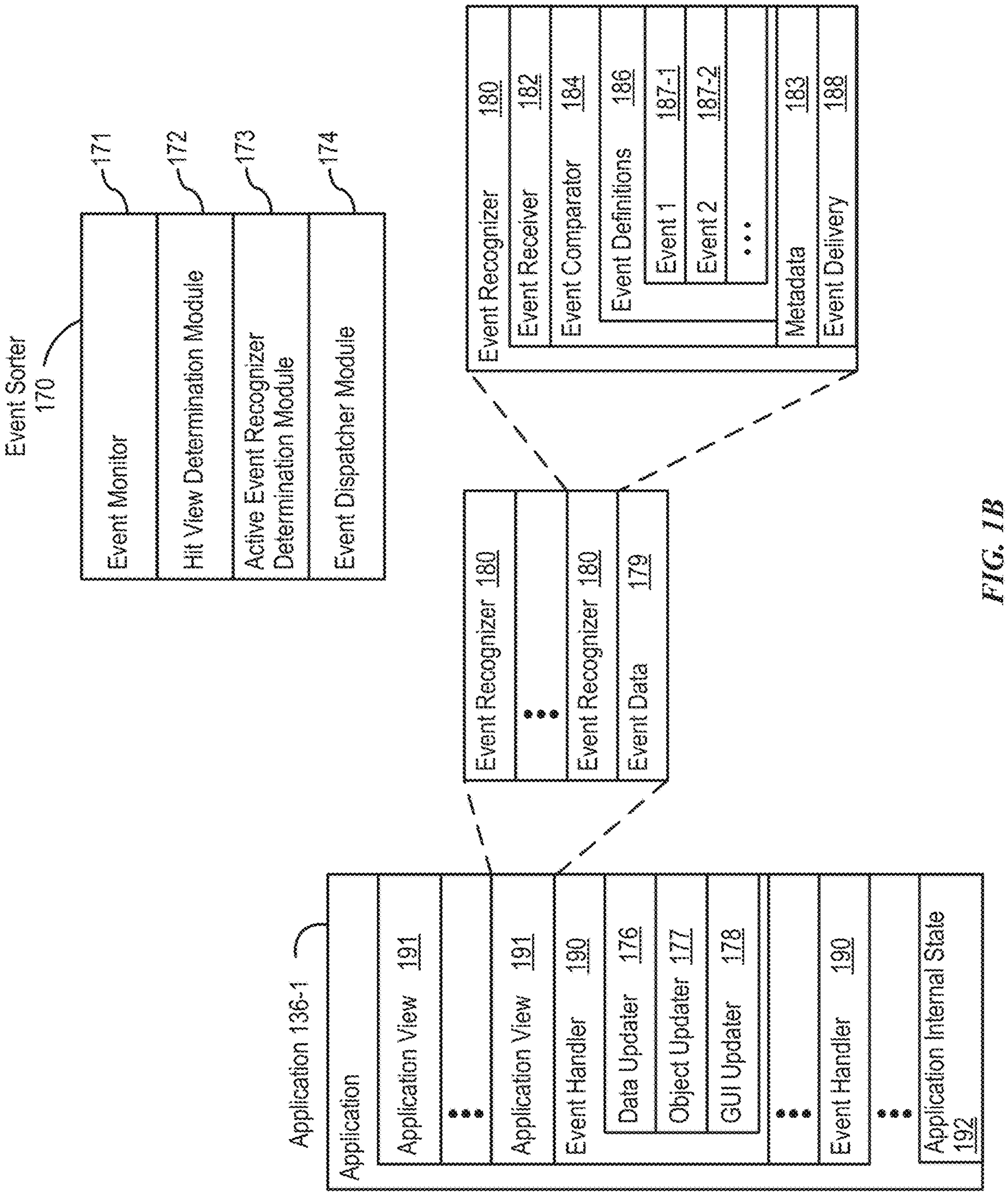
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
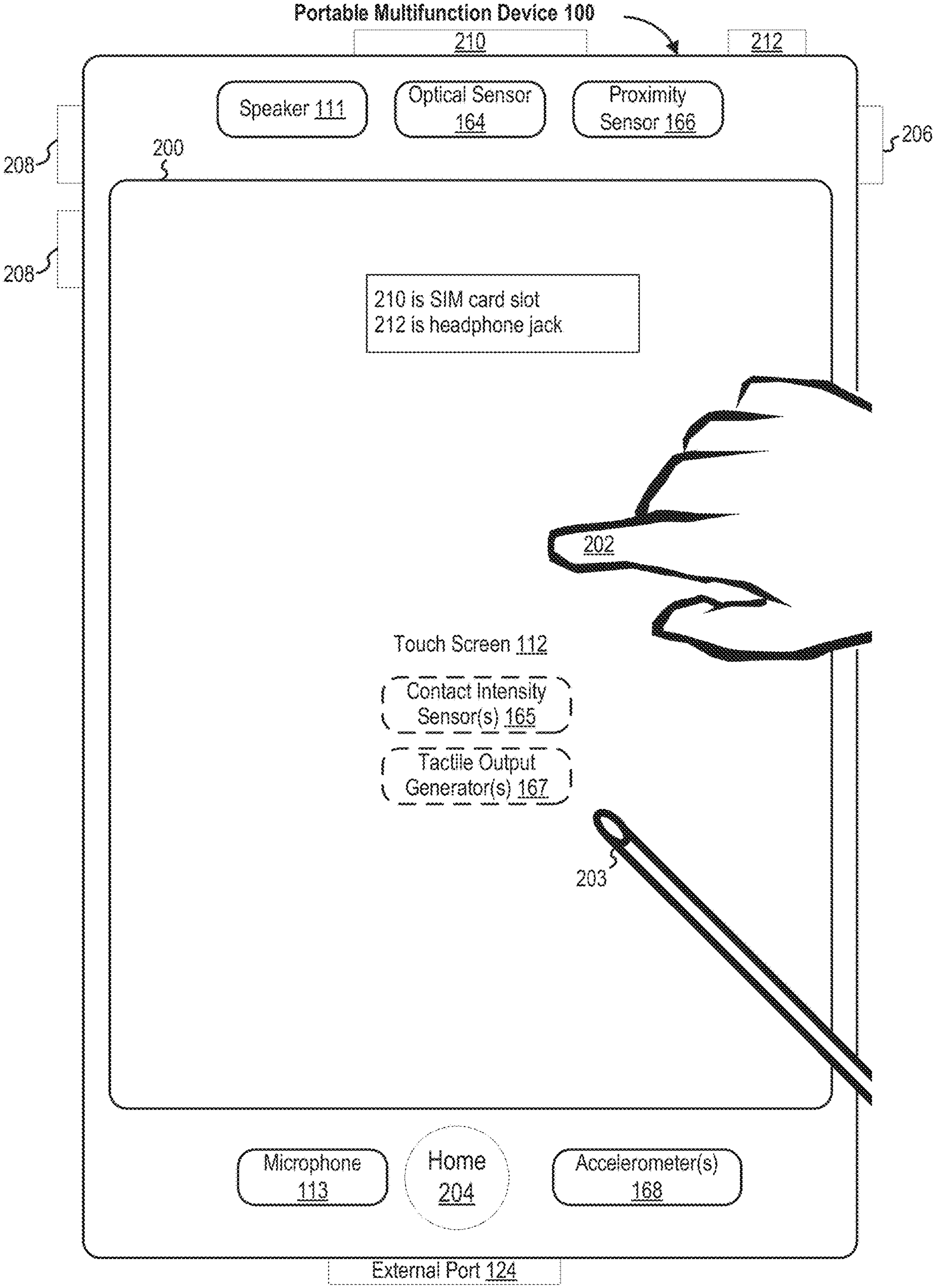
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
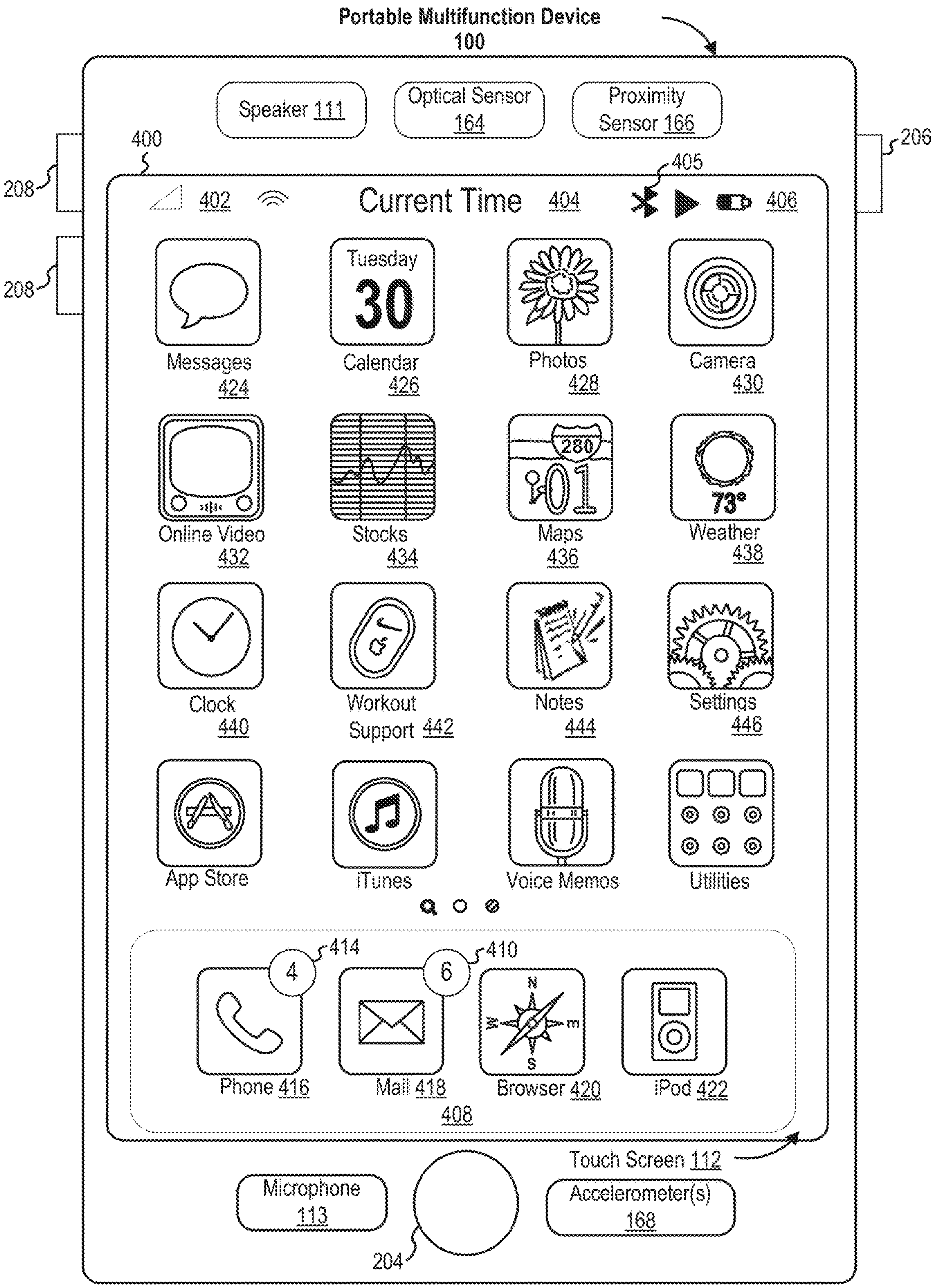
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
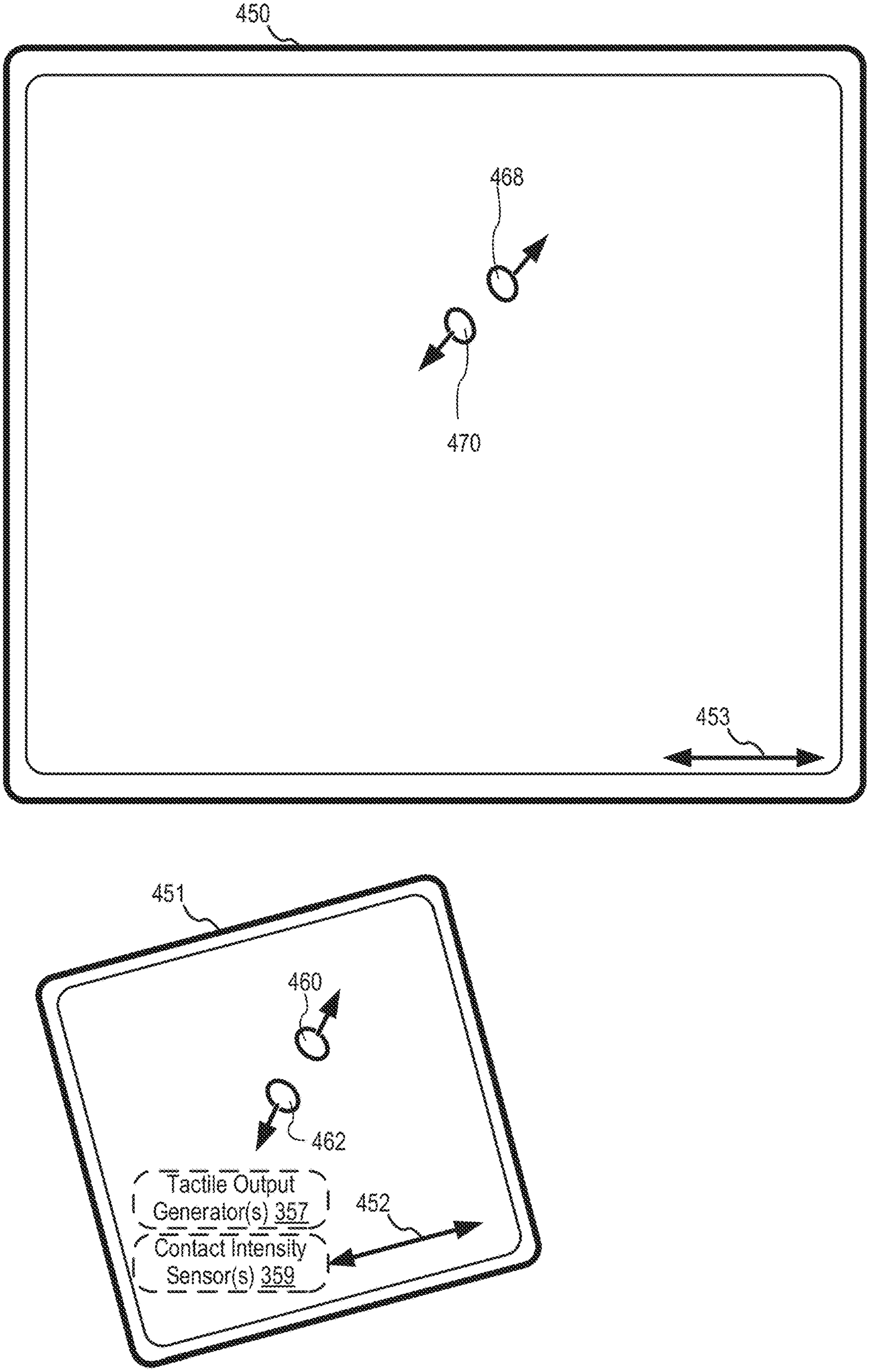
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
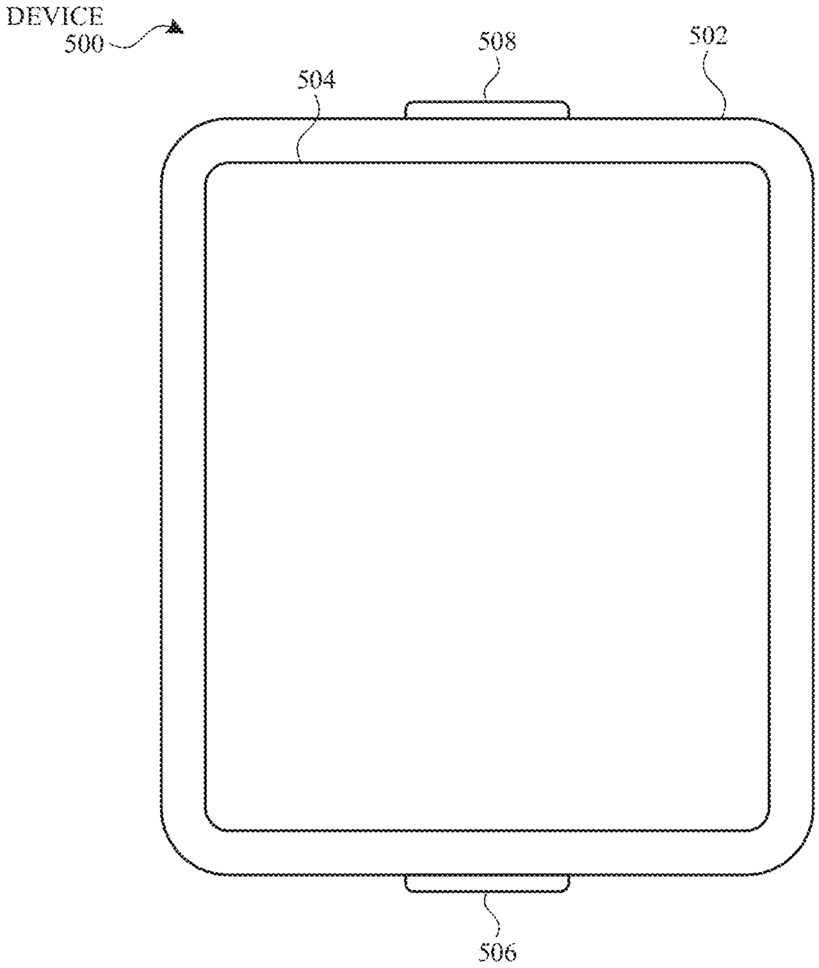
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
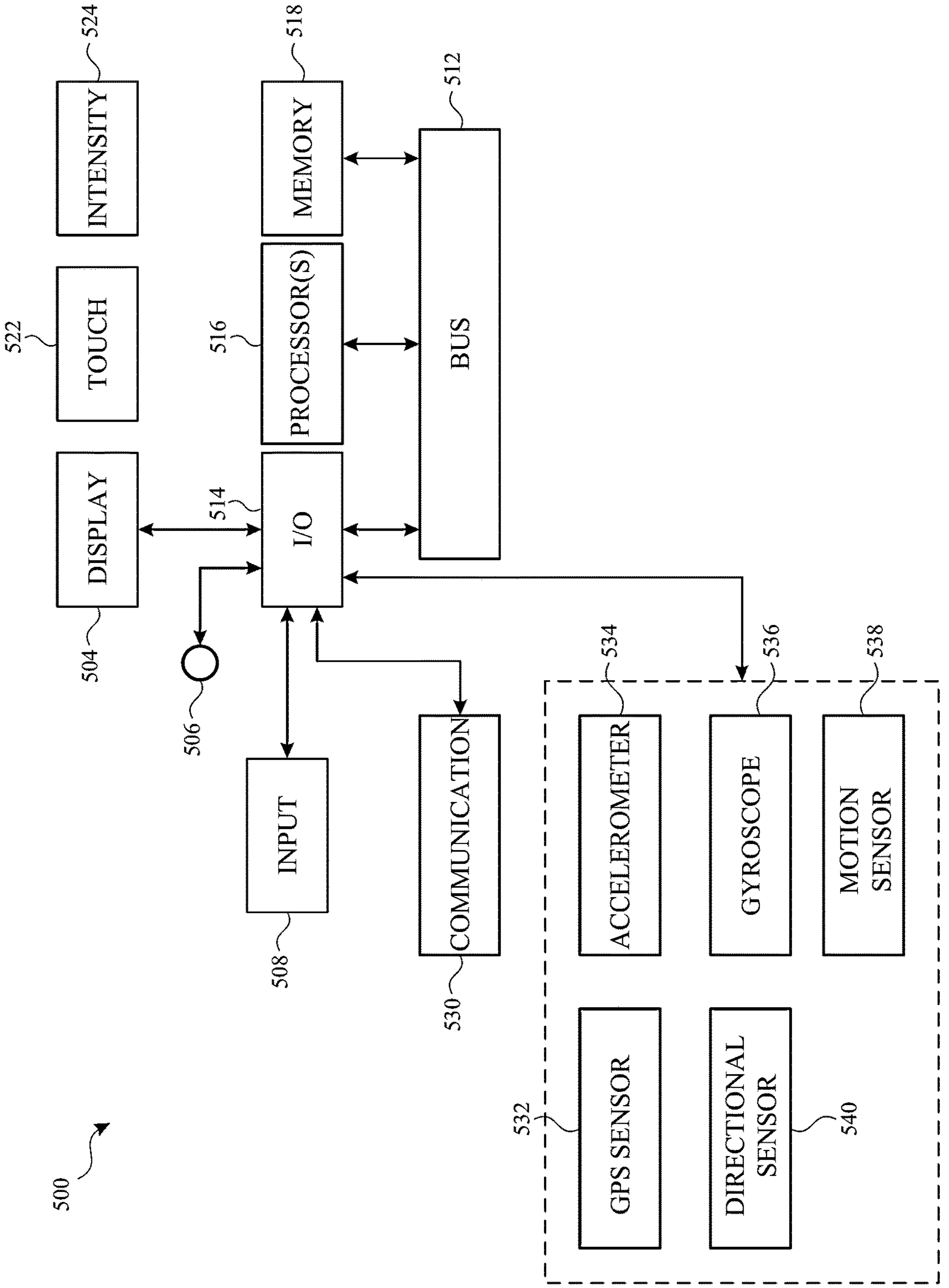
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7, 9).

A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
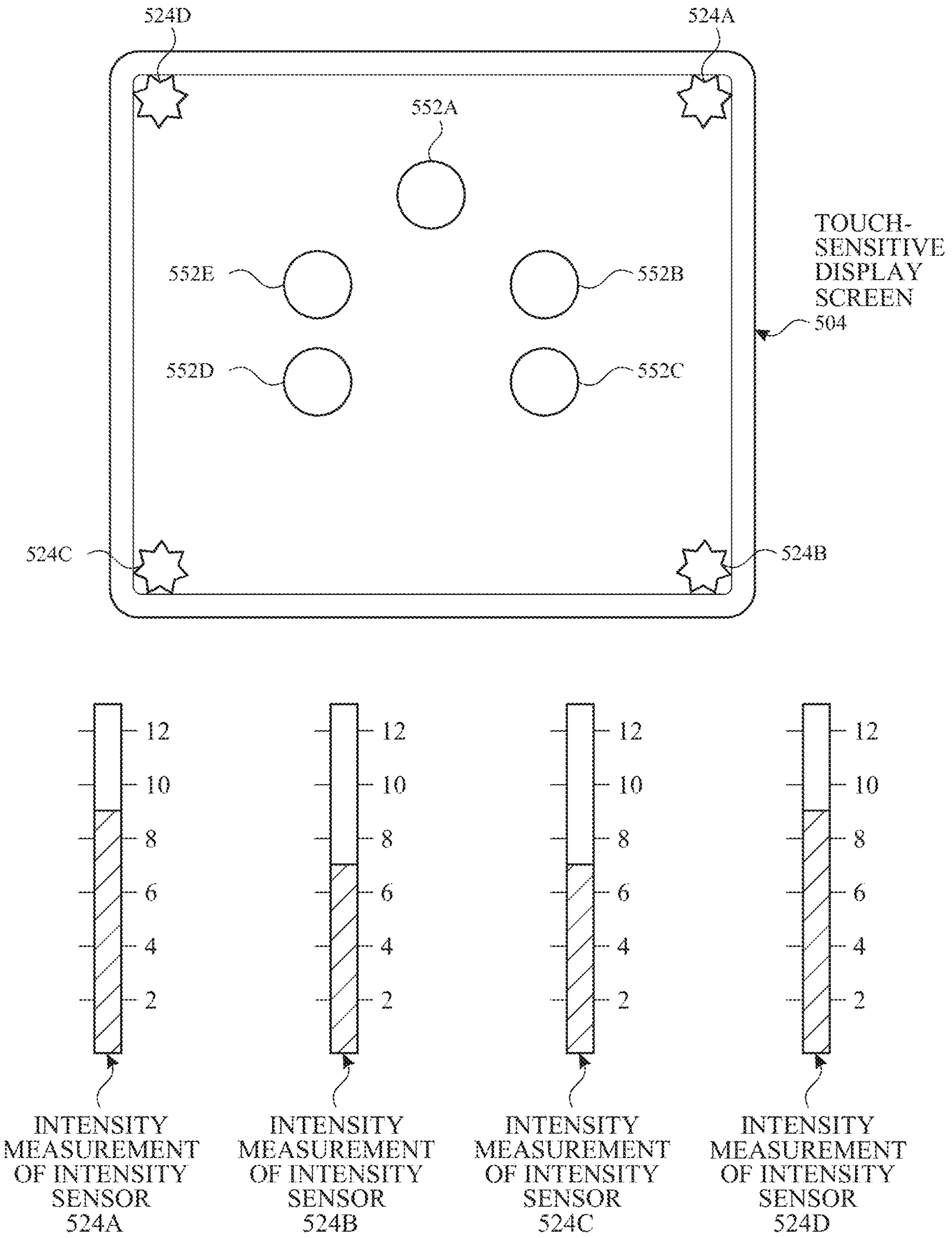
FIGS. 5C-5D illustrate exemplary components of a personal electronic device having a touch-sensitive display and intensity sensors in accordance with some embodiments.
Figure 5D:
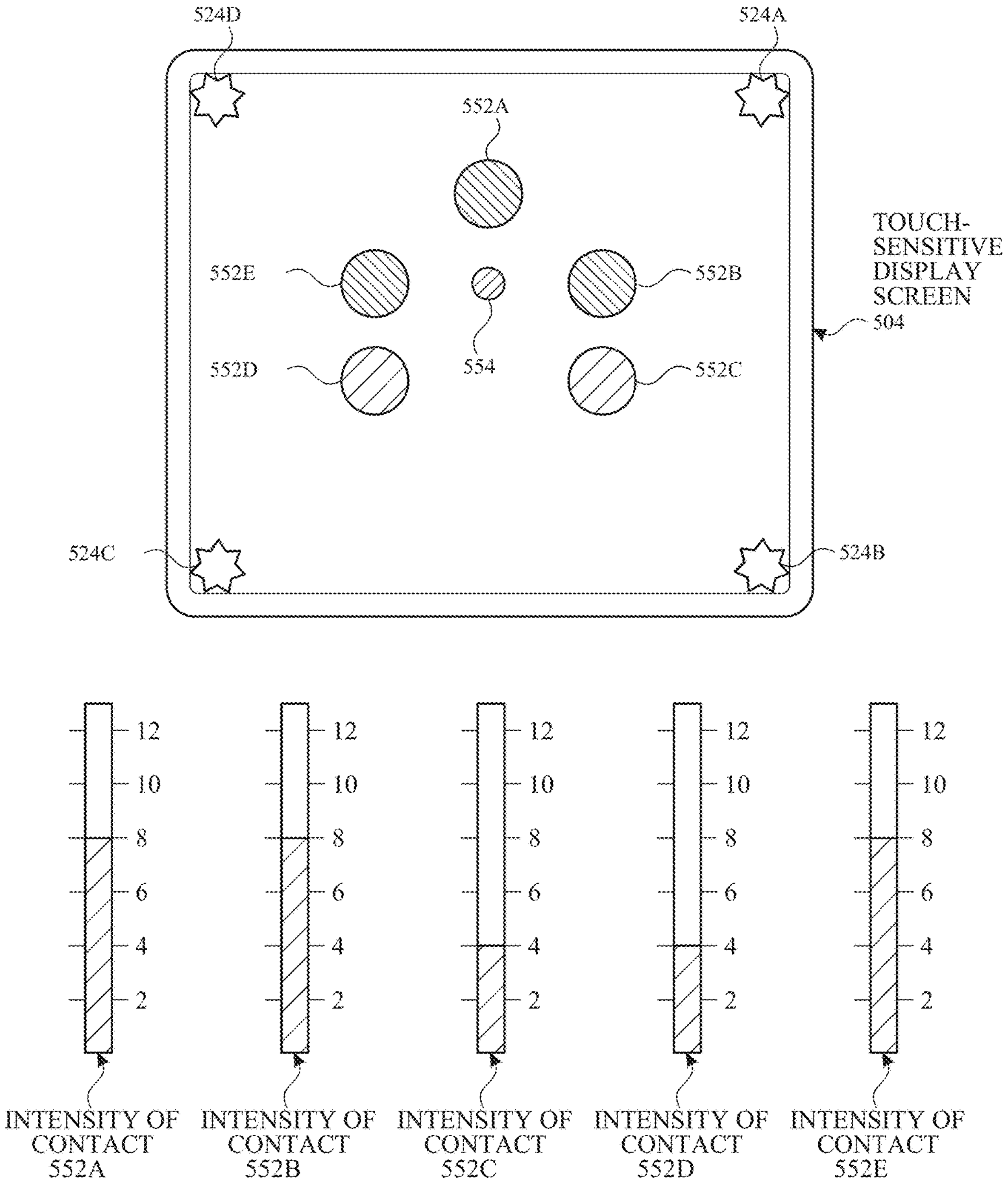

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
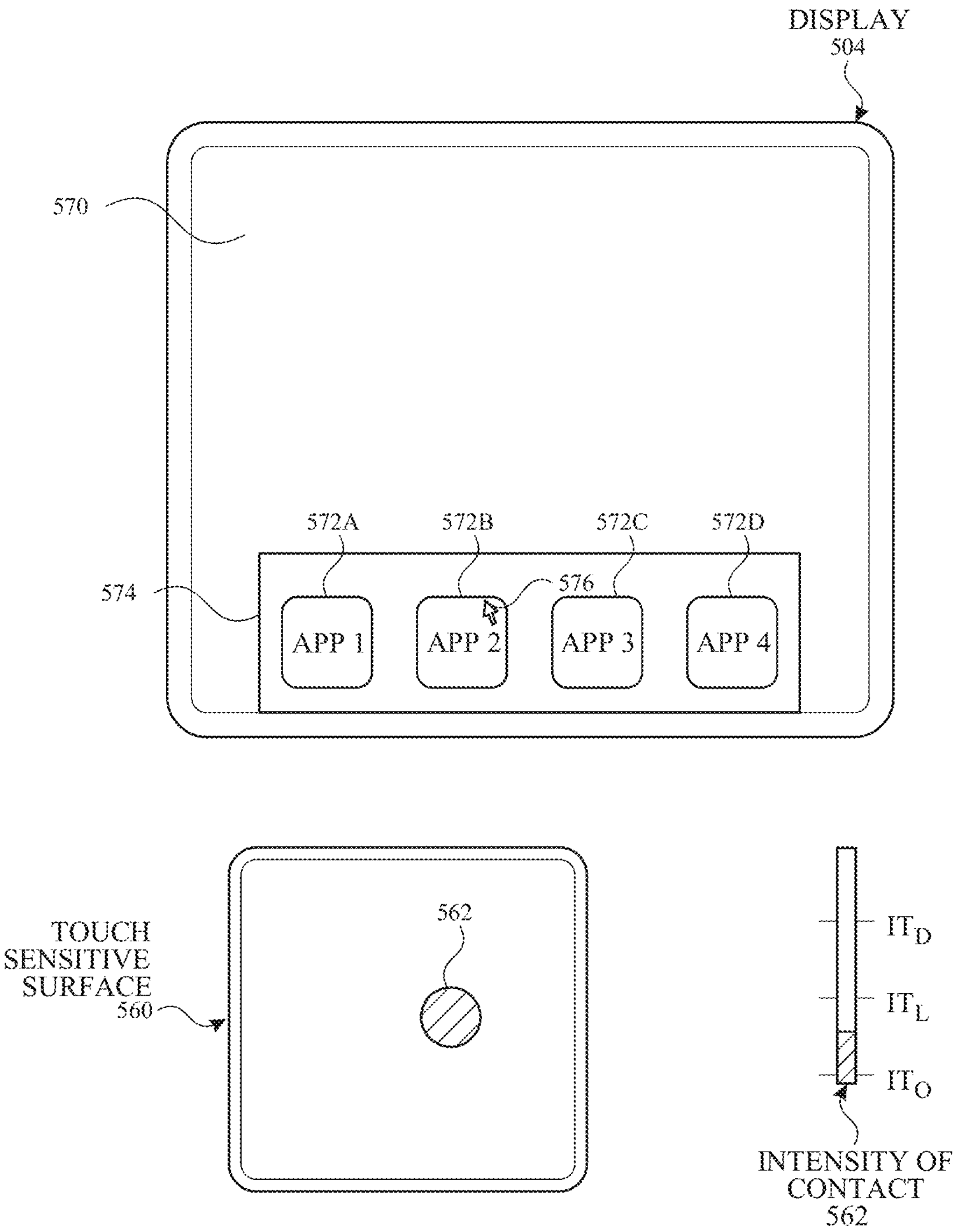
FIGS. 5E-5H illustrate exemplary components and user interfaces of a personal electronic device in accordance with some embodiments.
Figure 5F:
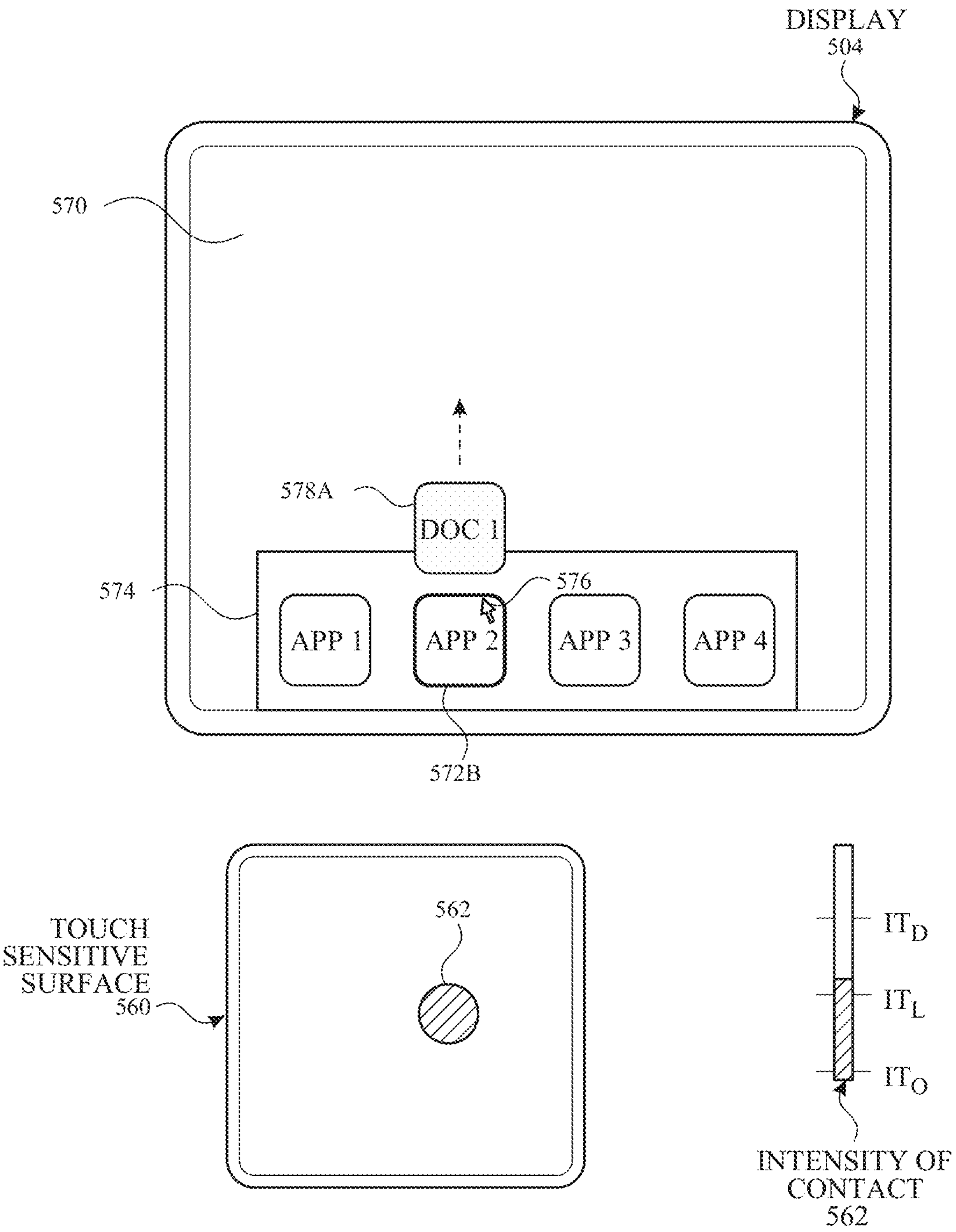
Figure 5G:
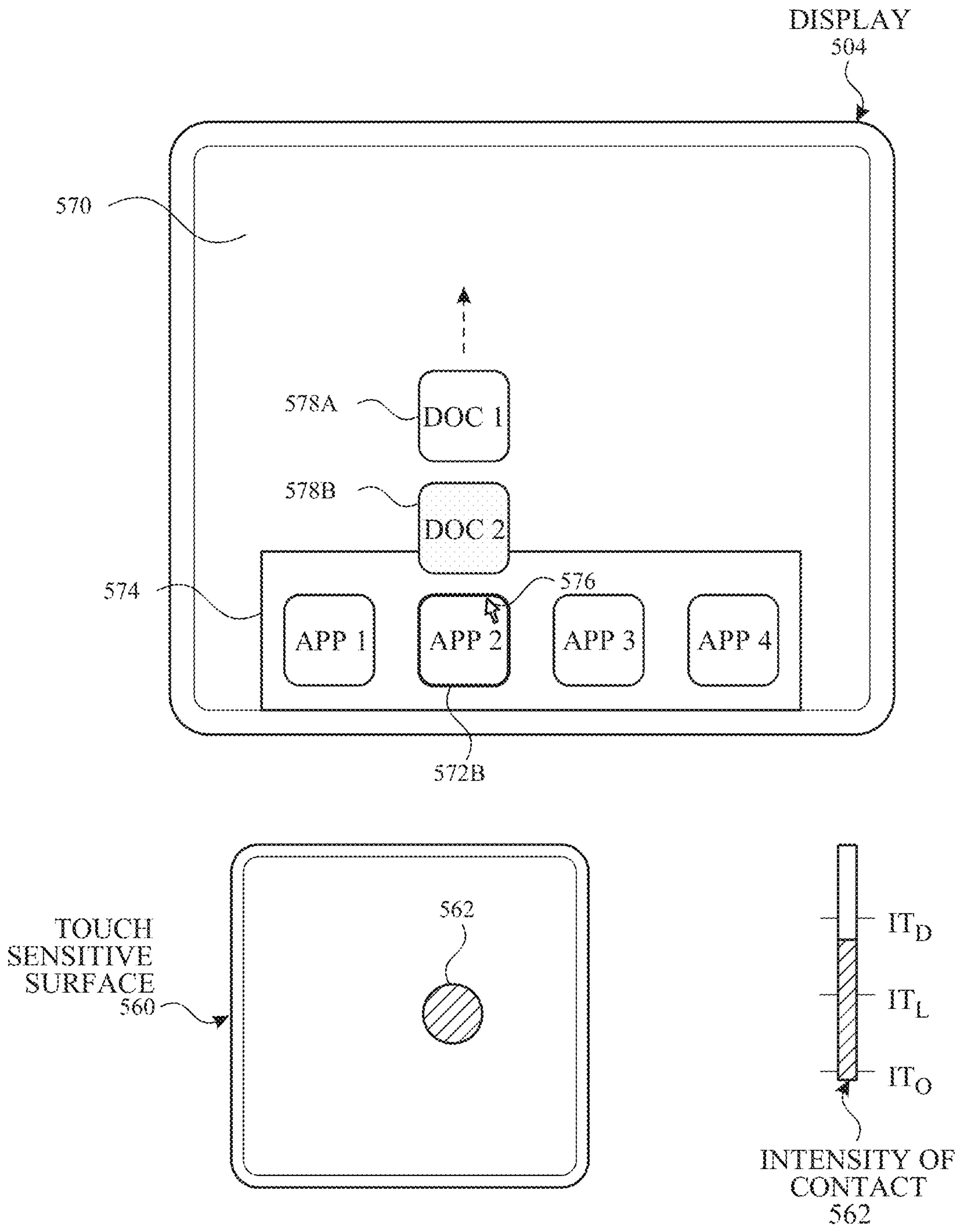
Figure 5H:
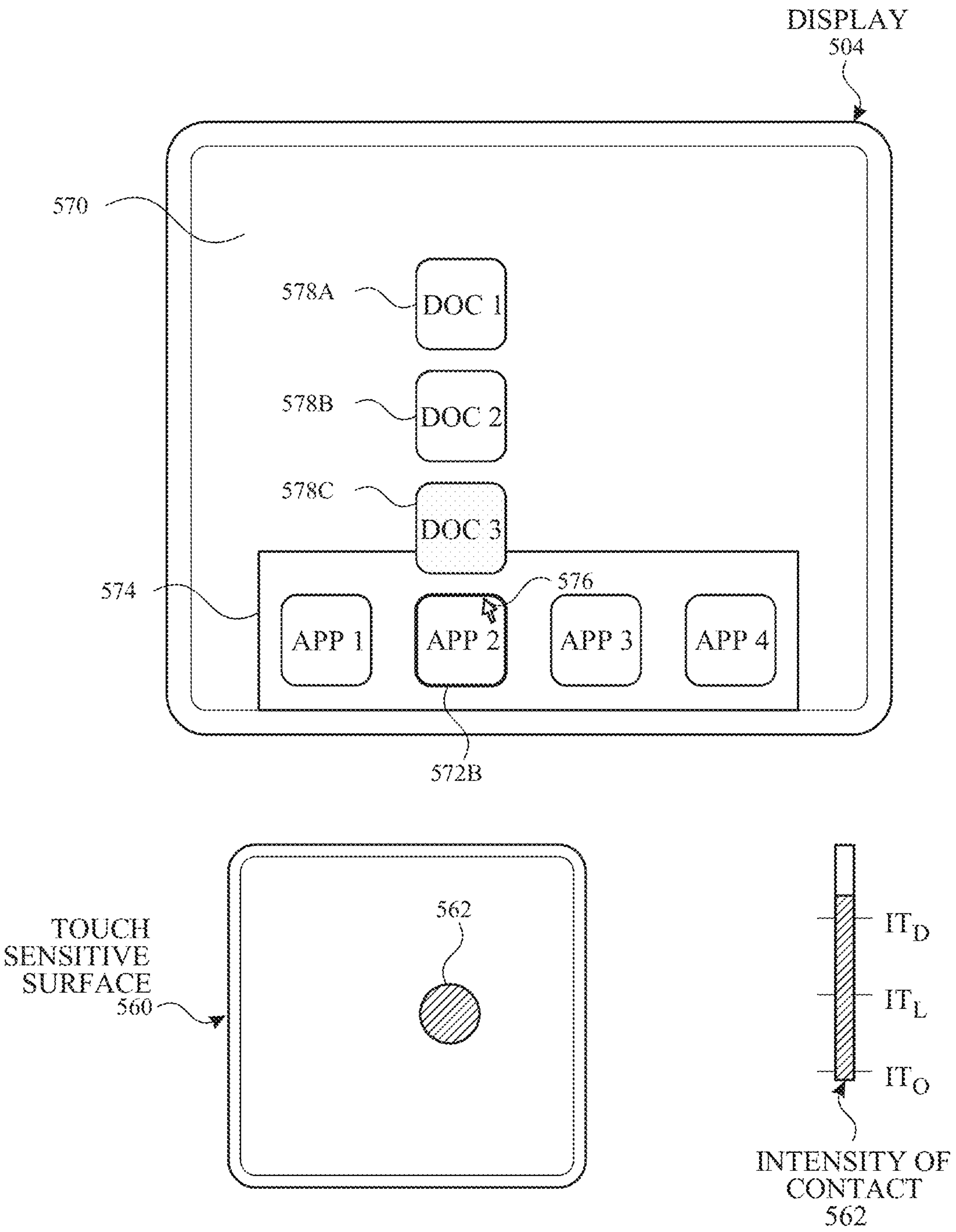

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5I. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT S"). In some embodiments, the intensity, on which the progress of the animation is based, is the characteristic intensity of the contact. The operations described with reference to FIGS. 5E-5H can be performed using an electronic device similar or identical to device 100, 300, or 500.

Figure 5I:
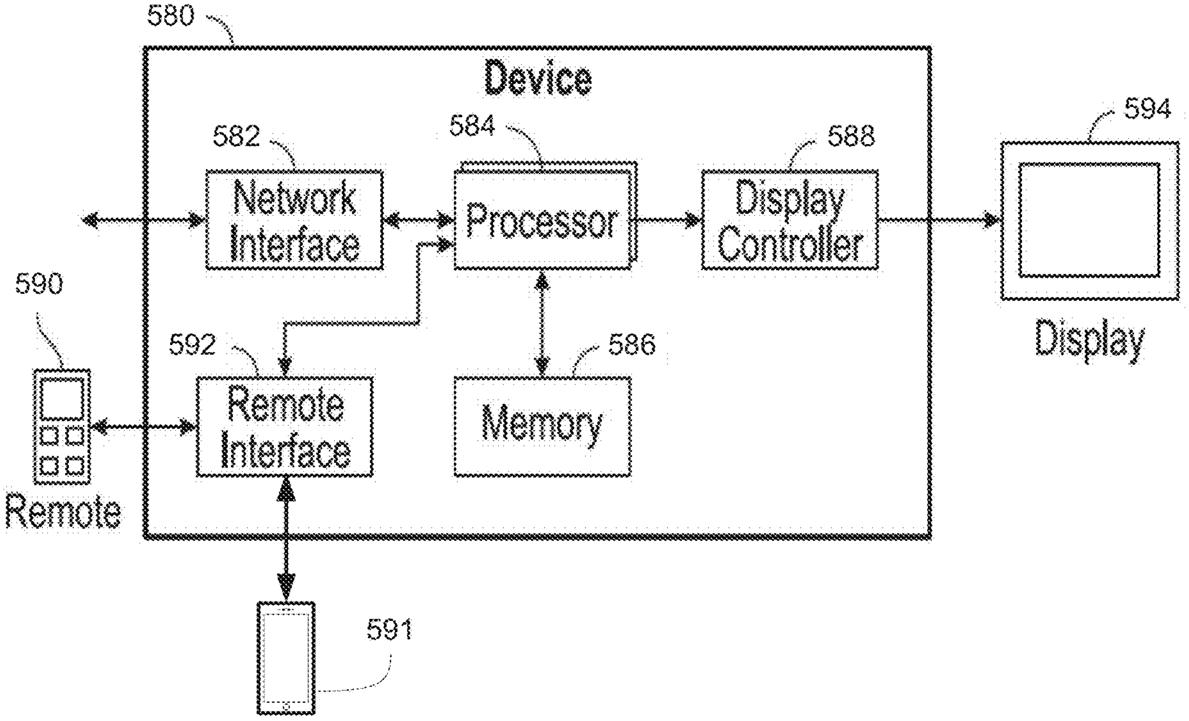
FIG. 5I illustrates a block diagram of an exemplary architectures for devices according to some embodiments of the disclosure.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., methods 700 and 900).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multifunction device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Straightening of Handwritten Content

Users interact with electronic devices in many different manners, including entering text into such devices. In some embodiments, an electronic device displays handwritten text in content entry regions. The embodiments described below provide ways in which an electronic device receives inputs to select and interact with portions of the handwritten text, including straightening the handwritten text, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6DD illustrate exemplary ways in which an electronic device selects and provides for manipulation of handwritten content in accordance with some embodiments of the disclosure. The embodiments in these figures are used to illustrate the processes described below, including the processes described with reference to FIGS. 7A-7J.

Figure 6B:
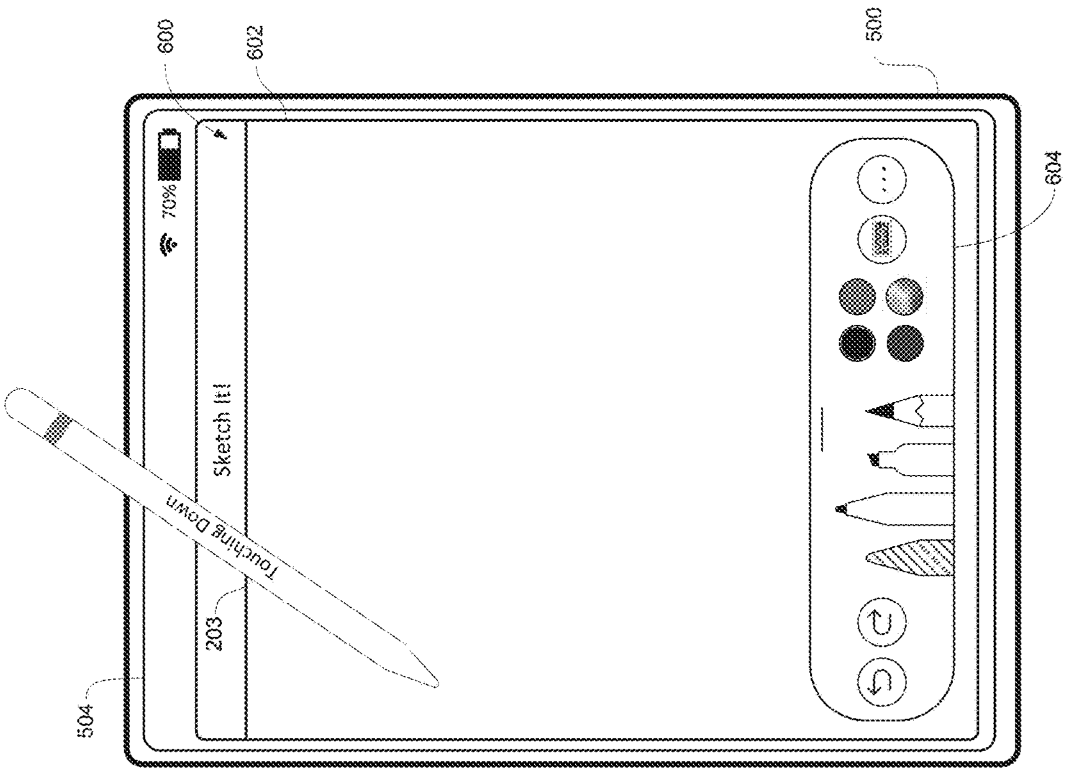
FIGS. 6A-6DD illustrate exemplary ways in which an electronic device selects and provides for manipulation of handwritten content in accordance with some embodiments of the disclosure.
Figure 6A:
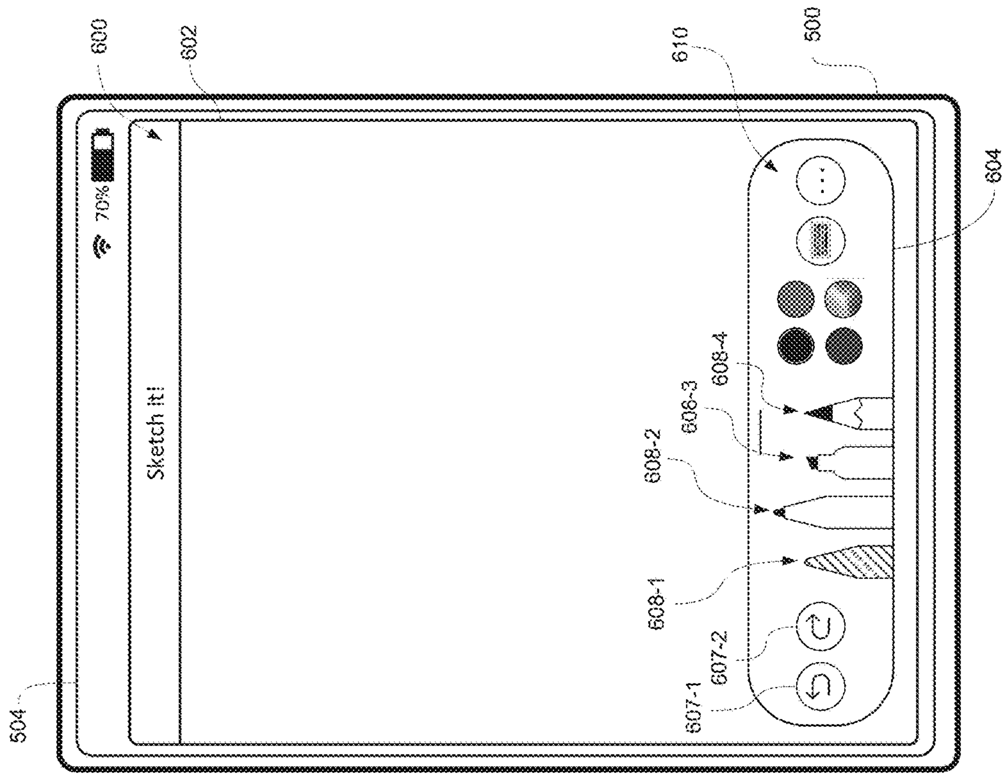

FIGS. 6A-6DD illustrate operation of the electronic device 500 for selecting and providing for manipulation of handwritten content. FIG. 6A illustrates electronic device 500 displaying user interface 600 (e.g., via a display device, via a display generation component, or via a touch screen). In some embodiments, user interface 600 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 600 is a user interface of a free-form handwriting application (e.g., for taking handwritten notes, drawing shapes, sketches, and/or drawings, composing handwritten text, and/or generating handwritten lists). In some embodiments, the handwriting application is an application installed on device 500.

In FIG. 6A, user interface 600 includes content-entry region 602. In some embodiments, content-entry region 602 is configured to receive handwritten input (e.g., a drawing and/or handwriting input via a stylus device) and display a representation of the handwritten input (e.g., if drawing and/or handwritten input is provided) and/or display font-based text (e.g., if font-based text input is provided). In FIG. 6A, user interface 600 includes content-entry palette 604. In some embodiments, content entry palette 604 is a user interface element that includes one or more selectable options associated with content in the content-entry region 602. For example, content entry palette 604 includes options for changing a color of content in the content-entry region (e.g., changing the color of existing content or changing the content of future content inserted by the user), options for changing the font of text in the content-entry region (e.g., changing the font of existing text or changing the font of future text inserted by the user), options for attaching or inserting rich objects (e.g., files, images, web-based links), options for selecting the content-entry tool, and/or options for displaying a soft keyboard for inserting font-based text in the content-entry region.

As shown in FIG. 6A, content entry palette 604 includes undo option 607-1 and redo option 607-2. In some embodiments, undo option 607-1 is selectable to undo the most recent action (e.g., content entry-related action) and redo option 607-2 is selectable to perform the most recent action again (e.g., content entry-related action). In some embodiments, content entry palette 604 includes selection tool 608-1, pen entry tool 608-2, highlighter entry tool 608-3, and pencil entry tool 608-4. In some embodiments, content entry palette 604 includes other options 610 that are selectable to perform other functions (e.g., display a font-based keyboard) or change one or more settings with respect to content in content entry region 602.

In some embodiments, selection of selection tool 608-1 causes the device to enter into selection mode in which handwritten inputs (e.g., encircling) drawn in the content entry region around representations of previous handwritten input cause the representations (e.g., handwritten text or shapes) to become selected (e.g., and enable subsequent operations involving the selected representations to be performed, as discussed in more detail below). In some embodiments, selection of pen entry tool 608-2 causes the device to enter into a pen entry mode in which handwritten inputs drawn in the content-entry region 602 are stylized as if drawn by a pen (e.g., without converting them to font-based text). In some embodiments, selection of highlighter entry tool 608-3 causes the device to enter into a highlighter entry mode in which handwritten inputs drawn in the content entry region are stylized as if drawn by a highlighter (e.g., without converting them to font-based text). In some embodiments, selection of pencil entry tool 608-4 causes the device to enter into a pencil entry mode in which handwritten inputs drawn in the content-entry region 602 are stylized as if drawn by a pencil (e.g., without converting them to font-based text). In some embodiments, content entry tools other than selection tool 608-1 are referred to as drawing tools (e.g., because the tools allow a user to draw in the content-entry region and without the drawn content being converted into font-based text). In FIG. 6A, pen entry tool 608-2 is currently active (e.g., as shown by the representation of pen entry tool 608-2 displayed higher than the other entry tools in the content entry palette 604).

In FIG. 6B, the electronic device 500 detects a contact with touch screen 504 provided by the stylus 203 (e.g., controlled by a user of the electronic device 500) while the pen entry tool 608-2 is active. In some embodiments, in response to the contact by stylus 203, a representation of the handwritten input (e.g., by stylus 203) is displayed at the contact location. Thus, the user is able to begin directly drawing/writing in content-entry region 602.

Figure 6D:
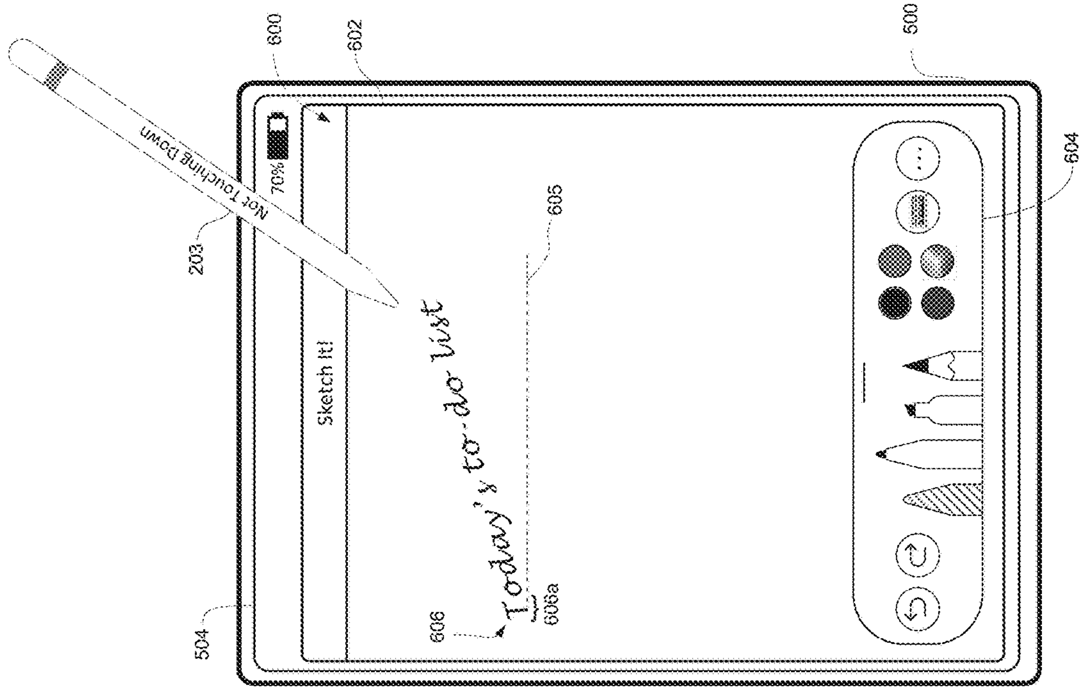
Figure 6C:
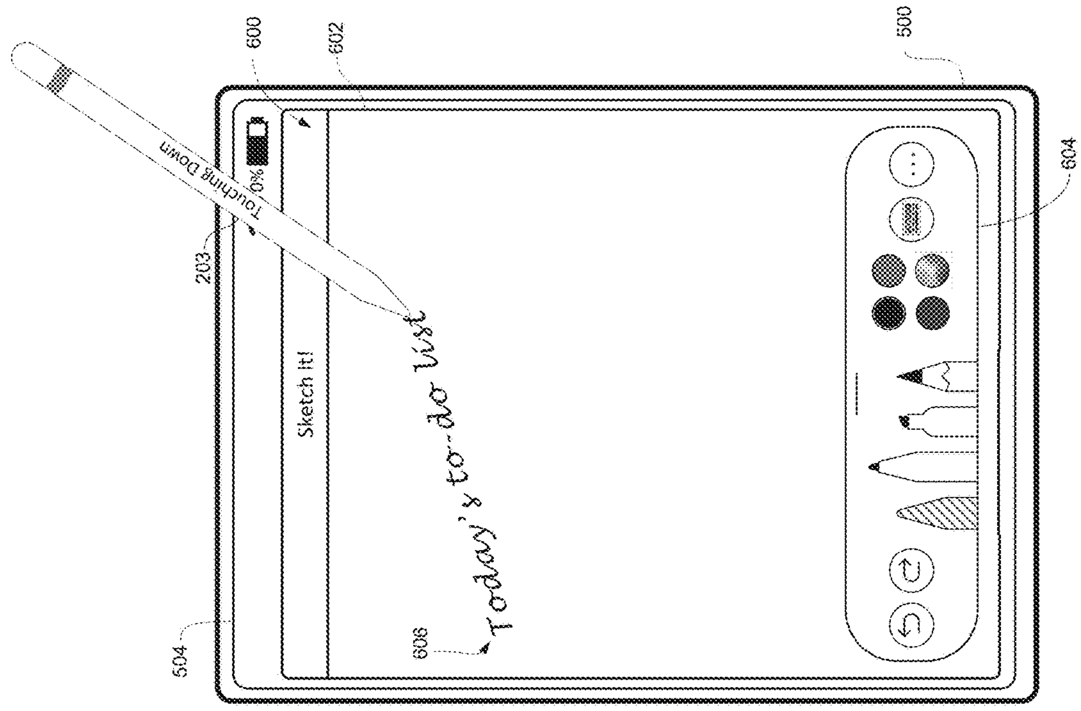

In FIG. 6C, while the contact is maintained with touch screen 504, the electronic device 500 detects handwriting movement by the stylus 203. In some embodiments, in response to detecting the handwriting movement, the electronic device 500 displays a representation of the handwritten input 606 in the content-entry region 602, as shown in FIG. 6C. In some embodiments, a representation of the handwritten input is displayed while the input is being received. As shown in FIG. 6C, the representation 606 corresponds to handwritten text provided by the user using the stylus 203 (e.g., comprising the words "Today's to-do list"). In FIG. 6D, the electronic device 500 detects a termination of the contact with touch screen 504 (e.g., lift-off of stylus 203 from touch screen 504). In some embodiments, in response to detecting the termination of the contact, the electronic device 500 maintains display of the representation of the handwritten input 606 in the content-entry region 802.

In some embodiments, the electronic device 500 facilitates manipulation of the handwritten content in the content-entry region 602. As described herein, one such manipulation includes changing a shape and/or orientation of the handwritten content in the content-entry region 602 such that the orientation of the handwritten content corresponds to a predefined orientation associated with the content-entry region 602. For example, as shown in FIG. 6D, the predefined orientation associated with the content-entry region 602 is a horizontal orientation (e.g., as indicated by an orientation of the words "Sketch It!" at a top region of the user interface 600). As described below, the electronic device 500 optionally provides for manipulating the handwritten content such that the orientation of the handwritten content aligns to the horizontal orientation of the content-entry region 602, which allows the handwritten content to be straightened in the content-entry region 602.

In some embodiments, the electronic device 500 changes the shape and/or orientation of the handwritten content in response to detecting an end of the handwritten input providing the handwritten content. For example, as shown in FIG. 6D and as mentioned above, the electronic device 500 detects lift-off of the stylus 203 from the surface of the touch screen 504. In some embodiments, as described below, in response to detecting the lift-off of the stylus (e.g., for more than a threshold amount of time, such as 0.5, 1, 1.5, 2, 3, 4, or 5 seconds), the electronic device 500 changes a shape and/or orientation of the representation of the handwritten input 606 to align to the horizontal orientation associated with the content-entry region 602, as represented by horizontal line 605 in FIG. 6D. For example, the representation of the handwritten input 606 has a baseline path formed by the bottom portions of the handwritten letters forming the handwritten phrase "Today's to-do list." As shown in FIG. 6D, an orientation of the baseline path is not aligned to the horizontal line 605 (corresponding to the orientation of the content-entry region 602). Additionally, the shape of the representation of the handwritten input 606 is optionally defined (e.g., partially) by the baseline path of representation of the handwritten input 606 and a size and form of the individual letters included in the representation of the handwritten input 606.

In some embodiments, the electronic device 500 changes the shape and/or orientation of the representation of the handwritten input 606 relative to a first character of the representation of the handwritten input 606. For example, as shown in FIG. 6D, the electronic device 500 changes the shape and/or orientation of the representation of the handwritten input 606 based on a location of the first character 606*a* (e.g., the letter "T") of the representation 606. In some embodiments, the electronic device 500 changes locations of the characters (e.g., letters) other than the first character 606*a* in the content-entry region 602 when aligning the representation 606 to the predefined orientation associated with the content-entry region 602 (e.g., the location of the first character 606*a* does not change in the content-entry region 602).

Figure 6F:
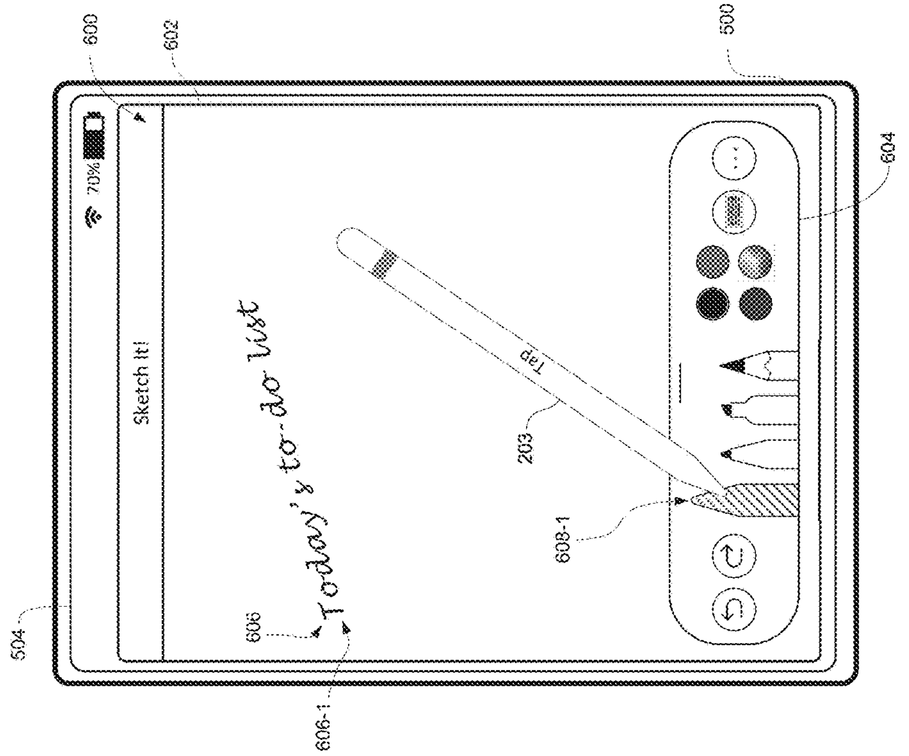
Figure 6E:
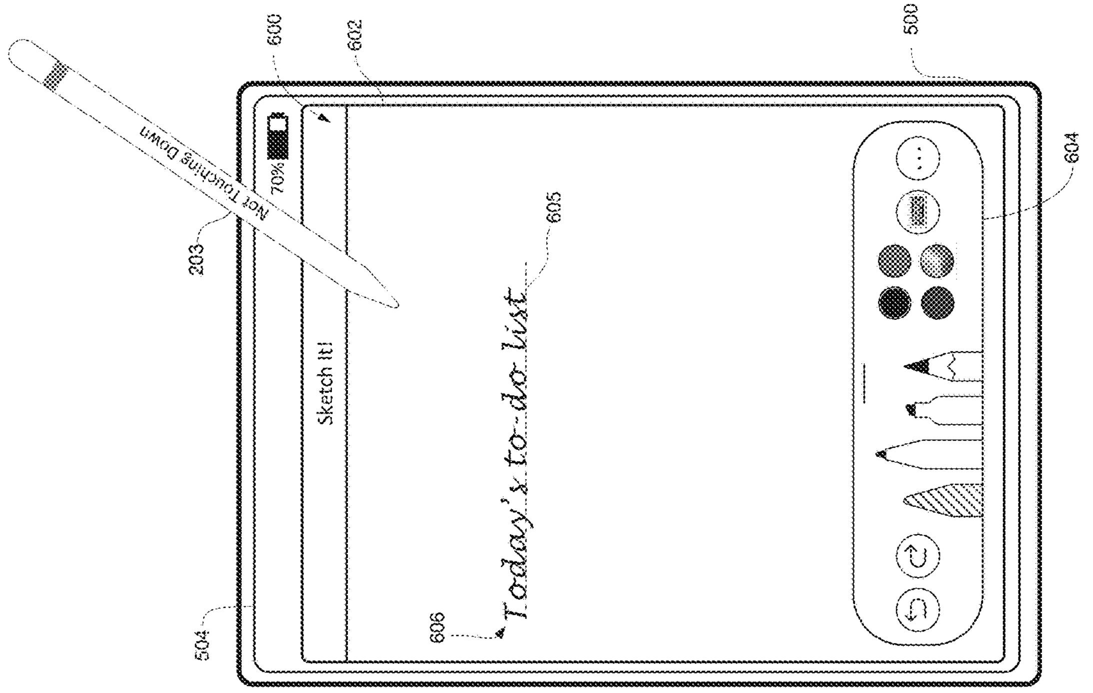

As shown in FIG. 6E, in some embodiments, in response to detecting the end of the handwritten input provided by the stylus 203, the electronic device changes the shape and/or orientation of the representation of the handwritten input 606 such that the representation 606 aligns with the predefined orientation of the content-entry region 602. For example, as shown in FIG. 6E, the electronic device 500 changes the shape of the representation of the handwritten input (e.g., by changing the individual shapes of the letters of the phrase "Today's to-do list" and/or rotating the letters of the phrase) to change the baseline path of the representation of the handwritten input 606 and align the representation 606 to the predefined orientation, represented by horizontal line 605. Additionally, as shown in FIG. 6E, without changing the location of the first letter "T," the electronic device changes the locations of the handwritten letters of the representation 606 within the content-entry region 602 to align the representation 606 to the predefined orientation. Thus, as outlined above, in some embodiments, the electronic device 500 straightens handwritten content in the content-entry region 602 relative to the predefined orientation of the content-entry region 602 in response to detecting an end of the handwritten input (e.g., detecting lift-off of the stylus 203).

In some embodiments, the electronic device 500 changes the shape and/or orientation of the representation of handwritten input 606 in the content-entry region 602 based on a detected language of the handwritten text of the representation of handwritten input 606. For example, in FIG. 6D, the handwritten text of the representation of handwritten input 606 is written in the English language. In some embodiments, as shown in FIG. 6E, because English is a language that is written and/or read left-to-right, the electronic device 500 changes the shape and/or orientation of the representation 606 to move the baseline path of the representation 606 in a direction (e.g., a clockwise direction) that aligns with the left-to-right orientation determined by the electronic device 500.

In some embodiments, the electronic device 500 changes the shape and/or orientation of the representation of handwritten input 606 in the content-entry region 602 based on an evaluation of the handwritten characters of the representation of handwritten input 606. For example, as similarly discussed above, the representation of handwritten input 606 includes the words "Today's to-do list," as shown in FIG. 6D. In some embodiments, the electronic device 500 compares the characters of (e.g., the letters of) the representation of handwritten input 606 to one or more characters in font-based text (e.g., such as the characters in the font-based text in which the words "Sketch It!" are displayed in the user interface 600). In some embodiments, the electronic device 500 determines the manner in which to change the shape and/or orientation of the representation of handwritten input 606 based on a shape of the one or more characters in the font-based text. For example, the one or more characters in the font-based text have a respective shape when displayed in a respective user interface and aligned to a predefined orientation of the respective user interface (e.g., which is optionally the same as the predefined orientation associated with the content-entry region 602). Accordingly, as shown in FIG. 6E, when the electronic device 500 changes the shape and/or orientation of the representation of handwritten input 606, the electronic device 500 rotates and/or moves the letters of the handwritten text "Today's to-do list" in the content-entry region 602 to adapt the shape and/or orientation of the representation of handwritten input 606 to the respective shape expected for the one or more characters in the font-based text.

As used herein, "straightening" the handwritten content in the content-entry region 602 refers to the above-described manner of changing the shape and/or orientation of the handwritten content to align the baseline path of the handwritten content to the predefined orientation associated with the content-entry region 602.

In some embodiments, the electronic device 500 straightens handwritten content in the content-entry region 602 in response to detecting selection of a straighten option displayed in the user interface 600. In FIG. 6F, the electronic device 500 displays the representation of the handwritten input 606 discussed above. As similarly described above, in FIG. 6F, the shape and/or orientation of the representation of the handwritten input 606 is not aligned to the predefined orientation associated with the content-entry region 602. In some embodiments, the electronic device provides for straightening the representation of the handwritten input 606 by displaying a selection option that is selectable to straighten the representation 606 in the content-entry region 602.

In some embodiments, the electronic device displays the selectable option in response to detecting selection of the representation of the handwritten input 606 in the content-entry region. For example, as shown in FIG. 6F, the electronic device 500 detects selection of the selection tool 608-1 (e.g., via a tap provided by the stylus 203), which causes the electronic device 500 to activate a selection mode in the content-entry region 602. As shown in FIG. 6G, in response to detecting movement by the stylus 203 on the surface of the touch screen 504 while in the selection mode, the electronic device 500 displays a first visual indication 612-1 in accordance with the movement by the stylus 203 that indicates a portion of the representation of the handwritten input 606 that will become selected (e.g., in response to detecting lift-off of the stylus 203 from the touch screen 504).

Figure 6H:
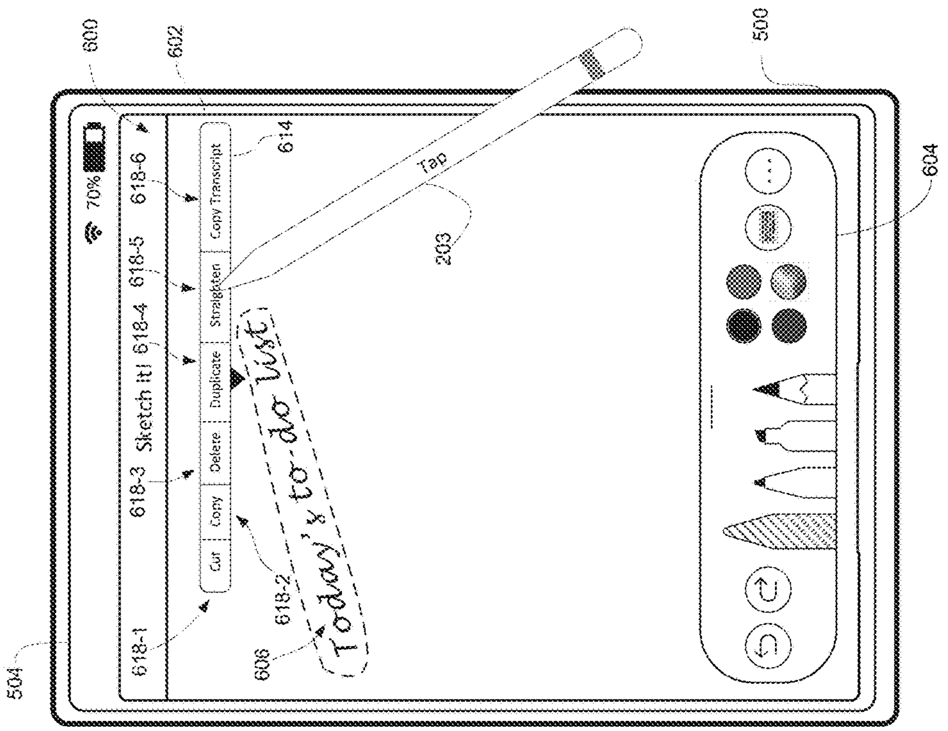
Figure 6G:
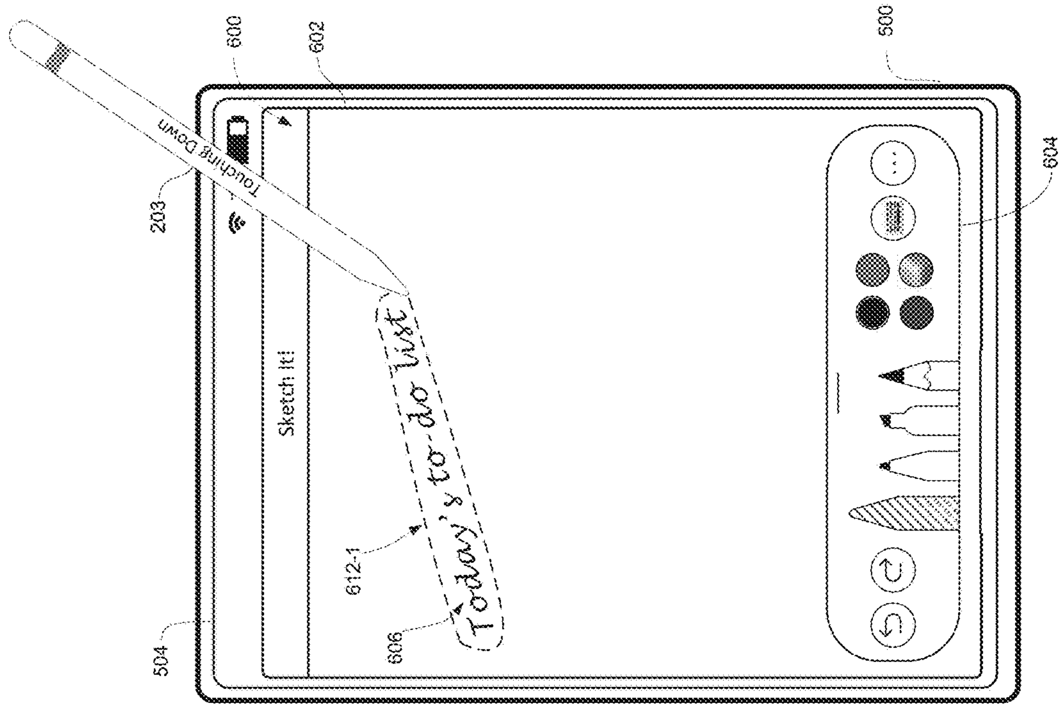

In FIG. 6H, in response to detecting lift-off of the stylus 203 from the touch screen 504, the electronic device 500 selects the portion of the representation of the handwritten input 606 indicated by the first visual indication 612-1 and optionally displays a toolbar element 614 in the content-entry region 602. As shown in FIG. 6H, the toolbar element 614 includes a plurality of selectable options 618-1 through 618-6 that are selectable to cause the electronic device 500 to perform corresponding options involving the representation of handwritten input 606. For example, as shown in FIG. 6H, the selectable option 618-1 is selectable to cut the representation of handwritten input 606 (e.g., remove and copy the content of the selected portion of the representation of handwritten input 606), selectable option 618-2 is selectable to copy the selected portion of the representation of handwritten input 606 (e.g., for pasting a copy of the representation of handwritten input 606 (e.g., in the content-entry region 602 or in a content-entry region of another user interface), selectable option 618-3 is selectable to cease display of the selected portion of the representation of handwritten input 606, selectable option 618-4 is selectable to display a duplicate of the selected portion of the representation of handwritten input 606 in the content-entry region, selectable option 618-5 is selectable to straighten the selected portion of the representation of handwritten input 606 as discussed below, and/or selectable option 618-6 is selectable to copy font-based text corresponding to the selected portion of the representation of handwritten input 606. In some embodiments, the toolbar element 614 is scrollable (e.g., horizontally scrollable) in the content-entry region 602 to reveal additional and/or alternative selectable options in the content-entry region 602. In some embodiments, one or more of the selectable options 618-1 through 618-6 are displayed in the toolbar element 614 after scrolling the toolbar element 614 (e.g., in response to scrolling input directed to the toolbar element 614). In some embodiments, the toolbar element 614 includes a different number (e.g., fewer or greater) of the selectable options than that shown in FIG. 6H.

Figure 6J:
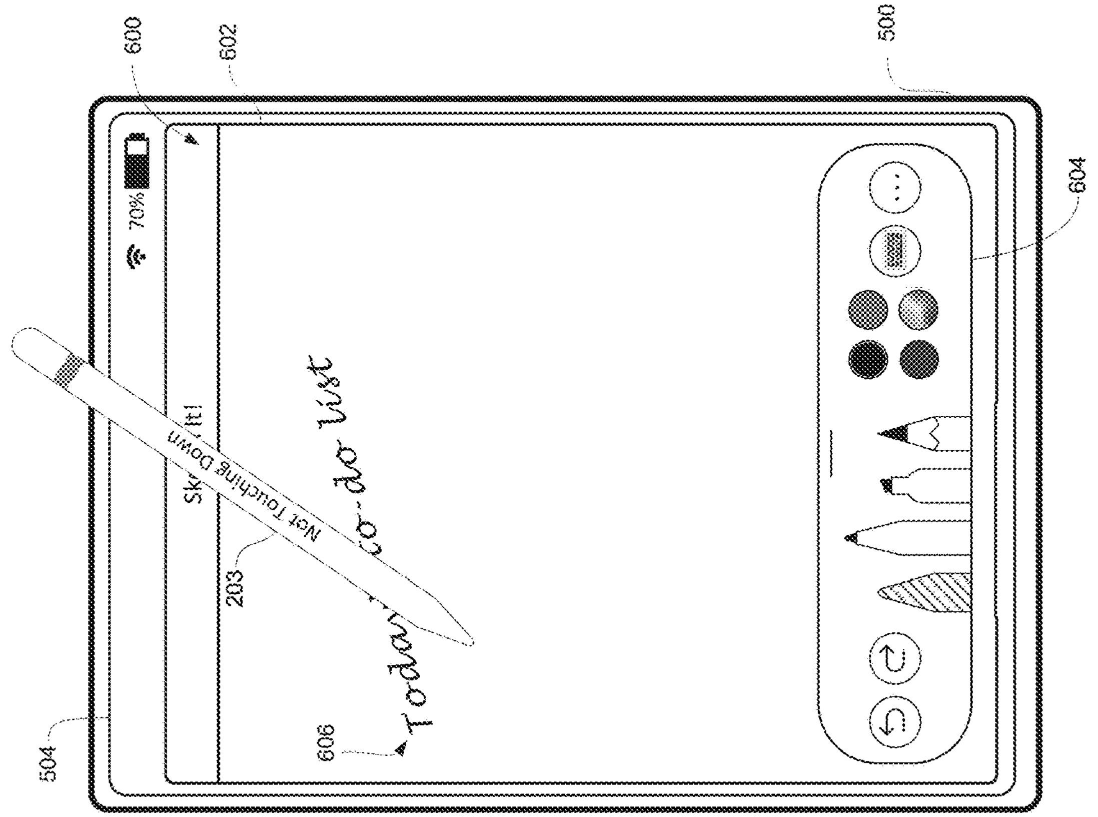
Figure 6I:
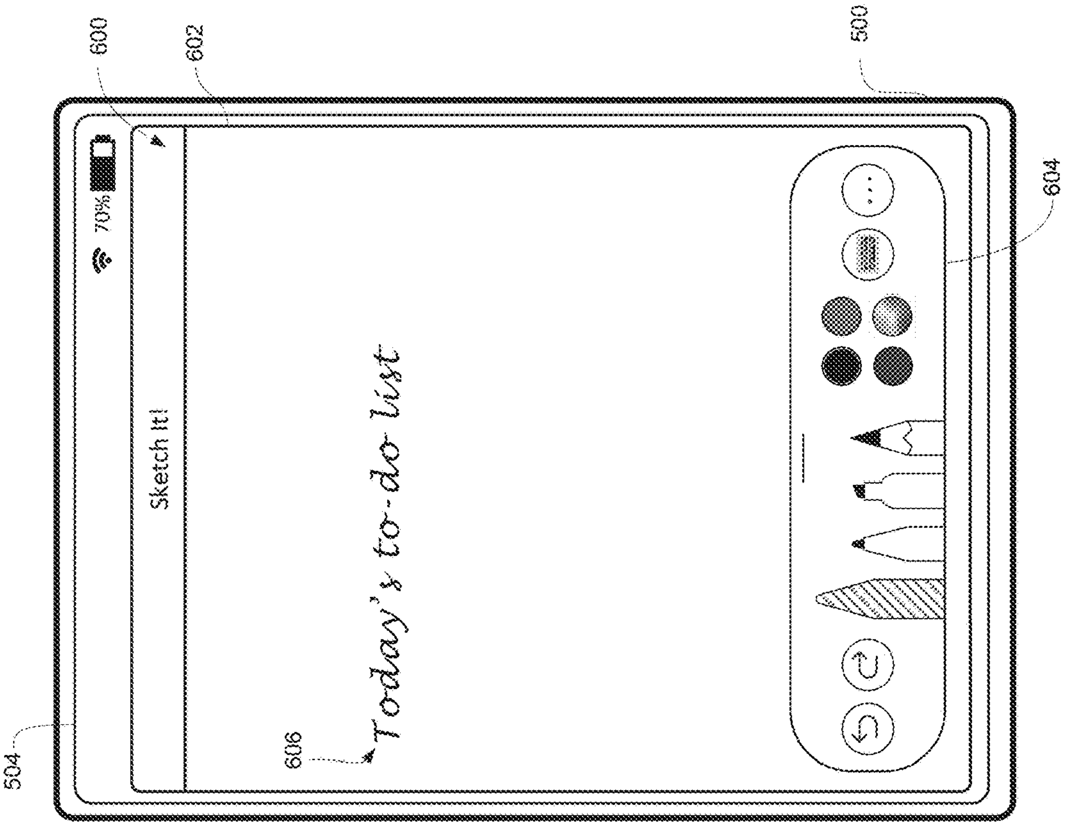

As discussed above, in some embodiments, the electronic device 500 straightens the selected portion of the representation of the handwritten input 606 in response to receiving selection of a straighten option (e.g., selectable option 618-5). As shown in FIG. 6H, the electronic device 500 detects a selection input (e.g., a tap input) provided by the stylus 203 directed to the selectable option 618-5 in the toolbar element 614. In response to detecting the selection of the selectable option 618-5, as shown in FIG. 6I, the electronic device 500 optionally straightens the selected portion of the representation of handwritten input 606 in the content-entry region 602. For example, as shown in FIG. 6I, the electronic device straightens the handwritten words "Today's to-do list" in the content-entry region 602 in a similar manner as described above.

In some embodiments, the electronic device 500 straightens a respective line of handwritten text in the content-entry region 602 in response to detecting handwritten input of a new line of handwritten text in the content-entry region 602. For example, as shown in FIG. 6J, the content-entry region 602 includes the representation of handwritten input 606 discussed previously above. As shown in FIG. 6J, the shape and/or orientation of the representation of handwritten input 606 is optionally not aligned to the predefined orientation associated with the content-entry region 602.

Figure 6K:
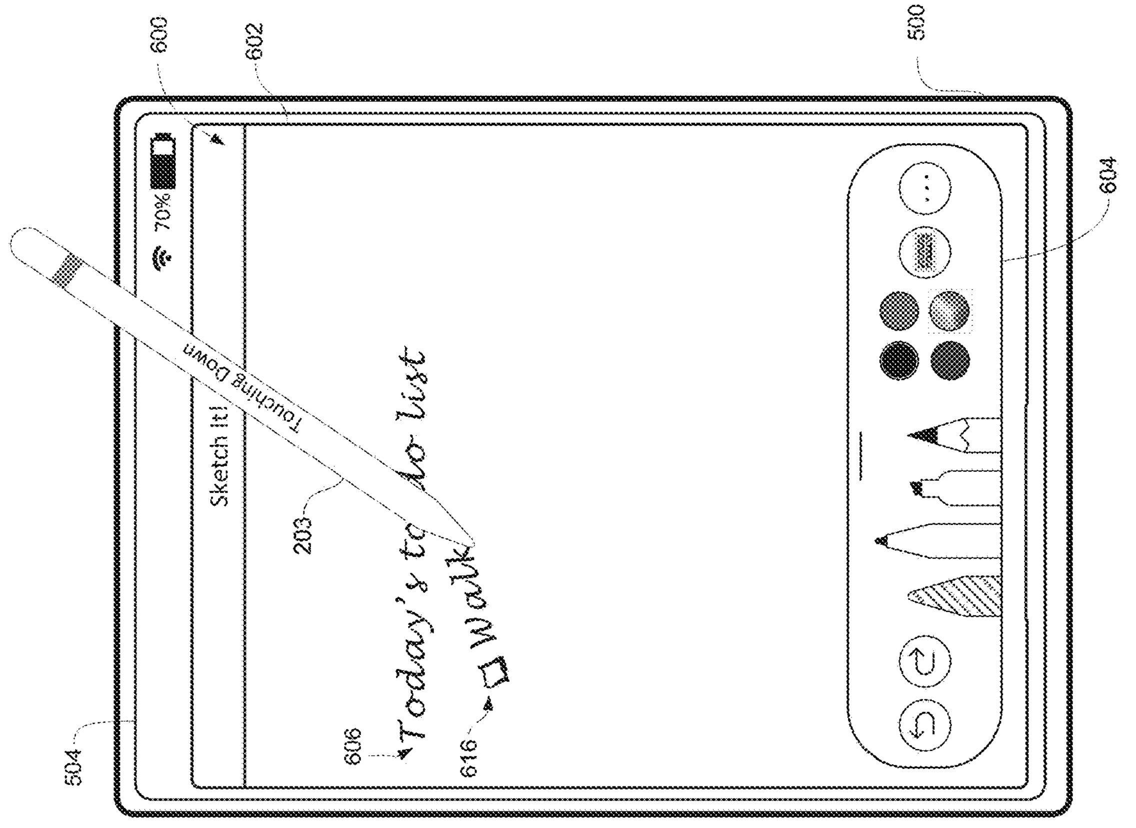

In FIG. 6J, the electronic device 500 detects the stylus 203 initiate writing a new line of handwritten text (e.g., below the representation of handwritten text 606) in the content-entry region 602. As shown in FIG. 6K, as the electronic device 500 detects movement of the stylus 203 on the touch screen 504, the electronic device 500 displays a second representation of handwritten input 616 (e.g., at the location of the movement of the stylus) as a second line of handwritten text in the content-entry region 602. Additionally, as shown in FIG. 6K, in response to detecting the handwriting of the second line of handwritten text by the stylus 203, the electronic device 500 straightens the representation of the handwritten input 606 displayed before detecting the input handwriting the second line of handwritten text. For example, as shown in FIG. 6K, the electronic device 500 aligns the representation of the handwritten input 606 to the predefined orientation associated with the content-entry region 602 while maintaining display of the second representation of the handwritten input 616 in the content-entry region 602 (e.g., optionally as the stylus 203 maintains contact with the touch screen 504, as shown).

Figure 6L:
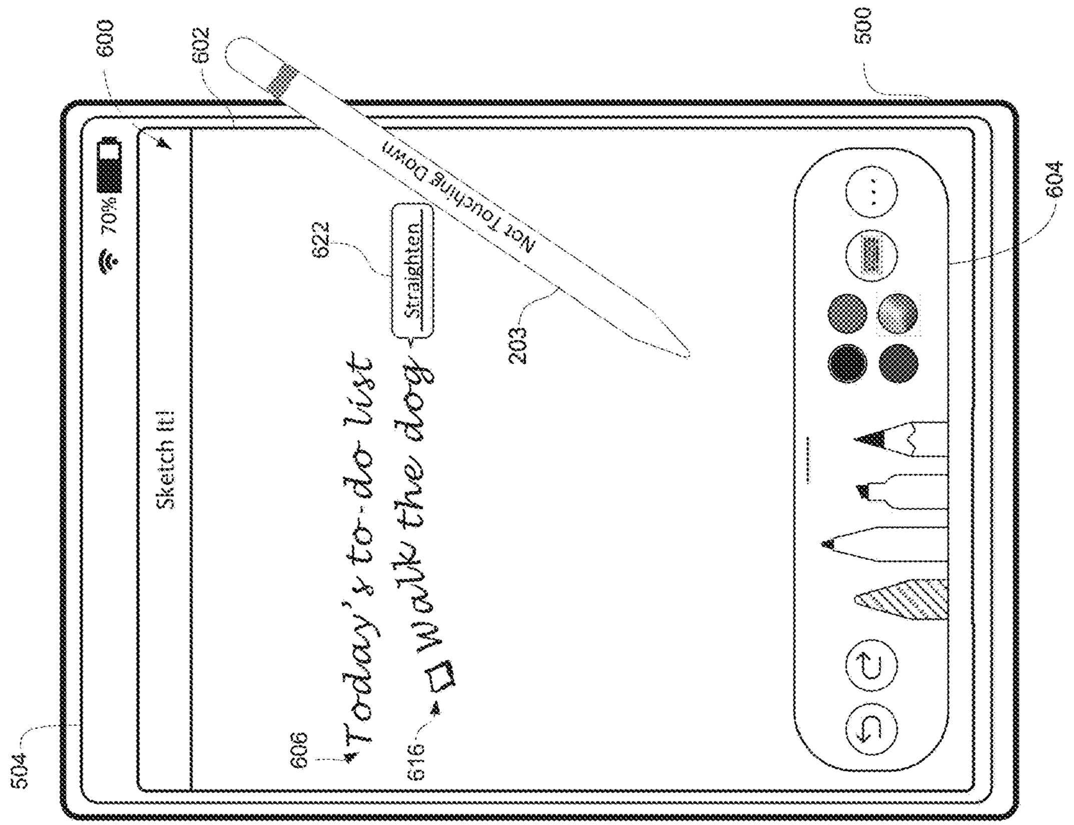

In some embodiments, the electronic device 500 displays a selectable option that is selectable to cause a respective line of handwritten text to be straightened in the content-entry region 602 when the electronic device 500 detects that the respective line of handwritten text has been written in the content-entry region 602. For example, in FIG. 6L, the electronic device 500 is displaying the second representation of handwritten input 616 that includes the handwritten text "Walk the dog." In some embodiments, as shown in FIG. 6L, in response to detecting an end of the handwritten input provided by the stylus 203 (e.g., lift-off of the stylus 203 from the touch screen 504), the electronic device 500 displays selectable option 622. As mentioned above, the selectable option 622 is optionally selectable to cause the electronic device 500 to straighten the second representation of handwritten input 616 in the content-entry region 602, as shown in FIG. 6M. In some embodiments, the electronic device 500 displays the selectable option 622 in FIG. 6L while detecting the handwritten input (e.g., and before detecting the end of the handwritten input) in the content-entry region 602.

In FIG. 6M, the electronic device 500 straightens the second representation of handwritten input 616 in the content-entry region 602 (e.g., in response to detecting selection of (e.g., a tap or touch input directed to) the selectable option 622 in FIG. 6L). In some embodiments, the electronic device 500 straightens handwritten content that also includes shapes. For example, as shown in FIG. 6L, the second representation of handwritten input 616 includes a non-textual drawing (e.g., a square). In some embodiments, because the non-textual drawing is written with textual content (e.g., the words "Walk the dog"), the electronic device 500 changes a shape of the non-textual drawing (e.g., rotates and/or shifts the square) in the content-entry region 602 when the electronic device 500 straightens the second representation of the handwritten input 616, as shown in FIG. 6M.

Figure 6N:
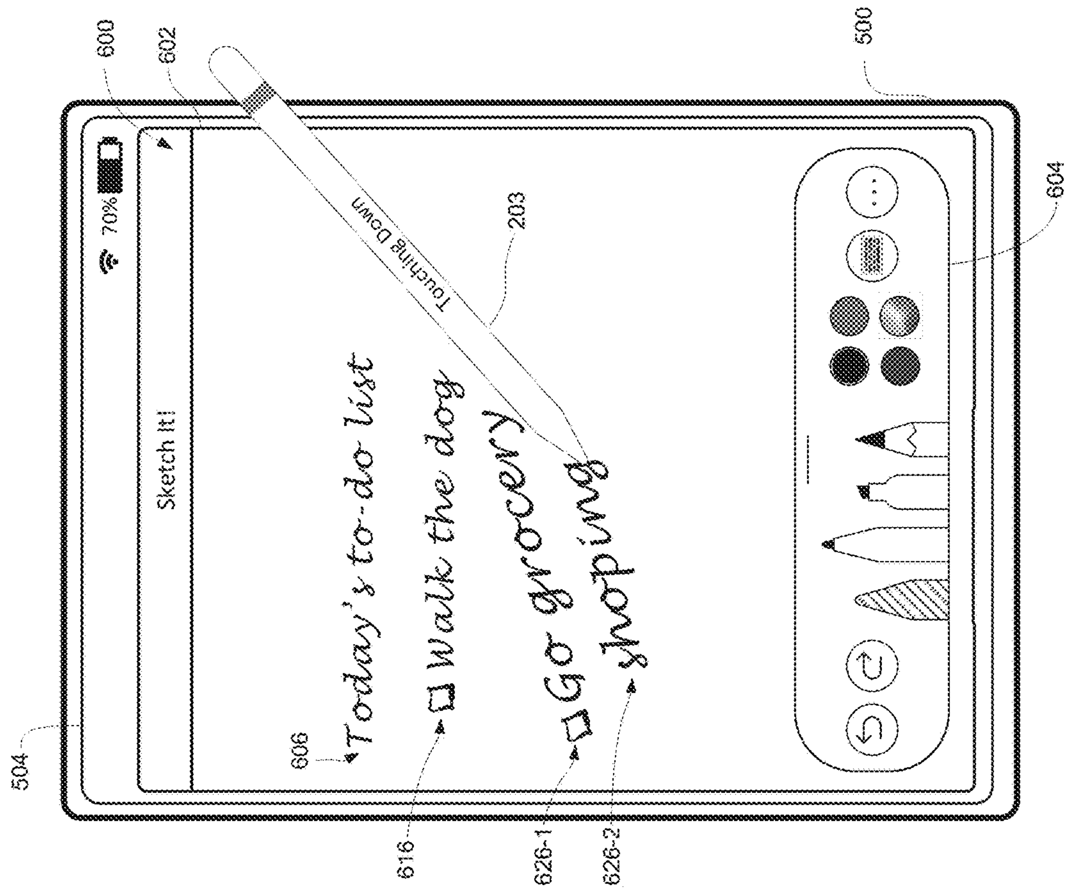
Figure 6M:
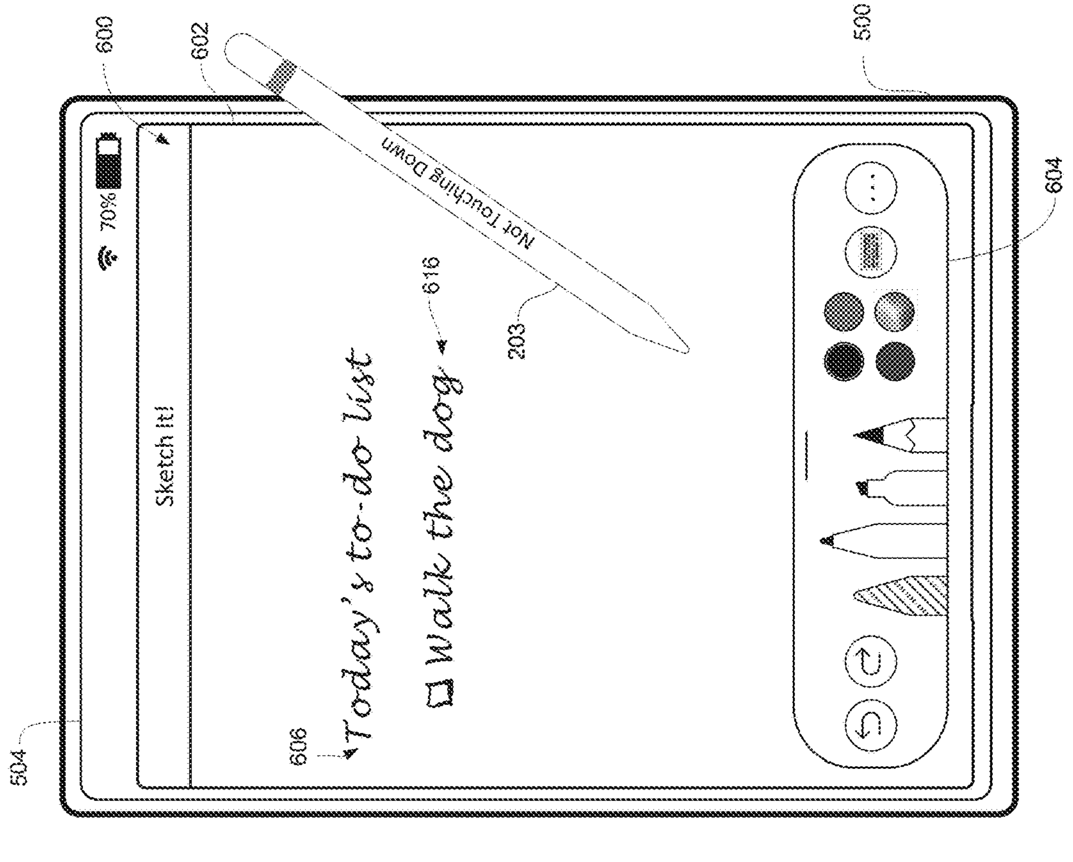
Figure 6P:
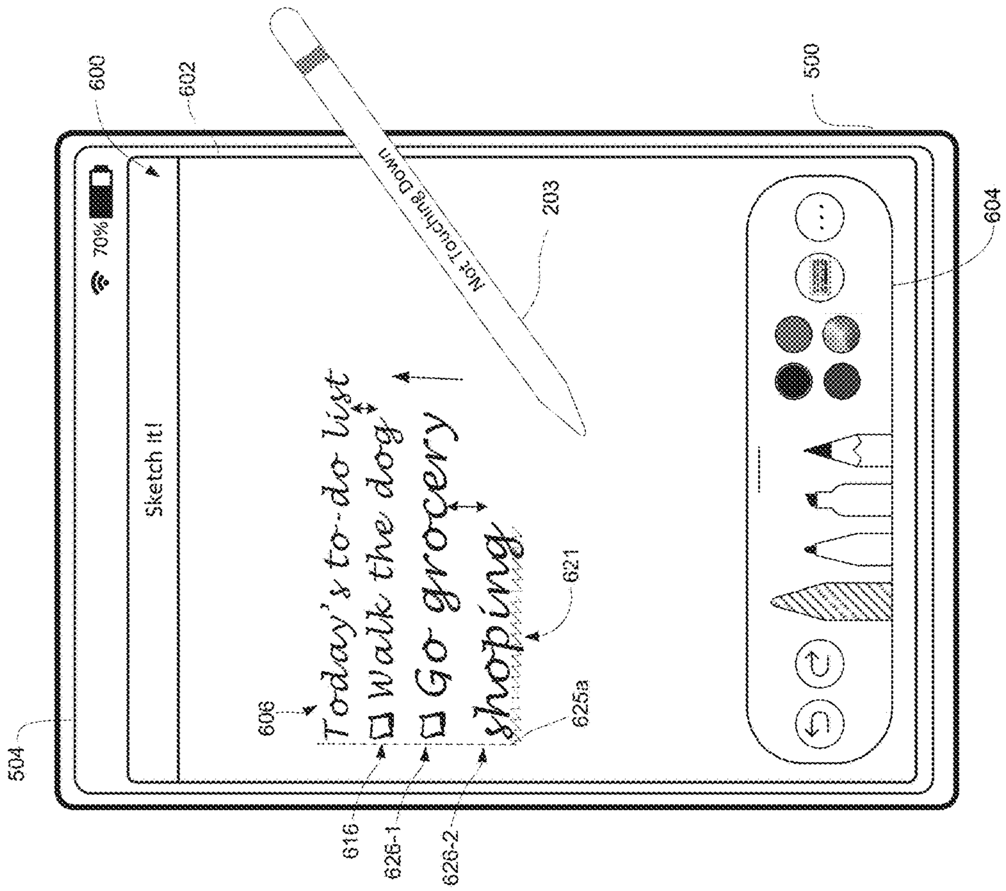
Figure 6O:
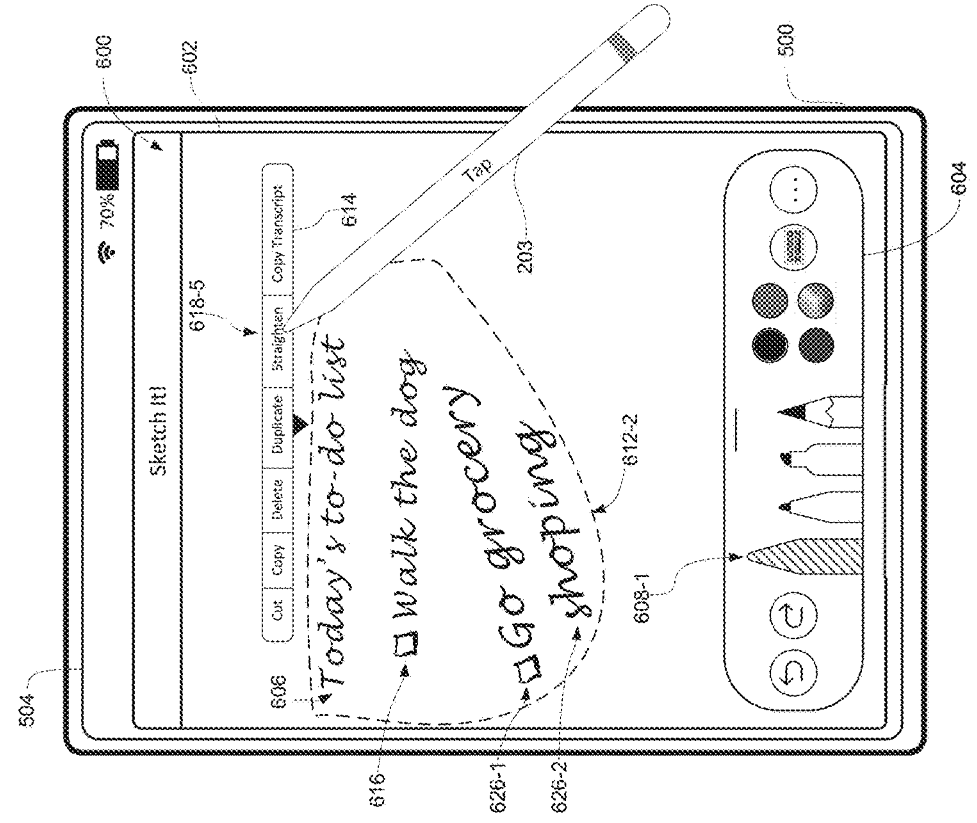

In FIG. 6N, the electronic device 500 detects handwritten input provided by stylus 203 in the content-entry region 602. In some embodiments, as shown in FIG. 6N, while detecting the handwritten input, the electronic device 500 displays a third representation of handwritten input 626, which includes a first line of handwritten text 626-1 and a second line of handwritten text 626-2. For example, the electronic device 500 displays a representation of the words "Go grocery shopping" in the content-entry region 602, as shown in FIG. 6O.

In some embodiments, the electronic device 500 straightens multiple lines of handwritten content in the content-entry region 602. For example, as shown in FIG. 6O, the representation of handwritten input 606, the second representation of handwritten input 616, and the third representation of handwritten input 626 are selected (e.g., represented by second visual indication 612-2) in the content-entry region 602 (e.g., using selection tool 608-1 in the content entry palette 604). In FIG. 6O, the electronic device 500 detects selection (e.g., using stylus 203) of selectable option 618-5 in the toolbar element 614 described previously above. In some embodiments, in response to detecting the selection of the selectable option 618-5, the electronic device 500 straightens the first line 626-1 and the second line 626-2 of the third representation of handwritten input in the content-entry region 602, as shown in FIG. 6P.

In some embodiments, when the electronic device 500 straightens multiple lines of handwritten content in the content-entry region 602, the electronic device 500 adjusts a line spacing between respective lines of handwritten content. For example, as shown in FIG. 6O, the representation of handwritten input 606 and the second representation of handwritten input 616 have a first separation (e.g., vertical distance) in the content-entry region 602, and the second representation of handwritten input 616 and the first line 626-1 of the third representation of handwritten input have a second separation, different from the first separation in the content-entry region 602. As shown in FIG. 6P, in response to detecting the selection of the selectable option 618-5 in FIG. 6O, the electronic device 500 moves the selected portions of the second representation of handwritten input 616 and the third representation of handwritten input 626 in the content-entry region 602. In some embodiments, when the electronic device 500 moves the selected portions of the second representation of handwritten input 616 and the third representation of handwritten input 626, the separation between the lines of handwritten content is consistent. For example, as shown in FIG. 6P, after the electronic device 500 moves the second representation 616 and the first line 626-1 of the third representation of handwritten input, the separation between the representation 606 and the second representation 616 is (e.g., substantially) equal to the separation between the second representation 616 and the first line 626-1 of the third representation in the content-entry region 602.

In some embodiments, the electronic device 500 adjusts the separation between respective lines of handwritten content based on a size of the handwritten content in the respective lines of handwritten content. In FIG. 6O, a size of the handwritten text (e.g., a vertical size, such as a height, of the character(s)) of the third representation of handwritten input 626 is larger than a size of the handwritten text of the second representation of handwritten input 616 and/or a size of the handwritten text of the representation of handwritten input 606. As shown in FIG. 6P, when the electronic device moves the handwritten content in response to detecting the selection of the selectable option 618-5 in FIG. 6O, the separation between the representation 606 and the second representation 616 is smaller than the separation between the first line 626-1 and the second line 626-2 of the third representation in the content-entry region 602. For example, the size of the handwritten text of the third representation of handwritten input causes the separation between the first line 626-1 and the second line 626-2 to be larger than the separation between the representation 606 and the second representation 616, which contain handwritten text that is smaller than the handwritten text of the third representation, as discussed above.

In some embodiments, when the electronic device 500 straightens multiple lines of handwritten content in the content-entry region 602, the electronic device 500 aligns the lines of handwritten content to a predefined margin associated with the content-entry region 602. For example, in FIG. 6O, a starting location of the representation of handwritten input 606 is different from a starting location of the second representation of handwritten input 616 and starting locations of the first line 626-1 and the second line 626-2 of the third representation of handwritten input in the content-entry region 602. In some embodiments, as shown in FIG. 6P, in response to detecting selection of the selectable option 618-5 in FIG. 6O, the electronic device 500 moves the starting locations of the representations 606, 616, and/or 626 to align the representations 606, 616, and 626 to the predefined margin associated with the content-entry region 602, represented by the vertical line 625*a*.

In some embodiments, the predefined margin associated with the content-entry region 602 is selected by the user of the electronic device 500. For example, the user sets the margin associated with the content-entry region 602 to be left-aligned in one or more settings of the user interface 600. In some embodiments, the predefined margin associated with the content-entry region 602 is selected by the electronic device 500 based on a detected language of the handwritten text of the handwritten content in the content-entry region 602. For example, in FIG. 6O, the handwritten text of the representations 606, 616, and/or 626 are written in the English language. In FIG. 6P, because English is a language that is written and/or read left-to-right, the electronic device 500 aligns the handwritten content to the left-aligned margin (e.g., represented by line 625*a*) in the content-entry region 602 in a similar manner as described above.

In some embodiments, when the electronic device 500 straightens one or more lines of handwritten content in the content-entry region 602, the electronic device 500 initiates one or more processes for performing additional document cleanup operations involving the handwritten content in the content-entry region 602. For example, one such document cleanup operation includes evaluating the handwritten text of the handwritten content in the content-entry region 602 for misspellings. In FIG. 6O, the handwritten word "shopping" in the second line 626-2 of the third representation of handwritten input is a misspelling of the word "shopping." Accordingly, in FIG. 6P, when the electronic device 500 straightens the first line 626-1 and the second line 626-2 of the third representation of handwritten input, the electronic device 500 evaluates the handwritten text in the selected portion of the representations 606, 616, and 626 for misspellings. As shown in FIG. 6P, in response to determining the misspelling of the handwritten word "shopping," the electronic device 500 displays a respective visual indication 621 beneath the portion of the handwritten text corresponding to the word "shopping" to indicate that the word is perceived as being misspelled (e.g., which allows the user to correct the perceived misspelling). It should be understood that, in some embodiments, the electronic device 500 initiates performance of additional and/or alternative document cleanup operations when straightening handwritten content in the content-entry region 602, such as grammar and/or punctuation evaluations, word usage evaluations, and/or line wrapping evaluations (e.g., which is described in more detail in method 900).

Figure 6R:
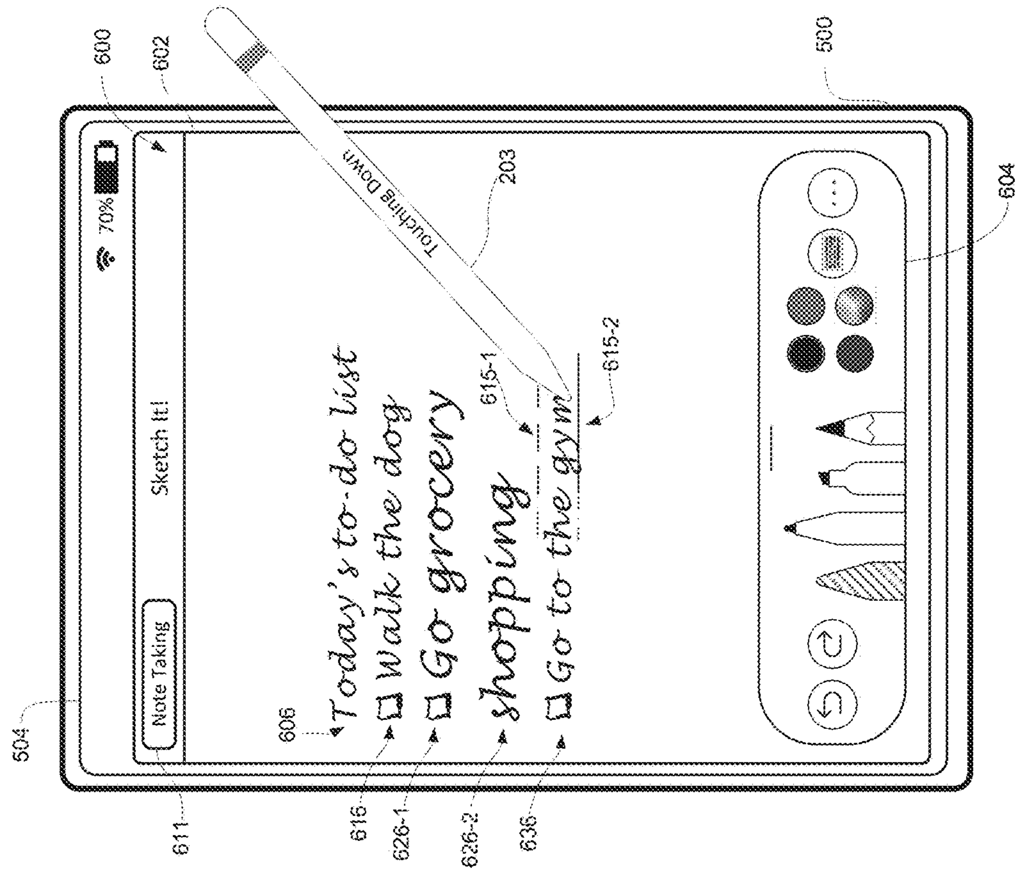
Figure 6Q:
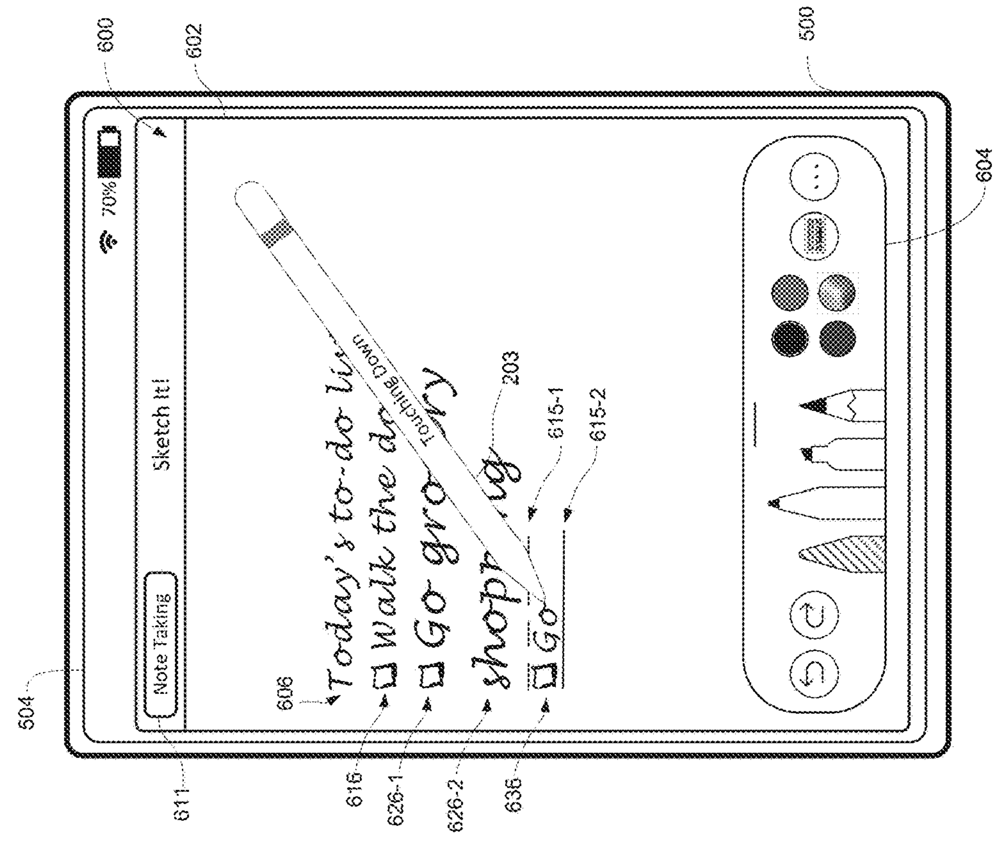

In some embodiments, the electronic device 500 displays visual handwriting guidance in the content-entry region 602 when detecting handwritten input. For example, as shown in FIG. 6Q, in response to detecting handwritten input provided by the stylus 203 in the content-entry region 602, the electronic device 500 displays one or more visual guidelines 615 with a fourth representation of handwritten input 636 in accordance with the handwritten input. In some embodiments, the electronic device 500 displays a first visual guideline 615-1 and a second visual guideline 615-2 below the first visual guideline 615-1. In some embodiments, the first visual guideline 615-1 and the second visual guideline 615-2 have a predefined separation in the content-entry region 602. For example, the predefined separation is selected by the electronic device 500 without user input specifying a separation distance. In some embodiments, the separation between the first visual guideline 615-1 and the second visual guideline 615-2 is based on a size (e.g., a vertical size, such as a height) of the handwritten content in the fourth representation of handwritten input 636. In some embodiments, the separation between the first visual guideline 615-1 and the second visual guideline 615-2 is based on the writing tool that is selected when the handwritten input is detected. For example, the electronic device 500 determines the separation between the first visual guideline 615-1 and the second visual guideline 615-2 based on a thickness of the strokes of handwritten input provided by the selected writing tool.

In some embodiments, as shown in FIG. 6Q, an orientation of the one or more guidelines is aligned to the predefined orientation associated with the content-entry region 602. For example, as shown in FIG. 6Q, the first visual guideline 615-1 and the second visual guideline 615-2 extend across the content-entry region 602 in a horizontal direction that aligns with the horizontal orientation associated with the content-entry region 602. In some embodiments, the first visual guideline 615-1 and the second visual guideline 615-2 provide guidance for the (e.g., user providing the) handwritten input detected by the electronic device 500, such that the shape and/or orientation of the fourth representation of handwritten input 636 at least substantially aligns with the predefined orientation associated with the content-entry region 602 (e.g., so long as the handwritten input is provided in the region between the first visual guideline 615-1 and the second visual guideline 615-2), as shown in FIG. 6Q.

In some embodiments, the electronic device 500 displays the one or more visual guidelines based on whether a respective mode associated with the user interface 600 is active at the electronic device 500. For example, the electronic device 500 displays the one or more visual guidelines if a note-taking mode is active but forgoes displaying the one or more visual guidelines if a drawing mode is active instead. As shown in FIG. 6Q, a note-taking mode is optionally active at the electronic device 500 (e.g., as indicated by visual indication 611) when the handwritten input provided by the stylus 203 on the touch screen 504 is detected. Accordingly, as shown in FIG. 6Q, the electronic device 500 displays the first visual guideline 615-1 and/or the second visual guideline 615-2 in the content-entry region 602 in response to detecting the handwritten input, as similarly discussed above.

In some embodiments, the electronic device 500 alters display of the one or more visual guidelines in the content-entry region 602 as additional portions of the handwritten input are detected. For example, in FIG. 6R, the electronic device 500 has detected additional handwritten input corresponding to handwritten text "Go to the gym," as reflected in the fourth representation of handwritten input 636 in the content-entry region 602. As shown in FIG. 6R, the electronic device 500 fades a portion of the one or more visual guidelines as a current location of the handwritten input moves farther from the starting location of the handwritten input. For example, the electronic device 500 is detecting handwritten input provided by the stylus 203 corresponding to a handwritten "m" in the content-entry region 602. In FIG. 6R, the current location of the handwritten input provided by the stylus 203 is optionally more than a predetermined distance (e.g., 0.5, 1, 2, 3, 4, 5, 15, or 20 cm) from a first end of the one or more visual guidelines. Accordingly, as shown in FIG. 6R, the electronic device fades the first end of the first visual guideline 615-1 and the second visual guideline 615-2. Additionally, in FIG. 6R, the current location of the handwritten input provided by the stylus 203 is optionally less than the predetermined distance from a second end, opposite the first end, of the one or more visual guidelines. Accordingly, as shown in FIG. 6R, the electronic device forgoes fading the second end of the first visual guideline 615-1 and the second visual guideline 615-2 in the content-entry region 602.

In some embodiments, the electronic device 500 ceases display of the one or more visual guidelines in response to detecting an end of the handwritten input. For example, in FIG. 6S, the electronic device 500 detects lift-off of the stylus 203 from the touch screen 504 corresponding to an end of the handwritten input associated with the fourth representation of handwritten input 636. In some embodiments, in response to detecting the end of the handwritten input, the electronic device 500 ceases display of the first visual guideline 615-1 and the second visual guideline 615-2 in the content-entry region 602 while maintaining display of the fourth representation of handwritten input 636, as shown in FIG. 6S.

Figure 6T:
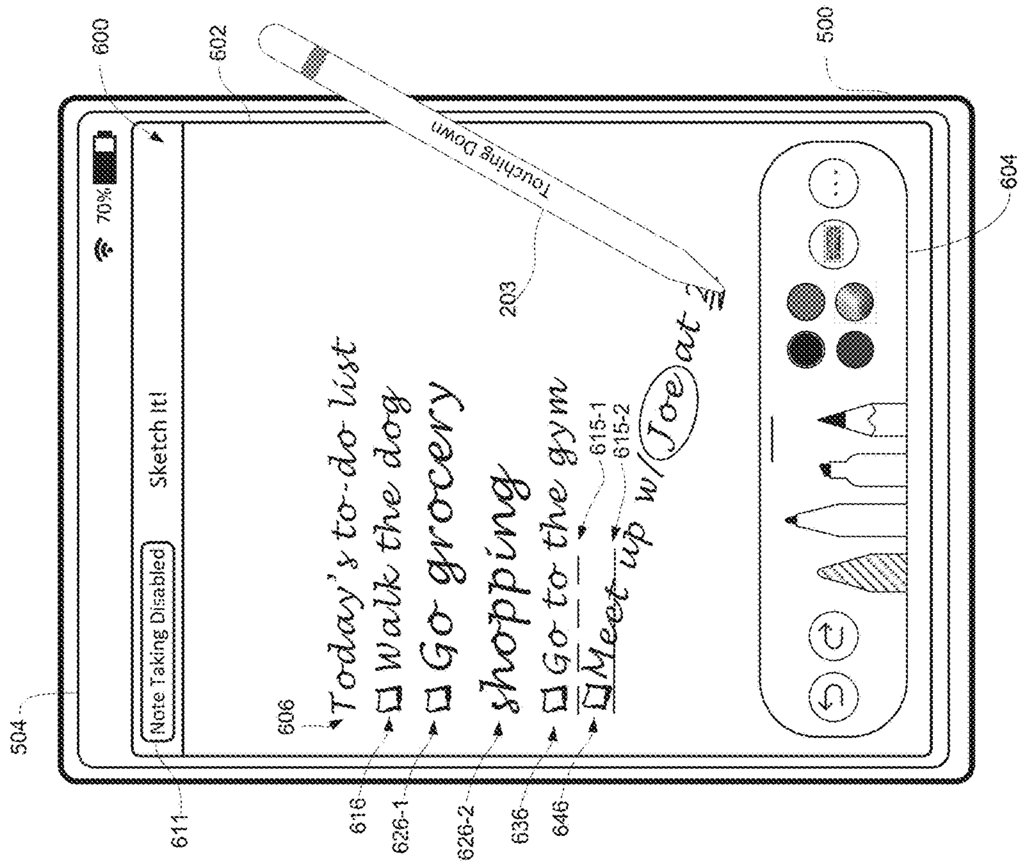
Figure 6S:
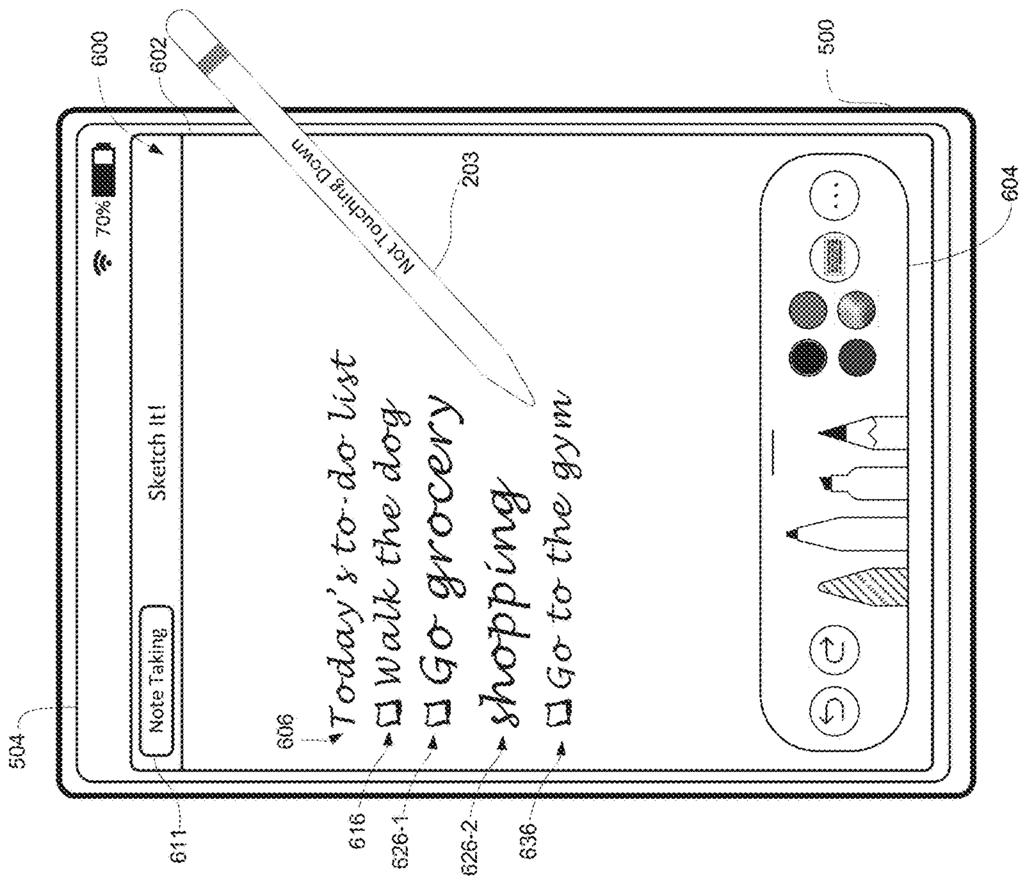

In FIG. 6T, the electronic device 500 detects handwritten input on the touch screen 504 provided by the stylus 203. As shown in FIG. 6T, while detecting the handwritten input, the electronic device 500 displays a fifth representation of handwritten input 646 in the content entry-region 602. Additionally, as similarly described above, in response to detecting the handwritten input, the electronic device 500 displays one or more visual guidelines, such as the first visual guideline 615-1 and the second visual guideline 615-2, in the content-entry region 602. As shown in FIG. 6T, portions of the handwritten input are provided outside of the first visual guideline 615-1 and the second visual guideline 615-2, such that the fourth representation of handwritten input 646 is not aligned to the predefined orientation associated with the content-entry region 602. Additionally, as shown in FIG. 6T, the electronic device 500 displays the first visual guideline 615-1 and the second visual guideline 615-2 while the note-taking mode associated with the user interface 600 is not active (e.g., as represented by visual indication 611).

In some embodiments, the electronic device 500 changes a visual appearance of handwritten marks included in the handwritten content when straightening handwritten text of the handwritten content. For example, as shown in FIG. 6T, the fourth representation of handwritten input 646 includes a plurality of marks, such as circling of the handwritten word "Joe" and underlining of the handwritten number "2," in the content-entry region 602. In some embodiments, when the electronic device 500 straightens the fourth representation of handwritten input 646 (e.g., in any of the manners described previously herein, such as in response to detecting lift-off of the stylus 203 from the touch screen 504), the electronic device 500 moves and/or rotates the plurality of marks in the content-entry region 602. For example, in FIG. 6U, when the electronic device 500 straightens the fourth representation of handwritten input 646, the electronic device 500 moves and/or rotates the circular marking around the handwritten word "Joe" and moves and/or rotates the underline marking under the handwritten number "2" in the fourth representation of handwritten input 646. In some embodiments, the plurality of markings is moved and/or rotated based on the movements and/or rotations of the handwritten characters with which the plurality of markings are displayed. For example, the electronic device 500 moves and/or rotates the circular marking when moving and/or rotating the handwritten word "Joe" in the content-entry region 602 and moves and/or rotates the underline marking when moving and/or rotating the handwritten number "2" in the content-entry region 602.

Figure 6V:
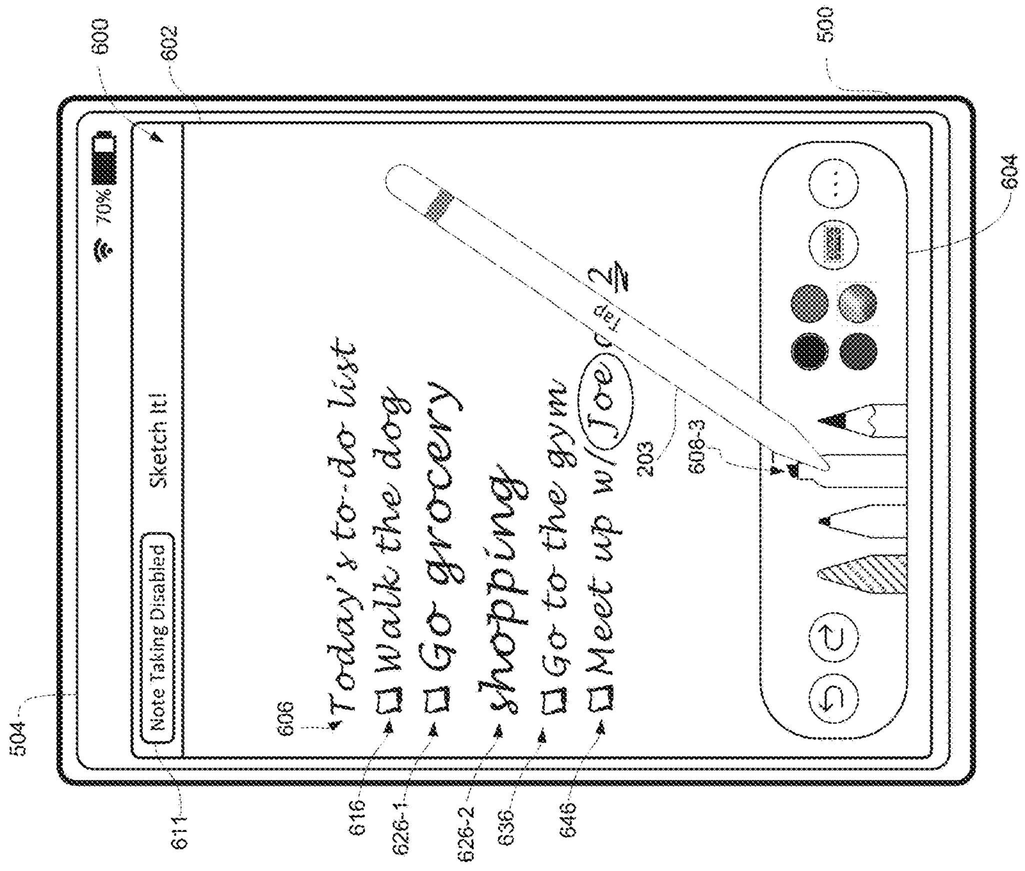
Figure 6U:
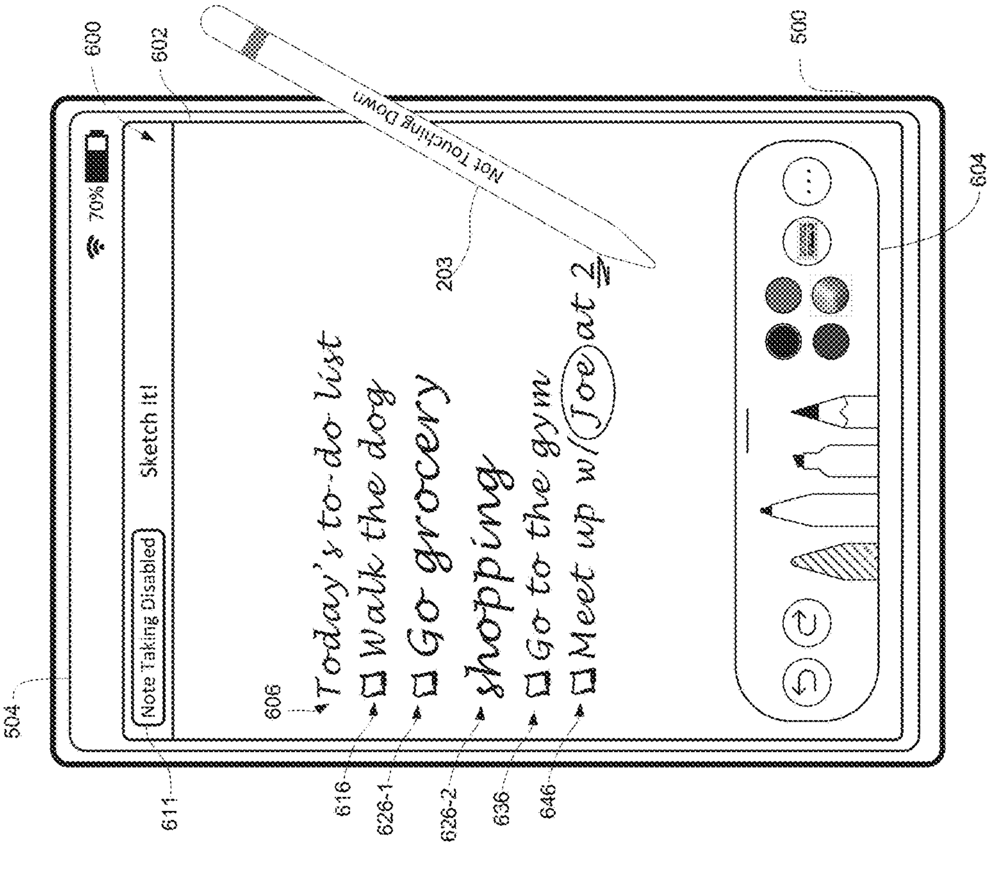

In some embodiments, the electronic device 500 restricts straightening of handwritten content displayed in the content-entry region 602 based on the writing tool selected when the electronic device 500 detects handwritten input associated with the handwritten content. For example, as described herein above, the pen entry tool (e.g., 608-2 in FIG. 6A) is selected when the handwritten input illustrated in FIGS. 6B-6U is detected. In FIG. 6V, the electronic device 500 detects selection of highlighter entry tool 608-3 in the content entry palette 604, which, as previously discussed above, causes the user interface 600 to enter a highlighter entry mode for the content-entry region 602.

Figure 6X:
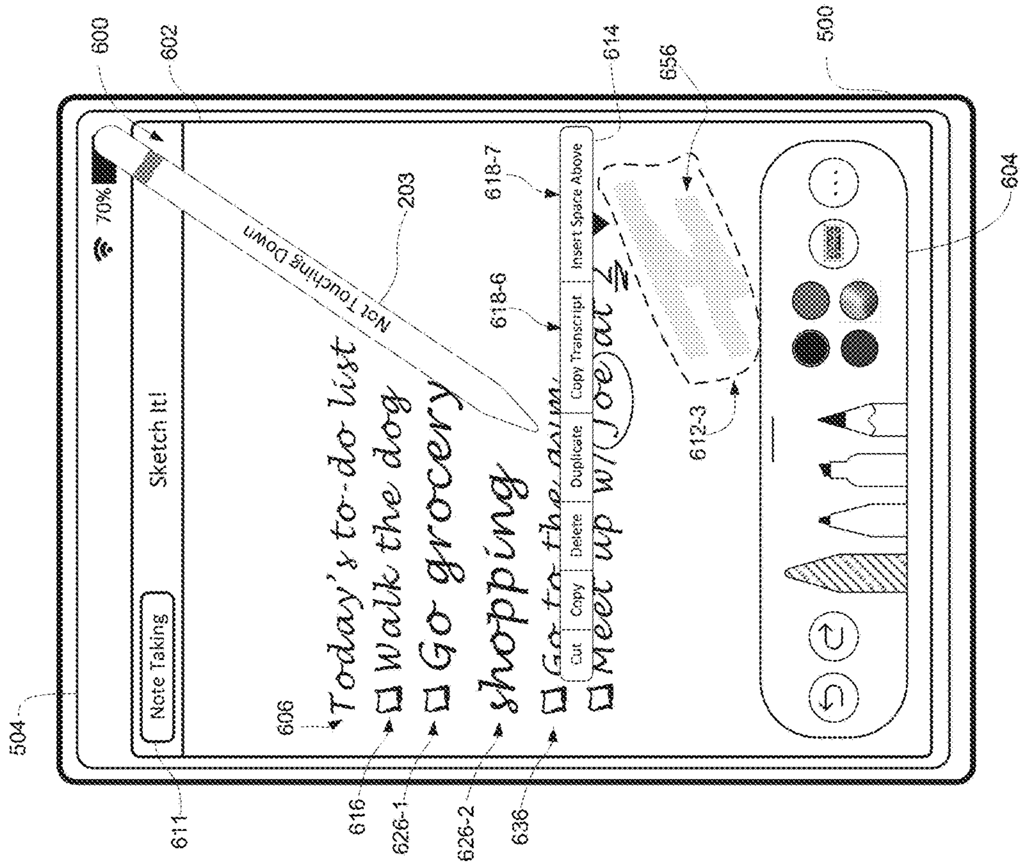
Figure 6W:
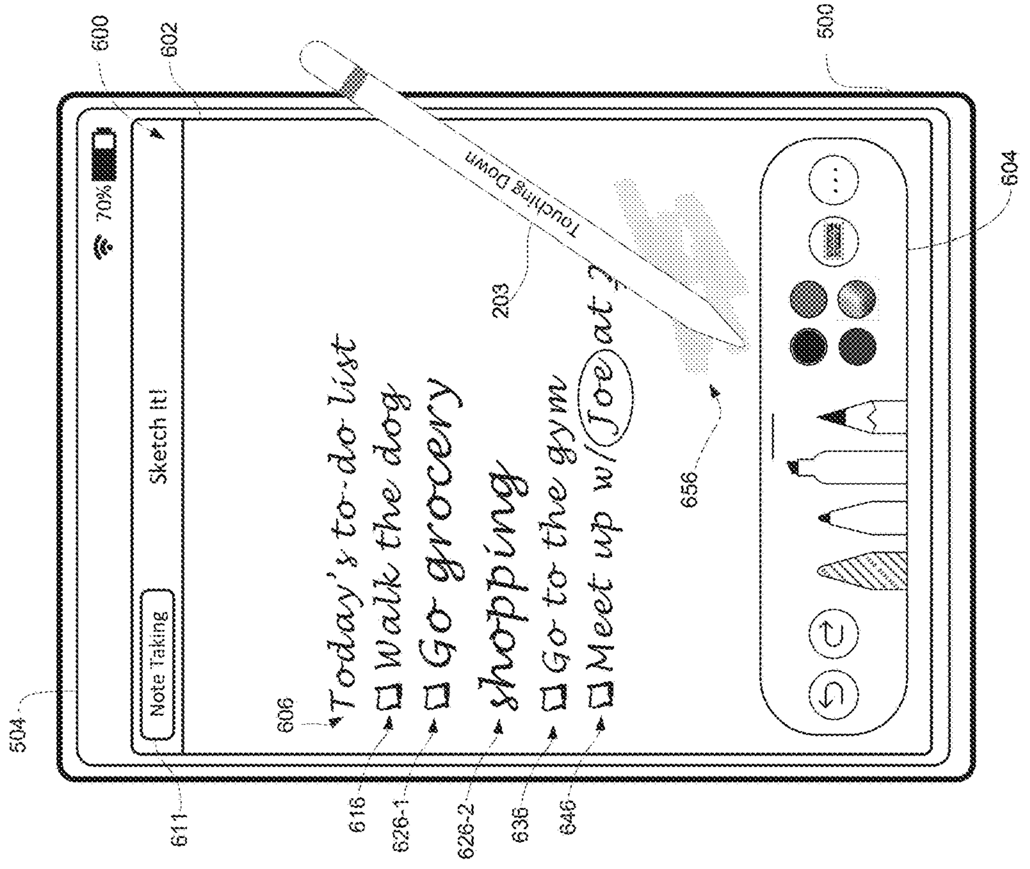

In FIG. 6W, the electronic device 500 detects handwritten input on the touch screen 504 provided by the stylus 203 while the highlighter entry tool is selected. While detecting the handwritten input, as shown in FIG. 6W, the electronic device 650 displays a sixth representation of handwritten input 656 in the content-entry region 602. As shown in FIG. 6W, the sixth representation of handwritten input 656 includes streaks stylized as if drawn by a highlighter. In FIG. 6X, the electronic device 500 detects selection (e.g., using selection tool 608-1) of the sixth representation of handwritten input 656 (e.g., as represented by third visual indication 612-3), which causes the electronic device 500 to display toolbar element 614 in content-entry region 602.

As mentioned above, in some embodiments, the electronic device 500 restricts straightening handwritten content that is provided using one or more writing tools of a respective type. For example, as shown in FIG. 6X, the electronic device 500 forgoes displaying selection option 618-5 in the toolbar element 614 in the content-entry region 602, signifying that the straightening operation is not provided for handwritten content written using the highlighter entry tool 608-3. For example, the electronic device 500 instead displays selectable option 618-7 in the toolbar element 614 in the content-entry region 602. In some embodiments, the electronic device 500 displays the selection option 618-5 in the toolbar element 614, but selection of the selectable option 618-5 does not cause the sixth representation of handwritten input 646 to be straightened in the content-entry region 602 (e.g., the electronic device 500 does not perform any operation). Additional writing tools for which the straightening operation is not provided optionally include a paintbrush entry tool and/or a watercolor entry tool.

Figure 6Z:
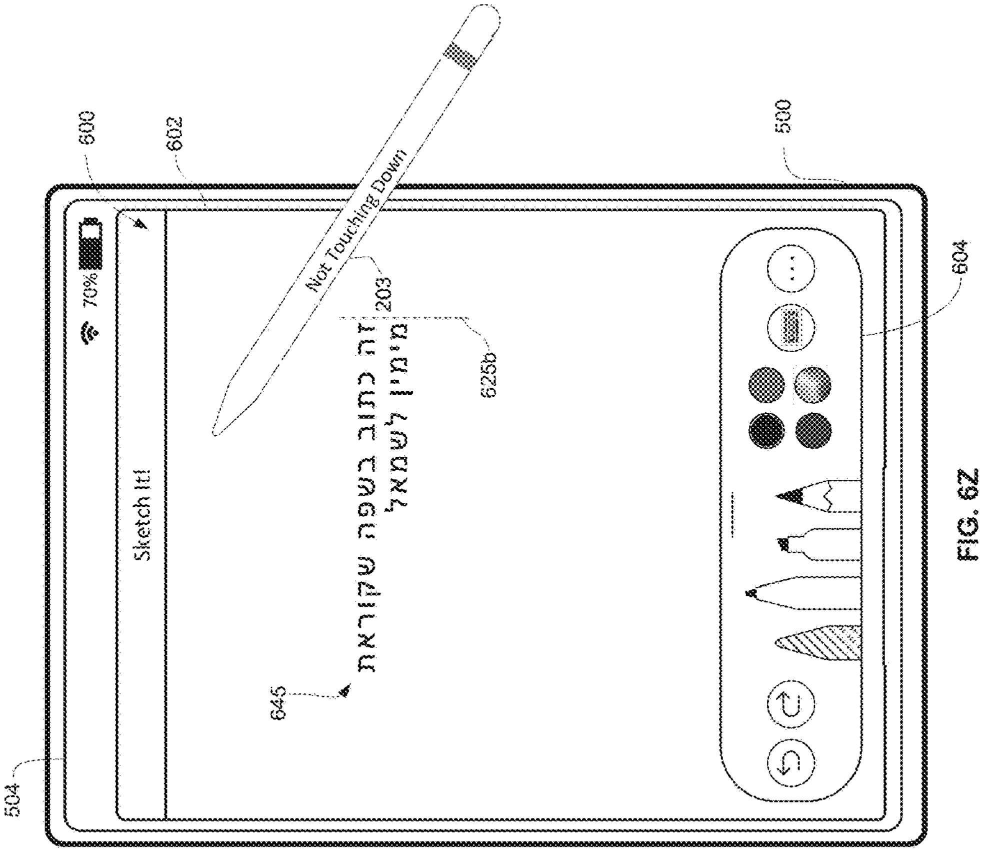
Figure 6Y:
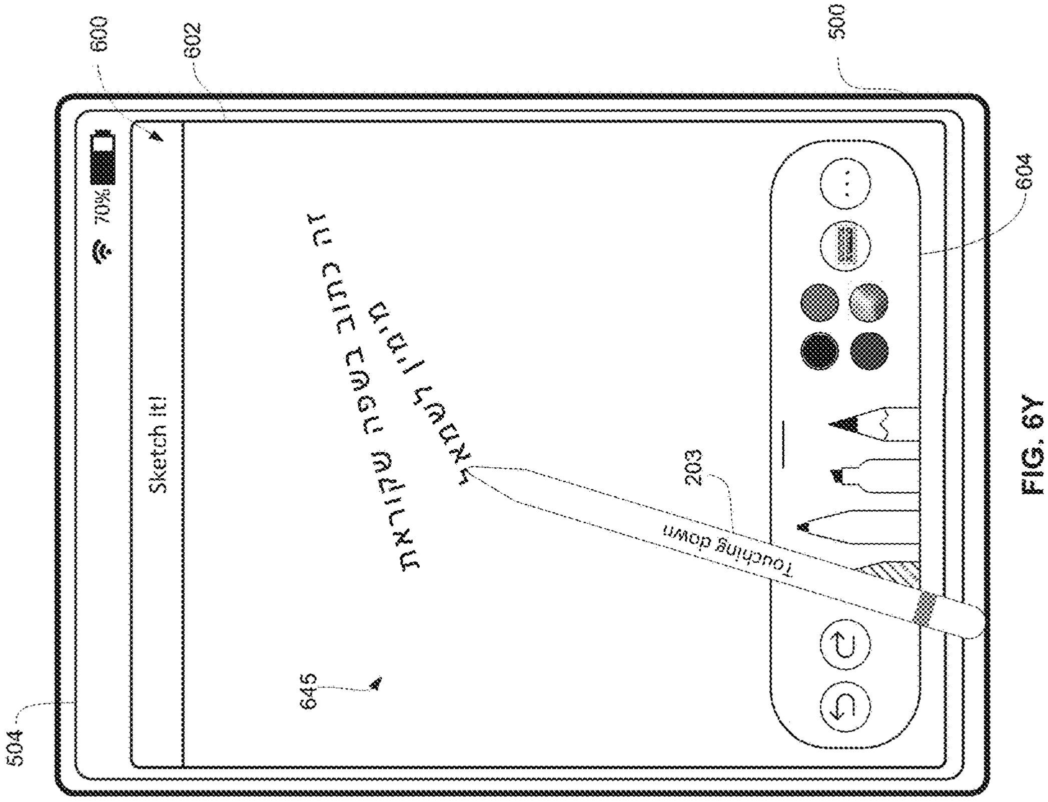
Figure 6A:
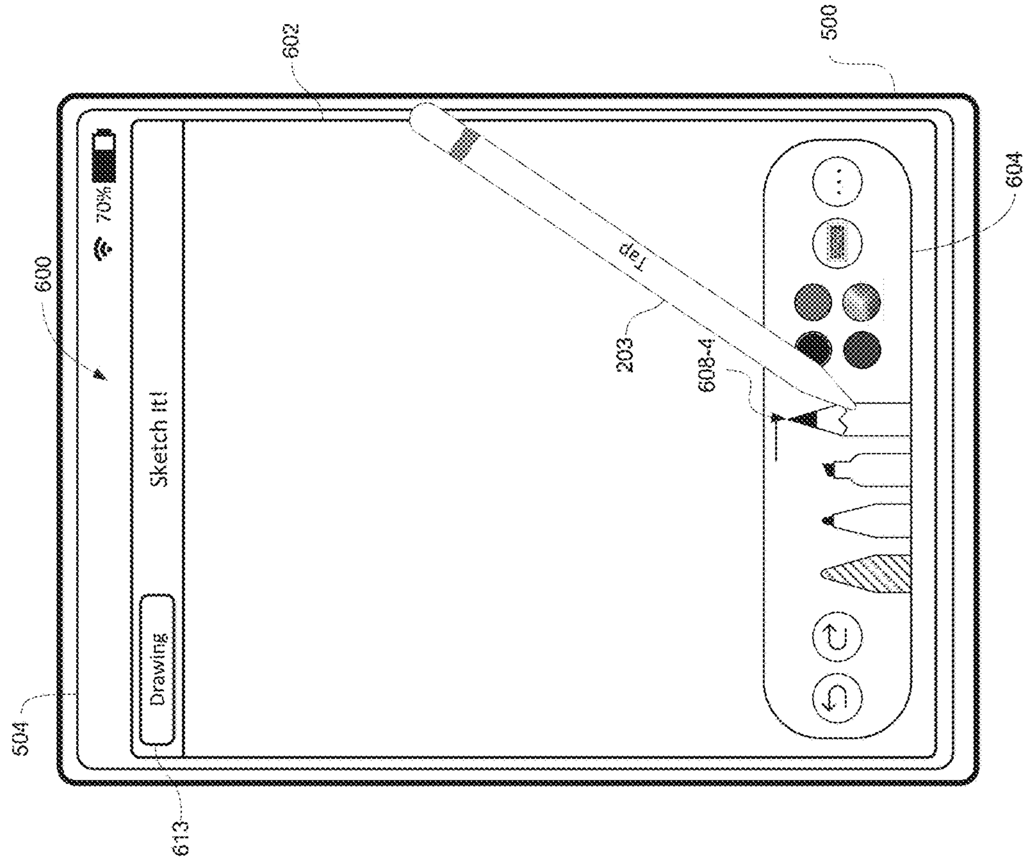
Figure 6B:
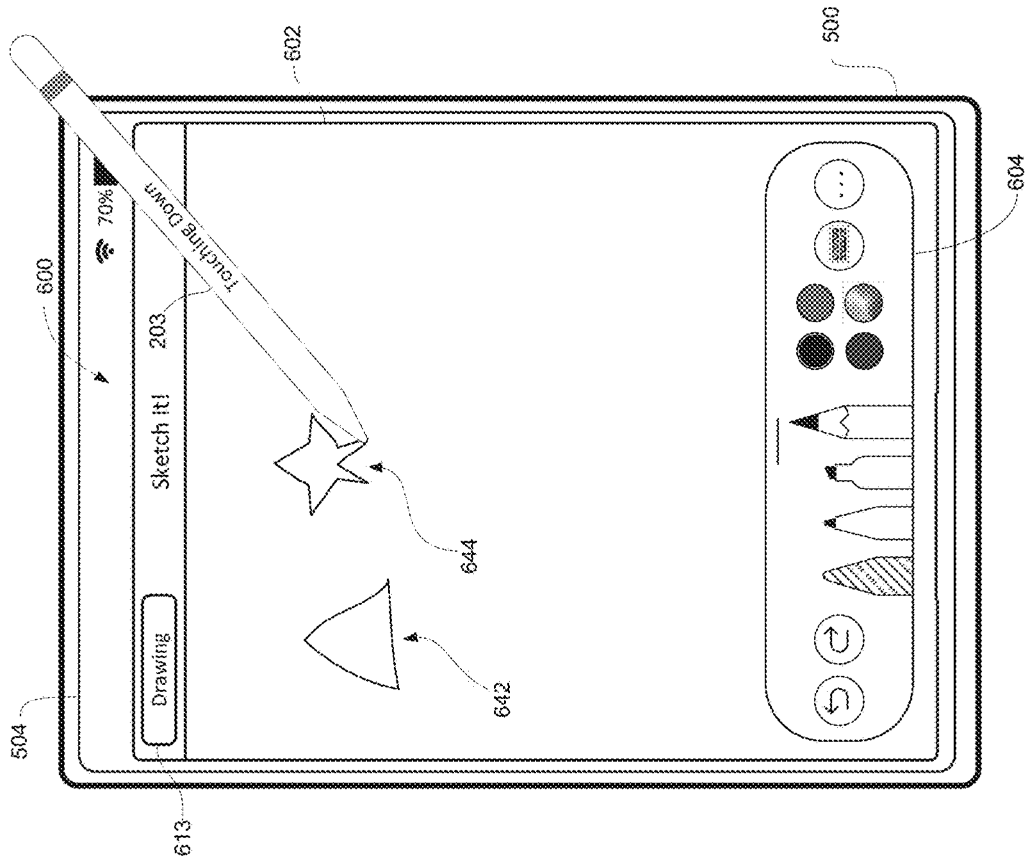
Figure 6D:
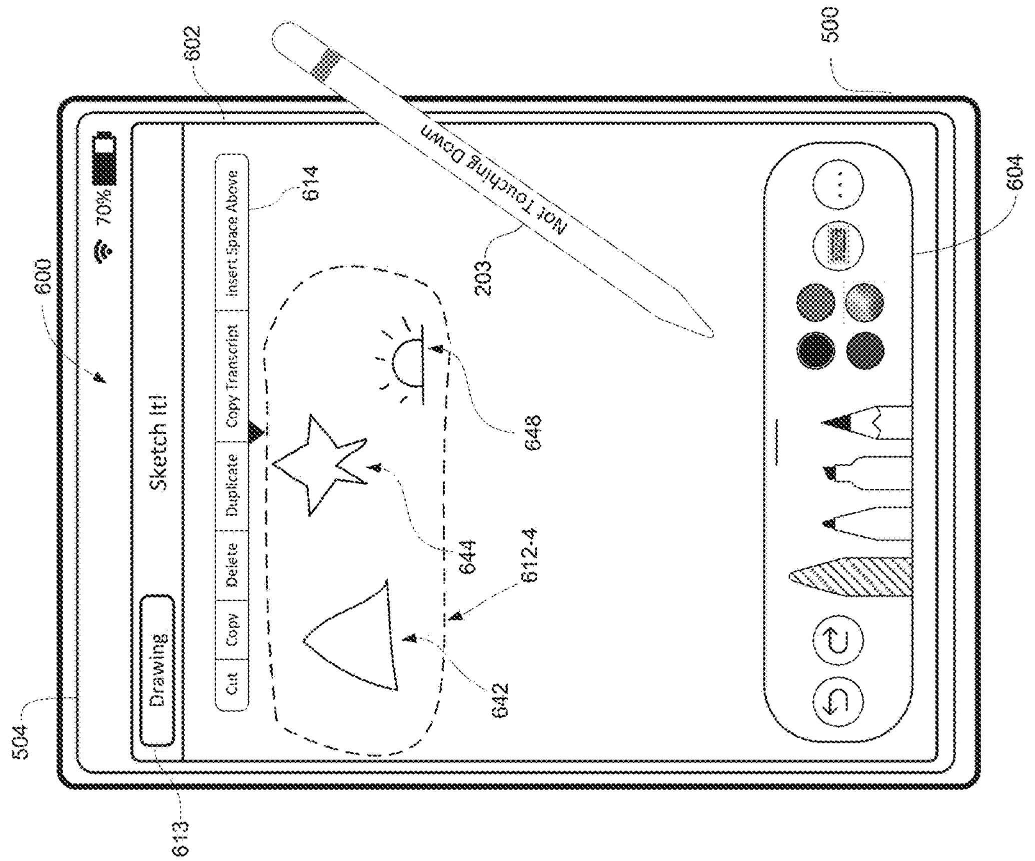
Figure 6C:
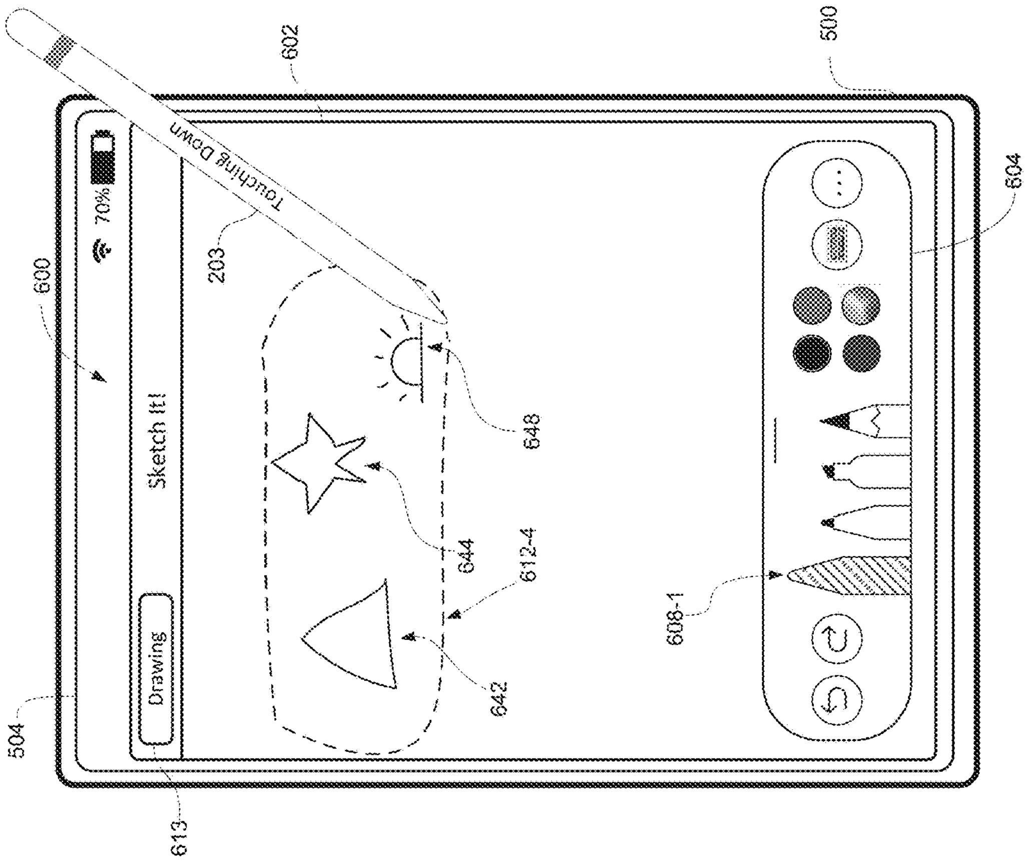
Figure 7A:
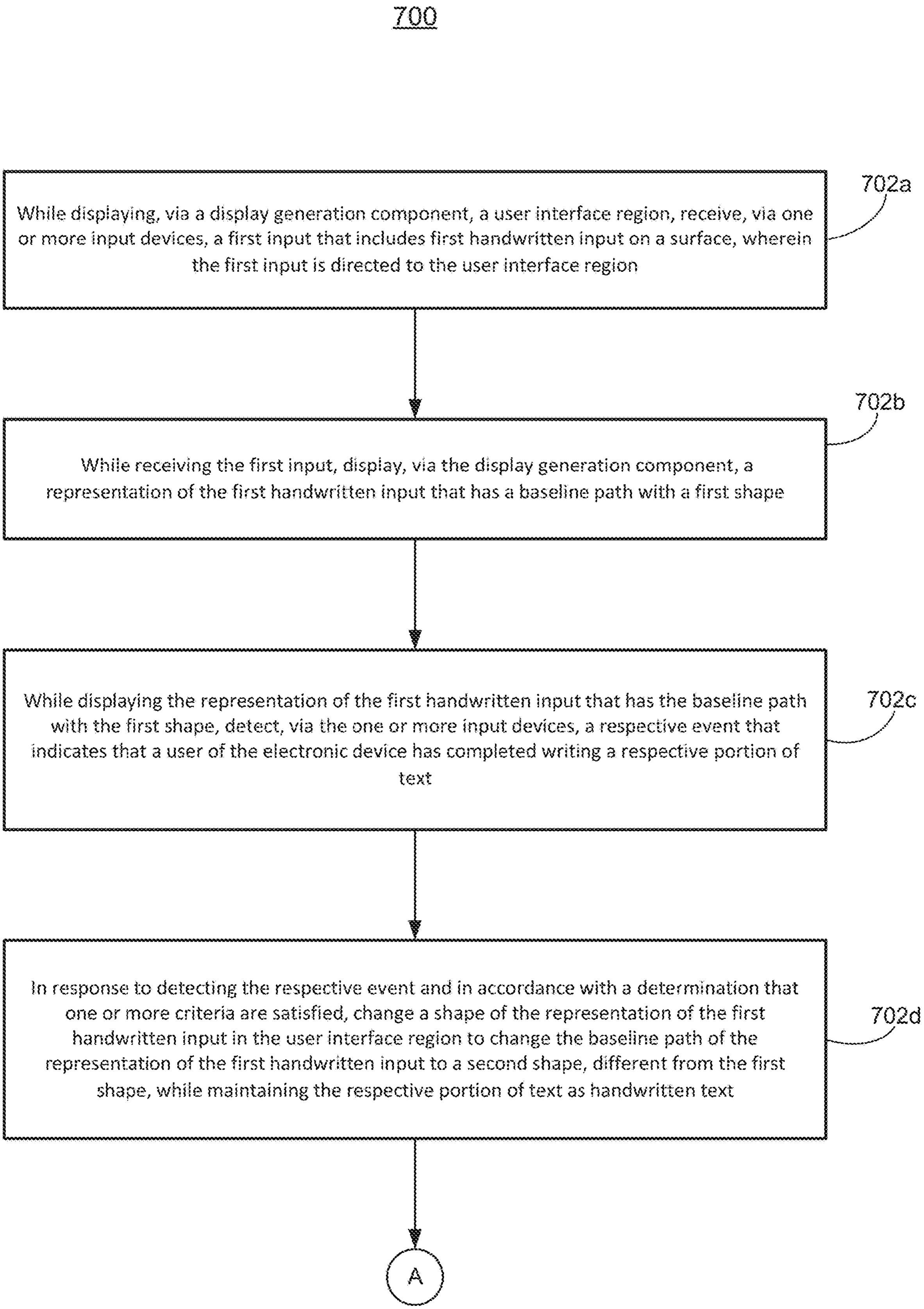
Figure 7B:
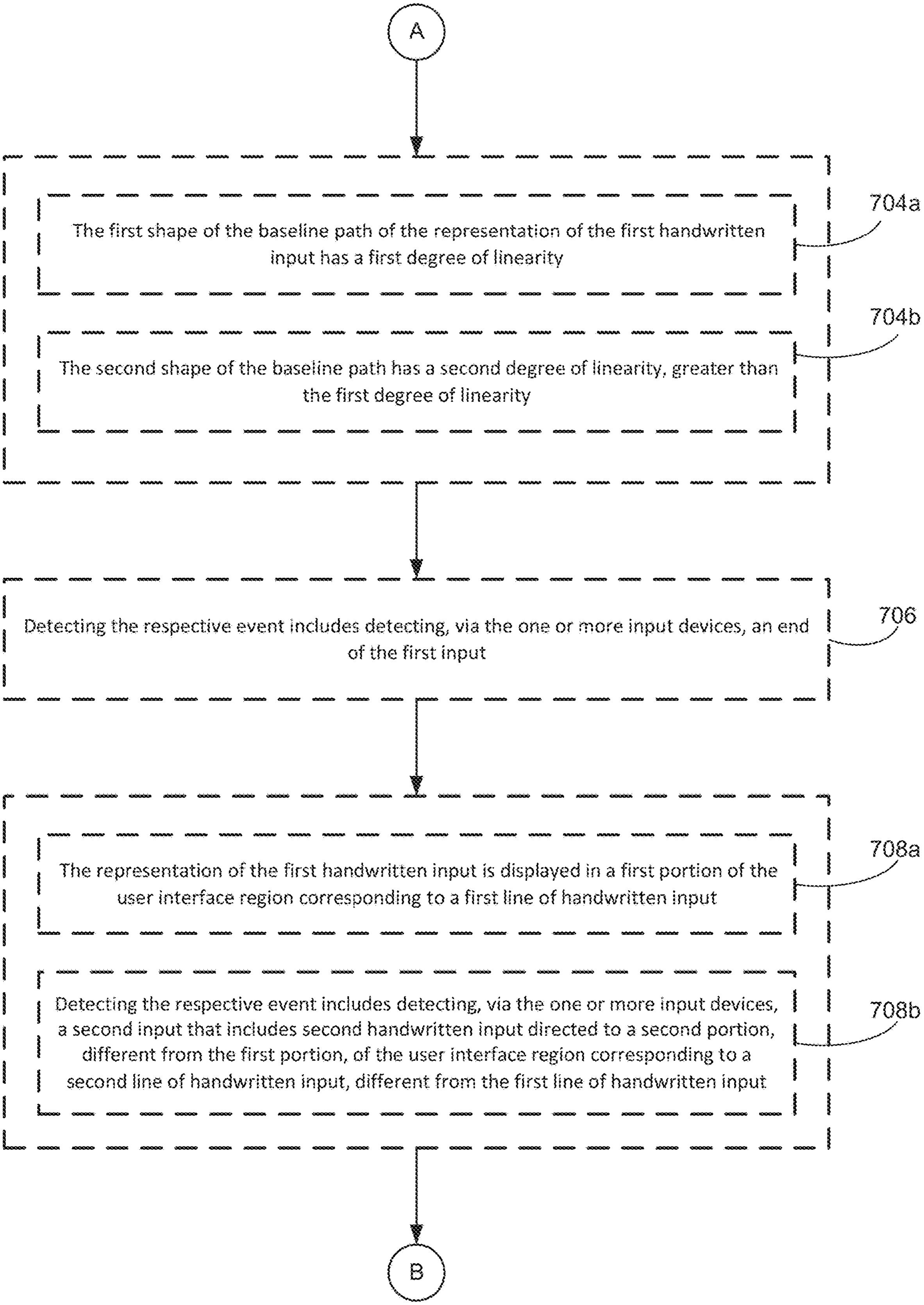
Figure 7C:
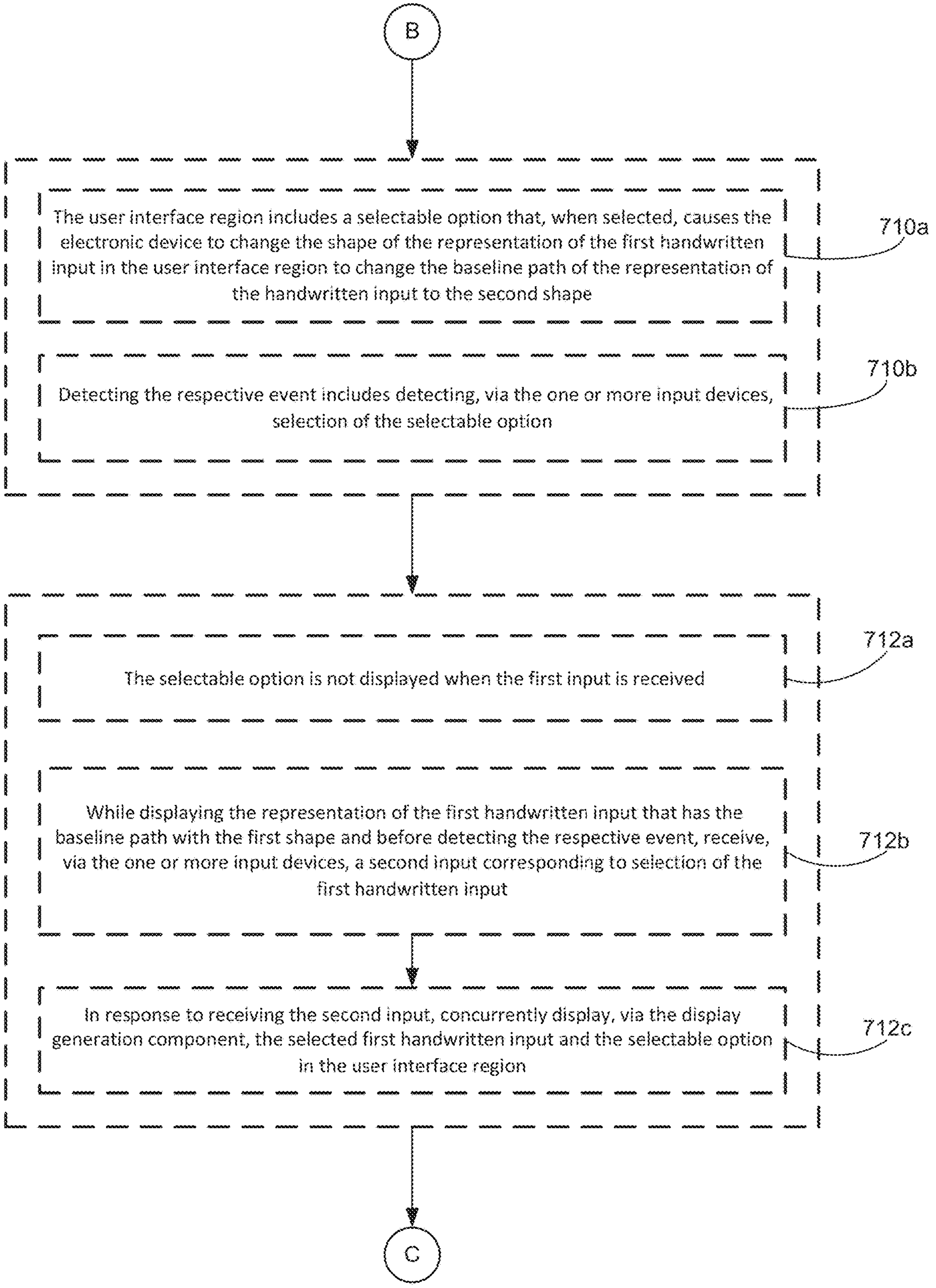
Figure 7E:
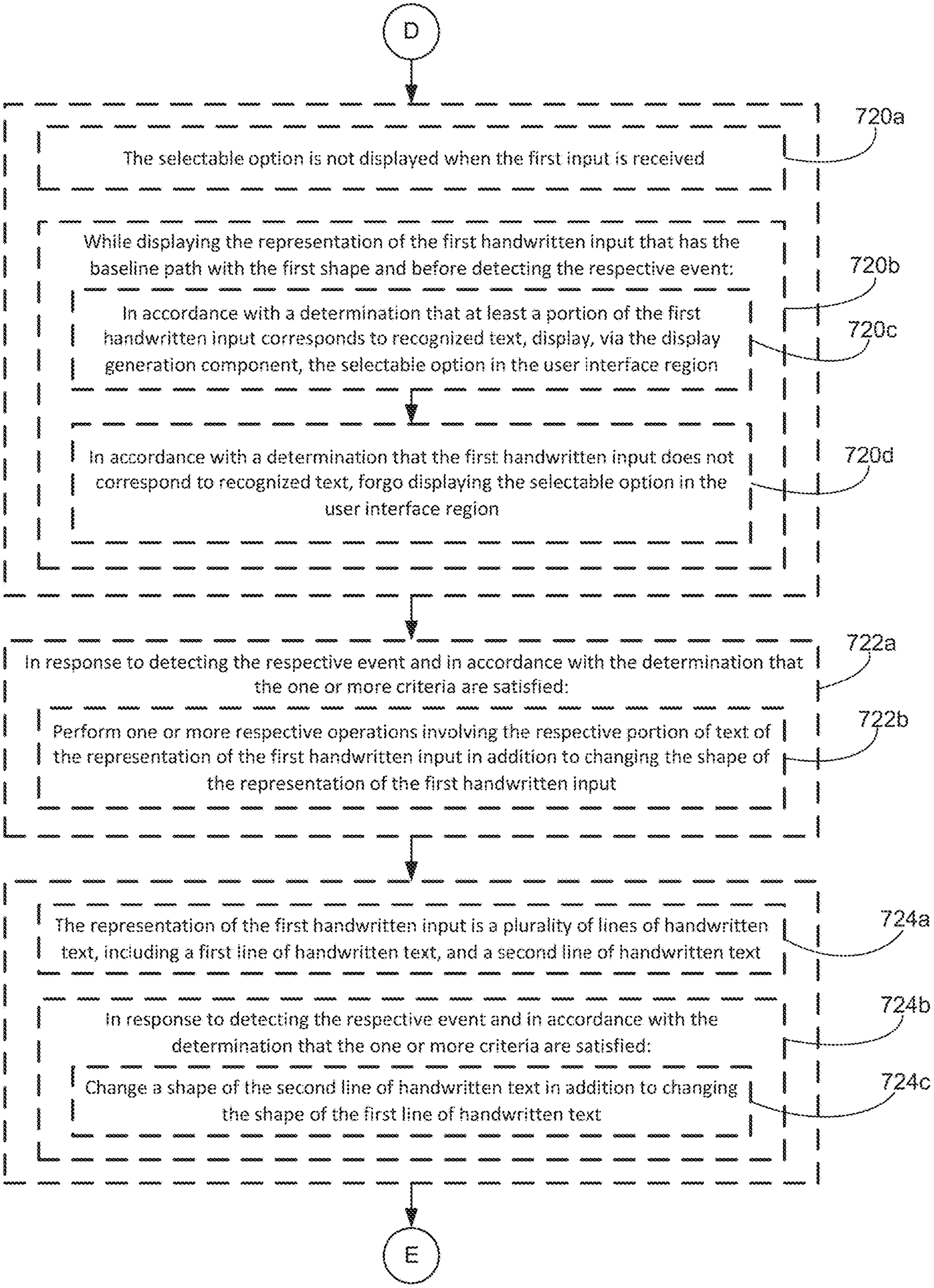
Figure 7F:
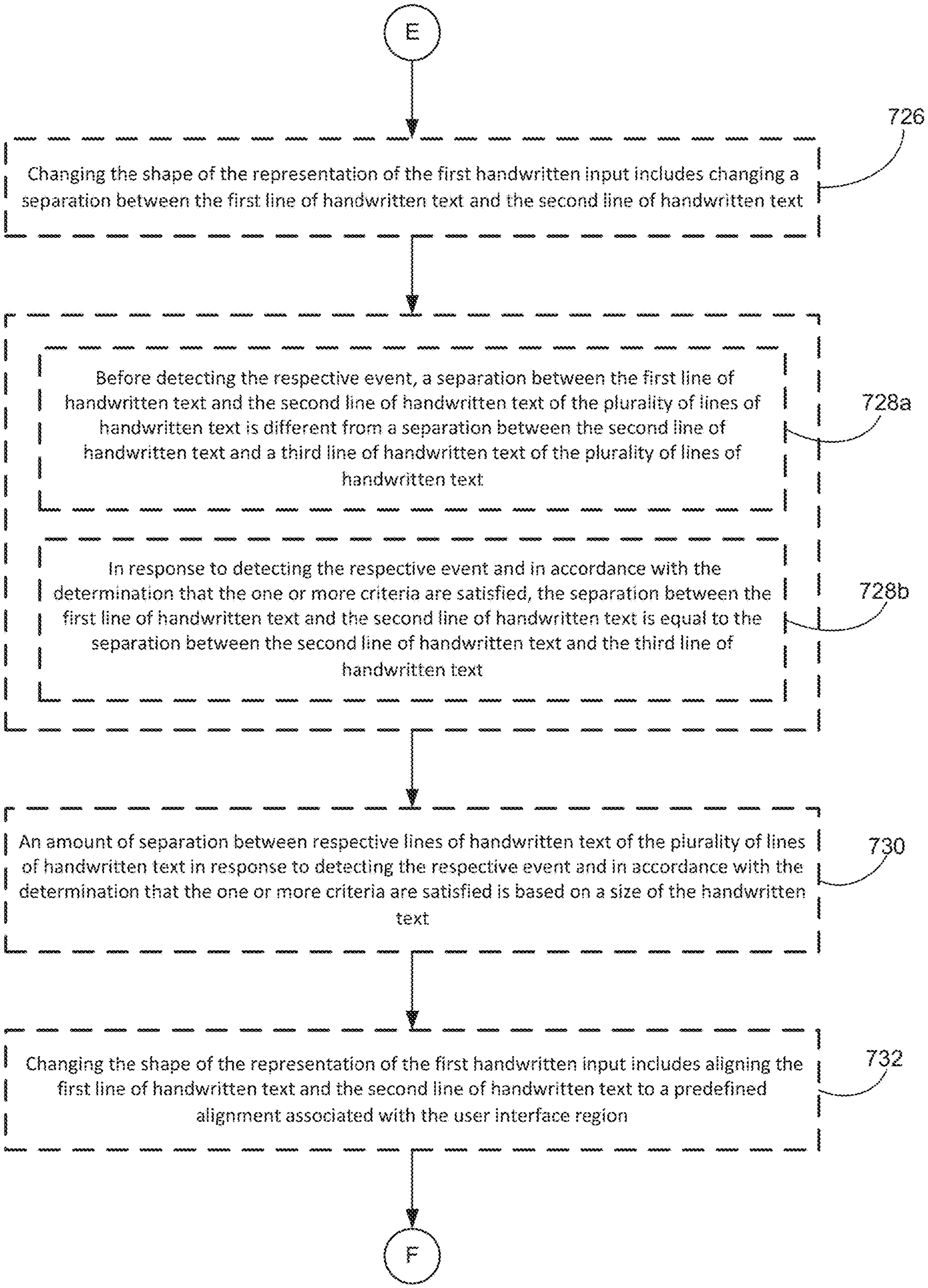
Figure 7H:
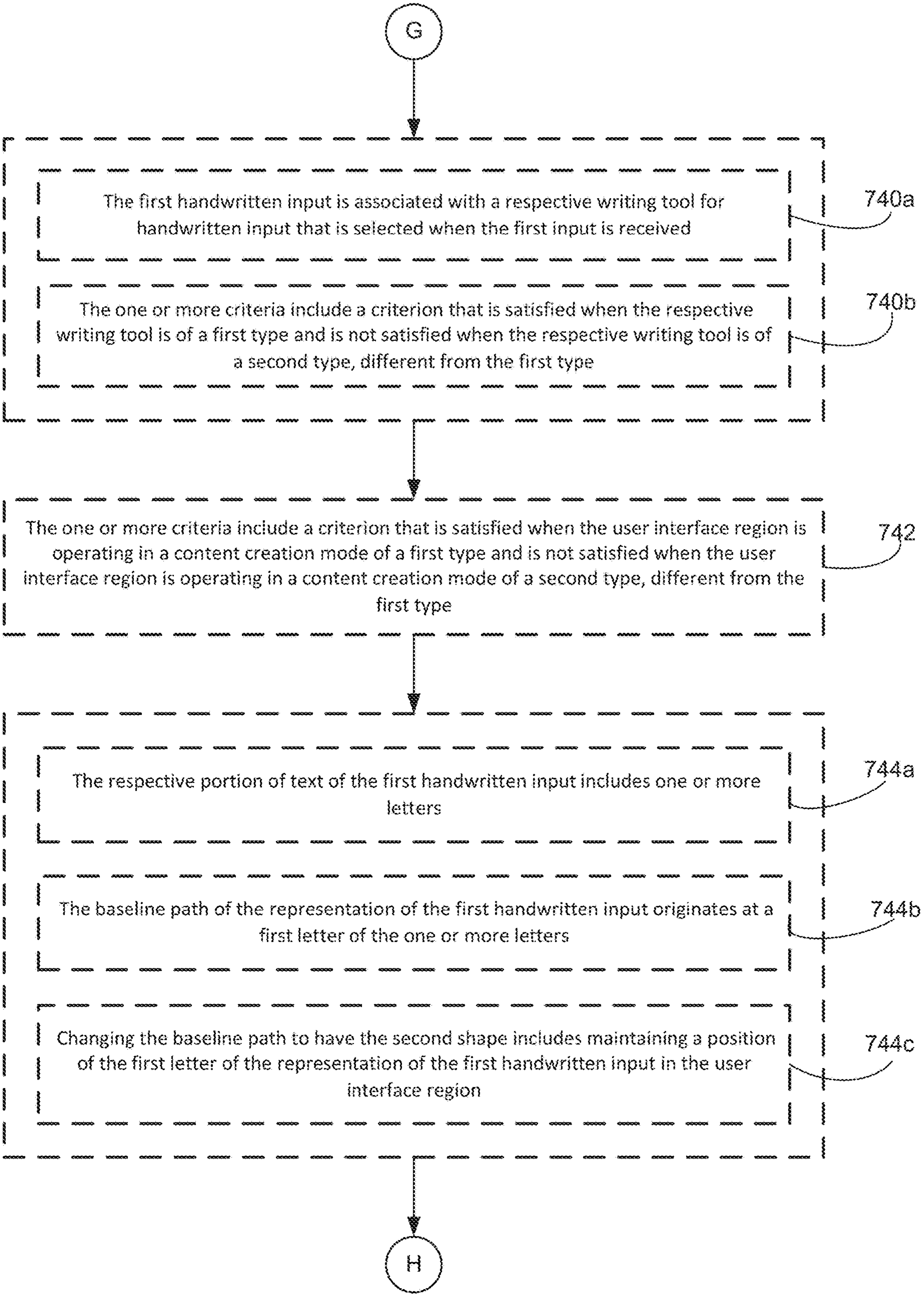
Figure 7I:
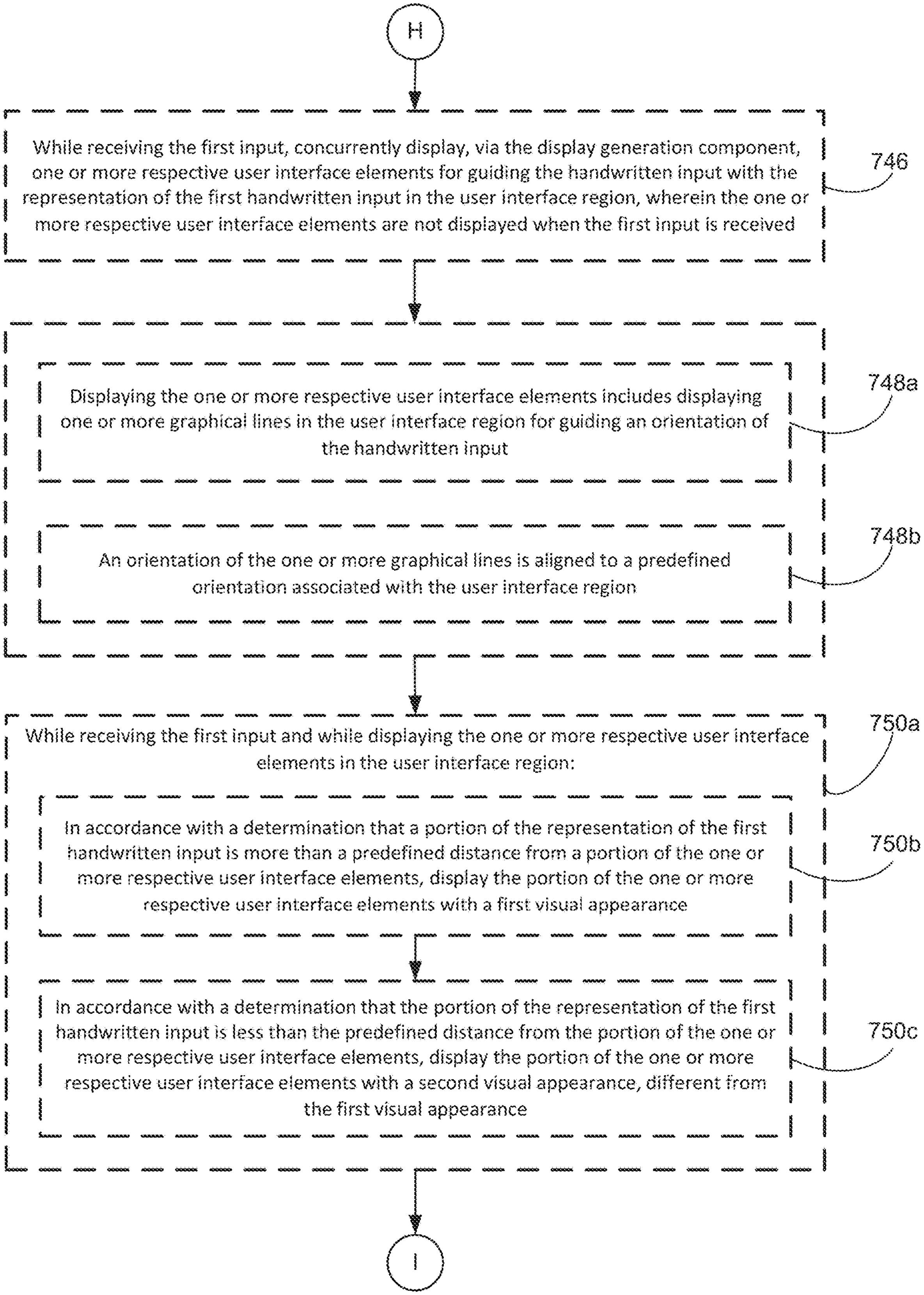
Figure 7J:
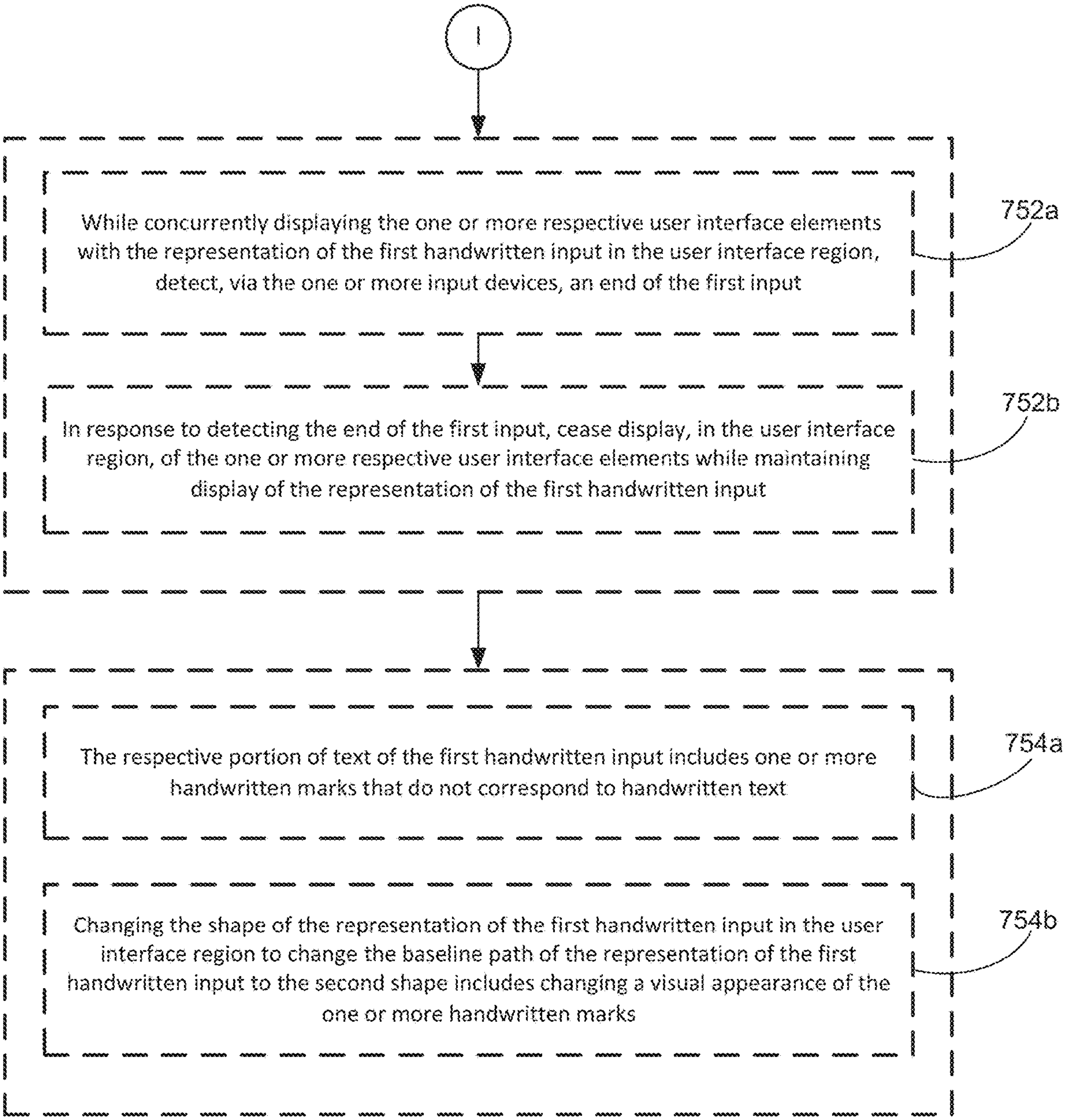

As described above with reference to FIG. 6P, in some embodiments, when the electronic device 500 straightens multiple lines of handwritten content in the content-entry region 602, the electronic device 500 aligns the lines of handwritten content to a predefined margin associated with the content-entry region 602. In some embodiments, the predefined margin associated with the content-entry region 602 is selected by the electronic device 500 based on a detected language of the handwritten text of the handwritten content in the content-entry region 602. For example, in FIG. 6Y, the electronic device 500 detects handwritten input on the touch screen 504 provided by the stylus 203. As shown in FIG. 6Y, while detecting the handwritten input, the electronic device displays a representation of the handwritten input 645 in the content-entry region 602. In FIG. 6Y, the handwritten text of the representation of the handwritten input 645 is written in the Hebrew language. In FIG. 6Z, because Hebrew is a language that is written and/or read right-to-left, when the electronic device straightens the lines of handwritten text of the representation of handwritten input 645, the electronic device 500 also aligns the handwritten content to the right-aligned margin (e.g., represented by vertical line 625*b*) in the content-entry region 602 in a similar manner as described above.

In some embodiments, the electronic device 500 restricts straightening of handwritten content displayed in the content-entry region 602 based on whether a respective mode associated with the user interface 600 is active at the electronic device 500 when handwritten input associated with the handwritten content is detected. In FIG. 6AA, a drawing mode associated with the user interface 600 is active at the electronic device 500 (e.g., as indicated by visual indication 613). In FIG. 6AA, the electronic device 500 detects selection of pencil entry tool 608-4 in the content entry palette 604, which, as described above, optionally causes the user interface 600 to activate a pencil entry mode for the content-entry region 602.

In FIG. 6BB, the electronic device 500 has detected a sequence of drawing inputs on the touch screen 504 provided by the stylus 203 corresponding to drawn shapes. For example, in response to detecting the drawing input corresponding to a drawn triangle, the electronic device 500 displays the representation of the triangle 642 in the content-entry region 602, as shown in FIG. 6BB. Similarly, while detecting the drawing input corresponding to a drawn star, the electronic device 500 displays the representation of the star 644 in the content-entry region 602 in FIG. 6BB. In FIG. 6CC, the electronic device has detected drawing input on the touch screen 504 provided by the stylus 203 corresponding to a drawn sunset. For example, as shown in FIG. 6CC, in response to detecting the drawing input corresponding to the drawn sunset, the electronic device 500 displays the representation of the sunset 648 in the content-entry region 602.

Additionally, in FIG. 6CC, the electronic device 500 is detecting selection of the representation of the triangle 642, the representation of the star 644, and the representation of the sunset 648 (e.g., provided by the stylus 203 while the selection tool 608-1 is active). In some embodiments, as similarly described above, the electronic device 500 displays visual indication 612-5 in the content-entry region 602 in accordance with the selection input. In FIG. 6DD, in response to detecting selection of the representations 642, 644, and 648 in the content-entry region 602, the electronic device 500 displays toolbar element 614 in the content-entry region 602.

As mentioned above, in some embodiments, the electronic device 500 restricts straightening of handwritten content that is displayed in the content-entry region while a respective mode is active at the electronic device 500. For example, as shown in FIG. 6DD, the electronic device 500 forgoes displaying selection option 618-5 in the toolbar element 614 in the content-entry region 602, signifying that the straightening operation is not provided for handwritten content written while the drawing mode (e.g., indicated by visual indication 613) is active for the user interface 600. In some embodiments, the electronic device 500 restricts straightening of handwritten content that does not include handwritten text. For example, as shown in FIG. 6DD, the selected portions of the representations 642, 644, and 648 do not include handwritten text (e.g., handwritten characters, letters, and/or special characters). Accordingly, because the selected portions of the representations 642, 644, and 648 include only non-text content, the electronic device 500 forgoes straightening the representations 642, 644, and 648 in the content-entry region 602 (e.g., forgoes displaying the straighten option 618-5 in the menu element 614).

FIGS. 7A-7J is a flowchart illustrating an exemplary method 700 of selecting and providing for manipulation of handwritten content in accordance with some embodiments. The method 700 is optionally performed at an electronic device such as device 100, device 300, device 500, device 501, device 510, and device 591 as described above with reference to FIGS. 1A-1B, 2-3, 4A-4B and 5A-5I. Some operations in method 700 are, optionally combined and/or order of some operations is, optionally, changed.

As described below, the method 700 provides ways for interaction with handwritten content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device (e.g., 500) in communication with a display generation component (e.g., 504) and one or more input devices (e.g., 330). For example, a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external), or a set-top box in communication one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users.

In some embodiments, while displaying, via the display generation component, a user interface region (e.g., content-entry region 602 in FIG. 6A), the electronic device receives (702*a*), via the one or more input devices, a first input that includes first handwritten input on a surface (e.g., on a touch-sensitive surface in communication with the electronic device and/or integrated with the display generation component), such as handwritten input provided by stylus 203 as shown in FIG. 6B, wherein the first input is directed to the user interface region. For example, the user interface region is associated with and/or is displayed within a text composition user interface (e.g., user interface 600 in FIG. 6A) associated with a note-taking application, a messaging application, a journaling or scheduling application, a text-editor application, and/or a text annotation application or any other region that can accept handwritten input. In some embodiments, the user interface region is or includes a handwriting entry region configured to receive handwritten input (e.g., provided directly into the user interface region (e.g., the touch sensitive surface includes the user interface region) or populated into the user interface region by the electronic device after receiving the handwritten input via a separate touch-sensitive surface such as a trackpad)). In some embodiments, the electronic device receives the first input via an external device/tool for providing handwritten input (e.g., a stylus), such as stylus 203 in FIG. 6B, or via a finger of a hand of a user of the electronic device. In some embodiments, the first input includes continuous and/or subsequent strokes and/or contacts (e.g., provided by the stylus or finger of the user) detected on the touch sensitive surface that are recognized by the electronic device as handwritten input (e.g., handwritten words, numbers, special characters, and/or shapes), as discussed below.

In some embodiments, while receiving the first input, the electronic device displays (702*b*), via the display generation component, a representation of the first handwritten input that has a baseline path (e.g., a path followed by the bottom portion of letters in the handwritten input other than descenders of the letters) with a first shape, such as representation 606 as shown in FIG. 6C. For example, while receiving the strokes and/or contacts of the first input that form the first handwritten input, the electronic device displays a representation of the first handwritten input in the user interface region. In some embodiments, the representation of the first handwritten input corresponds to representations of handwritten words, number, special characters, and/or shapes, as similarly shown in FIG. 6C. In some embodiments, the electronic device displays the representation of the first handwritten input with a first orientation in the user interface region that is based on a respective orientation of the strokes and/or contacts detected on the touch sensitive surface. For example, if the user of the electronic device provides the strokes and/or contacts on the touch sensitive surface in a first respective direction (e.g., horizontal direction or diagonal direction) relative to the user interface region or relative to the underlying document, the electronic device displays the representation of the first handwritten input having the first orientation in the user interface region that corresponds to the first respective direction of the strokes and/or contacts that form the handwritten input. In some embodiments, the baseline path of the first handwritten input aligns with the first orientation in the user interface region. For example, the baseline path extends in a horizontal direction or a diagonal direction in the user interface region (e.g., from a first letter/character of the handwritten input). In some embodiments, the first shape of the baseline path of the first handwritten input corresponds to a culmination of the shapes of the bottom portions of the letters of the handwritten input (e.g., excluding any descenders, as mentioned above). In some embodiments, the user interface region is associated with a predefined orientation (e.g., that is based on an orientation of the electronic device and/or an orientation of the user interface in which the user interface region is displayed) relative to the user interface region. In some embodiments, the user interface region is associated with a straight/horizontal orientation if a language of the user interface region (e.g., system language setting) and/or handwritten input is a first language (e.g., a language that reads right to left or left to right), such as English as indicated by the representation 606 in FIG. 6B. In some embodiments, the user interface region is associated with a straight/vertical orientation if the language of the user interface region (e.g., system language setting) and/or handwritten input is a second language (e.g., a language that reads top to bottom), as discussed below. In some embodiments, the first orientation of the representation of the first handwritten input and the predefined orientation of the user interface region are different and/or skewed relative to one another (e.g., due to the detected orientation of the strokes and/or contacts that form the handwritten input).

In some embodiments, while displaying the representation of the first handwritten input that has the baseline path with the first shape, the electronic device detects (702*c*), via the one or more input devices, a respective event that indicates that a user of the electronic device has completed writing a respective portion of text (e.g., a line of text or a word of text), such as detecting lift-off of the stylus 203 form touch screen 504 as shown in FIG. 6D. For example, the electronic device detects a respective event that corresponds to a request to change an orientation and/or shape of the baseline path of the representation of the first handwritten input. In some embodiments, as described below, the respective event includes detecting an end of the first input (e.g., detecting lift-off of an input device or object providing the first handwritten input), as shown in FIG. 6D. In some embodiments, the respective event includes receiving a second input that includes second handwritten input as a new line of handwritten input in the user interface region (e.g., after previously detecting lift-off of an input device or object providing the handwritten input), as shown in FIG. 6J. In some embodiments, the respective event includes receiving a selection of an option that corresponds to a request to change the orientation and/or shape of the baseline path of the representation of the first handwritten input, as shown in FIG. 6H. In some embodiments, the respective event does not include an input (e.g., selection of an option or manipulation of a user interface element) that indicates the amount by which to change the orientation and/or shape of the baseline path of the representation of the first handwritten input (e.g., by 1, 2, 5, 10, 15, 30, 45, 50, 60, 70, 90, 110, or 135 degrees) within the user interface region. In some embodiments, the respective event causes the electronic device to recognize the handwritten input as a respective portion of text. For example, the electronic device associates the shape of the baseline path and/or the shape of the first handwritten input with lines or words of text (e.g., comprising letters, numbers, and/or special characters).

In some embodiments, in response to detecting the respective event and in accordance with a determination that one or more criteria are satisfied (e.g., the representation of the first handwritten input is of one or more first types of representations of handwritten input and/or the electronic device is associated with a first mode when the first input is received, as described with reference to FIG. 6DD), the electronic device changes (702*d*) a shape of the representation of the first handwritten input in the user interface region to change the baseline path of the representation of the first handwritten input to a second shape, different from the first shape, while maintaining the respective portion of text as handwritten text (e.g., substantially maintaining relative sizes, shapes and/or spacing of letters within the text so that the letters within the text have a visual appearance that is consistent with the handwriting of the user), such as changing the shape of the representation 606 as shown in FIG. 6E. For example, the electronic device straightens the representation of the first handwritten input within the user interface region relative to the previously-described predefined orientation associated with the user interface region. In some embodiments, in response to detecting the respective event, and without receiving an input indicating the amount by which to change the orientation and/or shape of the representation of the first handwritten input, the electronic device displays the representation of the first handwritten input (e.g., the representations of the handwritten words, number, special characters, and/or shapes) with a second orientation that is aligned to the predefined orientation of the user interface region. In some embodiments, by changing the orientation and/or shape of the representation of the first handwritten input, the electronic device changes the baseline path of the representation of the handwritten input to the second shape. In some embodiments, the baseline path extends in a direction that aligns with the predefined orientation associated with the user interface region, as represented by horizontal line 605 in FIG. 6E. For example, the second shape of the baseline path causes the words, numbers, or special characters of the handwritten text to be straightened within the user interface region. In some embodiments, the electronic device does not convert the representation of the first handwritten input to font-based text when and/or while the orientation of the representation of the first handwritten input is aligned to the predefined orientation of the user interface region. For example, the electronic device maintains display of the representations of handwritten words, number, special characters, and/or shapes in the user interface region, as shown in FIG. 6E. In some embodiments, as discussed below, a relative amount by which the orientation and/or shape of the representation of the first handwritten input is changed is based on the detected language of the first handwritten input. For example, if the user interface region is associated with a straight/horizontal orientation because the language of the user interface region (e.g., system language setting) and/or handwritten input is a first language (e.g., a language that reads right to left or left to right), the electronic device aligns the representation of the first handwritten input to the straight/horizontal orientation, as shown in FIG. 6E. If the user interface region is associated with a straight/vertical orientation because the language of the user interface region (e.g., system language setting) and/or handwritten input is a second language (e.g., a language that reads top to bottom), the electronic device optionally aligns the representation of the first handwritten input to the vertical orientation. In some embodiments, the relative amount by which the orientation and/or shape of the representation of the first handwritten input is changed is based on the first orientation (e.g., the starting orientation) of the baseline path of the representation of the first handwritten input. For example, if the starting orientation of the representation of the first handwritten input is misaligned from the predefined orientation by a first respective amount, the electronic device changes the orientation and/or shape of the representation of the first handwritten input by a first amount that is based on the first respective amount. If the starting orientation of the representation of the first handwritten input is misaligned from the predefined orientation by a second respective amount, less than the first respective amount, the electronic device changes the orientation and/or shape of the representation of the first handwritten input by a second amount, less than the first amount, that is based on the second respective amount. In some embodiments, if the first orientation of the first handwritten input is aligned to the predefined orientation of the user interface region when the respective event is detected, changing the shape of the representation of the first handwritten input to change the baseline path to the second shape includes forgoing changing the orientation and/or shape of the representation of the first handwritten input. Aligning an orientation of a representation of handwritten input to an orientation of a user interface region in which the representation of the handwritten input is displayed in response to detecting a respective event reduces the number of inputs needed to change the orientation of the representation of handwritten input to an appropriate orientation and/or enables the orientation of the representation of handwritten input to be changed automatically, thereby improving user-device interaction.

In some embodiments, the first shape of the baseline path of the representation of the first handwritten input has a first degree of linearity (704*a*) (e.g., the first shape of the baseline path has a nonzero amplitude and/or frequency having a first value), such as the shape of the baseline path of the representation 616 in FIG. 6L. In some embodiments, the first shape of the baseline path of the representation of the first handwritten input has a first degree of waviness/curvature with respect to the predefined orientation of the user interface region, such as the curviness of the words "Walk the" in the representation 616 in FIG. 6L.

In some embodiments, the second shape of the baseline path has a second degree of linearity, greater than the first degree of linearity (704*b*), such as the shape of the baseline path of the representation 616 in FIG. 6M. For example, the second shape of the baseline path has an amplitude and/or frequency having a second value, less than the first value discussed above. In some embodiments, the second shape of the baseline path has a second degree of waviness/curvature, less than the first degree, with respect to the predefined orientation of the user interface region. For example, the second shape of the baseline path is visually less wavy/curved than the first shape of the baseline path. Aligning an orientation of a representation of handwritten input to an orientation of a user interface region in which the representation of the handwritten input is displayed in response to detecting a respective event reduces the number of inputs needed to change the orientation of the representation of handwritten input to an appropriate orientation and/or enables the orientation of the representation of handwritten input to be changed automatically, thereby improving user-device interaction.

In some embodiments, detecting the respective event includes detecting, via the one or more input devices, an end of the first input (706), such as detecting lift-off of stylus 203 from touch screen 504 as shown in FIG. 6D. For example, the electronic device detects lift-off of a contact between an object (e.g., a writing tool, such as a stylus, or a finger of the user) providing the first input and the surface. In some embodiments, the electronic device detects the respective event a threshold amount of time (e.g., 0.25, 0.5, 0.75, 1, 2, 3, 4, 5, or 8 seconds) after detecting the end of the first input. Aligning an orientation of a representation of handwritten input to an orientation of a user interface region in which the representation of the handwritten input is displayed in response to detecting an end of the handwritten input reduces the number of inputs needed to change the orientation of the representation of handwritten input to an appropriate orientation and/or enables the orientation of the representation of handwritten input to be changed automatically, thereby improving user-device interaction.

In some embodiments, the representation of the first handwritten input is displayed in a first portion of the user interface region corresponding to a first line of handwritten input (708*a*), such as display of representation 606 as a first line of handwritten text as shown in FIG. 6J. For example, the representation of the first handwritten input is a first line of handwritten text in the user interface region.

In some embodiments, detecting the respective event includes detecting, via the one or more input devices, a second input that includes second handwritten input directed to a second portion, different from the first portion, of the user interface region corresponding to a second line of handwritten input, different from the first line of handwritten input (708*b*), such as handwritten input provided by stylus 203 as a second line of handwritten text as shown in FIG. 6K. For example, the electronic device detects writing of a second line of handwritten text in the user interface region while the first line of handwritten text is displayed. In some embodiments, the electronic device detects the second line of handwritten text in a portion of the user interface region that is below the first line of handwritten text, as similarly shown in FIG. 6K. In some embodiments, the electronic device changes the shape of the first line of handwritten text to align the baseline path to the linear orientation associated with the user interface region without changing the shape of the second line of handwritten text (e.g., because the second handwritten input is still being detected), such as straightening the representation 606 as shown in FIG. 6K. Aligning an orientation of a representation of handwritten input to an orientation of a user interface region in which the representation of the handwritten input is displayed in response to detecting a second line of handwritten input reduces the number of inputs needed to change the orientation of the representation of handwritten input to an appropriate orientation and/or enables the orientation of the representation of handwritten input to be changed automatically, thereby improving user-device interaction.

In some embodiments, the user interface region includes a selectable option (e.g., straighten option 618-5 in FIG. 6H) that, when selected, causes the electronic device to change the shape of the representation of the first handwritten input in the user interface region to change the baseline path of the representation of the handwritten input to the second shape (710*a*). For example, the user interface region includes a straighten option that, when selected, causes the electronic device to change the shape of the representation of the first handwritten input to align the baseline path to the predefined orientation associated with the user interface region. In some embodiments, the user interface region includes the straighten option because the representation of the first handwritten input is displayed in the user interface region. In some embodiments, as discussed below, the straighten option is displayed in the user interface region in response to user input (e.g., detected after the first input).

In some embodiments, detecting the respective event includes detecting, via the one or more input devices, selection of (e.g., a tap or touch directed to) the selectable option (710*b*), such as selection of the straighten option 618-5 by stylus 203 as shown in FIG. 6H. Aligning an orientation of a representation of handwritten input to an orientation of a user interface region in which the representation of the handwritten input is displayed in response to detecting selection of a selectable option reduces the number of inputs needed to change the orientation of the representation of handwritten input to an appropriate orientation and/or enables the orientation of the representation of handwritten input to be changed automatically, thereby improving user-device interaction.

In some embodiments, the selectable option (e.g., straighten option 618-5 in FIG. 6H) is not displayed when (e.g., and/or before) the first input is received (712*a*), as shown in FIG. 6B. In some embodiments, while displaying the representation of the first handwritten input that has the baseline path with the first shape and before detecting the respective event, the electronic device receives (712*b*), via the one or more input devices, a second input corresponding to selection of the first handwritten input, such as selection of representation 606 by stylus 203 as shown in FIG. 6G. For example, before the electronic device changes the shape of the representation of the first handwritten input, the electronic device receives a selection of the first handwritten input in the user interface region. In some embodiments, the selection includes utilization of a selection tool (e.g., selectable within the user interface region), such as selection tool 608-1 in FIG. 6F, for selecting all or a portion of the representation of the first handwritten input. In some embodiments, the selection includes a respective gesture (e.g., a tap, a double tap, or a tap and hold) directed toward the representation of the first handwritten input in the user interface region.

In some embodiments, in response to receiving the second input, the electronic device concurrently displays (712*c*), via the display generation component, the selected first handwritten input and the selectable option in the user interface region, such as display of the selected representation 606 and the straighten option 618-5 as shown in FIG. 6H. For example, in response to receiving the selection of the representation of the first handwritten input, the electronic device concurrently displays the straighten option with the selected portion of the representation of the first handwritten input that is displayed with a selection indicator (e.g., highlighting or other visual indicator that visually distinguishes the selected handwritten input from unselected content), such as visual indicator 612-1 in FIG. 6G. In some embodiments, the straighten option is displayed relative to the representation of the first handwritten input in the user interface region (e.g., above, below, or adjacent to a portion of the representation of the first handwritten input). In some embodiments, the straighten option is displayed in a predefined portion of the user interface region (e.g., along a side or top region of the user interface region). Displaying a selectable option for aligning an orientation of a representation of handwritten input to an orientation of a user interface region in which the representation of the handwritten input is displayed in response to detecting selection of the representation of handwritten input reduces the number of inputs needed to change the orientation of the representation of handwritten input to an appropriate orientation and/or avoids unintentional and/or unwanted changing of the orientation of the representation of handwritten input, thereby improving user-device interaction.

In some embodiments, the selectable option (e.g., straighten option 618-5 in FIG. 6H) is displayed within a toolbar user interface object (e.g., toolbar element 614 in FIG. 6H), the toolbar user interface object including a plurality of respective selectable options (714), such as selectable options 618-1 through 618-6 in FIG. 6H. For example, the straighten option is displayed among a plurality of selectable options within a toolbar displayed in the user interface region. In some embodiments, the plurality of selectable options are selectable to perform corresponding operations involving the handwritten text of the first handwritten input. For example, the plurality of selectable options includes a copy option (e.g., 618-2), a cut option (e.g., 618-1), a text (e.g., font-based text) insertion option, and/or a paste option (if applicable). In some embodiments, as similarly described above with reference to steps 712*a*-712*c*, the toolbar is displayed after the electronic device detects selection of the representation of the first handwritten input in the user interface region. In some embodiments, the toolbar is displayed relative to the representation of the first handwritten input in the user interface region (e.g., above, below, or adjacent to a portion of the representation of the first handwritten input), as shown in FIG. 6H. In some embodiments, the toolbar is displayed in a predefined portion of the user interface region (e.g., along a side or top region of the user interface region). Displaying a selectable option within a toolbar for aligning an orientation of a representation of handwritten input to an orientation of a user interface region in which the representation of the handwritten input is displayed reduces the number of inputs needed to change the orientation of the representation of handwritten input to an appropriate orientation and/or facilitates user input for performing additional text-related operations corresponding to other selectable options displayed within the toolbar, thereby improving user-device interaction.

In some embodiments, the selectable option is not displayed when a beginning of the first input is received (716*a*) (e.g., and/or before the first input is received), such as while receiving handwritten input provided by stylus 203 as shown in FIG. 6K. In some embodiments, while displaying at least a portion of the representation of the first handwritten input that has the baseline path with the first shape and before detecting the respective event (e.g., the representation 616 in FIG. 6L), the electronic device concurrently displays (716*b*), via the display generation component, the at least the portion of the representation of the handwritten input (e.g., representation 616) and the selectable option in the user interface region (e.g., straighten option 622 in FIG. 6L). For example, the electronic device displays the selectable option in the user interface region while detecting the first input (e.g., a threshold amount of time, such as 0.1, 0.15, 0.25, 0.5, 1, 1.5, 2, 2.5, 3, 4, or 5 seconds, after displaying a first portion of the representation of the first handwritten input). In some embodiments, the electronic device displays the selectable option in the user interface region after detecting completion of a first handwritten line of text (e.g., after detecting lift-off of a contact between an object providing the handwritten input and the surface, and initiation of a second handwritten line of text, such as below the first handwritten line of text). In some embodiments, as similarly described above with reference to steps 712*a*-712*c*, the selectable option is displayed relative to the at least the portion of the representation of the first handwritten input in the user interface region, as shown in FIG. 6L, or in a predefined portion of the user interface region. Displaying a selectable option for aligning an orientation of a representation of handwritten input to an orientation of a user interface region in which the representation of the handwritten input is displayed after displaying a first line of handwritten text reduces the number of inputs needed to change the orientation of the representation of handwritten input to an appropriate orientation and/or avoids unintentional and/or unwanted changing of the orientation of the representation of handwritten input, thereby improving user-device interaction.

In some embodiments, the selectable option is not displayed when the first input is received (718*a*). In some embodiments, while displaying the representation of the first handwritten input that has the baseline path with the first shape and before detecting the respective event, the electronic device detects (718*b*) a second respective event, such as lift-off of stylus 203 from the touch screen 504 as similarly shown in FIG. 6D. For example, as similarly described above with reference to step 706, the electronic device detects lift-off of a contact between an object providing the handwritten input and the surface, such as lift-off of a stylus or a finger of the user. In some embodiments, as discussed above with reference to steps 708*a*-708*b*, the electronic device detects writing a new line of handwritten text, as shown in FIG. 6K. In some embodiments, as discussed above with reference to steps 710*a*-710*b*, the electronic device detects selection of a straighten option displayed in the user interface region, as shown in FIG. 6H.

In some embodiments, in response to detecting the second respective event (718*c*), in accordance with a determination that the selectable option has been displayed a threshold number of times (e.g., 1, 2, 3, 4, 5, 6, or 10 times) in the user interface region before receiving the first input, the electronic device forgoes (718*d*) displaying, via the display generation component, the selectable option in the user interface region, such as forgoing display of straighten option 618-5 as similarly shown in FIG. 6F. For example, if the electronic device determines that the straighten option has been displayed in the user interface region the threshold number of times before receiving the first input (e.g., in response to a series of inputs providing handwritten input in the user interface region that were received prior to the first input), the electronic device does not automatically display the straighten option in response to detecting the end of the first input.

In some embodiments, in accordance with a determination that the selectable option has been displayed less than the threshold number of times in the user interface region before receiving the first input, the electronic device displays (718*e*) the selectable option in the user interface region, such as display of straighten option 622 as similarly shown in FIG. 6L. For example, if the electronic device determines that the straighten option has not been displayed in the user interface region the threshold number of times (e.g., has been displayed less than the threshold number of times) before receiving the first input, the electronic device displays the straighten option in the user interface region in response to detecting the end of the first input. In some embodiments, if a subsequent input (e.g., a second input, a third input, or a fourth input after the first input) including handwritten input is detected that causes the selectable option to be displayed in the user interface region the threshold number of times, the electronic device will forgo displaying the selectable option in the user interface region in response to detecting an end of the subsequent input. Limiting display of a selectable option for aligning an orientation of a representation of handwritten input to an orientation of a user interface region in which the representation of the handwritten input is displayed to below a threshold number avoids unintentional and/or unwanted changing of the orientation of the representation of handwritten input, thereby improving user-device interaction.

In some embodiments, the selectable option is not displayed when the first input is received (720*a*). In some embodiments, while displaying the representation of the first handwritten input that has the baseline path with the first shape and before detecting the respective event (720*b*), in accordance with a determination that at least a portion of the first handwritten input corresponds to recognized text, such as the words of the representation 606 in FIG. 6H, the electronic device displays (720*c*), via the display generation component, the selectable option in the user interface region, such as display of straighten option 618-5 as shown in FIG. 6H. For example, if the electronic device determines that all or a portion of the first handwritten input corresponds to text (e.g., letters, words, numbers, and/or special characters, optionally including shapes), the electronic device enables display of the straighten option. In some embodiments, as discussed above with reference to step 706, the straighten option is displayed after detecting an end of the first input. In some embodiments, the straighten option is displayed in response to detecting a selection of the representation of the handwritten input. In some embodiments, as discussed above with reference to steps 708*a*-708*b*, the straighten option is displayed in response to writing a new line of handwritten input (e.g., below the first handwritten input).

In some embodiments, in accordance with a determination that the first handwritten input does not correspond to recognized text, the electronic device forgoes (720*d*) displaying the selectable option in the user interface region, such as forgoing display of the straighten option as shown in FIG. 6DD. For example, if the electronic device determines that all or a portion of the first handwritten input does not correspond to text (e.g., the handwritten input includes only shapes, as shown in FIG. 6DD), the electronic device disables display of the straighten option. Accordingly, if the user selects the representation of the first handwritten input or begins writing a new line of handwritten input in the user interface region, the electronic device optionally forgoes displaying the straighten option in the user interface region. Displaying a selectable option for aligning an orientation of a representation of handwritten input to an orientation of a user interface region in which the representation of the handwritten input is displayed based on whether the handwritten input includes recognized text avoids unintentional and/or unwanted changing of the orientation of the representation of handwritten input, thereby improving user-device interaction.

In some embodiments, in response to detecting the respective event and in accordance with the determination that the one or more criteria are satisfied (722*a*), the electronic device performs (722*b*) one or more respective operations involving the respective portion of text of the representation of the first handwritten input in addition to changing the shape of the representation of the first handwritten input, such as performing a spell check operation as shown in FIG. 6P. For example, in response to detecting selection of the straighten option, the electronic device initiates one or more operations involving the handwritten text in addition to changing the shape of the handwritten text to align to the predefined orientation associated with the user interface region. In some embodiments, the electronic device performs a spell check operation on the letters and/or words of the handwritten text. For example, the electronic device identifies (e.g., via visual indications, such as visual indication 621 in FIG. 6P) instances of any detected misspelled words within the handwritten text. In some embodiments, the electronic device performs a grammar check operation on the handwritten text. For example, the electronic device identifies instances of any detected errors in usage, sentence structure, and/or punctuation. Performing additional text-related operations involving handwritten input when changing an orientation of a representation of the handwritten input reduces the number of inputs needed to perform the text-related operations and/or enables the text-related operations to be performed automatically, thereby improving user-device interaction.

In some embodiments, the representation of the first handwritten input is a plurality of lines of handwritten text, including a first line of handwritten text (e.g., representation 626-1 in FIG. 6N), and a second line of handwritten text (724*a*) (e.g., the second line of handwritten text is displayed separate from the first line of handwritten text in the user interface, such as at a location that is above the first line of the handwritten text), such as representation 626-2 in FIG. 6N. In some embodiments, in response to detecting the respective event and in accordance with the determination that the one or more criteria are satisfied (724*b*), the electronic device changes a shape of the second line of handwritten text in addition to changing the shape of the first line of handwritten text (724*c*), such as straightening the first line 626-1 and the second line 626-2 of handwritten text as shown in FIG. 6P. For example, the electronic device changes the shapes of the first line of handwritten text and the second line of handwritten text in response to detecting the respective event. In some embodiments, the electronic device aligns the baseline path of the first line of handwritten text and the baseline path of the second line of handwritten text to the predefined orientation associated with the user interface region. Aligning orientations of multiple lines of handwritten text to an orientation of a user interface region in which the lines of handwritten text are displayed in response to detecting a respective event reduces the number of inputs needed to concurrently change the orientations of the lines of handwritten text to an appropriate orientation and/or enables the orientation of the lines of handwritten text to be changed automatically, thereby improving user-device interaction.

In some embodiments, changing the shape of the representation of the first handwritten input includes changing a separation between the first line of handwritten text and the second line of handwritten text (726), such as adjusting a spacing between the line 626-1 and the line 626-2 of handwritten text from FIG. 6O to FIG. 6P. For example, if, prior to detecting the respective event, the first line of handwritten text and the second line of handwritten text are a first vertical distance apart in the user interface region, as shown in FIG. 6O, in response to detecting the respective event, the electronic device moves the first line of handwritten text and/or the second line or handwritten text within the user interface region, such that the first line of handwritten text and the second line of handwritten text are a second vertical distance apart, different from the first distance, as shown in FIG. 6P. Changing a separation between lines of handwritten text when changing orientations of the lines of handwritten text in a user interface region in which the lines of handwritten text are displayed improves an organization and presentation of the lines of handwritten text in the user interface region and/or enables the separation between the lines of handwritten text to be changed automatically, thereby improving user-device interaction.

In some embodiments, before detecting the respective event, a separation between the first line of handwritten text (e.g., representation 606 in FIG. 6N) and the second line of handwritten text (e.g., representation 616 in FIG. 6N) of the plurality of lines of handwritten text is different from a separation between the second line of handwritten text and a third line of handwritten text (e.g., representation 626-1 in FIG. 6N) of the plurality of lines of handwritten text (728*a*). For example, the plurality of lines of handwritten text within the user interface region further includes a third line of handwritten text, separate from the first line of handwritten text and the second line of handwritten text.

In some embodiments, in response to detecting the respective event and in accordance with the determination that the one or more criteria are satisfied, the separation between the first line of handwritten text and the second line of handwritten text is equal to the separation between the second line of handwritten text and the third line of handwritten text (728*b*), such as display of the representation 606 and the representation 616 with a spacing therebetween that is equal to that of the representation 616 and the representation 626-1 as shown in FIG. 6P. For example, in response to detecting the respective event, the electronic device changes the vertical distance between the first line of handwritten text and the second line of handwritten text, and changes the vertical distance between the second line of handwritten text and the third line of handwritten text in the user interface region, such that the vertical distances are equal, as shown in FIG. 6P. In some embodiments, the electronic device changes the separation between the first line of handwritten text and the second line of handwritten text by a first amount, and changes the separation between the second line of handwritten text and the third line of handwritten text by a second amount, different from the first amount, to provide a consistent separation among the three lines of handwritten text. Changing a separation between pairs of lines of handwritten text to provide consistent separation among the lines of handwritten text when changing orientations of the lines of handwritten text in a user interface region in which the lines of handwritten text are displayed improves an organization and presentation of the lines of handwritten text in the user interface region and/or enables the separation between the pairs of lines of handwritten text to be changed automatically, thereby improving user-device interaction.

In some embodiments, an amount of separation between respective lines of handwritten text of the plurality of lines of handwritten text in response to detecting the respective event and in accordance with the determination that the one or more criteria are satisfied is based on a size of the handwritten text (730), as shown in the change of line spacing from FIG. 6O to FIG. 6P. For example, if the handwritten text in the first line of handwritten text (e.g., representation 606 in FIG. 6O) and the handwritten text in the second line of handwritten text (e.g., representation 616 in FIG. 6O) are a first size, the electronic device changes the separation between the first line of handwritten text and the second line of handwritten text by a first amount, as shown in FIG. 6P. If the handwritten text in the first line of handwritten text is the first size (e.g., size of representation 616 in FIG. 6O) and the handwritten text in the second line of handwritten text is a second size (e.g., size of representation 626-1 in FIG. 6O), different from the first size, the electronic device optionally changes the separation between the first line of handwritten text and the second line of handwritten text by a second amount, different from the first amount, as shown in FIG. 6P. Additionally or alternatively, in some embodiments, the separation between respective lines of handwritten text is based on the vertical size of the handwritten text of the respective lines (e.g., the largest/tallest character(s) in the handwritten text, and not necessarily the horizontal size of the characters in the handwritten text. Changing a separation between lines of handwritten text when changing orientations of the lines of handwritten text in a user interface region in which the lines of handwritten text are displayed based on the size of the handwritten text improves an organization and presentation of the lines of handwritten text in the user interface region with respect to the size of the handwritten text and/or enables the separation between the lines of handwritten text to be changed automatically, thereby improving user-device interaction.

In some embodiments, changing the shape of the representation of the first handwritten input includes aligning the first line of handwritten text and the second line of handwritten text to a predefined alignment associated with the user interface region (732), such as alignment to the left margin 625*a* as shown in FIG. 6P. For example, in response to detecting the respective event, the electronic device moves the first line of handwritten text (e.g., representation 606 in FIG. 6*o*) and/or the second line of handwritten text (e.g., representation 616 in FIG. 6O) in the user interface region to align to the predefined alignment of the user interface region, as shown in FIG. 6P. For example, if the predefined alignment of the user interface region is a first alignment (e.g., left-aligned or justified), the first line of handwritten text and/or the second line of handwritten text are moved in a first direction (e.g., leftward) in the user interface region to align to the first alignment. If the predefined alignment of the user interface region is a second alignment, different from the first alignment (e.g., right-aligned or center-aligned), the electronic device optionally moves the first line of handwritten text and/or the second line of handwritten text in a second direction, different from the first direction, in the user interface region to align to the second alignment. Updating an alignment of lines of handwritten text when changing orientations of the lines of handwritten text in a user interface region in which the lines of handwritten text are displayed to align to a predefined alignment of the user interface region improves an organization and presentation of the lines of handwritten text in the user interface region with respect to the predefined alignment and/or enables the lines of handwritten text to be realigned automatically, thereby improving user-device interaction.

In some embodiments, aligning the first line of handwritten text and the second line of handwritten text to the predefined alignment associated with the user interface region includes (734*a*), in accordance with a determination that a detected language associated with the handwritten text is a first language, such as the English language of the representations 606-626-2 in FIG. 6P, aligning the first line of handwritten text and the second line of handwritten text to a first alignment (734*b*), such as aligning to left margin 625*a* as shown in FIG. 6P. For example, the alignment associated with the user interface region is determined based on the detected language of the handwritten text of the first line of handwritten text and the second line of handwritten text. In some embodiments, if the detected language is a language that reads left to right (e.g., English, Spanish, French, Mandarin Chinese), the first line of handwritten text and the second line of handwritten text are aligned to a first alignment (e.g., left-aligned) in the user interface region, as shown in FIG. 6P.

In some embodiments, in accordance with a determination that the detected language associated with the handwritten text is a second language, different from the first language, such as the Hebrew language of representation 645 in FIG. 6Y, the electronic device aligns the first line of handwritten text and the second line of handwritten text to a second alignment, different from the first alignment (734*c*), such as aligning to right margin 625*b* as shown in FIG. 6Z. In some embodiments, if the detected language is a language that reads right to left (e.g., Arabic, Hebrew, Kurdish), the first line of handwritten text and the second line of handwritten text are aligned to a second alignment (e.g., right-aligned), different from the first alignment, in the user interface region. Updating an alignment of lines of handwritten text when changing orientations of the lines of handwritten text in a user interface region in which the lines of handwritten text are displayed based on a detected language of the handwritten text improves an organization and presentation of the lines of handwritten text in the user interface region with respect to the detected language and/or enables the lines of handwritten text to be realigned based on the detected language automatically, thereby improving user-device interaction.

In some embodiments, in accordance with a determination that a detected language associated with the respective portion of text of the first handwritten input is a first language, the second shape is oriented in a first direction (736*a*), such as the horizontal orientation represented by line 605 in FIG. 6D. For example, the orientation of the baseline path of the representation of the first handwritten input is determined based on the detected language of the handwritten text of the representation of the first handwritten input. In some embodiments, if the detected language is a language that reads left to right (e.g., English, Spanish, French, Mandarin Chinese) or a language that reads right to left (e.g., Arabic, Hebrew, Kurdish), the shape of the representation of the first handwritten input is changed to orient the baseline path of the representation of the first handwritten input in a first direction (e.g., a horizontally linear direction) in the user interface region, as shown in FIG. 6E and/or in FIG. 6Z.

In some embodiments, in accordance with a determination that the detected language associated with the respective portion of text of the first handwritten input is a second language, different from the first language, the second shape is oriented in a second direction, different from the first direction (736*b*), as described with reference to FIG. 6E. In some embodiments, if the detected language is a language that reads top to bottom (e.g., Japanese, Taiwanese, Vietnamese, Korean), the shape of the representation of the first handwritten input is changed to orient the baseline path of the representation of the first handwritten input in a second direction (e.g., a vertically linear direction), different from the first direction, in the user interface region. Changing an orientation of a representation of handwritten input in a user interface region based on a detected language of handwritten text of the handwritten input improves an organization and presentation of the representation of the handwritten input in the user interface region with respect to the detected language and/or enables the representation of handwritten input to be realigned based on the detected language automatically, thereby improving user-device interaction.

In some embodiments, changing the baseline path of the representation of the first handwritten input to have the second shape includes (738*a*), in accordance with a determination that one or more characters in the respective portion of text of the first handwritten input corresponds to one or more first characters in a first font-based text, changing the shape of the representation of the first handwritten input to correspond to a first respective shape the one or more first characters would have in the first font-based text (738*b*), as described with reference to FIG. 6D. For example, the orientation of the baseline path of the representation of the first handwritten input is determined based on adapting the handwritten text of the first handwritten input to an orientation that would be expected for a font-based text having the same characters (e.g., letters, numbers, special characters) as those detected in the handwritten text. In some embodiments, if the one or more characters of the handwritten text correspond to one or more first characters (e.g., letters) in the first font-based text, the electronic device changes the shape of the representation of the first handwritten input to change the baseline path of the one or more characters to have a first respective shape that the one or more first characters would be expected to have in the first font-based text. In some embodiments, if the one or more characters in the respective portion of text of the first handwritten input corresponds to one or more first characters in a second font-based text, different from the first font-based text, the electronic device changes the shape of the representation of the first handwritten input to change the baseline path to have a third respective shape that the one or more first characters would be expected to have in the second font-based text.

In some embodiments, in accordance with a determination that the one or more characters in the respective portion of text of the first handwritten input corresponds to one or more second characters, different from the one or more first characters, in the first font-based text, the electronic device changes the shape of the representation of the first handwritten input to correspond to a second respective shape the one or more second characters would have in the first font-based text, wherein the first respective shape is different from the second respective shape (738), as described with reference to FIG. 6D. In some embodiments, if the one or more characters of the handwritten text correspond to one or more second characters (e.g., numbers or special characters) in the first font-based text, the electronic device changes the shape of the representation of the first handwritten input to change the baseline path of the one or more characters to have a second respective shape, different from the first respective shape, that the one or more second characters would be expected to have in the first font-based text. In some embodiments, if the one or more characters in the respective portion of text of the first handwritten input corresponds to one or more second characters, different from the one or more first characters, in the second font-based text, the electronic device changes the shape of the representation of the first handwritten input to change the baseline path to have a fourth respective shape, different from the third respective shape, that the one or more second characters would be expected to have in the second font-based text. Changing an orientation of a representation of handwritten input in a user interface region based on equating one or more characters of the handwritten input to one or more corresponding characters in a font-based text improves an organization and presentation of the representation of the handwritten input in the user interface region and/or enables the representation of handwritten input to be realigned automatically, thereby improving user-device interaction.

In some embodiments, the first handwritten input is associated with a respective writing tool for handwritten input that is selected when the first input is received (740*a*), such as pen entry tool 608-2 as shown in FIG. 6A. For example, the user has selected, before providing the first input, the respective writing tool associated with the application that is providing display of the user interface region. In some embodiments, the respective writing tool controls an appearance and/or form of the strokes that form the representation of the first handwritten input in response to detecting the first input. In some embodiments, the respective writing tool is selected from a plurality of predefined writing tools (e.g., content entry tools 608-1-608-4 in FIG. 6A) associated with the application that is providing the display of the user interface region. For example, a form and appearance of strokes drawn using the plurality of predefined writing tools are configured to imitate those of real-world writing tools, such as pens, pencils, paintbrushes, and/or markers.

In some embodiments, the one or more criteria include a criterion that is satisfied when the respective writing tool is of a first type (e.g., such as pen entry tool 608-1 or pencil entry tool 608-4 in FIG. 6A) and is not satisfied when the respective writing tool is of a second type, different from the first type (740*b*), such as highlighter entry tool 608-4 in FIG. 6A. For example, if the respective writing tool is of a first type, such as a pen, pencil, or marker, the electronic device enables the shape of the representation of the first handwritten input to be changed to align the baseline path of the first handwritten input to the predefined orientation associated with the user interface region in response to detecting the respective event, as shown in FIG. 6E. In some embodiments, if the respective writing tool is of a second type, such as a highlighter, paintbrush, and/or watercolor tool, the electronic device does not enable the shape of the representation of the first handwritten input to be changed, such as forgoing display of straighten option 618-5 as shown in FIG. 6X. In some embodiments, if the user selects a different writing tool that is of the first type, and provides subsequent handwritten input using the writing tool of the first type, the electronic device will enable the shape of the representation of the subsequent handwritten input to be changed in response to detecting the respective event. Aligning an orientation of a representation of handwritten input to an orientation of a user interface region in which the representation of the handwritten input is displayed based on the type of writing tool selected when the handwritten input is received facilitates user discovery that the orientation of the representation of handwritten input can be changed if the handwritten input is provided using some handwriting tools but not others, and/or reduces the number of inputs needed to change the orientation of the representation of handwritten input to an appropriate orientation while writing using some handwriting tools, thereby improving user-device interaction.

In some embodiments, the one or more criteria include a criterion that is satisfied when the user interface region is operating in a content creation mode of a first type (e.g., Note Taking mode as indicated by 611 in FIG. 6Q) and is not satisfied when the user interface region is operating in a content creation mode of a second type, different from the first type (742), such as Drawing mode as indicated by 613 in FIG. 6AA. For example, the content creation mode of the first type is a content creation mode configured with an affinity for text input. In some embodiments, the first type of content creation mode refers to a note-taking creation mode, a journaling creation mode, a text-entry creation mode, and/or a composition creation mode. In some embodiments, the first type of content creation mode is based on the application with which the user interface region is associated. In some embodiments, the content creation mode of the second type is a content creation mode configured with an affinity for non-text input, such as shapes 642 and 644 in FIG. 6BB. For example, the second type of content creation mode refers to a drawing or sketching mode, a document annotation mode, and/or a model-based creation mode. Aligning an orientation of a representation of handwritten input to an orientation of a user interface region in which the representation of the handwritten input is displayed based on the type of mode in which the user interface region is operating facilitates user discovery that the orientation of the representation of handwritten input can be changed in some modes but not others, and/or reduces the number of inputs needed to change the orientation of the representation of handwritten input to an appropriate orientation in some modes, thereby improving user-device interaction.

In some embodiments, the respective portion of text of the first handwritten input includes one or more letters (744*a*), such as the letters of representation 606 in FIG. 6D. For example, the respective portion of text includes words or phrases formed by the one or more letters. In some embodiments, the baseline path of the representation of the first handwritten input originates at a first letter of the one or more letters (744*b*), such as first letter "T" 606*a* in FIG. 6D. For example, the first letter of the one or more letters is chronologically the first letter of the words or phrases formed by the one or more letters in the handwritten text.

In some embodiments, changing the baseline path to have the second shape includes maintaining a position of the first letter of the representation of the first handwritten input in the user interface region (744*c*), such as maintaining position of the letter "T" as shown in FIG. 6E. For example, the baseline path and/or a location of the start of the baseline path is anchored to a location of the first letter in the user interface region when the electronic device changes the baseline path of the representation of the first handwritten input in response to detecting the respective event. In some embodiments, the location of the first letter (and/or a particular point of the first letter, such as the centroid of the first letter) does not change (e.g., does not shift or move) in the user interface region in response to detecting the respective event. For example, relative positions of a second, third, fourth, and/or fifth letter or number of the handwritten text change in the user interface region such the shape of the baseline path changes to align to the predefined orientation of the user interface region with respect to the location of the first letter, as shown in FIG. 6E. In some embodiments, the electronic device rotates the first letter (e.g., by a respective degree) of the representation of the first handwritten input, such as rotation of the letter "T" as shown in FIG. 6E, without moving and/or shifting the first letter when changing the shape of the representation of the first handwritten input. Changing an orientation of handwritten text to align to an orientation of a user interface region in which the handwritten text is displayed based on a location of a first letter of the handwritten text enables the relative spatial relationship between the handwritten text and the user interface region to be maintained by maintaining the location of the first letter, thereby improving user-device interaction.

In some embodiments, while receiving the first input, the electronic device concurrently displays (746), via the display generation component, one or more respective user interface elements for guiding the handwritten input with the representation of the first handwritten input in the user interface region, such as visual guidelines 615-1 and 615-2 in FIG. 6Q, wherein the one or more respective user interface elements are not displayed when the first input is received, as shown in FIG. 6B. For example, the electronic device displays the one or more respective user interface elements within a threshold amount of time (e.g., 0.25, 0.5, 1, 1.5, 1.75, 2, 3, or 5 seconds) of receiving the first input. In some embodiments, the electronic device displays the one or more respective user interface elements if the user interface region is operating in a respective mode (e.g., a note-taking/journaling mode), as indicated by visual indication 611 in FIG. 6Q. In some embodiments, if the user interface region is operating in a mode that is different from the respective mode (e.g., a drawing mode), the electronic device forgoes displaying the one or more respective user interface elements, as shown in FIG. 6BB. In some embodiments, the one or more respective user interface elements extend across the user interface region from a location that corresponds to a location of a first character (e.g., letter, number, or special character) of the handwritten input, as shown in FIG. 6Q. In some embodiments, as discussed in more detail below with reference to steps 748*a*-748*b*, the one or more respective user interface elements assist the user with writing the handwritten text with a baseline path that (e.g., substantially) corresponds to a predefined orientation associated with the user interface region. For example, an orientation of the one or more respective user interface elements is aligned to the predefined orientation associated with the user interface region, such as the horizontal orientation of the visual guidelines 615-1 and 615-2 as shown in FIG. 6Q. Providing visual guidance for guiding handwritten input when the handwritten input is detected in a user interface region improves the visual linearity of the handwritten input in the user interface region and/or reduces the number of inputs needed for displaying a representation of the handwritten input with a linear orientation, thereby improving user-device interaction.

In some embodiments, displaying the one or more respective user interface elements includes displaying one or more graphical lines in the user interface region for guiding an orientation of the handwritten input (748*a*), such as display of visual guidelines 615-1 and 615-2 in FIG. 6Q. For example, the one or more respective user interface elements are one or more graphical lines (e.g., horizontal lines) displayed in the user interface region while the electronic device is receiving the first input. In some embodiments, the one or more graphical lines include a pair of graphical lines extending across a portion of the user interface region. For example, the pair of graphical lines provide an upper bound and a lower bound in the user interface region between which the handwritten input can be provided (and the representation of the handwritten input subsequently displayed), as shown in FIG. 6Q.

In some embodiments, an orientation of the one or more graphical lines is aligned to a predefined orientation associated with the user interface region (748*b*), such as alignment of the visual guidelines 615-1 and 615-2 to a horizontal orientation as shown in FIG. 6Q. For example, the one or more graphical lines extend in a respective direction across the user interface region that aligns to the predefined orientation of the user interface region, such that, when the handwritten input is provided in the user interface region following the one or more graphical lines (e.g., between the pair of graphical lines discussed above), the baseline path of the representation of the handwritten input (e.g., substantially) aligns to the predefined orientation of the user interface region. In some embodiments, a vertical distance between the pair of graphical lines is predefined. In some embodiments, the distance is based on the writing tool selected by the user (e.g., the distance between the pair of graphical lines is larger for a writing tool having a thicker stroke (e.g., such as a marker tool) than for other writing tools (e.g., such as a pen or pencil tool). In some embodiments, the distance is based on a vertical size (e.g., height) of the representation of handwritten input that has been and/or is being provided. Providing graphical lines for guiding handwritten input when the handwritten input is detected in a user interface region improves the visual linearity of the handwritten input in the user interface region and/or reduces the number of inputs needed for displaying a representation of the handwritten input with a linear orientation, thereby improving user-device interaction.

In some embodiments, while (e.g., in response to) receiving the first input and while displaying the one or more respective user interface elements in the user interface region (750*a*), in accordance with a determination that a portion of the representation of the first handwritten input (e.g., a first end of representation 636 in FIG. 6R) is more than a predefined distance (e.g., 0.5, 1, 2, 3, 4, 5, 10, 12, 15, or 20 cm) from a portion of the one or more respective user interface elements (e.g., a first end of the visual guidelines 615-1 and 615-2 in FIG. 6R), the electronic device displays (750*b*) the portion of the one or more respective user interface elements with a first visual appearance, such as fading display of the first end of the visual guidelines 615-1 and 615-2 as shown in FIG. 6R. For example, if the electronic device determines that a first portion of the handwritten text (e.g., a first letter, number, and/or special character) is outside of the predefined distance from a first portion of the one or more respective user interface elements (e.g., an edge or tip of the graphical lines), the electronic device displays the first portion of the one or more respective user interface elements with a first visual appearance. In some embodiments, the electronic device ceases display of the first portion of the one or more respective user interface elements. In some embodiments, the electronic device changes visual characteristics of the first portion of the one or more respective user interface elements relative to other portions of the one or more respective user interface elements (e.g., decreases an opacity and/or coloration of the first portion relative to the other portions), as shown in FIG. 6R.

In some embodiments, in accordance with a determination that the portion of the representation of the first handwritten input (e.g., the first end of representation 636 in FIG. 6Q) is less than the predefined distance (e.g., 0.5, 1, 2, 3, 4, 5, 10, 12, 15, or 20 cm) from the portion of the one or more respective user interface elements (e.g., the first end of the visual guidelines 615-1 and 615-2 in FIG. 6Q), the electronic device displays (750*c*) the portion of the one or more respective user interface elements with a second visual appearance, different from the first visual appearance, such as maintaining display of the first end of the visual guidelines 615-1 and 615-2 as shown in FIG. 6R. For example, if the electronic device determines that the first portion of the handwritten text (e.g., a first letter, number, and/or special character) is less the predefined distance from the first portion of the one or more respective user interface elements (e.g., an edge or tip of the graphical lines), the electronic device displays the first portion of the one or more respective user interface elements with a second visual appearance. In some embodiments, the electronic device maintains display of the first portion of the one or more respective user interface elements, as shown in FIG. 6Q. In some embodiments, the electronic device forgoes changing visual characteristics of the first portion of the one or more respective user interface elements relative to the other portions of the one or more respective user interface elements (e.g., maintains an opacity and/or coloration of the first portion relative to the other portions). In some embodiments, in accordance with a determination that a subsequent portion of the representation of the first handwritten input (e.g., displayed in response to detecting a subsequent portion of the first input) causes the portion of the representation of the first handwritten input to be more than the predefined distance from the portion of the one or more respective user interface elements, the electronic device displays the portion with the first visual appearance described above. For example, the one or more respective user interface elements fade out as the current handwriting position in the user interface region moves further than the predefined distance from a first end of the one or more respective user interface elements, and/or fill in (e.g., are redisplayed and/or are not faded out) as the current handwriting position in the user interface remains less than the predefined distance from a second end of the one or more respective user interface elements. Varying display of visual guidance for guiding handwritten input depending on a distance between a portion of the visual guidance and a portion of the handwritten input in a user interface region avoids and/or reduces interference with the representation of the handwritten input as the user provides the handwritten input, thereby improving user-device interaction.

In some embodiments, while concurrently displaying the one or more respective user interface elements with the representation of the first handwritten input in the user interface region, the electronic device detects (752*a*), via the one or more input devices, an end of the first input, such as lift-off of stylus 203 from touch screen 504 as shown in FIG. 6S. For example, as similarly described above with reference to step 706, the electronic device detects lift-off of a contact between an object providing the first input and the surface, such as a stylus or a finger of the user. In some embodiments, the electronic device detects a pause of the movement of the contact between the object providing the first input and the surface (e.g., for more than a threshold amount of time, such as 0.1, 0.15, 0.25, 0.5, 1, 2, 3, 4, 5, 8, or 10 seconds).

In some embodiments, in response to detecting the end of the first input, the electronic device ceases (752*b*) display, in the user interface region, of the one or more respective user interface elements while maintaining display of the representation of the first handwritten input, such as ceasing display of the visual guidelines 615-1 and 615-2 as shown in FIG. 6S. For example, the electronic device ceases displaying the one or more graphical lines in the user interface region while maintaining display of the handwritten text in the user interface region. In some embodiments, the electronic device redisplays the one or more respective user interface elements in response to detecting subsequent handwritten input (e.g., a new line of handwritten text or continued writing of the existing line of handwritten text) in the user interface region, such as redisplaying the visual guidelines 615-1 and 615-2 as shown in FIG. 6T. Ceasing display of visual guidance for guiding handwritten input when an end of the handwritten input is detected in a user interface region avoids and/or reduces interference with the representation of the handwritten input and/or facilitates user input for performing cleanup operations involving the representation of the handwritten input, thereby improving user-device interaction.

In some embodiments, the respective portion of text of the first handwritten input includes one or more handwritten marks that do not correspond to handwritten text (754*a*), such as circling and underlining in representation 646 in FIG. 6T. For example, the respective portion of text of the first handwritten input includes annotations, such as underlining, circling, and/or other marks provided with the first handwritten input (e.g., above or below portions of words and/or between letters of the text). In some embodiments, the one or more handwritten marks contribute to the shape of the representation of the first handwritten input.

In some embodiments, changing the shape of the representation of the first handwritten input in the user interface region to change the baseline path of the representation of the first handwritten input to the second shape includes changing a visual appearance of (e.g., orientation, size, position, and/or vividness of) the one or more handwritten marks (754*b*), such as moving and/or rotating the circling and underlining in representation 646 when straightening the representation 646 as shown in FIG. 6U. For example, when the electronic device changes the shape of the representation of the first handwritten input to align to the predefined orientation associated with the user interface region, the electronic device changes the visual appearance of the annotations/mark to also align to the predefined orientation, as shown in FIG. 6U. In some embodiments, the one or more handwritten marks are visually changed together when the shape of the representation of the first handwritten input is changed (e.g., the annotations/marks are visually changed (e.g., rotated, shifted, and/or resized) by a same magnitude (e.g., of degree, distance, width, height, and/or direction)). In some embodiments, the one or more handwritten marks are visually changed individually when the shape of the representation of the first handwritten input is changed (e.g., the annotations/marks are visually changed by different magnitudes (e.g., depending on the locations of the marks relative to the respective portion of text (e.g., between letters or below portions of text)). In some embodiments, the one or more handwritten marks are visually changed relative to the handwritten text that the one or more handwritten marks are displayed with. For example, the electronic device visually changes (e.g., rotates, shifts, and/or resizes) the one or more handwritten marks based on the change in shape of the representation of the handwritten input (e.g., movement of individual characters with which the handwritten marks are displayed, rotation of individual characters with which the handwritten marks are displayed, such as the word "Joe" and/or the number "2" of the representation 646 in FIG. 6U, and/or resizing of individual characters with which the handwritten marks are displayed). In some embodiments, as similarly discussed above with reference to steps 720*a*-720*d*, marks/annotations provided as handwritten input without handwritten text (e.g., without recognized letters, words, numbers, and/or characters), such as shapes 642, 644, and 648 in FIG. 6DD, are not afforded the functionality of being visually changed to align to the predefined orientation. Changing a visual appearance of marks/annotations within handwritten text when changing an orientation of a representation of the handwritten text to align to an orientation of a user interface region in which the representation is displayed reduces the number of inputs needed to consistently change an orientation of the handwritten text that includes the marks/annotations and/or enables the handwritten text and the marks/annotations to be performed automatically reoriented concurrently, thereby improving user-device interaction.

It should be understood that the particular order in which the operations in FIGS. 7A-7J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIGS. 7A-7J. For example, the operation of the electronic device selecting and providing for interaction with handwritten content, including straightening the handwritten content, described above with reference to method 700 optionally has one or more of the characteristics of wrapping handwritten content based on handwritten inputs described herein with reference to other methods described herein (e.g., method 900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 7A-7J are, optionally, implemented by components depicted in FIGS. 1A-1B. For example, displaying operations 702*b*, 712*c*, 716*b*, 718*e*, 720*c*, 746, 750*b*, and 750*c*, receiving operations 702*a* and 712*b*, and detecting operations 702*c*, 718*b*, and 752*a*, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Wrapping of Handwritten Content

Users interact with electronic devices in many different manners, including entering text into such devices. In some embodiments, an electronic device displays handwritten text in content entry regions. The embodiments described below provide ways in which an electronic device receives inputs to select and interact with portions of the handwritten text, including wrapping the handwritten text, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8B:
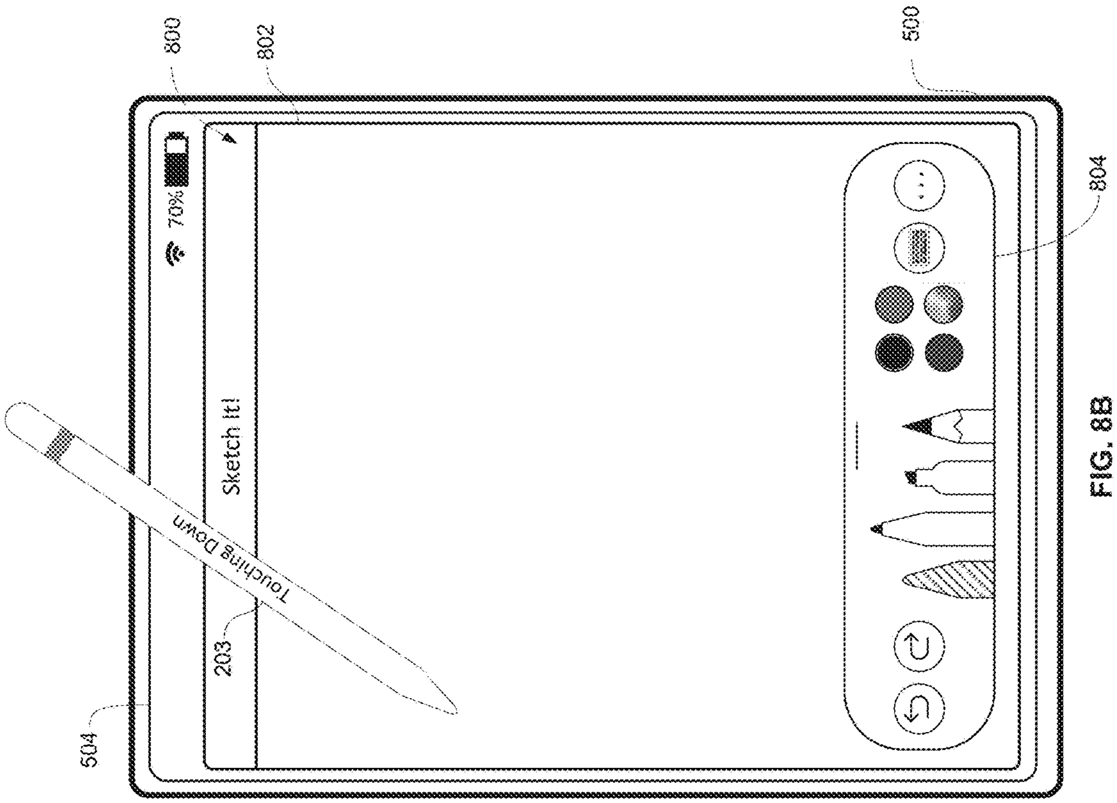
FIGS. 8A-8BB illustrate exemplary ways in which an electronic device selects and provides for wrapping of handwritten content in accordance with some embodiments of the disclosure.
Figure 8A:
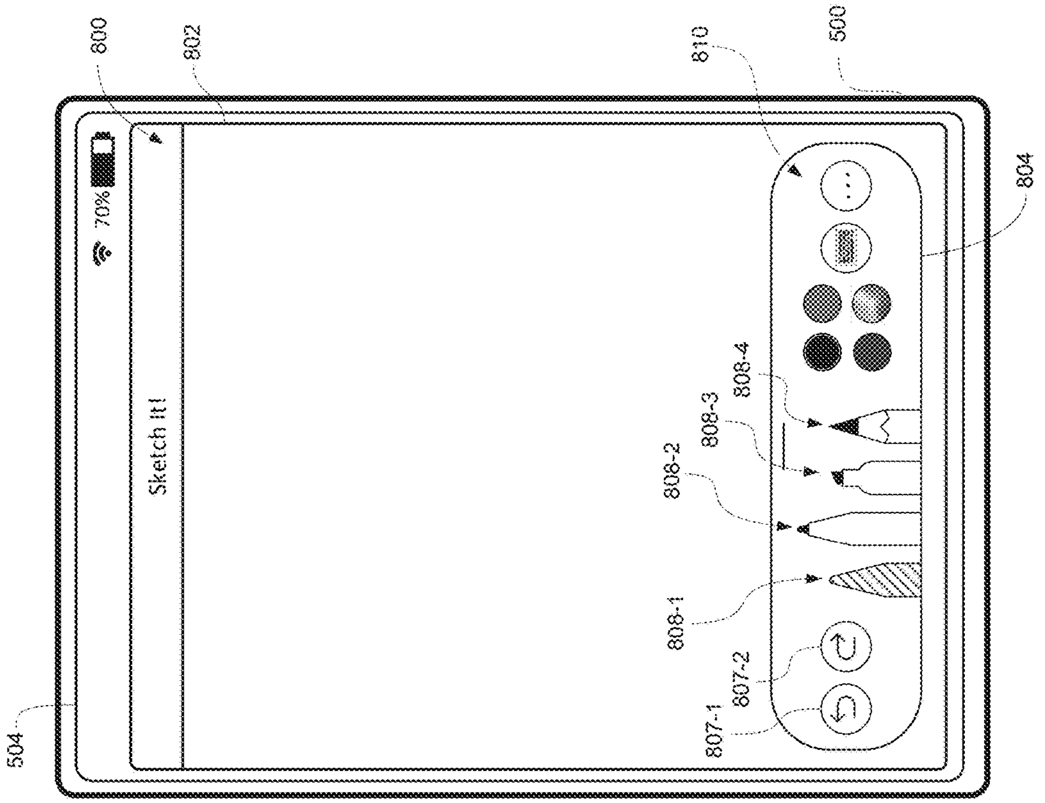

FIGS. 8A-8BB illustrate exemplary ways in which an electronic device selects and provides for wrapping of handwritten content in accordance with some embodiments of the disclosure. The embodiments in these figures are used to illustrate the processes described below, including the processes described with reference to FIGS. 9A-9G.

FIGS. 8A-8BB illustrate operation of the electronic device 500 for selecting and providing for wrapping of handwritten content. FIG. 8A illustrates electronic device 500 displaying user interface 800 (e.g., via a display device, via a display generation component, or via a touch screen). In some embodiments, user interface 800 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 800 is a user interface of a free-form handwriting application (e.g., for taking handwritten notes, drawing shapes, sketches, and/or drawings, composing handwritten text, and/or generating handwritten lists). In some embodiments, the handwriting application is an application installed on device 500.

In FIG. 8A, user interface 800 includes content-entry region 802. In some embodiments, content-entry region 602 is configured to receive handwritten input (e.g., a drawing and/or handwriting input via a stylus device) and display a representation of the handwritten input (e.g., if drawing and/or handwritten input is provided) and/or display font-based text (e.g., if font-based text input is provided). In some embodiments, the content-entry region 802 corresponds to content-entry region 602 described above with reference to the FIG. 6 series. In FIG. 8A, user interface 800 includes content-entry palette 804. In some embodiments, content entry palette 804 is a user interface element that includes one or more selectable options associated with content in the content-entry region 802. For example, content entry palette 804 includes options for changing a color of content in the content-entry region (e.g., changing the color of existing content or changing the content of future content inserted by the user), options for changing the font of text in the content-entry region (e.g., changing the font of existing text or changing the font of future text inserted by the user), options for attaching or inserting rich objects (e.g., files, images, and/or web-based links), options for selecting the content-entry tool, and/or options for displaying a soft keyboard for inserting font-based text in the content-entry region. In some embodiments, content entry palette 804 corresponds to content entry palette 604 described above with reference to the FIG. 6 series.

As shown in FIG. 8A, content entry palette 804 includes undo option 807-1 and redo option 807-2. In some embodiments, undo option 807-1 is selectable to undo the most recent action (e.g., content entry-related action) and redo option 807-2 is selectable to perform the most recent action again (e.g., content entry-related action). In some embodiments, content entry palette 804 includes selection tool 808-1, pen entry tool 808-2, highlighter entry tool 808-3, and pencil entry tool 808-4. In some embodiments, content entry palette 804 includes other options 810 that are selectable to perform other functions (e.g., display a font-based keyboard) or change one or more settings with respect to content in content entry region 802.

In some embodiments, selection of selection tool 808-1 causes the device to enter into selection mode in which handwritten inputs (e.g., encircling) drawn in the content entry region around representations of previous handwritten input cause the representations (e.g., handwritten text or shapes) to become selected (e.g., and enable subsequent operations involving the selected representations to be performed, as discussed in more detail below). In some embodiments, selection of pen entry tool 808-2 causes the device to enter into a pen entry mode in which handwritten inputs drawn in the content-entry region 802 are stylized as if drawn by a pen (e.g., without converting them to font-based text). In some embodiments, selection of highlighter entry tool 808-3 causes the device to enter into a highlighter entry mode in which handwritten inputs drawn in the content entry region are stylized as if drawn by a highlighter (e.g., without converting them to font-based text). In some embodiments, selection of pencil entry tool 808-4 causes the device to enter into a pencil entry mode in which handwritten inputs drawn in the content-entry region 802 are stylized as if drawn by a pencil (e.g., without converting them to font-based text). In some embodiments, content entry tools other than selection tool 808-1 are referred to as drawing tools (e.g., because the tools allow a user to draw in the content-entry region and without the drawn content being converted into font-based text). In FIG. 8A, pen entry tool 808-2 is currently active (e.g., as shown by the representation of pen entry tool 808-2 displayed higher than the other entry tools in the content entry palette 804).

In FIG. 8B, the electronic device 500 detects a contact with touch screen 504 provided by the stylus 203 (e.g., controlled by a user of the electronic device 500) while the pen entry tool 808-2 is active. In some embodiments, in response to the contact by stylus 203, a representation of the handwritten input (e.g., by stylus 203) is displayed at the contact location. Thus, the user is able to begin directly drawing/writing in content-entry region 802.

Figure 8D:
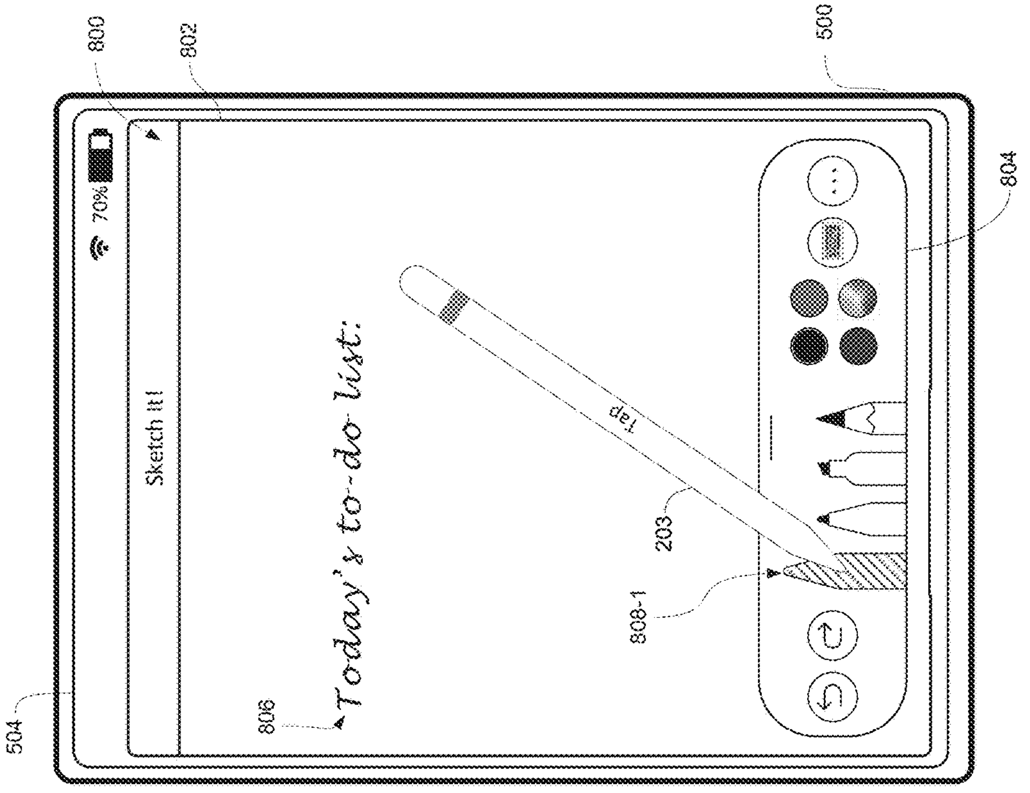
Figure 8C:
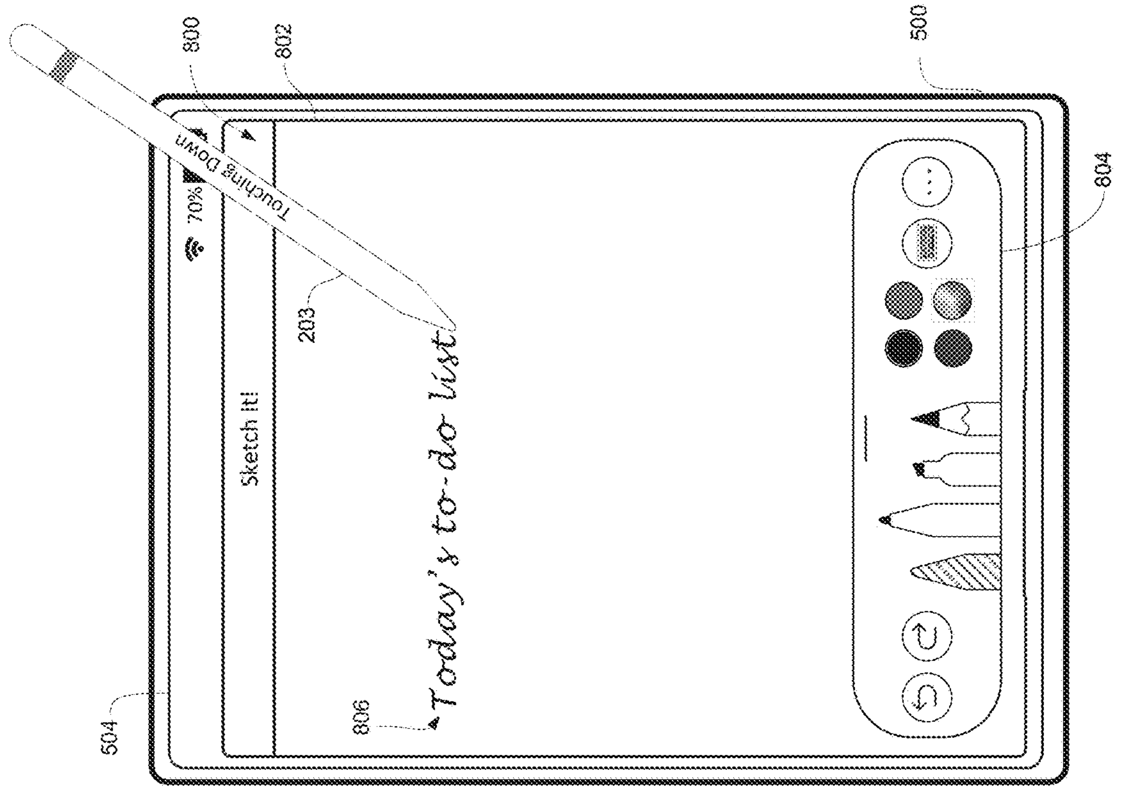

In FIG. 8C, while the contact is maintained with touch screen 504, the electronic device 500 detects handwriting movement by the stylus 203. In some embodiments, in response to detecting the handwriting movement, the electronic device 500 displays a representation of the handwritten input 806 in the content-entry region 802, as shown in FIG. 8C. In some embodiments, a representation of the handwritten input is displayed while the input is being received. As shown in FIG. 8C, the representation 806 corresponds to handwritten text provided by the user using the stylus 203 (e.g., comprising the words "Today's to-do list"). In FIG. 8D, the electronic device 500 detects a termination of the contact with touch screen 504 (e.g., lift-off of stylus 203 from touch screen 504). In some embodiments, in response to detecting the termination of the contact, the electronic device 500 maintains display of the representation of the handwritten input 806 in the content-entry region 802.

In some embodiments, the electronic device 500 facilitates manipulation of the handwritten content in the content-entry region 602. As described herein, one such manipulation includes wrapping one or more lines of the handwritten content in the content-entry region 602 such that a number of the one or more lines of the handwritten content changes in the content-entry region 802. In some embodiments, the electronic device 500 initiates a process for wrapping handwritten content in the content-entry region 802 in response to detecting selection of a resize option displayed in the user interface 800. In some embodiments, the electronic device 500 provides for wrapping the representation of the handwritten input 806 by displaying a selection option that is selectable to change a number of lines in which the handwritten text of the representation of the handwritten input 806 is displayed in the content-entry region 602.

Figure 8F:
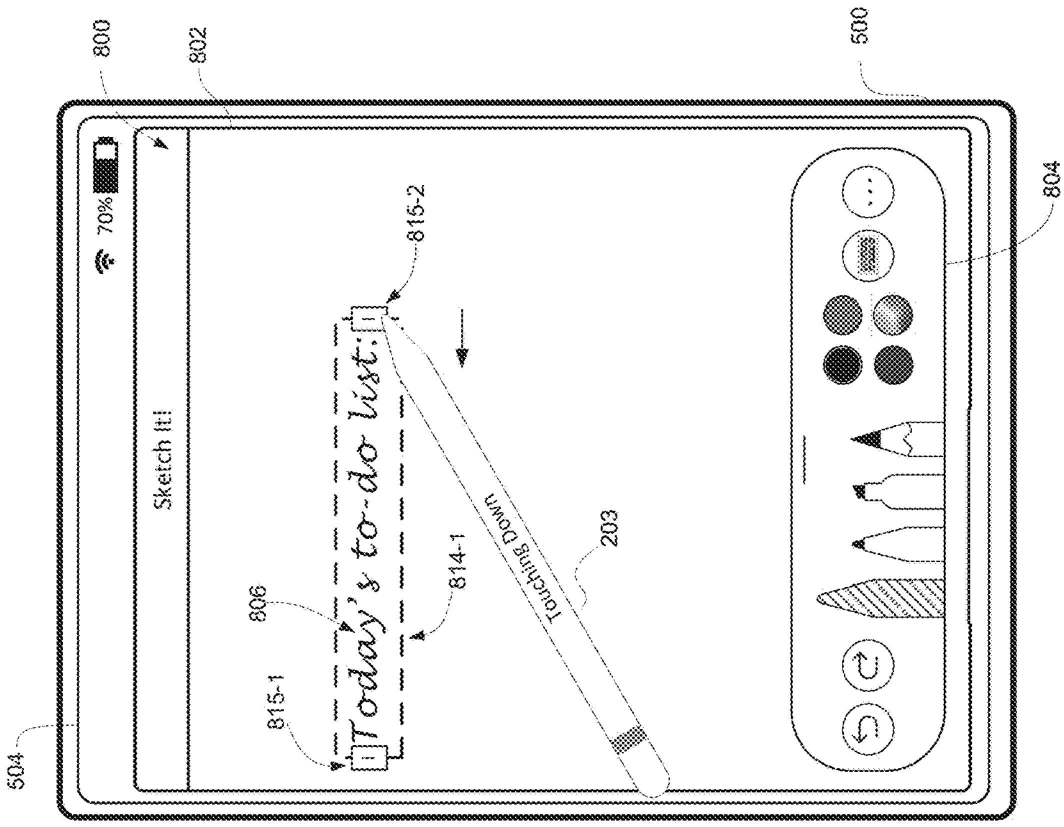
Figure 8E:
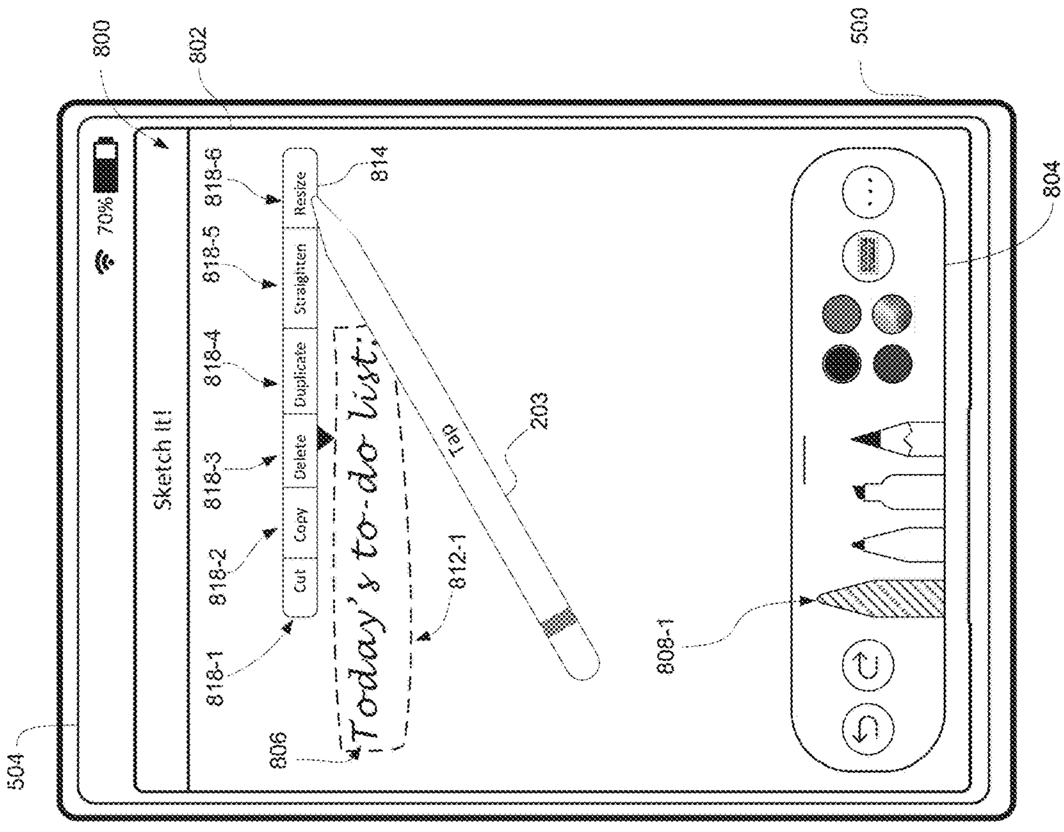

In some embodiments, the electronic device displays the selectable option in response to detecting selection of the representation of the handwritten input 806 in the content-entry region. For example, as shown in FIG. 8D, the electronic device 500 detects selection of the selection tool 808-1 (e.g., via a tap provided by the stylus 203) in the content entry palette 804, which causes the electronic device 500 to activate a selection mode in the content-entry region 802. As shown in FIG. 8E, in response to detecting movement by the stylus 203 on the surface of the touch screen 504 while in the selection mode, the electronic device 500 displays a first visual indication 812-1 in accordance with the movement by the stylus 203 that indicates a portion of the representation of the handwritten input 806 that is selected (e.g., in response to detecting lift-off of the stylus 203 from the touch screen 504).

In FIG. 8E, the electronic device 500 selects the portion of the representation of the handwritten input 806 indicated by the first visual indication 812-1 and optionally displays a toolbar element 814 in the content-entry region 802. As shown in FIG. 8E, the toolbar element 814 includes a plurality of selectable options 818-1 through 818-6 that are selectable to cause the electronic device 500 to perform corresponding options involving the representation of handwritten input 806. For example, as shown in FIG. 8E, the selectable option 818-1 is selectable to cut the representation of handwritten input 806 (e.g., remove and copy the content of the selected portion of the representation of handwritten input 806), selectable option 818-2 is selectable to copy the selected portion of the representation of handwritten input 806 (e.g., for pasting a copy of the representation of handwritten input 806 (e.g., in the content-entry region 802 or in a content-entry region of another user interface)), selectable option 818-3 is selectable to cease display of the selected portion of the representation of handwritten input 806, selectable option 818-4 is selectable to display a duplicate of the selected portion of the representation of handwritten input 806 in the content-entry region 802, selectable option 818-5 is selectable to straighten the selected portion of the representation of handwritten input 806 as discussed above in method 700, and/or selectable option 818-6 is selectable to wrap the handwritten text of the selected portion of the representation of handwritten input 806, as described below. In some embodiments, the toolbar element 814 is scrollable (e.g., horizontally scrollable) in the content-entry region 802 to reveal additional and/or alternative selectable options in the content-entry region 802. In some embodiments, one or more of the selectable options 818-1 through 818-6 are displayed in the toolbar element 814 after scrolling the toolbar element 814 (e.g., in response to scrolling input directed to the toolbar element 814). In some embodiments, the toolbar element 814 includes a different number (e.g., fewer or greater) of the selectable options than that shown in FIG. 8E.

As discussed above, in some embodiments, the electronic device 500 wraps the handwritten text of the selected portion of the representation of the handwritten input 806 in response to receiving selection of a resize option (e.g., selectable option 818-6). As shown in FIG. 8E, the electronic device 500 detects a selection input (e.g., a tap input) provided by the stylus 203 directed to the selectable option 818-6 in the toolbar element 814. In response to detecting the selection of the selectable option 818-8, as shown in FIG. 8F, the electronic device 500 initiates a process for wrapping the handwritten text of the representation of handwritten input 806 in the content-entry region 802. For example, as shown in FIG. 8F, the electronic device 500 displays one or more resizing/wrapping handles 815 that are selectable to initiate wrapping of the handwritten words "Today's to-do list:" in the content-entry region 802. In some embodiments, the one or more resizing handles 815 are displayed with a wrapping boundary 814-1 indicating the selected portions of handwritten text that will be wrapped in response to input directed to the one or more resizing handles 815, as discussed below.

In some embodiments, the one or more resizing handles include a first resizing handle 815-1 and a second resizing handle 815-2, as shown in FIG. 8F. In some embodiments, the first resizing handle 815-1 and the second resizing handle 815-2 are displayed on opposite ends of the selected portion of the representation of handwritten input 806. For example, as shown in FIG. 8F, the first resizing handle 815-1 is displayed with the wrapping boundary 814-1 at a first (left) end of the representation of handwritten input 806 and the second resizing handle 815-2 is displayed with the wrapping boundary 814-1 at a second (right) end, opposite the first end, of the representation of handwritten input 806 in the content-entry region 802. In some embodiments, the first resizing handle 815-1 and the second resizing handle 815-2 are selectable to cause movement of the first resizing handle 815-1 or the second resizing handle 815-2, which causes the electronic device 500 to wrap the handwritten text of the representation of handwritten input 806 based on the movement of the first resizing handle 815-1 and/or the second resizing handle 815-2.

In FIG. 8F, the electronic device 500 detects an interaction input on the touch screen 504 directed to the second resizing handle 815-2 in the content-entry region 802. For example, the electronic device 500 detects selection (e.g., tap and hold) of the stylus 203 on the touch screen 504, followed by movement of the stylus 203 on the touch screen 504 in a leftward direction, corresponding to movement of the second resizing handle 815-2 in the leftward direction. In response to detecting the interaction input corresponding to the movement of the second resizing handle 815-2, in FIG. 8G, the electronic device 500 wraps the handwritten text of the representation of handwritten input 806 in the content-entry region 802 in accordance with the movement of the second resizing handle 815-2. For example, in FIG. 8F, the selected portion of the representation of handwritten input 606 includes one line of handwritten text. As shown in FIG. 8G, the electronic device 500 displays the representation of the handwritten input as a first line of handwritten text 806-1 and as a second line of handwritten text 806-2 in response to detecting the leftward movement of the second resizing handle 815-2. For example, the handwritten text "list:" is displayed in the second line 806-2 in the content-entry region 802. Accordingly, as shown in FIG. 8G, an arrangement (e.g., position, orientation, and/or spacing) of the handwritten words and/or characters of the handwritten text of the representation of handwritten input 806 in the content-entry region 802 changes based on the movement of the second resizing handle 815-2

In some embodiments, an amount of (e.g., a number of letters, characters, and/or special characters) of the handwritten text of the representation of handwritten input 806 that is wrapped in response to the movement of the one or more resizing handles is based on a magnitude and a direction of the movement of the one or more resizing handles in the content-entry region 602. For example, because the movement of the second resizing handle 815-2 is in the leftward direction (e.g., toward the representation of handwritten input 606) in FIG. 8F, the electronic device 500 increases the number of lines in which the handwritten text of the representation of handwritten input 606 is displayed in FIG. 8G. Additionally, the number of words and/or characters of the handwritten text of the representation of handwritten input 806 that are wrapped (e.g., displayed in the second line 806-2) is optionally proportional to the magnitude (e.g., distance) of movement of the second resizing handle 815-2 in the content-entry region 802. As discussed in more detail later, movement of the second resizing handle 815-2 in a rightward direction in the content-entry region 802 optionally causes the electronic device 500 to increase or maintain the number of lines in which handwritten content is displayed (e.g., depending on the magnitude of the movement and/or the number of lines).

Figure 8H:
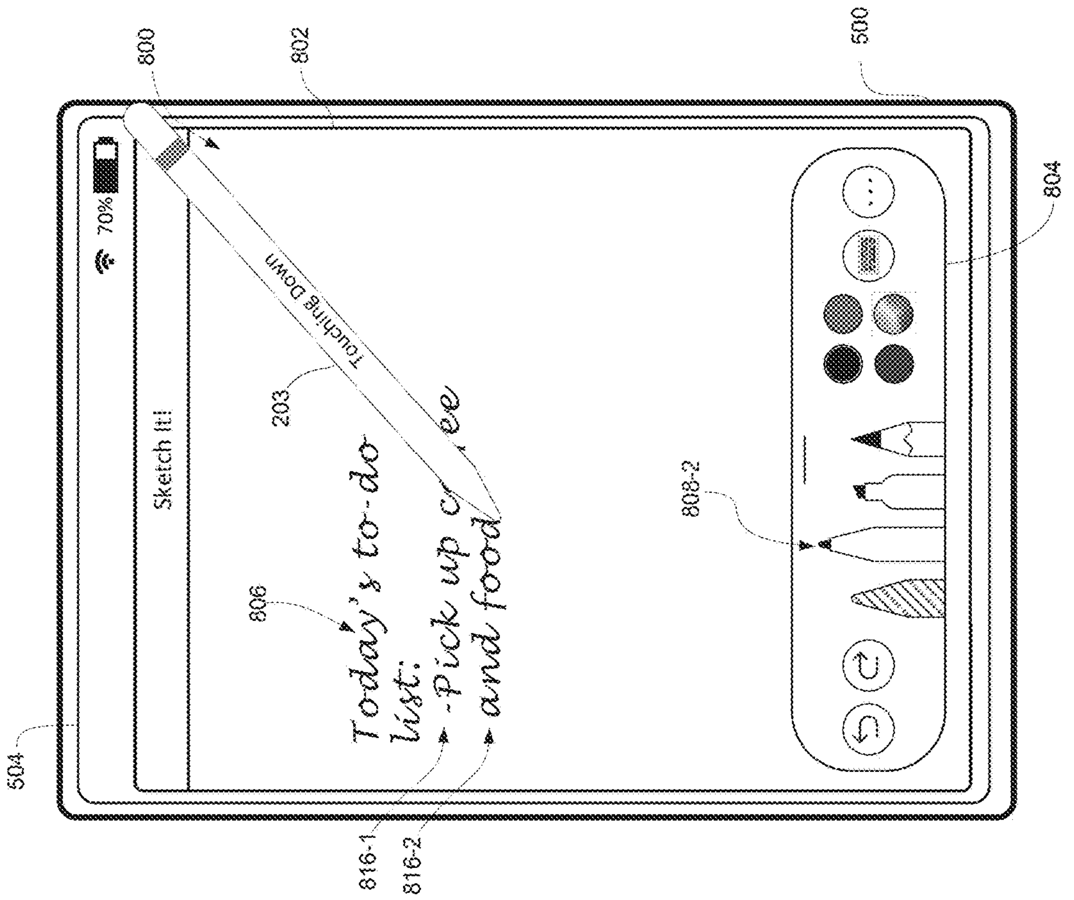
Figure 8G:
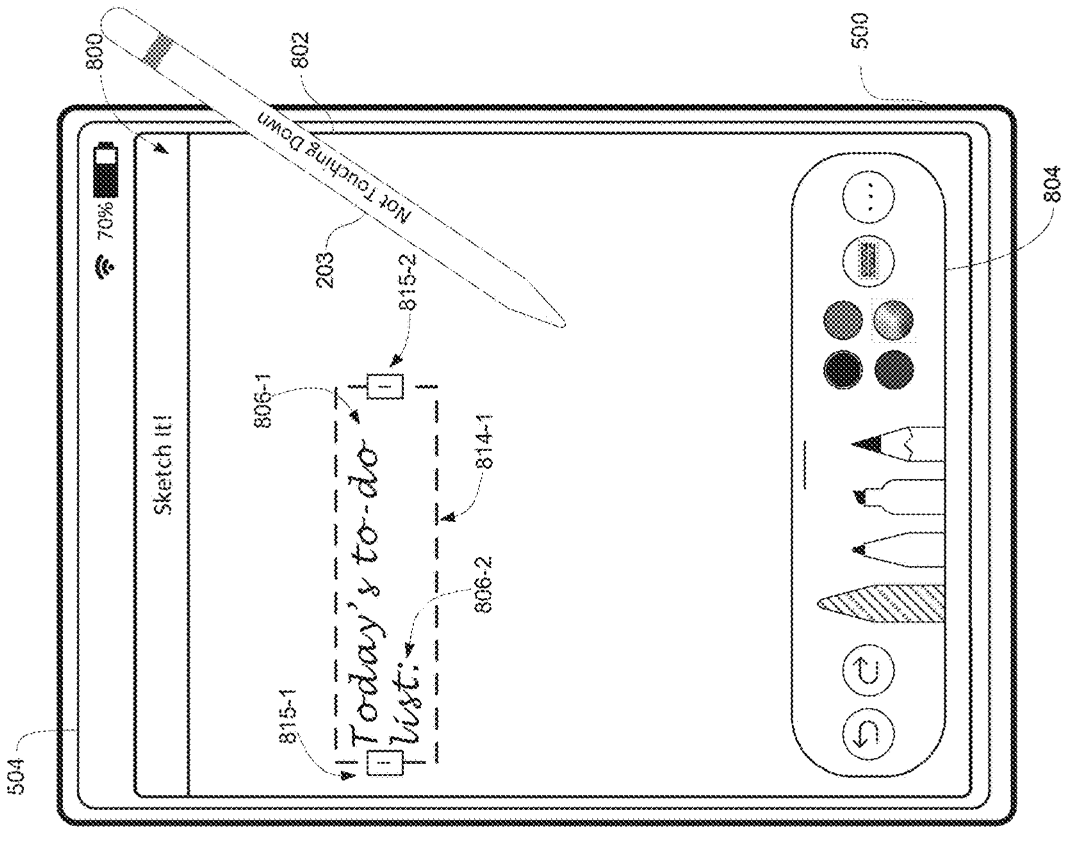
Figure 8J:
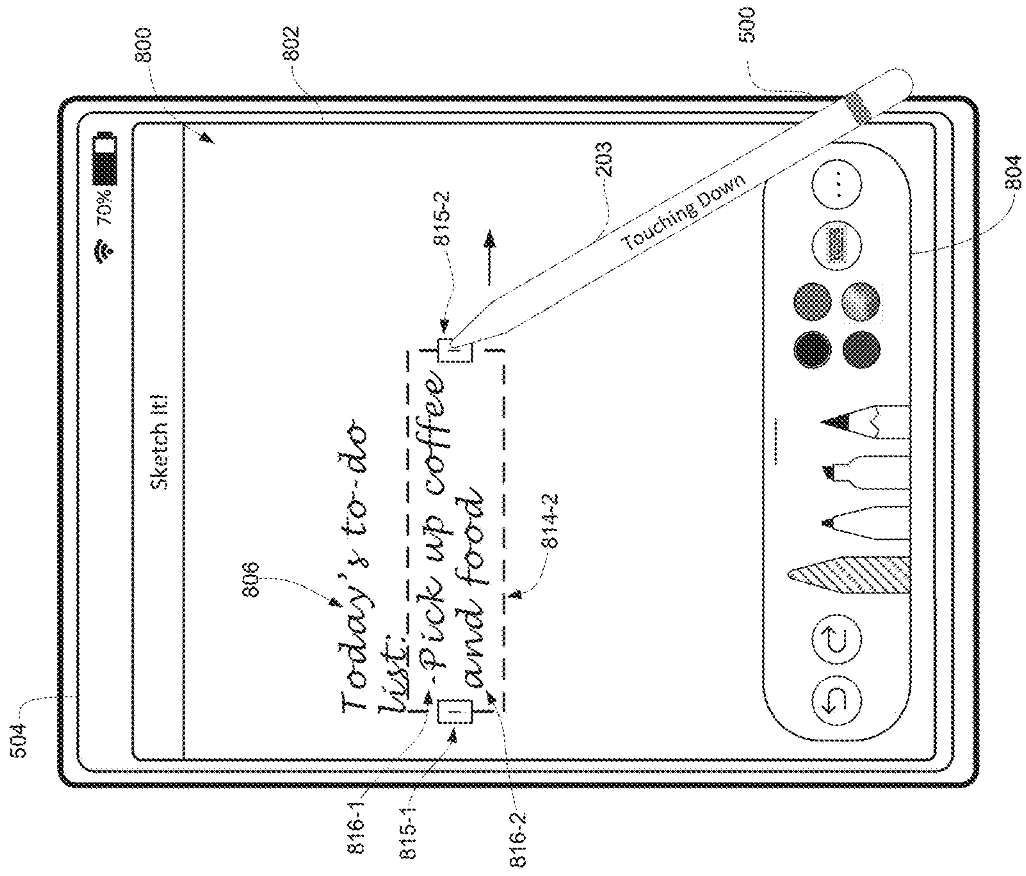
Figure 8I:
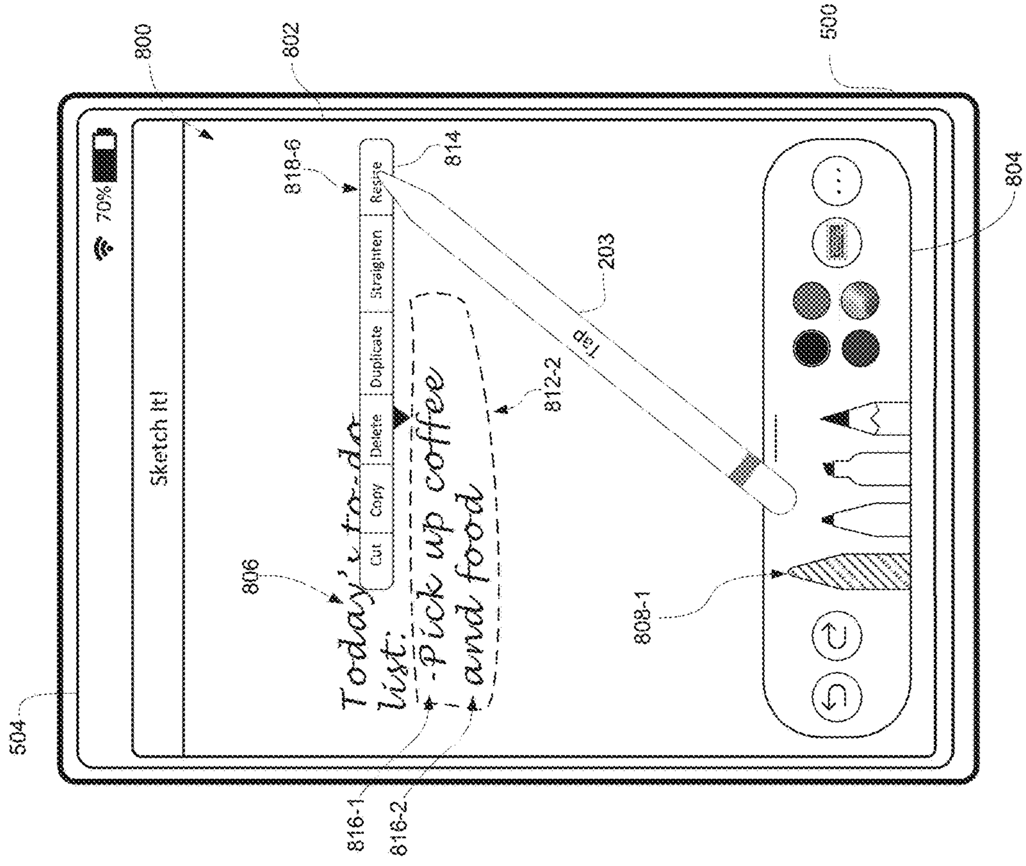

In FIG. 8H, the electronic device 500 detects the stylus 203 provide additional handwritten input (e.g., below the representation of handwritten input 806) in the content-entry region 802 (e.g., while the pen entry tool 808-2 is selected). As shown in FIG. 8H, as the electronic device 500 detects movement of the stylus 203 on the touch screen 504, the electronic device 500 displays a second representation of handwritten input (e.g., at the location of the movement of the stylus) as a first line 816-2 and a second line 816-2 of handwritten text in the content-entry region 802. In FIG. 8I, the electronic device 500 detects selection of a portion of the second representation of handwritten input 816 (e.g., as indicated by second visual indication 812-2). For example, the electronic device 500 detects selection of the first line 816-1 and the second line 816-2 of handwritten text of the second representation of handwritten input while the selection tool 808-1 is active, as shown in FIG. 8I. Additionally, as shown in FIG. 8I, in response to detecting the selection of the second representation of handwritten input 816, the electronic device 500 displays toolbar element 814 described above.

In FIG. 8I, the electronic device 500 detects a selection input (e.g., a tap or touch) provided by the stylus 203 directed to the selectable option 818-6 in the toolbar element 814, corresponding to a request to wrap the handwritten text "Pick up coffee and food" in the content-entry region 802. As similarly discussed above, in response to detecting the selection of the selectable option 818-6, the electronic device 500 displays the selected portion of the second representation of handwritten input 816 with one or more resizing handles in the content-entry region 802, as shown in FIG. 8J. For example, as shown in FIG. 8J, the electronic device 500 displays the first line 816-1 and the second line 816-2 of the selected handwritten text with wrapping boundary 814-2 and the first resizing handle 815-1 and the second resizing handle 815-2, as similarly described above.

In FIG. 8J, the electronic device 500 detects an interaction input directed toward the second resizing handle 815-2 in the content-entry region 802. For example, as shown in FIG. 8J, the electronic device 500 detects selection of the second resizing handle 815-2 by the stylus 203, followed by movement of the stylus 203 on the touch screen 504 in a rightward direction, corresponding to a request to move the second resizing handle 815-2 in the rightward direction in the content-entry region 802. In some embodiments, in response to detecting the interaction input directed to the second resizing handle 815-2, the electronic device 500 wraps the handwritten text of the second representation of handwritten input 816 in the content-entry region 802 in accordance with the movement of the second resizing handle 815-2, as shown in FIG. 8K. For example, as shown in FIG. 8K, the electronic device 500 alters display of the handwritten text in the first line 816-1 and the second line 816-2 of handwritten text in the content-entry region 802 based on the direction and magnitude of the movement of the second resizing handle 815-2. In FIG. 8I, when the interaction input directed to the second resizing handle 815-2 is detected, the first line 816-1 of handwritten text includes the words "Pick up coffee" and the second line 816-2 of handwritten text includes the words "and food" in the content-entry region 802. As shown in FIG. 8K, while the number of lines of handwritten text of the second representation of handwritten input is maintained in response to the movement of the second resizing handle 815-2 (e.g., remains at two lines of handwritten text), the word "and" is displayed in the first line 816-1 and is no longer displayed in the second line 816-2 in response to the movement of the second resizing handle 815-2 (e.g., the number of handwritten words/characters in the first line 816-1 of handwritten text increases in response to the rightward movement of the second resizing handle 815-2).

Figure 8L:
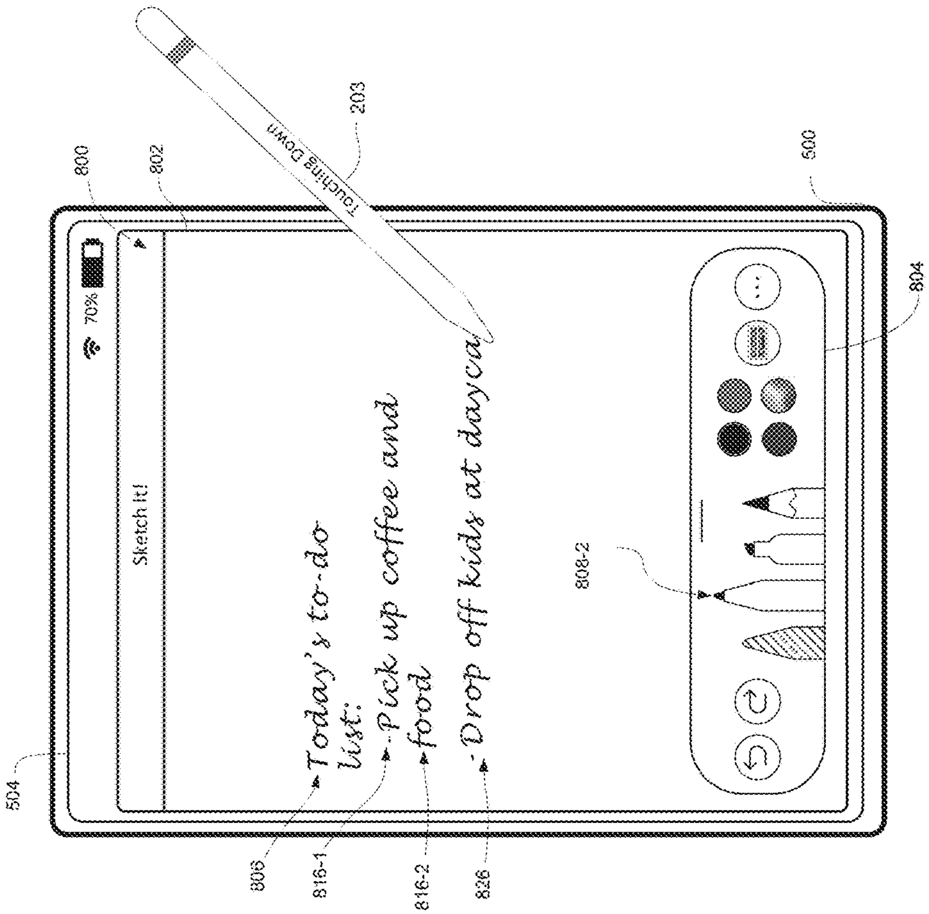
Figure 8K:
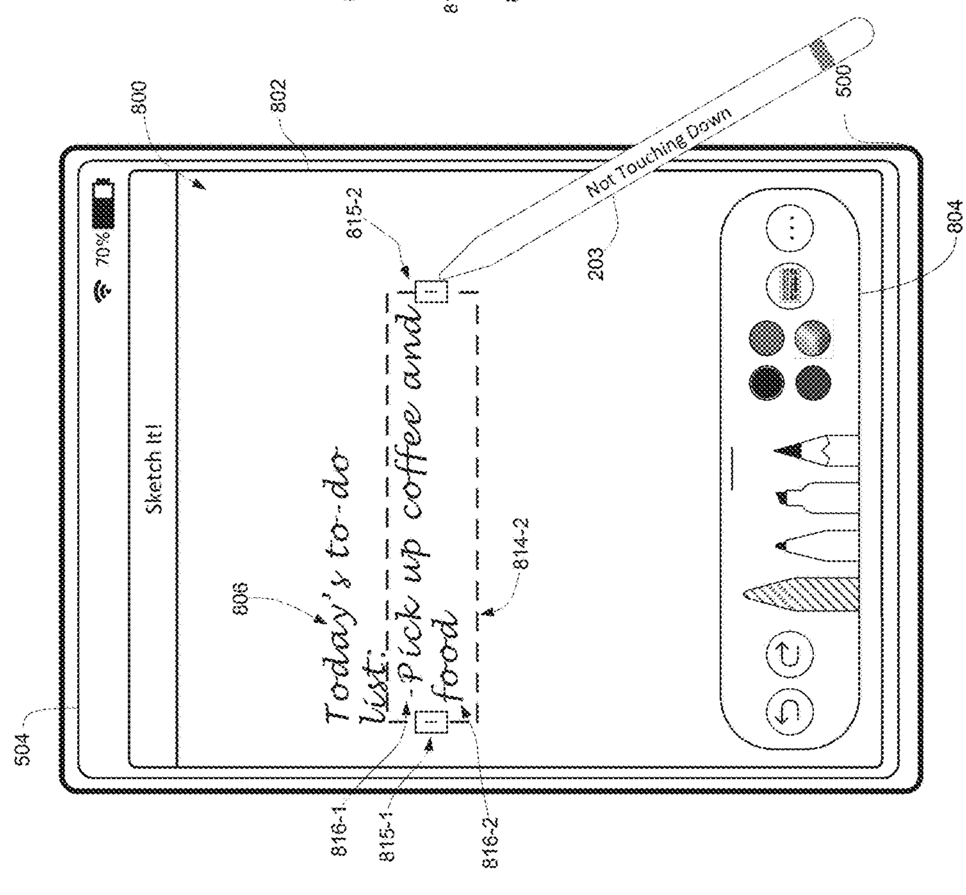
Figure 8N:
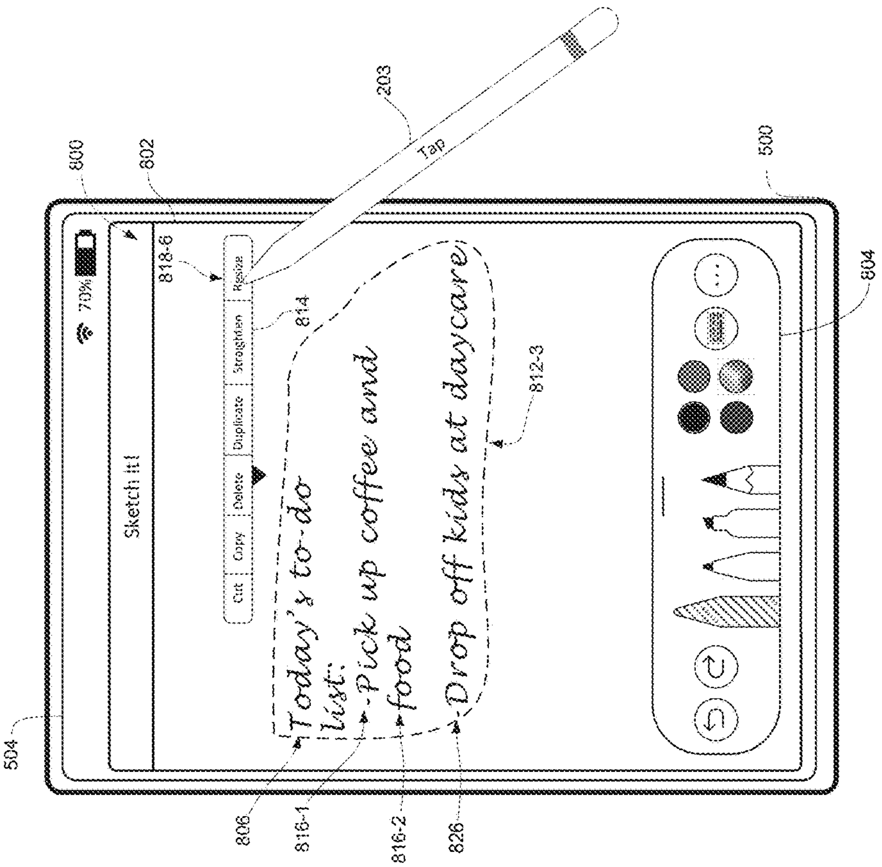
Figure 8M:
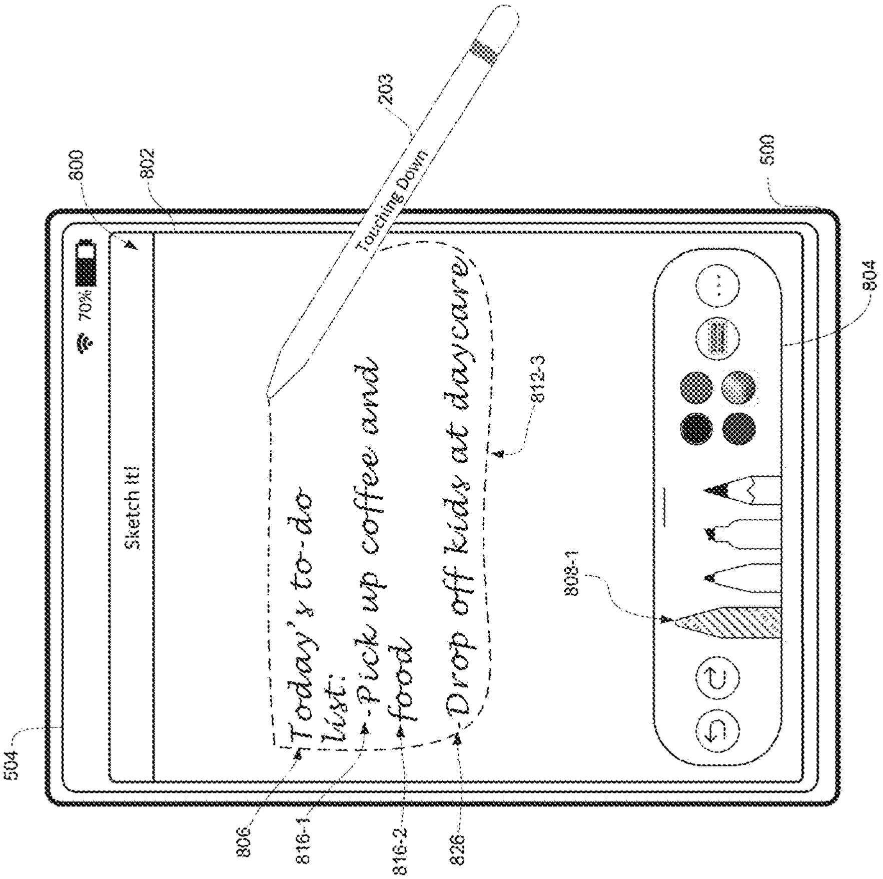

In FIG. 8L, the electronic device 500 detects the stylus 203 provide additional handwritten input (e.g., below the second line 816-2 of handwritten text of the second representation of handwritten input) in the content-entry region 802 (e.g., while the pen entry tool 808-2 is selected). As shown in FIG. 8L, as the electronic device 500 detects movement of the stylus 203 on the touch screen 504, the electronic device 500 displays a third representation of handwritten input (e.g., at the location of the movement of the stylus) in the content-entry region 802. In FIG. 8M, the electronic device 500 detects selection of portions of the handwritten content in the content-entry region 802 (e.g., as indicated by display of third visual indication 812-3). For example, the electronic device 500 detects selection of the representation of handwritten input 806, the second representation of handwritten input 816, and the third representation of handwritten input 826, as shown in FIG. 8M. As shown in FIG. 8M, the third representation of handwritten input 826 includes handwritten text comprising the words "Drop off kids at daycare" in the content-entry region 802. In some embodiments, as similarly described above, in response to detecting selection of portions of the handwritten content in the content-entry region 802, the electronic device displays toolbar element 814 in the content-entry region 802, as shown in FIG. 8N.

In some embodiments, the electronic device 500 wraps multiple lines of handwritten content in the content-entry region 802. In FIG. 8N, while the representations 806, 816, and 826 of handwritten content are selected in the content-entry region 802, the electronic device 500 detects a selection input (e.g., a tap or touch input) by the stylus 203 directed to the selectable option 818-6 in the toolbar element 814. In some embodiments, in response to detecting the selection of the selectable option 818-6, the electronic device 500 displays the one or more resizing handles for wrapping the selected portion of handwritten text in the content-entry region 802, as shown in FIG. 8O.

Figure 8P:
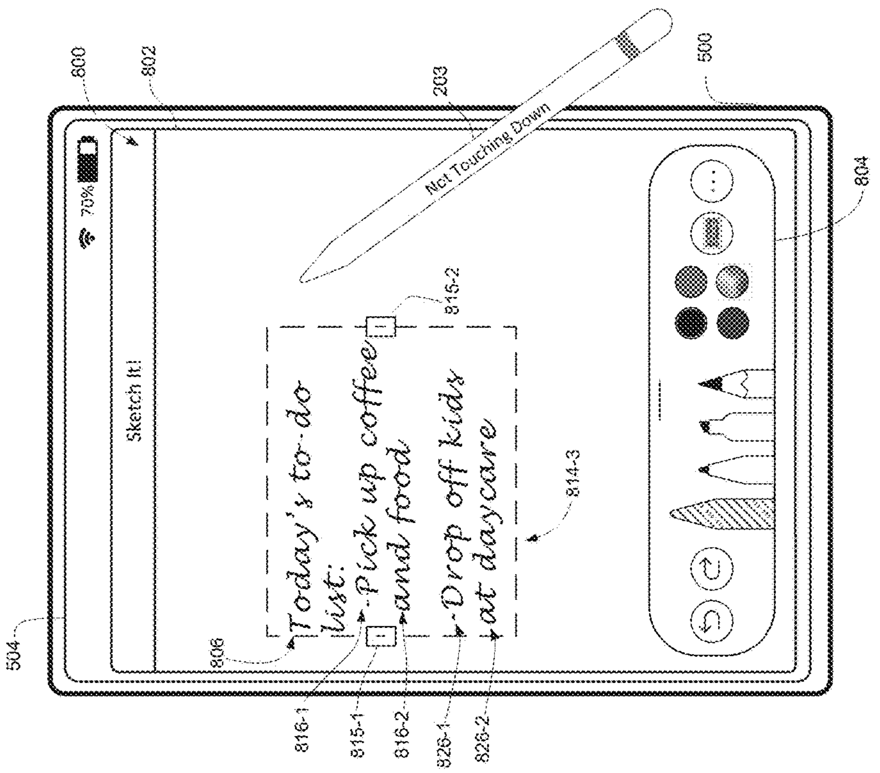
Figure 8O:
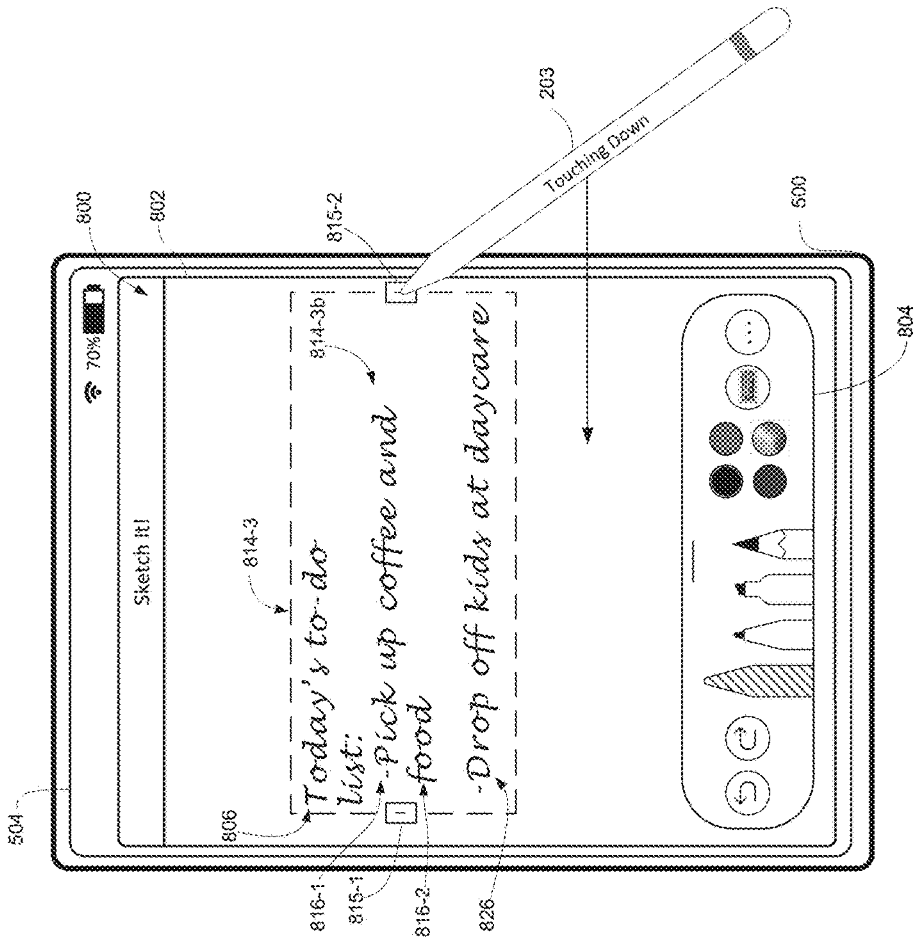

As shown in FIG. 8O, the electronic device 500 displays wrapping boundary 814-3 around the selected portions of handwritten content in the content-entry region 802, including the representation of handwritten input 806, the second representation of handwritten input 816, and the third representation of handwritten input 826. Additionally, as shown in FIG. 8O, the electronic device 500 displays the first resizing handle 815-1 (e.g., at a first (left) end of the selected portion of handwritten content) and the second resizing handle 815-2 (e.g., at a second (right) end of the selected portion of handwritten content) with the wrapping boundary 814-3 in the content-entry region 802. In FIG. 8O, the electronic device 500 detects an interaction input provided by the stylus 203 directed to the second resizing handle 815-2. For example, the electronic device 500 detects a selection input (e.g., a touch and hold) provided by the stylus 203, followed by movement of the stylus 203 on the touch screen 504 in a leftward direction, corresponding to movement of the second resizing handle 815-2 in the leftward direction in the content-entry region 802, as shown in FIG. 8O.

In some embodiments, in response to detecting the interaction input directed to the second resizing handle 815-2, the electronic device 500 wraps the selected portion of the handwritten content in the content-entry region 802 in accordance with the movement of the second resizing handle 815-2. For example, as shown in FIG. 8P, the electronic device 500 changes the number of lines in which the selected handwritten text is displayed in the content-entry region 802 in accordance with the direction and magnitude of the movement of the second resizing handle 815-2. Particularly, as shown in FIG. 8P the electronic device wraps multiple lines of handwritten text of the selected portion of the handwritten content in the content-entry region 802.

In some embodiments, the electronic device 500 wraps multiple lines of handwritten content individually in the content-entry region 802. For example, as described above, the selected portion of the handwritten content includes the representation of handwritten input 806, the second representation of handwritten input 816 (displayed as two lines 816-1 and 816-2), and the third representation of handwritten input 826, as shown in FIG. 8O. In FIG. 8P, when the electronic device 500 wraps the selected portion of handwritten content in the content-entry region 802, the electronic device 500 wraps the representation of the handwritten input 806, the first line 816-1 and the second line 816-2 of the second representation of handwritten input, and the third representation of handwritten input 826 independently in accordance with the movement of the second resizing handle 815-2. For example, the direction and magnitude of the movement of the second resizing handle 815-2 detected in FIG. 8O does not cause the electronic device 500 to wrap the representation of handwritten input 806, as shown in FIG. 8P. On the other hand, the direction and magnitude of the movement of the second resizing handle 815-2 detected in FIG. 8O optionally causes the electronic device 500 to wrap the second representation of handwritten input 816 and the third representation of handwritten input 826, as shown in FIG. 8P. For example, from FIG. 8O to FIG. 8P, the movement of the second resizing handle 815-2 causes the word "and" in the first line 816-2 to be displayed in the second line 816-2 in the second representation of handwritten input, and causes the words "at daycare" to be displayed in a second line 826-2 of the third representation of handwritten input. However, as shown in FIG. 8P, the electronic device 500 optionally maintains the dissociation among the representations 806, 816, and 826 in the content-entry region 802 when wrapping the handwritten content. For example, as shown in FIG. 8P, the handwritten words "and food" of the second line 816-2 of the second representation of handwritten input is maintained as separate from the handwritten words "Drop off kids" of the first line 826-1 of the third representation of handwritten input in the content-entry region 802 in response to the movement of second resizing handle 815-2.

Figure 8R:
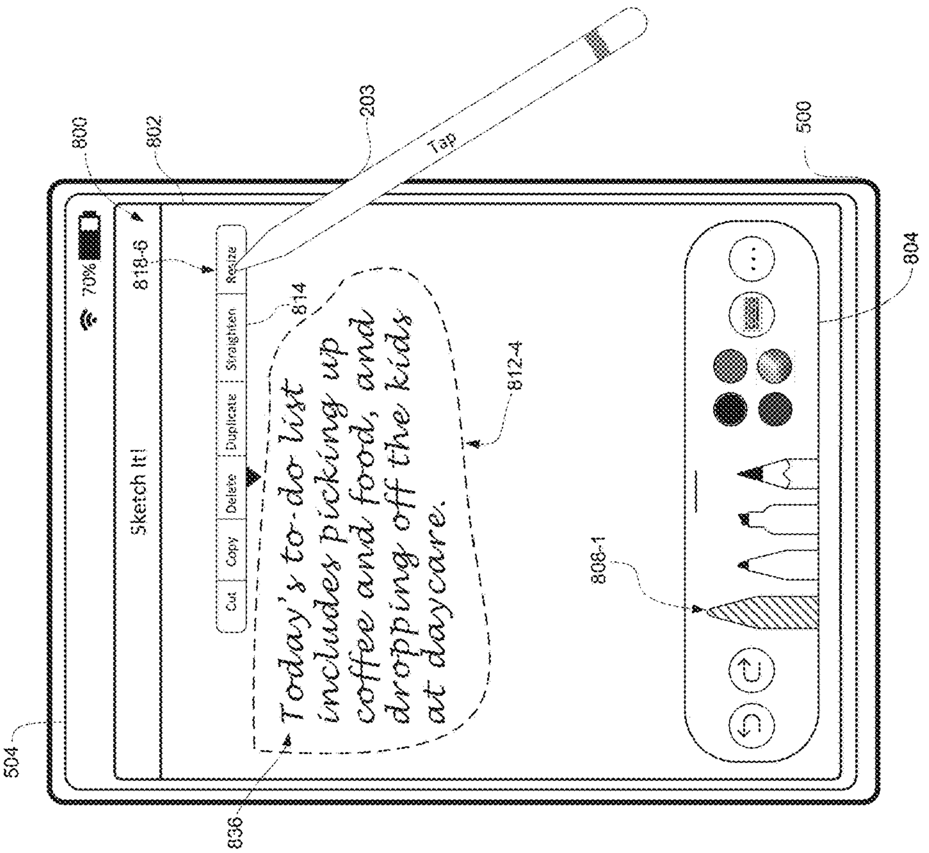
Figure 8Q:
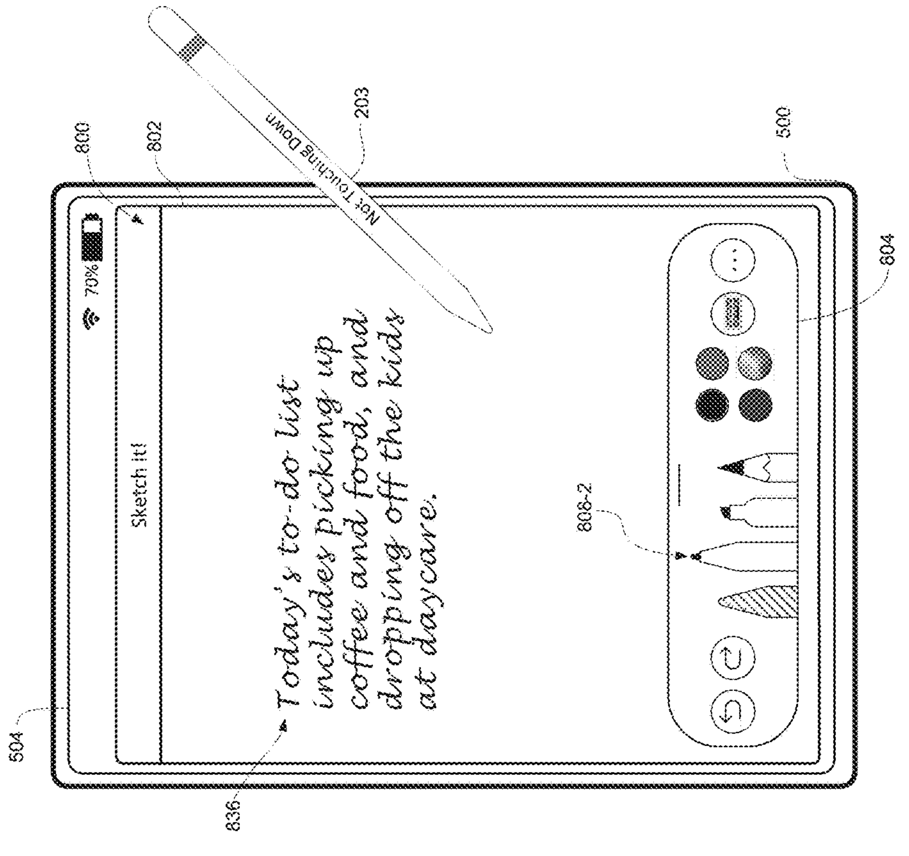

In some embodiments, the electronic device 500 wraps multiple lines of handwritten content holistically in the content-entry region 802. For example, FIG. 8Q illustrates the handwritten text of FIG. 8P written alternatively as a single sentence over five lines of handwritten text (e.g., provided by stylus 203). In FIG. 8R, the electronic device 500 has detected selection of the handwritten text 636 (e.g., indicated by display of visual indication 812-4) using, for example, the selection tool 808-1. As shown in FIG. 8R, in response to detecting the selection of the handwritten text 836, the electronic device 500 displays the toolbar element 814 described previously above. In FIG. 8R, the electronic device 500 detects selection of the selectable option 818-6 in the toolbar element 814, which, as described above, initiates a process for wrapping the handwritten text 836.

In some embodiments, in response to detecting selection of the selectable option 818-6, the electronic device 500 displays one or more resizing handles in the content-entry region 802. For example, as shown in FIG. 8S, the electronic device 500 displays the first resizing handle 815-1 and the second resizing handle 815-2. Additionally, as shown in FIG. 8S, the electronic device 500 displays wrapping boundary 814-4 around the selected handwritten text 836, indicating the portions of the handwritten text 836 that will be wrapped in response to input directed to the one or more resizing handles. In FIG. 8S, the electronic device 500 detects an interaction input provided by the stylus 203 directed to the first resizing handle 815-1 in the content-entry region 802. For example, as shown in FIG. 8S, the electronic device 500 detects a selection input (e.g., tap and hold) by the stylus 203, followed by movement of the stylus 203 in a rightward direction on the touch screen 504, corresponding to movement of the first resizing handle 815-1 in the rightward direction in the content-entry region 802.

Figure 8T:
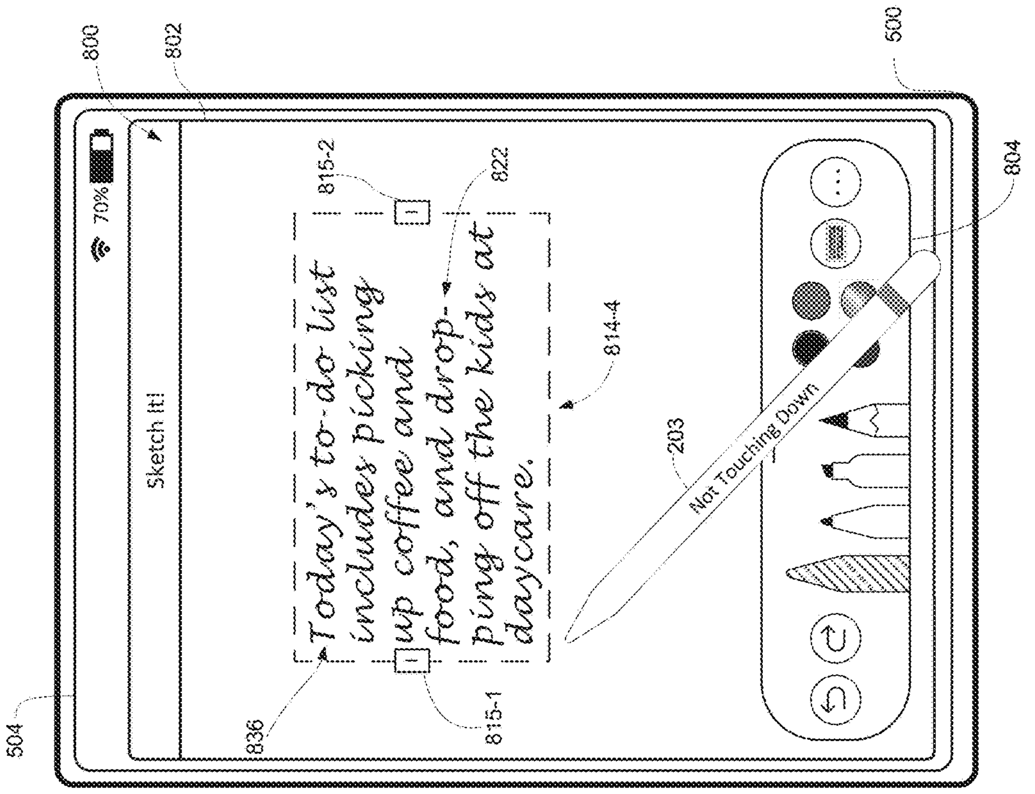
Figure 8S:
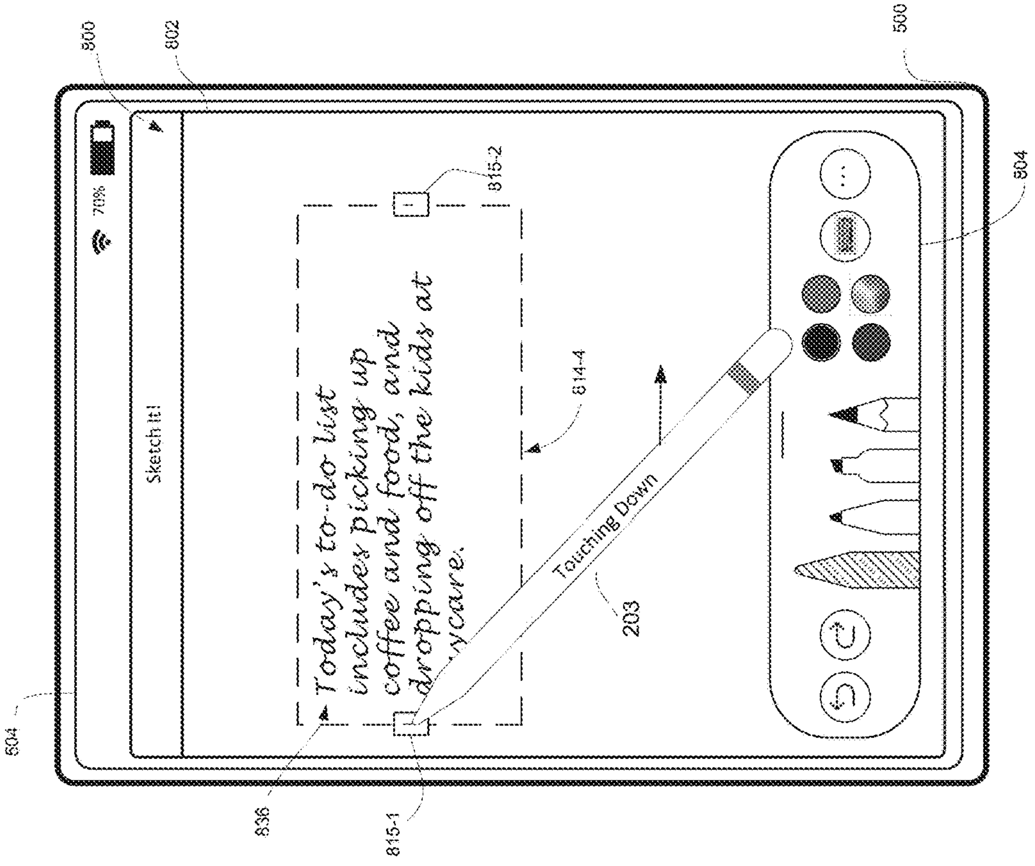

In response to detecting the interaction input directed to the first resizing handle 815-1, the electronic device 500 wraps the handwritten text 836 in the content-entry region 802 based on the movement of the first resizing handle 815-1, as shown in FIG. 8T. As mentioned above, in some embodiments, the electronic device 500 wraps the lines of the handwritten content together in the content-entry region 802. For example, as shown in FIG. 8T, the electronic device 500 increases the number of lines (e.g., from five lines to six lines) in which the handwritten text 836 is displayed in response to the rightward movement of the first resizing handle 815-1. Additionally, in accordance with the magnitude of the movement of the first resizing handle 815-1, the electronic device 500 moves the handwritten word "up" from the second line to the third line of the lines of handwritten text 636, moves the handwritten text "food, and" from the third line to the fourth line of the lines of handwritten text 636, moves the handwritten text "off the kids" from the fourth line to the fifth line of the lines of handwritten text 636, and displays the handwritten text "daycare." as a sixth line of the lines of handwritten text 636, as shown in FIG. 8T. Accordingly, as outlined above, when the electronic device 500 wraps lines of handwritten content holistically, handwritten text (e.g., words, numbers, and/or special characters) are distributed among the lines of handwritten content (e.g., including new lines of handwritten content) based on the magnitude of the wrapping.

In some embodiments, when the electronic device wraps multiple lines of handwritten content in the content-entry region 802, the electronic device 500 introduces word breaks between respective lines of the multiple lines of handwritten content. For example, as shown in FIG. 8T, in response to detecting the movement of the first resizing handle 815-1, the electronic device 500 splits up the handwritten word "dropping" between the fourth line and the fifth line of the lines of the handwritten text 836 in the content-entry region 802 in accordance with the magnitude of the movement of the first resizing handle 815-1. For example, the magnitude of the movement of the first resizing handle 815-1 causes the electronic device 500 to display the letters "drop" at an end of the fourth line and the letters "ping" at a beginning of the fifth line, as shown in FIG. 8T. Additionally, as shown in FIG. 8T, in some embodiments, the electronic device 500 introduces a hyphen 822 between the split portions of the word "dropping" in the content-entry region 802. For example, the electronic device 500 splits the word "dropping" according to its syllables and displays the hyphen 822 between the syllables, as shown in FIG. 8T.

In some embodiments, the electronic device 500 variably wraps multiple lines of handwritten content based on a context of handwritten text in of the handwritten content. For example, as described above, the electronic device 500 wraps multiple lines of handwritten content individually in some cases and wraps multiple lines of handwritten content together in others. In some embodiments, the electronic device 500 determines the context of the handwritten text based on one or more characteristics of the handwritten text. For example, in FIG. 8P, the electronic device 500 wraps the lines of handwritten text in the selected handwritten content individually because of one or more characteristics of the representations 806, 816, and/or 826. As shown in FIG. 8O, the representation of handwritten input 806 includes the handwritten punctuation mark ":" after the handwritten word "list" in the content-entry region 802. Additionally, in FIG. 8O, the first line 815-1 of the second representation of handwritten input and the third representation of handwritten input 826 begin with the handwritten character "-" which optionally denotes that the handwritten text of the second representation 816 and the third representation 826 belong to a list in the content-entry region 802. As another example, in FIG. 8O, a separation between respective lines of the selected lines of handwritten content is inconsistent (e.g., a separation between the line 815-1 and the second line of the representation 806 is smaller than a separation between the lines 816-2 and the third representation 826), indicating that the representations 806, 816, and/or 826 are separate content. The electronic device 500 optionally uses any of the above characteristics of the handwritten text when determining to wrap the handwritten text individually in FIG. 8P.

Similarly, in FIG. 8T, the electronic device 500 wraps the lines of handwritten text in the selected handwritten content holistically because of one or more characteristics of the handwritten text 836. As shown in FIG. 8S, the representation of handwritten input 806 includes the handwritten punctuation mark "." after the handwritten word "daycare" which is the last handwritten word in the content-entry region 802. Additionally, in FIG. 8S, a separation between respective lines of the selected lines of the handwritten text 836 is (e.g., substantially) uniform (e.g., a separation between the first line and the second line of the handwritten text 836 is similar to a separation between the second line and the third line of the handwritten text 836), indicating that the handwritten words of the handwritten text 636 are (e.g., spatially) related. The electronic device 500 optionally uses any of the above characteristics of the handwritten text when determining to wrap the handwritten text together in FIG. 8T.

Figure 8V:
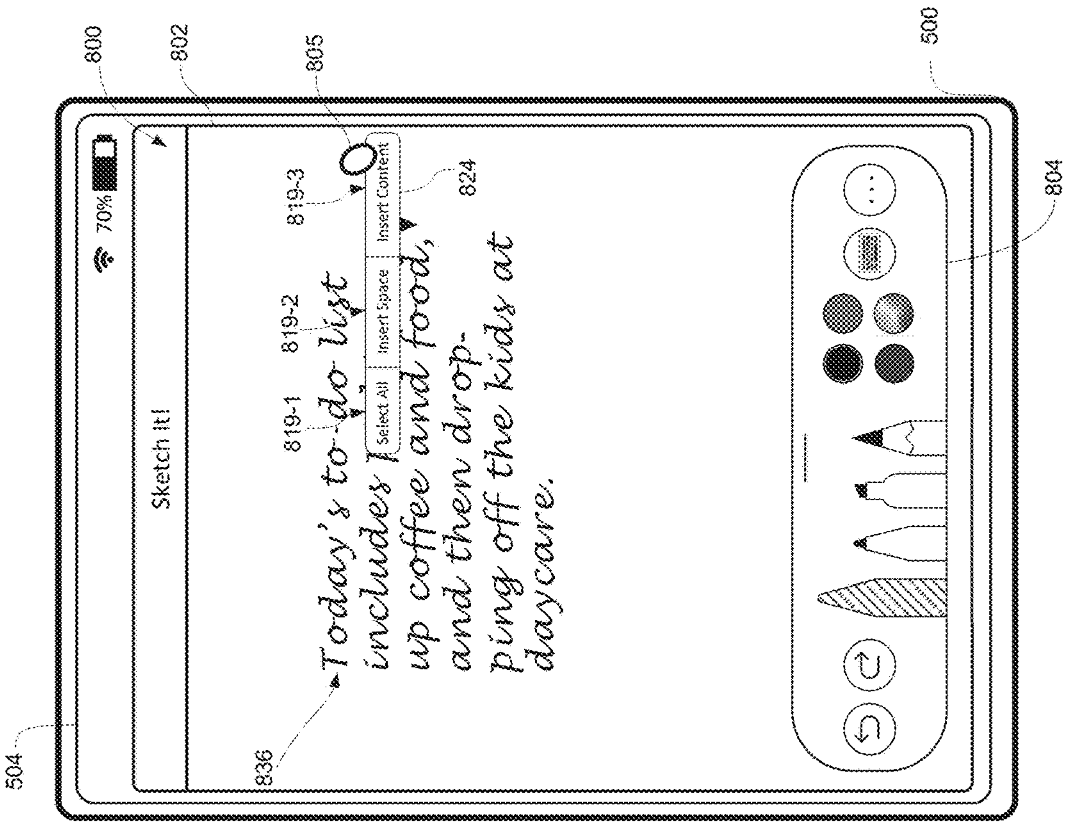

In some embodiments, the electronic device 500 wraps multiple lines of handwritten content in the content-entry region 802 in response to insertion of content into the content-entry region 802. For example, in FIG. 8U, while displaying the handwritten text 836, the electronic device 500 detects an input 805 corresponding to a request to insert content in the content-entry region 802. The electronic device 500 optionally detects a tap or touch input, such as a double tap input, on the touch screen 504 (e.g., provided by an object, such as a finger of the user or the stylus 203). In some embodiments, in response to detecting the input 805, the electronic device 500 displays menu element 824 in the content-entry region 802, as shown in FIG. 8V. As shown in FIG. 8V, the menu element 824 optionally includes a plurality of selectable options, including selectable option 819-1, which is selectable to cause the electronic device 500 to select the handwritten text 836, selectable option 819-2, which is selectable to cause the electronic device 500 to generate a separation in the content-entry region at a location of the content-entry region 802 at which the input 805 was received, and selectable option 819-3, which is selectable to initiate a process for inserting content in the content-entry region 802 at the location at which the input 805 was received.

In FIG. 8V, the electronic device 500 detects a selection input (e.g., a tap or touch input) 805 directed to the selectable option 819-3 in the menu element 824. In some embodiments, as described above, the electronic device 500 initiates a process for inserting content in the content-entry region 802 in response to detecting the selection input 805 in FIG. 8V. For example, the electronic device 500 displays a menu in the content-entry region 802 that prompts the user to select (e.g., from a library of content and/or from another application of the electronic device 500) a respective content item to insert into the content-entry region 802. In some embodiments, in response to detecting selection of a respective content item, the electronic device 500 displays an image corresponding to the respective content item in the content-entry region 802. For example, as shown in FIG.

Figure 8U:
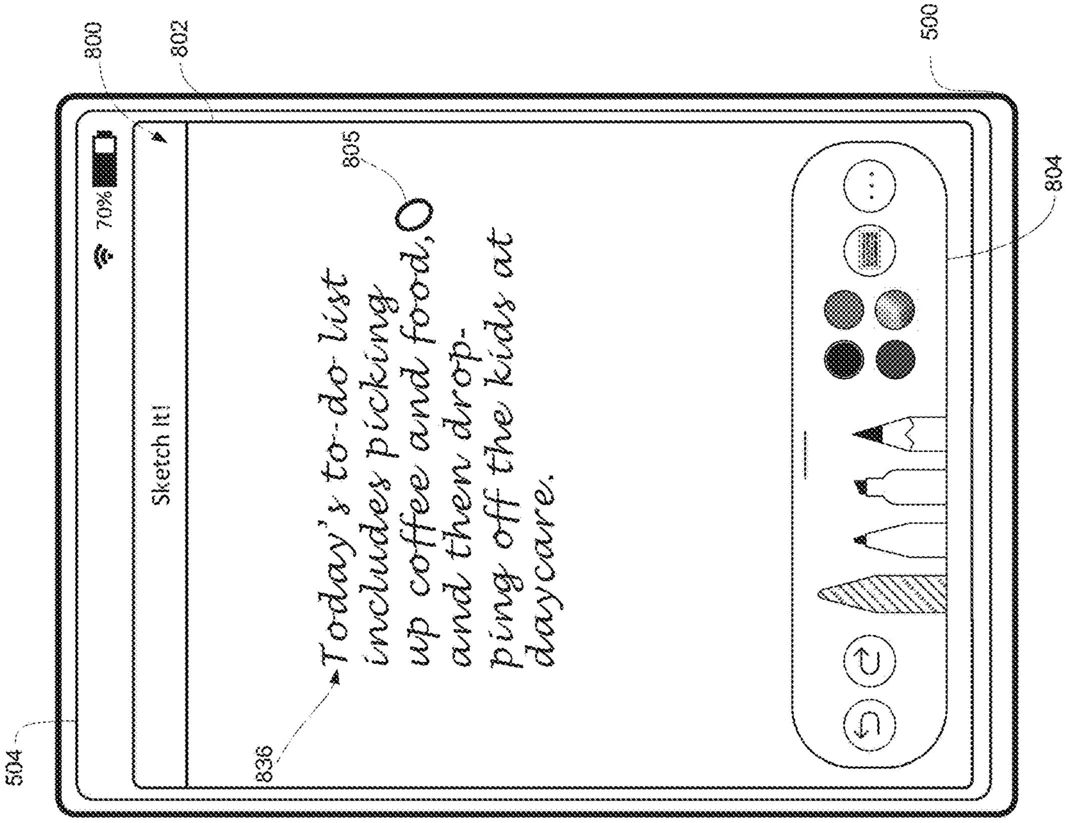

8W, the electronic device 500 displays the image 838 (e.g., depicting a coffee mug or an icon of a coffee mug) in the content-entry region 802 at the location at which the input 805 in FIG. 8U was detected.

Figure 8X:
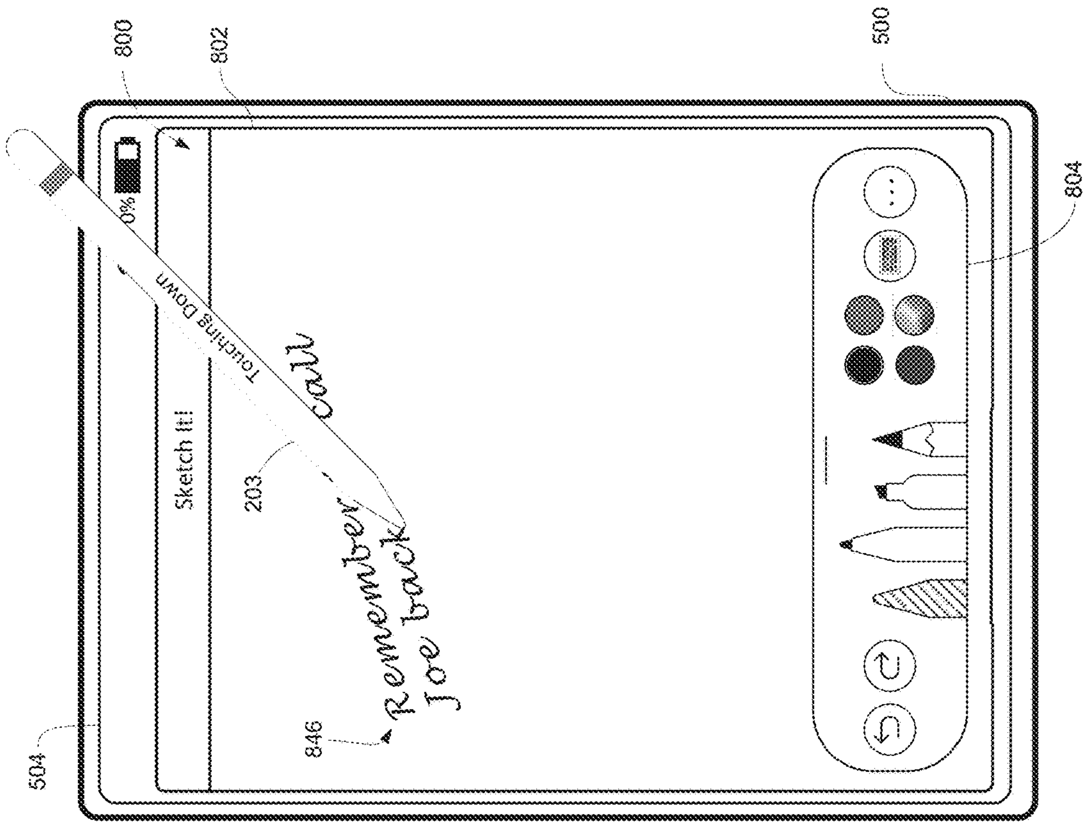
Figure 8W:
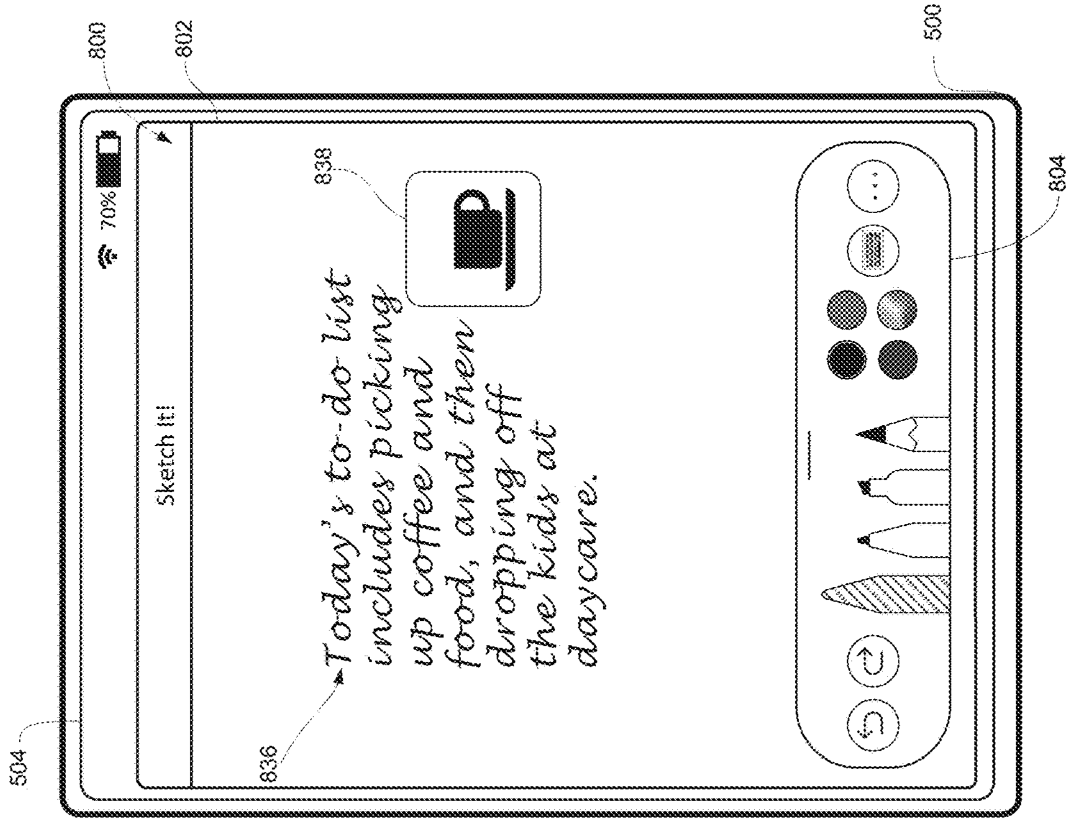

In some embodiments, as mentioned above, insertion of the image 838 into the content-entry region 802 causes the electronic device 500 to wrap the handwritten text 836 in the content-entry region 802. For example, as shown in FIG. 8W, if the electronic device 500 determines that one or more characteristics of the image 838 conflict with at least a portion of the handwritten content in the content-entry region 802, the electronic device 500 changes the number of lines of handwritten text in which the handwritten content is displayed. In FIG. 8V, because insertion of the image 838 next to the handwritten text "food," (e.g., the location at which the input 805 was detected in FIG. 8U) would conflict with (e.g., overlap at least a portion of) the handwritten text "food," (e.g., due to a size of the image 838), the electronic device 500 moves the handwritten text "food," from the third line to the fourth line of the handwritten text 836, as shown in FIG. 8W. Additionally, as shown in FIG. 8W, the electronic device 500 moves the handwritten word "dropping" (e.g., completely) to the fifth line of the handwritten text 836, moves the handwritten words "the kids at" from the fifth line to a sixth line of the handwritten text 836, and displays the handwritten text "daycare." in a seventh line of the handwritten text 836 to avoid spatial conflict between the image 838 and the above portions of the handwritten text 836.

In some embodiments, the electronic device 500 initiates a process for wrapping handwritten content in the content-entry region 802 when the electronic device 500 straightens the handwritten content. In FIG. 8X, the electronic device 500 detects handwritten input on the touch screen 504 provided by the stylus 203. As shown in FIG. 8X, while detecting the handwritten input, the electronic device 500 displays a representation of the handwritten input 846 in the content entry-region 802. For example, as shown in FIG. 8X, the representation of the handwritten input 846 includes the handwritten text "Remember to call Joe back" in the content-entry region 802.

Figure 8Z:
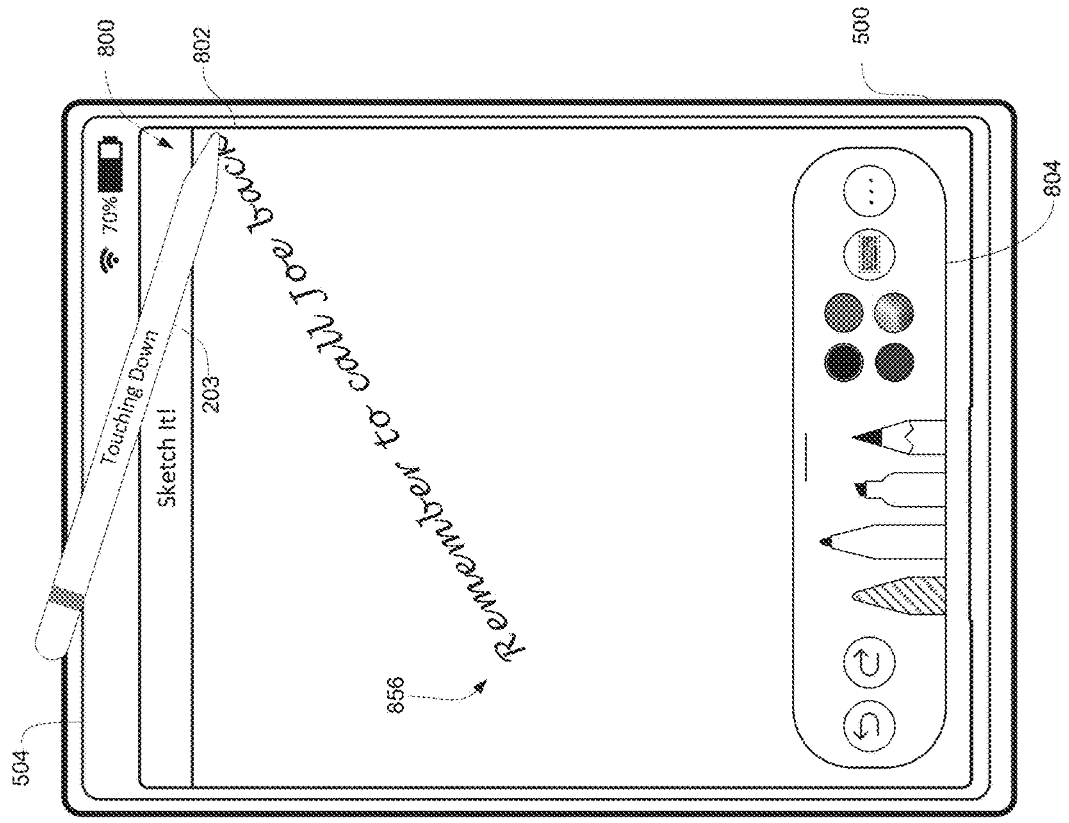
Figure 8Y:
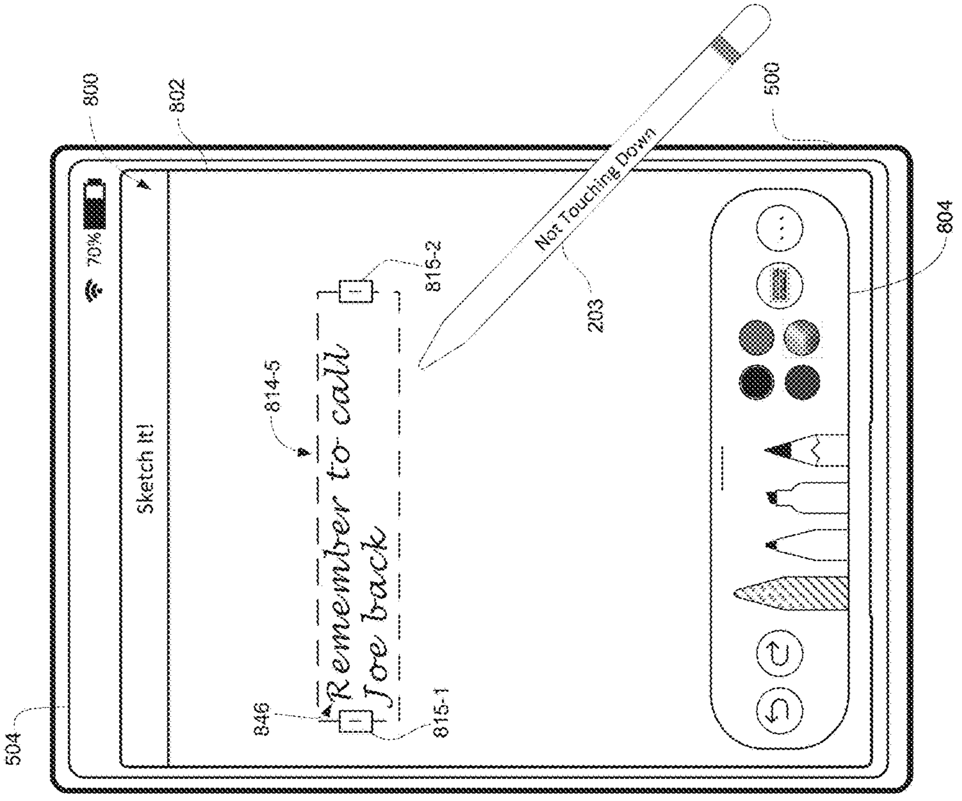
Figure 8B:
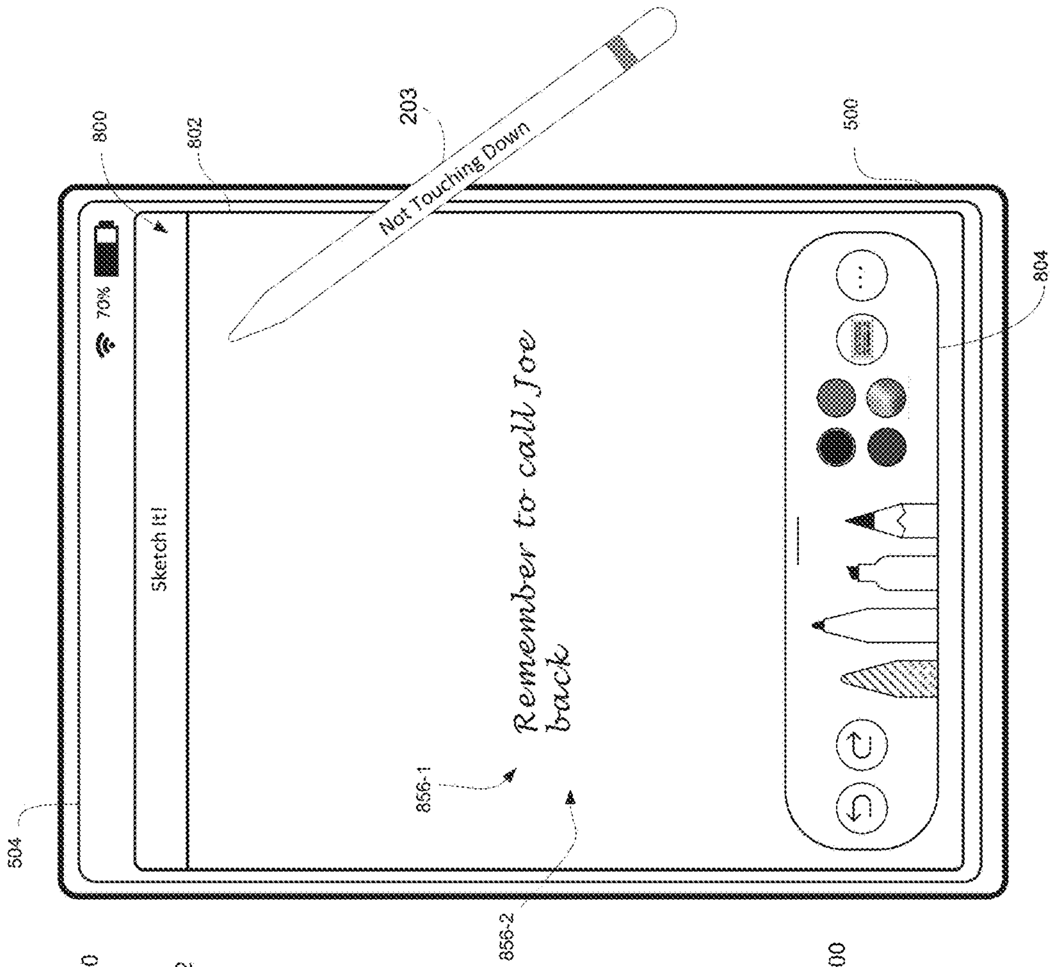
Figure 8A:
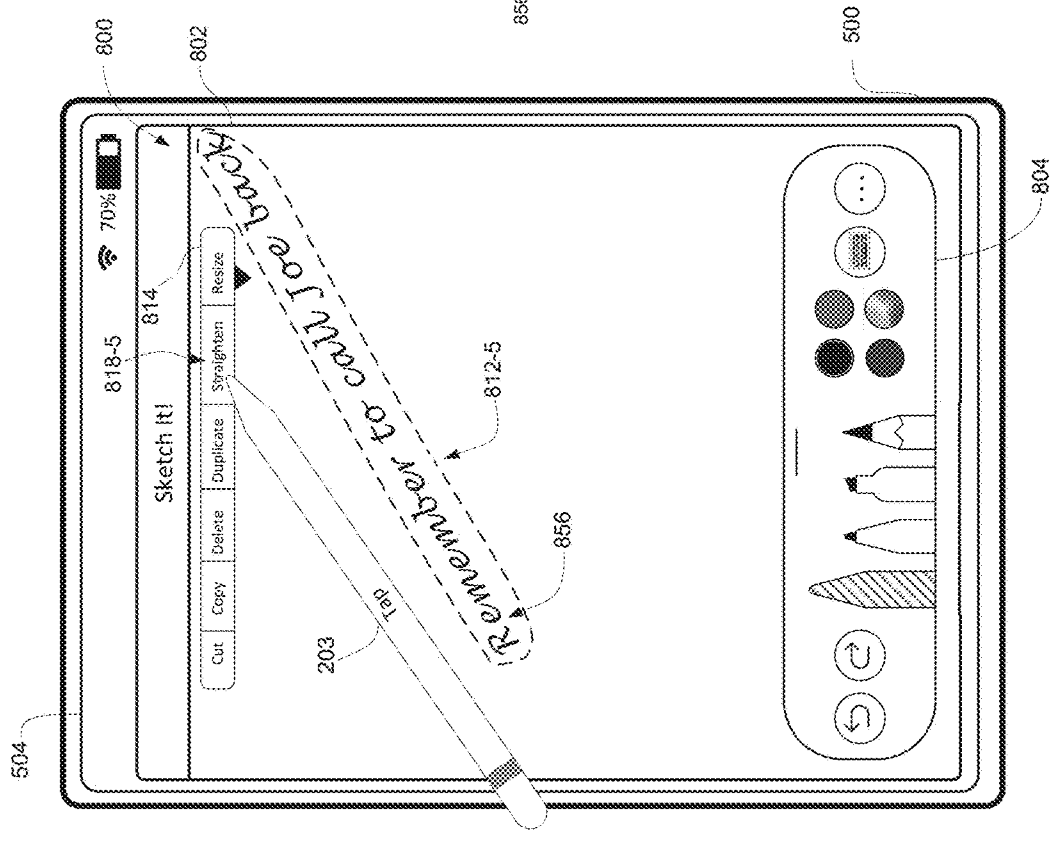
Figure 9A:
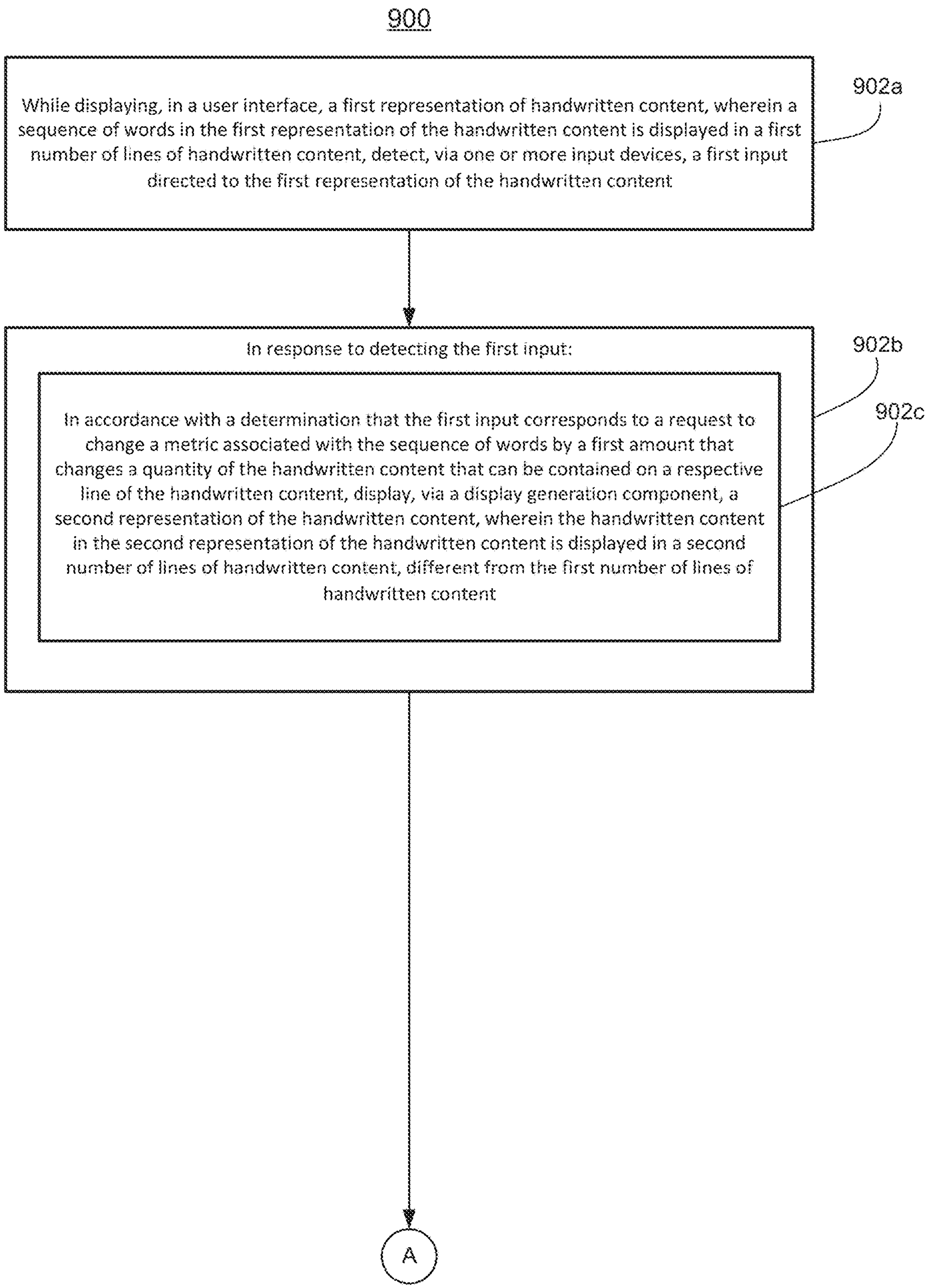
FIGS. 9A-9G is a flowchart illustrating an exemplary method of selecting and providing for wrapping of handwritten content in accordance with some embodiments of the disclosure.
Figure 9B:
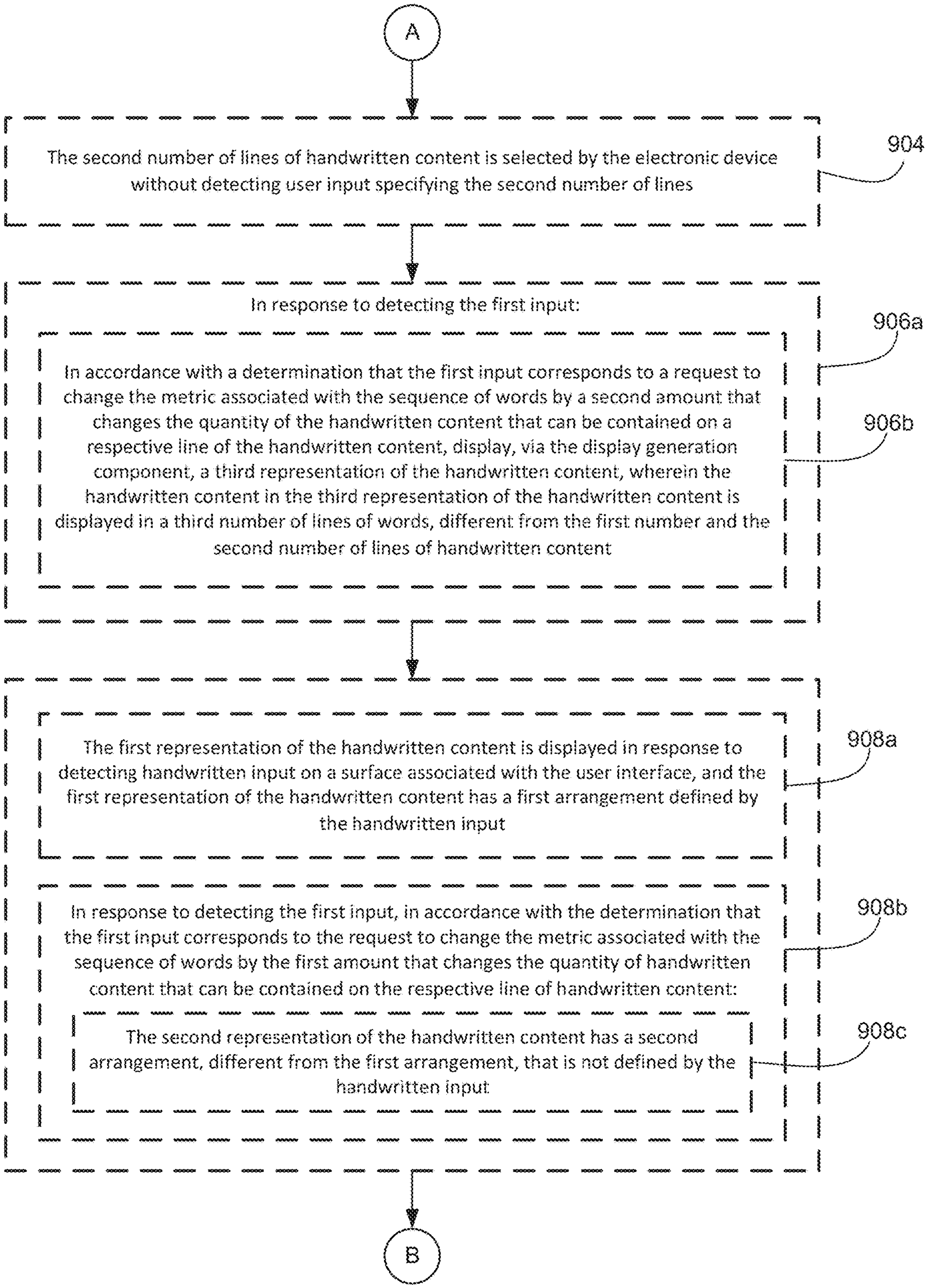
Figure 9C:
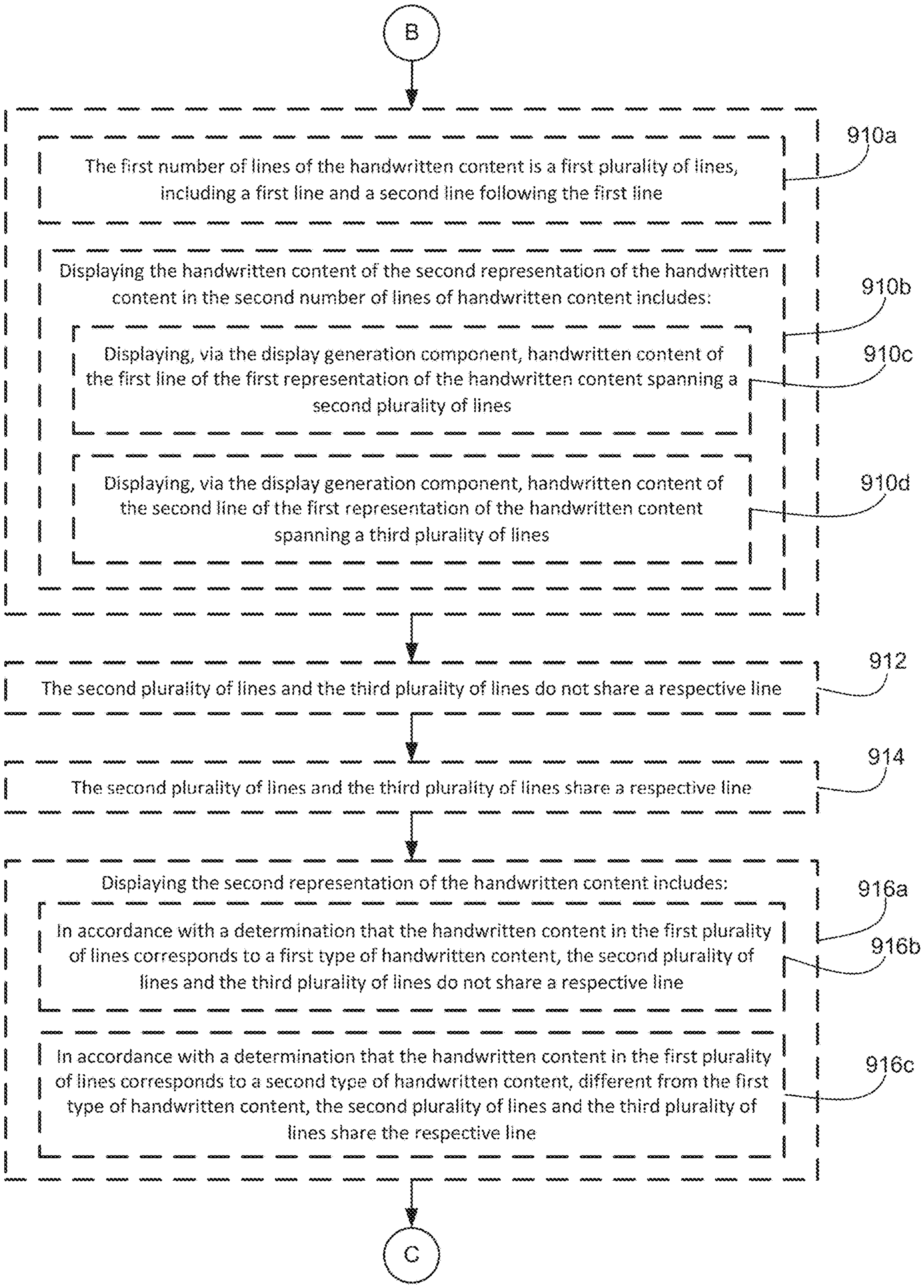
Figure 9D:
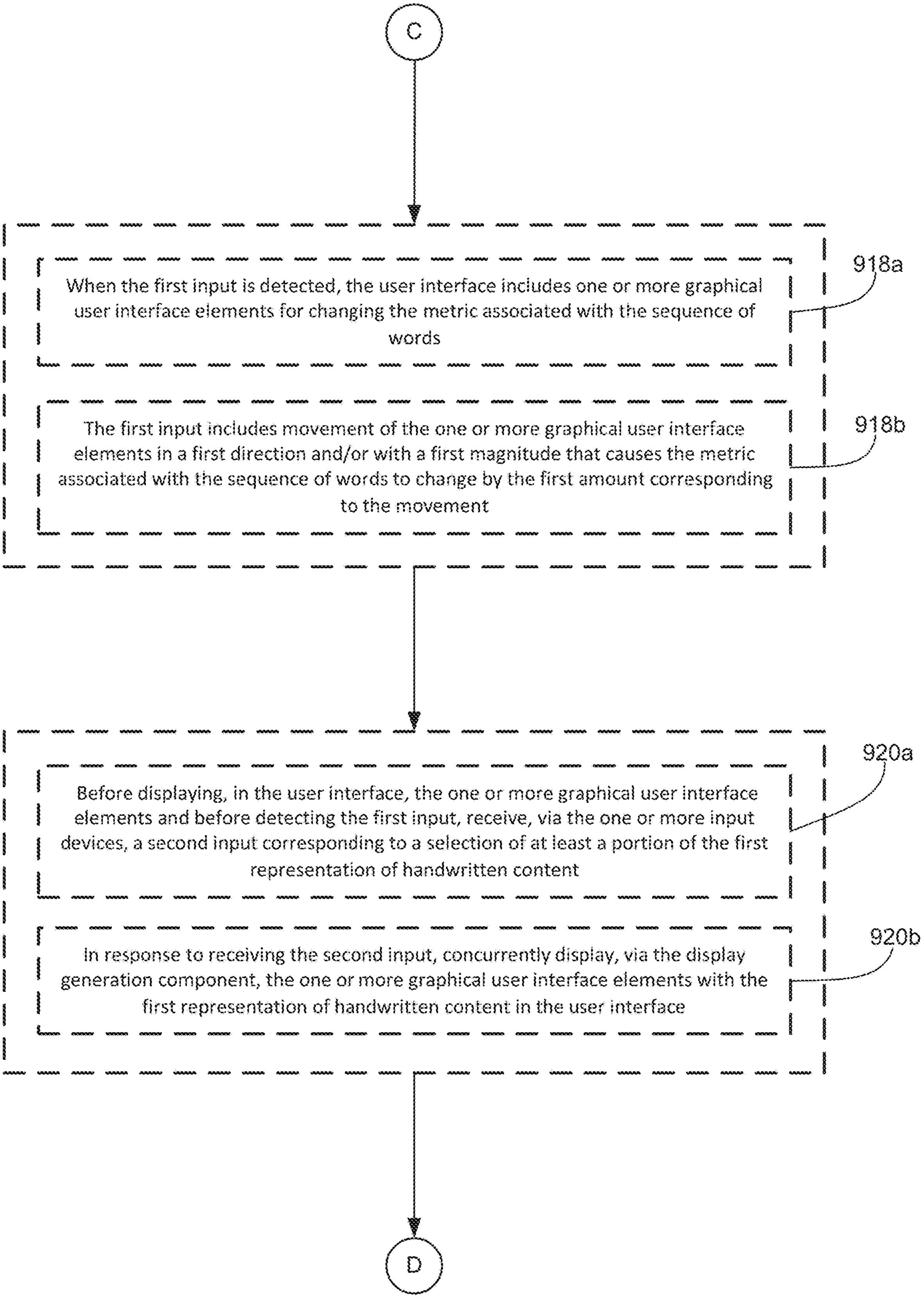
Figure 9E:
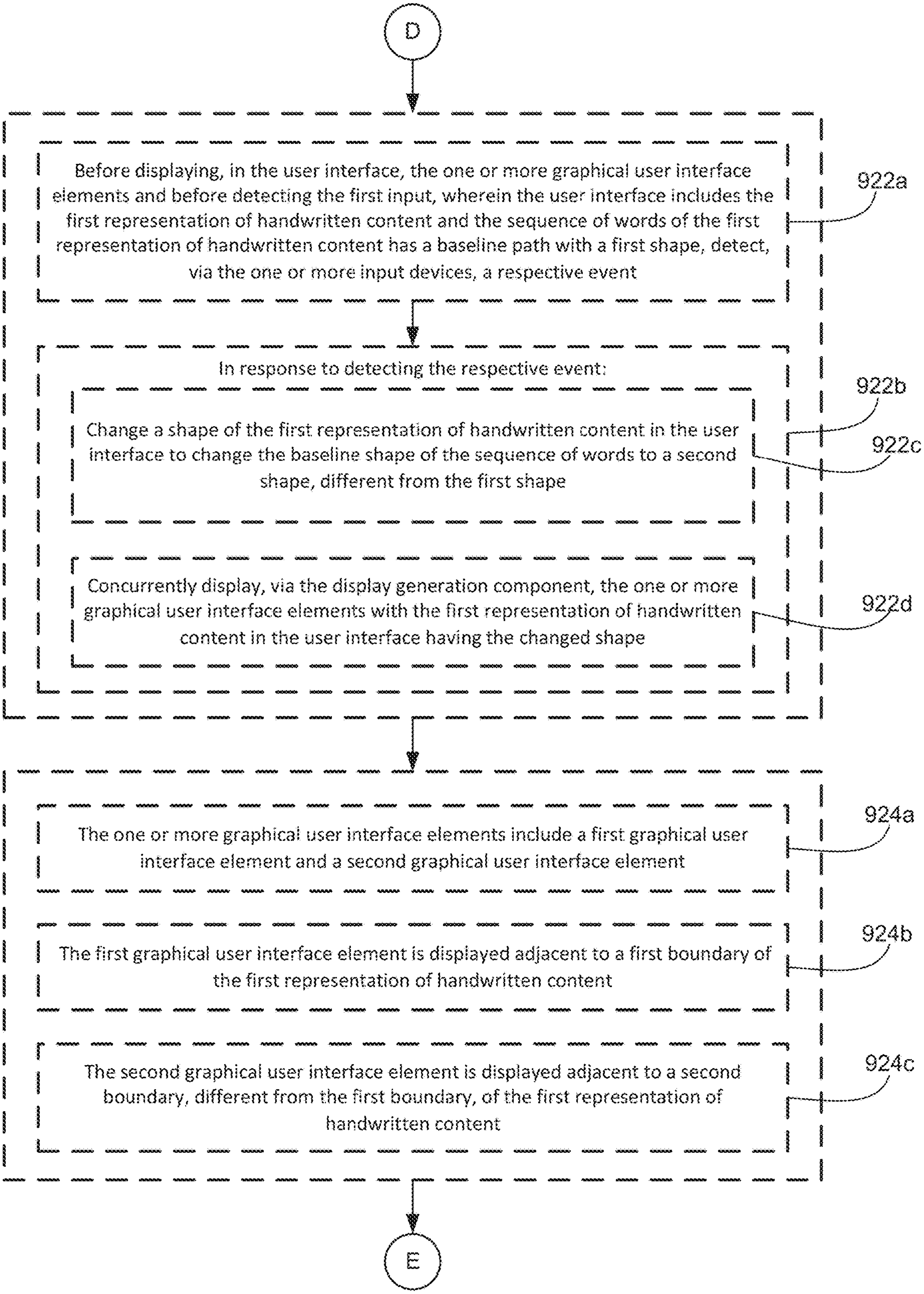
Figure 9F:
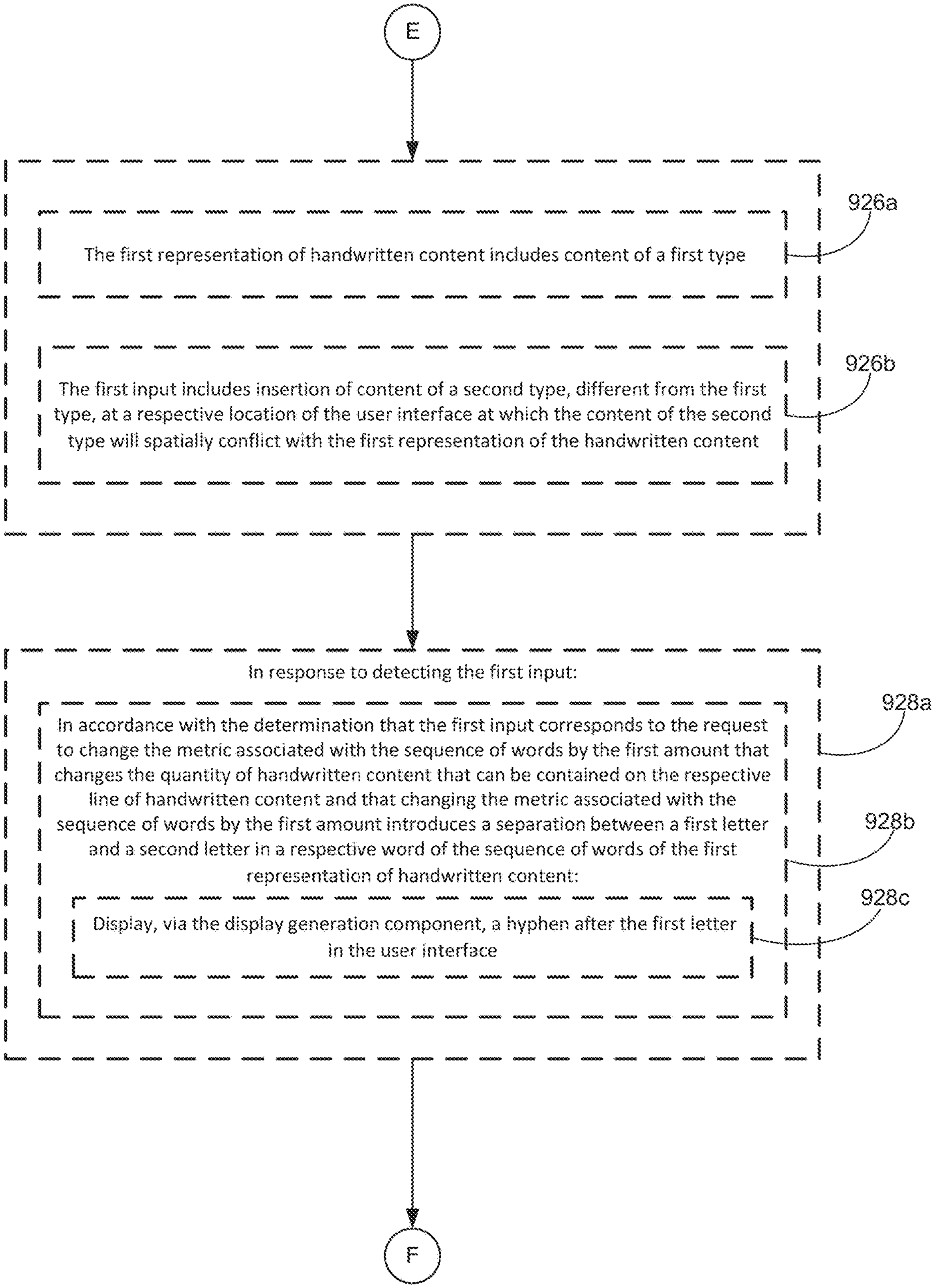
Figure 9G:
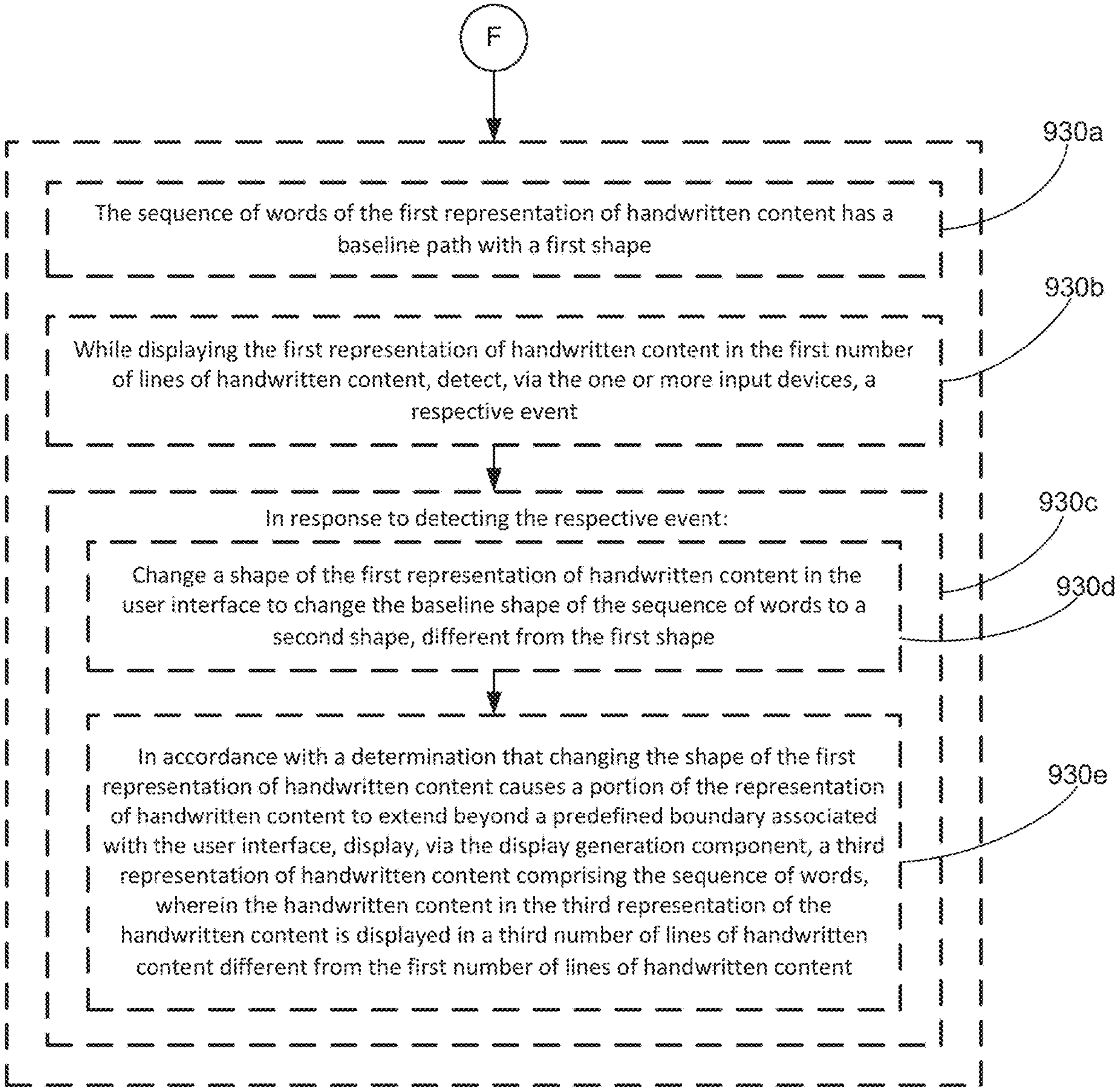

In FIG. 8Y, the electronic device 500 has straightened the representation of the handwritten input 846. For example, the electronic device 500 changes the shape and/or orientation of the handwritten text of the representation of the handwritten input 846 to align the representation of the handwritten input 846 to a predefined orientation associated with the content-entry region 802 in a similar manner as described above in method 700. Additionally, the electronic device 500 straightens the representation of the handwritten input 846 in response to any of the triggers described above in method 700. In some embodiments, after the electronic device 500 straightens the representation of the handwritten input 846 in the content-entry region 802, the electronic device 500 displays the one or more resizing handles for wrapping the handwritten text of the representation of the handwritten input 846. For example, as shown in FIG. 8Y, the electronic device 500 displays first resizing handle 815-1 and second resizing handle 815-2 with wrapping boundary 814-5, which indicates the portion of the handwritten text that will be wrapped in response to input directed to the first resizing handle 815-1 and/or the second resizing handle 815-2 in the content-entry region 802, as similarly described above.

In some embodiments, the electronic device 500 wraps handwritten content in the content-entry region 802 when straightening the handwritten content causes a portion of the handwritten content to extend beyond the content-entry region 802. In FIG. 8Z, the electronic device 500 detects handwritten input on the touch screen 504 provided by the stylus 203. As shown in FIG. 8Z, while detecting the handwritten input, the electronic device 500 displays a representation of the handwritten input 856 in the content entry-region 802. For example, as shown in FIG. 8Z, the representation of the handwritten input 856 includes the handwritten text "Remember to call Joe back" in the content-entry region 802.

In FIG. 8AA, the electronic device 500 has selected the representation of handwritten input 856 in the content-entry region 802 (e.g., indicated by display of visual indication 812-5 around the handwritten text). For example, as described previously above, the electronic device 500 has detected the stylus 203 move (e.g., on the touch screen 504) around the representation of handwritten input 856 in the content-entry region 802 while the selection tool 808-1 is active. As shown in FIG. 8AA, in response to the selection of the representation of handwritten input 856, the electronic device 500 displays toolbar element 814 described previously above. In FIG. 8AA, the electronic device detects a selection input (e.g., a tap or touch input) by the stylus 203 directed to the selectable option (e.g., straighten option) 818-5.

In FIG. 8BB, in response to detecting selection of the selectable option 818-5, the electronic device 500 straightens the representation of handwritten input 856 in the content-entry region 802 (e.g., in a similar manner as described in method 700). Additionally, as shown in FIG. 8BB, when the electronic device 500 straightens the representation of handwritten input 856, the electronic device 500 wraps the handwritten text of the representation of handwritten input 856. In FIG. 8AA, a position of the handwritten word "back" of the representation of handwritten input 856 is close to (e.g., less than 1 or 2 cm from) a boundary of the content-entry region 802. Accordingly, straightening the handwritten text of the representation of handwritten input 856 would cause at least a portion of the handwritten word "back" to extend beyond the boundary of the content-entry region 802. Thus, in FIG. 8BB, when the electronic device 500 straightens the representation of handwritten input 856, the electronic device 500 wraps the handwritten text and displays the handwritten text in a first line 856-1 and a second line 856-1, such that the handwritten word "back" is prevented from extending beyond the boundary of the content-entry region 802 after the representation is straightened.

FIGS. 9A-9G is a flowchart illustrating an exemplary method 900 of selecting and providing for wrapping of handwritten content in accordance with some embodiments of the disclosure. The method 900 is optionally performed at an electronic device such as device 100, device 300, device 500, device 501, device 510, and device 591 as described above with reference to FIGS. 1A-1B, 2-3, 4A-4B and 5A-5I. Some operations in method 900 are, optionally combined and/or order of some operations is, optionally, changed.

As described below, the method 900 provides for interaction with handwritten content, including wrapping of the handwritten content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device (e.g., 500) in communication with a display generation component (e.g., 504) and one or more input devices (e.g., 314). In some embodiments, the electronic device has one or more of the characteristics of the electronic device in method 700. In some embodiments, the display generation component has one or more of the characteristics of the display generation component in method 700. In some embodiments, the one or more input devices have one or more of the characteristics of the one or more input devices in method 700.

In some embodiments, while displaying, in a user interface (e.g., user interface 800 in FIG. 8A), a first representation of handwritten content (e.g., comprising a sequence of words displayed in response to detecting handwritten input on a surface (e.g., a touch-sensitive surface of the one or more input devices)), such as representation 806 in FIG. 8F, wherein a sequence of words in the first representation of the handwritten content is displayed in a first number of lines of handwritten content (e.g., a single line as shown in FIG. 8F), the electronic device detects (902*a*), via the one or more input devices, a first input directed to the first representation of the handwritten content, such as movement of resizing handle 815-2 by stylus 203 as shown in FIG. 8F. For example, the electronic device is displaying a user interface associated with a note-taking application, a messaging application, a journaling or scheduling application, a text-editor application, and/or a text annotation application. In some embodiments, the first representation of the handwritten content is displayed in a user interface region (e.g., content-entry region 802 in FIG. 8F), such as a handwriting entry region configured to receive handwritten input, such as the user interface region described in method 700. In some embodiments, the handwritten input has one or more characteristics of the handwritten input in method 700. In some embodiments, the touch sensitive surface has one or more characteristics of the touch sensitive surface in method 700. In some embodiments, the first representation of handwritten content corresponds to a representation of the handwritten input, which includes representations of handwritten words, such as the representation of handwritten input described in method 700. In some embodiments, the sequence of words of the first representation of handwritten content is displayed within the user interface in a first number of lines of words, such as 1, 2, 3, 4, 5, 8, 10, or 12 lines, and optionally corresponds to the number of lines in which the handwritten words were written in the handwritten input. In some embodiments, the sequence of words corresponds to a paragraph displayed in the first number of lines of words. In some embodiments, the sequence of words corresponds to a list (e.g., a bulleted list, a numbered list, or a lettered list) of words displayed in the first number of lines of words. In some embodiments, the first input includes manipulation of one or more user interface elements displayed in the user interface. For example, the first representation of the handwritten content is displayed with one or more resizing handles (e.g., displayed adjacent to the first representation of the handwritten content and/or on either end of the first representation of the handwritten content) that are selectable to initiate manipulation of the display of the sequence of words in the first number of lines of words, such as resizing handles 815-1 and 815-2 in FIG. 8F. In some embodiments, the first input includes movement of a resizing handle in a respective direction (e.g., rightward or leftward across the surface of the user interface), as shown in FIG. 8F, which optionally causes the electronic device to wrap (e.g., update the number of lines in which) the sequence of words is displayed, as discussed below.

In some embodiments, in response to detecting the first input (902*b*), in accordance with a determination that the first input corresponds to a request to change a metric (e.g., a text size, line width and/or line size) associated with the sequence of words by a first amount that changes a quantity of the handwritten content (e.g., a number of words or characters) that can be contained on a respective line of the handwritten content, the electronic device displays (902*c*), via the display generation component, a second representation of the handwritten content, wherein the handwritten content in the second representation of the handwritten content is displayed in a second number of lines of handwritten content, different from the first number of lines of handwritten content, such as display of the first line 806-1 and the second line 806-2 of the handwritten content as shown in FIG. 8G. For example, the electronic device replaces display of the first representation of the handwritten content with the second representation of the handwritten content in the user interface, as shown in FIG. 8G. In some embodiments, the number of lines of words in which the sequence of words is displayed is updated in accordance with the first input. For example, as discussed above, the first input includes manipulation of a resizing handle displayed with the first representation of the handwritten content that changes the metric associated with the sequence of words. In some embodiments, if the first number of lines corresponds to the first respective number of lines (e.g., 2, 3, 4, 5, 6, or 7 lines of words) and the first input includes movement of the resizing handle in a first direction (e.g., a rightward direction), the electronic device displays the sequence of words of the handwritten content in a second number of lines of words that is fewer than the first number of lines of words depending on a magnitude (e.g., an amount) of the movement of the resizing handle. For example, the greater amount the resizing handle is moved in the first direction relative to the user interface, the fewer the number of lines of words in which the handwritten content is displayed (e.g., with the minimum number of lines being a single line of words (e.g., depending on a size of the user interface region in which the second representation is displayed)) because each line of the number of lines is able to contain a larger quantity of words or characters than before detecting the first input. If the first input includes movement of the resizing handle in a second direction (e.g., a leftward direction), the electronic device displays the sequence of words of the handwritten content in the second number of lines of words, greater than the first number of lines of words, depending on the magnitude of the movement of the resizing handle (e.g., because each line of the number of lines of words is able to contain a smaller quantity of words or characters than before detecting the first input), as similarly shown in FIG. 8G. In some embodiments, the first input includes selection of an option displayed in the user interface that controls the number of lines in which the handwritten content is displayed. For example, if the first input includes selection of a first option that indicates that the second representation of the handwritten content will be displayed in the second number of lines, the electronic device displays the handwritten content in the second number of lines in response to receiving selection of the first option. In some embodiments, the electronic device does not convert the representation of the handwritten content to font-based text in response to detecting the first input (e.g., the second representation of the handwritten content does not include font-based text converted from the first representation of the handwritten content). For example, the electronic device maintains display of the representations of handwritten words, number, special characters, and/or shapes in the user interface region, as shown in FIG. 8G. Changing a number of lines in which a representation of a handwritten sequence of words is displayed in a user interface in response to detecting input directed to the representation reduces the number of inputs needed to change the number of lines in which the sequence of words is displayed and/or enables the number of lines in which the sequence of words is displayed to be changed automatically, thereby improving user-device interaction.

In some embodiments, the second number of lines of handwritten content is selected by the electronic device without detecting user input specifying the second number of lines (904), such as display of the first line 806-1 and the second line 806-2 in FIG. 8G without detecting input specifying two lines of handwritten content. For example, the second number of lines in which the handwritten content is displayed is automatically selected/determined by the electronic device based on the amount that the metric described above is changed. In some embodiments, changing the metric does not include specification of the number of lines in which to display the handwritten content. Changing a number of lines in which a representation of a handwritten sequence of words is displayed in a user interface by a determined amount in response to detecting input directed to the representation reduces the number of inputs needed to change the number of lines in which the sequence of words is displayed and/or enables the number of lines in which the sequence of words is displayed to be changed automatically, thereby improving user-device interaction.

In some embodiments, in response to detecting the first input (906*a*), in accordance with a determination that the first input corresponds to a request to change the metric associated with the sequence of words by a second amount that changes the quantity of the handwritten content that can be contained on a respective line of the handwritten content, the electronic device displays (906*b*), via the display generation component, a third representation of the handwritten content (e.g., representation 816 in FIG. 8K), wherein the handwritten content in the third representation of the handwritten content is displayed in a third number of lines of words, different from the first number and the second number of lines of handwritten content, as described above with reference to FIG. 8K. For example, the electronic device replaces display of the first representation of the handwritten content with a third representation of the handwritten content in the user interface in the third number of lines of words in a similar manner as described above. Changing a number of lines in which a representation of a handwritten sequence of words is displayed in a user interface in response to detecting input directed to the representation reduces the number of inputs needed to change the number of lines in which the sequence of words is displayed and/or enables the number of lines in which the sequence of words is displayed to be changed automatically, thereby improving user-device interaction.

In some embodiments, the first representation of the handwritten content is displayed in response to detecting handwritten input on a surface associated with the user interface (e.g., on a touch-sensitive surface (e.g., of the one or more input devices), a touch screen display of the electronic device, and/or a virtual surface (e.g., a two-dimensional or three-dimensional surface) displayed via the display generation component), such as detecting handwritten input from stylus 203 on touch screen 504 as shown in FIG. 8C, and the first representation of the handwritten content has a first arrangement defined by the handwritten input (908*a*), as shown in FIG. 8D. For example, the first arrangement of the first representation of the handwritten content is defined by a manner in which the handwritten input is provided. In some embodiments, the first arrangement is defined by the shape, orientation, position, and/or thickness of the handwritten characters of the handwritten input forming the first representation of the handwritten content. For example, the first arrangement corresponds to the particular movements, spacing, and/or more generally the particular writing input provided by the handwritten input itself (e.g., the number of lines of writing provided by the handwritten input and/or the line breaks in the writing provided by the handwritten input).

In some embodiments, in response to detecting the first input, in accordance with the determination that the first input corresponds to the request to change the metric associated with the sequence of words by the first amount that changes the quantity of handwritten content that can be contained on the respective line of handwritten content (908*b*), the second representation of the handwritten content has a second arrangement, different from the first arrangement, that is not defined by the handwritten input (908*c*), such as display of the representation of handwritten content as first line 806-1 and second line 806-2 as shown in FIG. 8G. For example, when the electronic device displays the handwritten content in the second number of lines, the handwritten content no longer has the first arrangement defined by the manner in which the handwritten input was provided. In some embodiments, the second arrangement is defined by the shape and/or orientation of the handwritten input in the second number of lines. For example, the electronic device displays the second representation of the handwritten content in the second arrangement to account for the change in the metric caused by the first input. The electronic device optionally repositions one or more handwritten characters of the handwritten content when the second representation of the handwritten content is displayed in the second number of lines, such as repositioning the text "list:" in the second line 806-2 of handwritten content as shown in FIG. 8G. Changing an arrangement of a representation of a handwritten sequence of words displayed in a user interface when changing a number of lines in which the sequence of words is displayed accounts for the change in the number of lines in which the sequence of words is displayed and/or enables the arrangement of the sequence of words displayed to be changed automatically, thereby improving user-device interaction.

In some embodiments, the first number of lines of the handwritten content is a first plurality of lines, including a first line (e.g., line 816-1 in FIG. 8L) and a second line following the first line (910*a*), such as line 826 in FIG. 8L. For example, the sequence of words is displayed in a first line and a second line below the first line in the user interface.

In some embodiments, displaying the handwritten content of the second representation of the handwritten content in the second number of lines of handwritten content includes (910*b*) displaying, via the display generation component, handwritten content of the first line of the first representation of the handwritten content spanning a second plurality of lines (910*c*), such as display of lines 816-1 and 816-2 as shown in FIG. 8P. For example, when the electronic device displays the second representation of the handwritten content in the second number of lines in response to receiving the first input, the electronic device displays the first line in the second plurality of lines (e.g., spreads the writing of the first line across two or more lines), such as movement of the word "and" from the line 816-1 to the line 816-2 as shown in FIG. 8P. In some embodiments, the second plurality of lines is fewer than the first plurality of lines. In some embodiments, the second plurality of lines is greater than the first plurality of lines, as shown in FIG. 8P.

In some embodiments, the electronic device displays, via the display generation component, handwritten content of the second line of the first representation of the handwritten content spanning a third plurality of lines (910*d*), such as display of line 826 in two lines 826-1 and 826-2 of handwritten content as shown in FIG. 8P. For example, the electronic device displays the second line in the third plurality of lines (e.g., spreads the writing of the first line across two or more lines), such as display of the words "at daycare" in the second line 826-2 as shown in FIG. 8P. In some embodiments, the third plurality of lines is fewer than the first plurality of lines. In some embodiments, the third plurality of lines is greater than the first plurality of lines. In some embodiments, the second and third pluralities of lines are partially or fully overlapping; in some embodiments, the second and third pluralities of lines are not overlapping, as show in FIG. 8P. Changing a number of a plurality of lines in which a representation of a handwritten sequence of words is displayed in a user interface in response to detecting input directed to the representation reduces the number of inputs needed to change the number of the plurality of lines in which the sequence of words is displayed and/or enables the number of the lines in which the sequence of words is displayed to be changed automatically, thereby improving user-device interaction.

In some embodiments, the second plurality of lines and the third plurality of lines do not share a respective line (912), such as text from line 816-2 not overlapping with text from line 826-1 as shown in FIG. 8P. For example, the first plurality of lines of the handwritten content comprises individually listed items (e.g., in a numbered list, a bulleted list, and/or a lettered list), as shown in FIG. 8O, and/or separate paragraphs of handwritten text, such that the sequence of words in the first line and the second line do not together form a consistent sentence or consistent group of sentences. In some embodiments, when the electronic device wraps the first plurality of lines, the electronic device individually wraps the first line and individually wraps the second line, such that the resulting second plurality of lines and third plurality of lines do not include a line in common (e.g., the sequence of words in the second plurality of lines remain separate from the sequence of words in the third plurality of lines). For example, after the electronic device wraps the second line, no handwritten text from the first line is displayed in a same line as handwritten text from the second line, as shown in FIG. 8P. Changing a first line independently of a second line of a plurality of lines in which a representation of a handwritten sequence of words is displayed in a user interface in response to detecting input directed to the representation reduces the number of inputs needed to independently change the first line and the second line of the plurality of lines in which the sequence of words is displayed and/or enables the first line to be changed independently of the second line automatically, thereby improving user-device interaction.

In some embodiments, the second plurality of lines and the third plurality of lines share a respective line (914), such as overlap of text in the lines of representation 836 in FIG. 8T. For example, the first plurality of lines of the handwritten content comprises a self-contained unit of writing (e.g., including a plurality of sentences, such as a paragraph of lines of handwritten content), such as the paragraph of representation 836 in FIG. 8S, such that the sequence of words in the first line and the second line together form a consistent sentence or consistent group of sentences. In some embodiments, when the electronic device wraps the first plurality of lines (e.g., in response to input provided by stylus 203 directed to resizing handle 815-1 in FIG. 8S), the electronic device wraps the first line and the second line together (e.g., by the same amount), such that the resulting second plurality of lines and third plurality of lines include at least one line in common (e.g., the sequence of words in the second plurality of lines remain tied to the sequence of words in the third plurality of lines), as shown in FIG. 8T. For example, after the electronic device wraps the second line, at least a portion of the handwritten text (e.g., at least one or more words and/or numbers) from the first line is displayed in a same line as handwritten text from the second line, such as the word "up" in the second line in FIG. 8S being moved to the third line next to the word "coffee," which was in the third line before the input was detected, as shown in FIG. 8T. Concurrently changing a first line and a second line of a plurality of lines in which a representation of a handwritten sequence of words is displayed in a user interface in response to detecting input directed to the representation reduces the number of inputs needed to concurrently change the first line and the second line of the plurality of lines in which the sequence of words is displayed and/or enables the first line and the second line to be concurrently changed automatically, thereby improving user-device interaction.

In some embodiments, displaying the second representation of the handwritten content includes (916*a*), in accordance with a determination that the handwritten content in the first plurality of lines corresponds to a first type of handwritten content, the second plurality of lines and the third plurality of lines do not share a respective line (916*b*), as described with reference to FIG. 8P. For example, the electronic device wraps the plurality of lines in which the sequence of words is displayed individually or as a unit based on a type of content of the handwritten content. In some embodiments, as similarly described above with reference to step 912, the first type of handwritten content includes individually listed items (e.g., in a numbered list, a bulleted list, and/or a lettered list), as shown in FIG. 8O, and/or separate paragraphs of handwritten text. For example, if the electronic device determines that the handwritten content is the first type of content (e.g., based on the form and/or contents of the sequence of words (e.g., such as detecting bullets, dashes, a series of numbers, and/or a threshold spacing (e.g., 0.25, 0.5, 1, 1.5, 2, 3, 4, 5, or 8 cm) between successive lines)), the electronic device wraps the lines of the first plurality of lines independently in a similar manner as described above with reference to step 912, as shown in FIG. 8P.

In some embodiments, in accordance with a determination that the handwritten content in the first plurality of lines corresponds to a second type of handwritten content, different from the first type of handwritten content, the second plurality of lines and the third plurality of lines share the respective line (916*c*), as described with reference to FIG. 8T. For example, as similarly described above, the second type of handwritten content includes a self-contained unit of writing (e.g., including a plurality of sentences, such as a paragraph of lines of handwritten content, as similarly shown by representation 836 in FIG. 8S). In some embodiments, if the electronic device determines that the handwritten content is the second type of content (e.g., based on the form and/or contents of the sequence of words (e.g., such as detecting periods, commas, and/or other punctuation marks, capitalized letters, and/or less than the threshold spacing between successive lines)), the electronic device wraps the lines of the plurality of lines as a unit in a similar manner as described above with reference to step 914, as shown in FIG. 8T. Selectively changing a number of lines in which a representation of a handwritten sequence of words is displayed in a user interface in a first manner or a second manner based on a type of the handwritten sequence of words reduces the number of inputs needed to change the number of lines in which the sequence of words is displayed in the first manner and/or the second manner and/or enables the number of lines in which the sequence of words is displayed to be changed in the first manner and/or the second manner automatically, thereby improving user-device interaction.

In some embodiments, when the first input is detected, the user interface includes one or more graphical user interface elements for changing the metric associated with the sequence of words (918*a*), such as resizing handles 815-1 and 815-2 shown in FIG. 8F. For example, the one or more graphical user interface elements indicate that the metric associated with the sequence of words is changeable in the user interface. In some embodiments, the one or more graphical user interface elements are concurrently displayed with the first representation of the handwritten content, as similarly shown in FIG. 8F. In some embodiments, the one or more graphical user interface elements are selectable to initiate movement of the one or more graphical user interface elements, and thus change the metric associated with the sequence of words. In some embodiments, the one or more graphical user interface elements correspond to one or more resizing handles.

In some embodiments, the first input includes movement of the one or more graphical user interface elements in a first direction and/or with a first magnitude that causes the metric associated with the sequence of words to change by the first amount corresponding to the movement (918*b*), such as movement of the resizing handle 815-2 by the stylus 203 as shown in FIG. 8F. As similarly discussed above with reference to steps 902*a*-902*c*, the first input includes manipulation of the one or more user graphical interface elements displayed in the user interface. In some embodiments, the first input includes movement of a resizing handle in a respective direction (e.g., rightward or leftward across the surface of the user interface), as shown in FIG. 8F, which optionally causes the electronic device to wrap (e.g., update the number of lines in which) the sequence of words is displayed. In some embodiments, a magnitude of the movement of the resizing handle determines the number of lines in which the sequence of words is displayed, as described above with reference to steps 902*a*-902*c*. Changing a number of lines in which a representation of a handwritten sequence of words is displayed in a user interface by a determined amount in response to detecting input directed to a resizing affordance reduces the number of inputs needed to change the number of lines in which the sequence of words is displayed and/or enables the number of lines in which the sequence of words is displayed to be changed automatically in response to the input directed to the resizing affordance, thereby improving user-device interaction.

In some embodiments, before displaying, in the user interface, the one or more graphical user interface elements and before detecting the first input, the electronic device receives, via the one or more input devices, a second input corresponding to a selection of at least a portion of the first representation of handwritten content (920*a*), such as selection of the representation 806 by the stylus 203 as shown in FIG. 8E. For example, the electronic device receives a respective gesture (e.g., a double tap) directed to the first representation of handwritten content. In some embodiments, the electronic device receives selection of one or more selectable options that correspond to the selection of at least a portion of the first representation of handwritten content. In some embodiments, the second input includes circling/bounding (e.g., represented by visual indication 812-1 in FIG. 8E) of at least a portion of the first representation of handwritten content using a respective writing tool (e.g., selection tool 808-1 in FIG. 8D) while the electronic device operates in a content selection mode associated with the user interface.

In some embodiments, in response to receiving the second input, the electronic device concurrently displays, via the display generation component, the one or more graphical user interface elements with the first representation of handwritten content in the user interface (920*b*), such as display of the resizing handles 815-1 and 815-2 concurrently with the representation 806 as shown in FIG. 8F. For example, as described below, the one or more graphical user interface elements are displayed relative to the selected portion of the first representation of handwritten content in the user interface. In some embodiments, the one or more graphical user interface elements are concurrently displayed with a visual indication of the selection of the portion of the first representation of handwritten content (e.g., lines or dashes surrounding the selected portion of the handwritten content). In some embodiments, an input directed to the one or more graphical user interface elements would change the metric associated with the sequence of words for the selected portion of the first representation of handwritten content (e.g., and not the unselected portion of the first representation of handwritten content). Displaying one or more resizing affordances for changing a number of lines in which a representation of a handwritten sequence of words is displayed in a user interface in response to detecting a selection of the representation of the handwritten sequence of words reduces the number of inputs needed to change the number of lines in which the sequence of words is displayed and/or enables the number of lines in which the sequence of words is displayed to be changed automatically in response to detecting input directed to the resizing affordance, thereby improving user-device interaction.

In some embodiments, before displaying, in the user interface, the one or more graphical user interface elements and before detecting the first input, wherein the user interface includes the first representation of handwritten content (e.g., representation 846 in FIG. 8X) and the sequence of words of the first representation of handwritten content has a baseline path (e.g., a path followed by the bottom portion of characters (e.g., letters, numbers, special characters, and/or punctuation marks) in the handwritten content other than descenders of the letters and/or punctuation marks, such as described in more detail with reference to method 700) with a first shape, the electronic device detects (922*a*), via the one or more input devices, a respective event, such as lift-off of the stylus 203 from the touch screen 504 as described with reference to FIG. 8X. For example, the electronic device detects a respective event that corresponds to a request to change an orientation and/or shape of the baseline path of the first representation of handwritten content. In some embodiments, the respective event includes detecting an end of handwritten input that provided the handwritten content (e.g., detecting lift-off of an input device or object providing the handwritten input). In some embodiments, the respective event includes receiving selection of an option that corresponds to a request to change the orientation and/or shape of the baseline path of the representation of handwritten input. In some embodiments, the respective event has one or more characteristics of respective events described in method 700.

In some embodiments, in response to detecting the respective event (922*b*), the electronic device changes (922*c*) a shape of the first representation of handwritten content in the user interface to change the baseline shape of the sequence of words to a second shape, different from the first shape, such as straightening the representation 846 in the content-entry region 802 as shown in FIG. 8Y. For example, the electronic device straightens the first representation of handwritten content in the user interface relative to a predefined orientation associated with the user interface, as shown in FIG. 8Y. In some embodiments, the electronic device displays the first representation of the handwritten content (e.g., the representations of handwritten words, numbers, special characters, and/or punctuation marks) with a second orientation that is aligned to the predefined orientation associated with the user interface, such that the baseline path of the handwritten content aligns with the predefined orientation. In some embodiments, changing the shape of the first representation of handwritten content and/or changing the baseline shape have one or more characteristics of changing the shape of handwritten content and/or changing the baseline shape described in method 700.

In some embodiments, the electronic device concurrently displays (922*d*), via the display generation component, the one or more graphical user interface elements with the first representation of handwritten content in the user interface having the changed shape, such as display of the resizing handles 815-1 and 815-2 concurrently with the straightened representation 846 as shown in FIG. 8Y. For example, the one or more graphical user interface elements are concurrently displayed with the first representation of handwritten content when the handwritten content is straightened relative to the predefined orientation associated with the user interface. Displaying resizing affordances for changing a number of lines in which a representation of a handwritten sequence of words is displayed in a user interface reduces the number of inputs needed to change the number of lines in which the sequence of words is displayed and/or enables the number of lines in which the sequence of words is displayed to be changed automatically in response to detecting input directed to one of the resizing affordances, thereby improving user-device interaction.

In some embodiments, the one or more graphical user interface elements include a first graphical user interface element (e.g., a first resizing handle) and a second graphical user interface element (924*a*) (e.g., a second resizing handle), such as resizing handles 815-1 and 815-2 in FIG. 8F. In some embodiments, the first graphical user interface element is displayed adjacent to a first boundary of the first representation of handwritten content (924*b*), such as display of resizing handle 815-1 on a left side of the representation 806 in FIG. 8F. For example, if the first representation of the handwritten content includes one or more lines of handwritten content, the first resizing handle is displayed on a left side boundary of the one or more lines of handwritten content.

In some embodiments, the second graphical user interface element is displayed adjacent to a second boundary, different from the first boundary, of the first representation of handwritten content (924*c*), such as display of resizing handle 815-2 on a right size of the representation 806 as shown in FIG. 8F. For example, the second resizing handle is displayed on a right side boundary, opposite the left side boundary, of the one or more lines of handwritten input. In some embodiments, the first resizing handle and the second resizing handle are independently movable to change the metric associated with the sequence of words and change the number of lines in which the sequence of words is displayed. For example, the first resizing handle is configurable to be moved in a respective direction (e.g., leftward or rightward) in the user interface and/or the second resizing handle is configurable to be moved in the respective direction (e.g., leftward or rightward) in the user interface to change the metric associated with the sequence of words. In some embodiments, movement of the first resizing handle in a leftward direction increases the number of words and/or numbers displayed in at least a first line of the first representation of handwritten content, and movement of the first resizing handle in a rightward direction decreases the number of words and/or numbers displayed in the first line. In some embodiments, movement of the second resizing handle in the leftward direction decreases the number of words and/or numbers displayed in at least the first line of the first representation of handwritten content, and movement of the second resizing handle in the rightward direction increases the number of words and/or numbers displayed in the first line, as similarly shown in FIG. 8G. Displaying one or more resizing affordances for changing a number of lines in which a representation of a handwritten sequence of words is displayed in a user interface when changing a shape of the representation of the handwritten sequence of words reduces the number of inputs needed to change the number of lines in which the sequence of words is displayed and/or enables the number of lines in which the sequence of words is displayed to be changed automatically in response to detecting input directed to the resizing affordance, thereby improving user-device interaction.

In some embodiments, the first representation of handwritten content includes content of a first type (926*a*), such as handwritten text of representation 836 in FIG. 8U. For example, content of the first type includes handwritten text, such as handwritten letters, numbers, special characters, and/or punctuation marks.

In some embodiments, the first input includes insertion of content of a second type, different from the first type, at a respective location of the user interface at which the content of the second type will spatially conflict with the first representation of the handwritten content (926*b*), such as insertion of image 838 in the content-entry region 802 that conflicts with the representation 836 as shown in FIG. 8W. For example, content of the second type includes non-handwritten text, such as an image, a video clip, a (e.g., hand drawn) drawing, an image of text, and/or a graph/chart. In some embodiments, the first input corresponds to an insertion of content of the second type into the user interface (e.g., via a series of one or more inputs, such as a paste or insert input) at a location that would spatially conflict with the handwritten content, such as insertion as shown in FIG. 8V. For example, the respective location is located within the handwritten content (e.g., between handwritten characters of the handwritten content). In some embodiments, the respective location is located outside of the representation of handwritten content (e.g., above, below, and/or to a side of the handwritten content), but a characteristic of the content of the second type (e.g., a size of the content) causes the content to conflict with (e.g., overlap with) a portion of the representation of the handwritten content. Changing a number of lines in which a representation of a handwritten sequence of words is displayed in a user interface in response to detecting insertion of non-text content that spatially conflicts with the representation of the handwritten sequence of words avoids the spatial conflict between the handwritten sequence of words and the inserted content and/or enables the number of lines in which the sequence of words is displayed to be changed to account for inserted content automatically, thereby improving user-device interaction.

In some embodiments, in response to detecting the first input (928*a*), in accordance with the determination that the first input corresponds to the request to change the metric associated with the sequence of words by the first amount that changes the quantity of handwritten content that can be contained on the respective line of handwritten content and that changing the metric associated with the sequence of words by the first amount introduces a separation between a first letter and a second letter in a respective word (e.g., separates adjacent letters of a word) of the sequence of words of the first representation of handwritten content (928*b*), such as a separation between the letters "p" and "p" of the representation 836 in FIG. 8T, the electronic device displays (928*c*), via the display generation component, a hyphen (e.g., hyphen 822 in FIG. 8T) after the first letter in the user interface (and between the first letter and the second letter in the sequence of words). For example, the electronic device visually separates the first letter and the second letter in the user interface using the hyphen. In some embodiments, the first letter is a last letter of a portion of a word displayed in a first line of the handwritten content in the user interface, and the second letter is a first letter of the portion of the word displayed in a second line (e.g., below the first line) of the handwritten content in the user interface after changing the number of lines in which the handwritten content is displayed. In some embodiments, the electronic device displays the hyphen between syllables of the respective word. For example, the first letter is part of an end of a first syllable of the respective word (e.g., "drop" in FIG. 8T) and the second letter is part of a beginning of a second syllable, following the first syllable, of the respective word (e.g., "ping" in FIG. 8T). In some embodiments, the hyphen is a font-based hyphen, as shown in FIG. 8T, or a graphical hyphen (e.g., selected by the electronic device based on an appearance (e.g., shape, form, thickness, and/or style) of the handwritten content). Introducing a hyphen between adjacent letters of a word when changing a number of lines in which a representation of a handwritten sequence of words is displayed in a user interface maximizes a number of words and/or portions of words that can be displayed on a respective line, thereby improving usage of the user interface and/or enables a hyphen to be displayed between adjacent letters of a word automatically, thereby improving user-device interaction.

In some embodiments, the sequence of words of the first representation of handwritten content has a baseline path (e.g., a path followed by the bottom portion of characters (e.g., letters, numbers, special characters, and/or punctuation marks) in the handwritten content other than descenders of the letters and/or punctuation marks, such as described in more detail with reference to method 700) with a first shape (930*a*). In some embodiments, while displaying the first representation of handwritten content in the first number of lines of handwritten content (e.g., representation 846 in FIG. 8AA), the electronic device detects (930*b*), via the one or more input devices, a respective event, such as selection of straighten option 818-5 by the stylus 203 as shown in FIG. 8AA. For example, the electronic device detects a respective event that corresponds to a request to change an orientation and/or shape of the baseline path of the first representation of handwritten content, as similarly described above with reference to steps 922*a*-922*d*.

In some embodiments, in response to detecting the respective event (930*c*), the electronic device changes (930*d*) a shape of the first representation of handwritten content in the user interface to change the baseline shape of the sequence of words to a second shape, different from the first shape, such as straightening the representation 846 in the content-entry region 802 as shown in FIG. 8BB. For example, the electronic device straightens the first representation of handwritten content in the user interface relative to a predefined orientation associated with the user interface, as similarly described above with reference to steps 922*a*-922*d*.

In some embodiments, in accordance with a determination that changing the shape of the first representation of handwritten content causes a portion of the representation of handwritten content (e.g., the word "back" in the representation 846 in FIG. 8AA) to extend beyond a predefined boundary associated with the user interface (e.g., a margin of the user interface and/or edge of the display or display area of the electronic device displaying the user interface), the electronic device displays (930*e*), via the display generation component, a third representation of handwritten content comprising the sequence of words, wherein the handwritten content in the third representation of the handwritten content is displayed in a third number of lines of handwritten content different from the first number of lines of handwritten content, such as display of the representation in a first line 846-1 and a second line 846-2 as shown in FIG. 8BB. For example, the electronic device replaces display of the first representation of the handwritten content with a third representation of the handwritten content in the user interface in the third number of lines of words in a similar manner as described above with reference to steps 922*a*-922*d*. In some embodiments, the third number of lines of words causes the handwritten content to remain displayed within the boundaries of the user interface (e.g., user interface 800) after changing the shape of the first representation of handwritten content. For example, the third number of lines enables the words, numbers, special characters, and/or punctuation marks of the handwritten content to remain displayed in the user interface (e.g., without extending beyond the predefined boundary associated with the user interface) while displaying the handwritten content with the second shape (e.g., in a straightened orientation relative to the predefined orientation associated with the user interface). In some embodiments, in accordance with a determination that changing the shape of the first representation of handwritten content does not cause a portion of the representation of handwritten content to extend beyond the predefined boundary associated with the user interface, the electronic device forgoes displaying the third representation of handwritten content comprising the sequence of words. For example, the electronic device does not replace display of the first representation of the handwritten content after straightening with the third representation of the handwritten content in the third number of lines of words, as similarly shown in FIG. 8Y. Changing a number of lines in which a representation of a handwritten sequence of words is displayed in a user interface in response to detecting input changing a shape of the representation of the handwritten sequence of words prevents the handwritten sequence of words from extending beyond the user interface when changing the shape of the representation of the handwritten sequence of words and/or enables the number of lines in which the sequence of words is displayed to be changed automatically, thereby improving user-device interaction.

It should be understood that the particular order in which the operations in FIGS. 9A-9G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIGS. 9A-9G. For example, the operation of the electronic device wrapping handwritten content in response to user inputs described above with reference to method 900 optionally has one or more of the characteristics of selecting and providing for interaction with handwritten content, including straightening the handwritten content, described herein with reference to other methods described herein (e.g., method 700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 9A-9G are, optionally, implemented by components depicted in FIGS. 1A-1B. For example, displaying operations 902*c*, 906*b*, 922*d*, 928*c* and 930*e* and detecting operations 902*a*, 922*a*, and 930*b* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate the analysis and identification of handwritten inputs. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, handwriting styles, etc.

The present disclosure recognizes that the use of such personal information data, in the present technology, can be used to the benefit of users. For example, the personal information data can be used to automatically perform operations with respect to interacting with the electronic device using a stylus (e.g., recognition of handwriting as text). Accordingly, use of such personal information data enables users to enter fewer inputs to perform an action with respect to handwriting inputs. Further, other uses for personal information data that benefit the user are also contemplated by the present disclosure. For instance, handwriting styles may be used to identify valid characters within handwritten content.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's handwriting entry history when analyzing handwritten content.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, handwriting can be recognized based on aggregated non-personal information data or a bare minimum amount of personal information, such as the handwriting being handled only on the user's device or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device in communication with a display generation component and one or more input devices:

while displaying, via the display generation component, a user interface region, receiving, via the one or more input devices, a first input that includes first handwritten input on a surface, wherein the first input is directed to the user interface region, and wherein the first handwritten input is associated with a respective writing tool for handwritten input that is selected when the first input is received;

while receiving the first input, displaying, via the display generation component, a representation of the first handwritten input that has a baseline path with a first shape, wherein the representation of the first handwritten input is a plurality of lines of handwritten text, including a first line of handwritten text, and a second line of handwritten text;

while displaying the representation of the first handwritten input that has the baseline path with the first shape, detecting, via the one or more input devices, a respective event that indicates that a user of the electronic device has completed writing a respective portion of text; and in response to detecting the respective event and in accordance with a determination that one or more criteria are satisfied, the one or more criteria including a criterion that is satisfied when the respective writing tool is of a first type and is not satisfied when the respective writing tool is of a second type, different from the first type, changing a shape of the representation of the first handwritten input in the user interface region to change the baseline path of the representation of the first handwritten input to a second shape, different from the first shape, including changing a shape of the second line of handwritten text in addition to changing a shape of the first line of handwritten text, while maintaining the respective portion of text as handwritten text.

2. The method of claim 1, wherein:

the first shape of the baseline path of the representation of the first handwritten input has a first degree of linearity; and the second shape of the baseline path has a second degree of linearity, greater than the first degree of linearity.

3. The method of claim 1, wherein detecting the respective event includes detecting, via the one or more input devices, an end of the first input.

4. The method of claim 1, wherein:

the representation of the first handwritten input is displayed in a first portion of the user interface region corresponding to a first line of handwritten input; and detecting the respective event includes detecting, via the one or more input devices, a second input that includes second handwritten input directed to a second portion, different from the first portion, of the user interface region corresponding to a second line of handwritten input, different from the first line of handwritten input.

5. The method of claim 1, wherein:

the user interface region includes a selectable option that, when selected, causes the electronic device to change the shape of the representation of the first handwritten input in the user interface region to change the baseline path of the representation of the handwritten input to the second shape; and detecting the respective event includes detecting, via the one or more input devices, selection of the selectable option.

6. The method of claim 5, wherein the selectable option is not displayed when the first input is received, the method further comprising:

while displaying the representation of the first handwritten input that has the baseline path with the first shape and before detecting the respective event, receiving, via the one or more input devices, a second input corresponding to selection of the first handwritten input; and in response to receiving the second input, concurrently displaying, via the display generation component, the selected first handwritten input and the selectable option in the user interface region.

7. The method of claim 5, wherein the selectable option is displayed within a toolbar user interface object, the toolbar user interface object including a plurality of respective selectable options.

8. The method of claim 5, wherein the selectable option is not displayed when a beginning of the first input is received, the method further comprising:

while displaying at least a portion of the representation of the first handwritten input that has the baseline path with the first shape and before detecting the respective event, concurrently displaying, via the display generation component, the at least the portion of the representation of the handwritten input and the selectable option in the user interface region.

9. The method of claim 5, wherein the selectable option is not displayed when the first input is received, the method further comprising:

while displaying the representation of the first handwritten input that has the baseline path with the first shape and before detecting the respective event, detecting a second respective event; and in response to detecting the second respective event:

in accordance with a determination that the selectable option has been displayed a threshold number of times in the user interface region before receiving the first input, forgoing displaying, via the display generation component, the selectable option in the user interface region; and in accordance with a determination that the selectable option has been displayed less than the threshold number of times in the user interface region before receiving the first input, displaying the selectable option in the user interface region.

10. The method of claim 5, wherein the selectable option is not displayed when the first input is received, the method further comprising:

while displaying the representation of the first handwritten input that has the baseline path with the first shape and before detecting the respective event:

in accordance with a determination that at least a portion of the first handwritten input corresponds to recognized text, displaying, via the display generation component, the selectable option in the user interface region; and in accordance with a determination that the first handwritten input does not correspond to recognized text, forgoing displaying the selectable option in the user interface region.

11. The method of claim 5, further comprising:

in response to detecting the respective event and in accordance with the determination that the one or more criteria are satisfied:

performing one or more respective operations involving the respective portion of text of the representation of the first handwritten input in addition to changing the shape of the representation of the first handwritten input.

12. The method of claim 1, wherein changing the shape of the representation of the first handwritten input includes changing a separation between the first line of handwritten text and the second line of handwritten text.

13. The method of claim 12, wherein:

before detecting the respective event, a separation between the first line of handwritten text and the second line of handwritten text of the plurality of lines of handwritten text is different from a separation between the second line of handwritten text and a third line of handwritten text of the plurality of lines of handwritten text; and in response to detecting the respective event and in accordance with the determination that the one or more criteria are satisfied, the separation between the first line of handwritten text and the second line of handwritten text is equal to the separation between the second line of handwritten text and the third line of handwritten text.

14. The method of claim 12, wherein an amount of separation between respective lines of handwritten text of the plurality of lines of handwritten text in response to detecting the respective event and in accordance with the determination that the one or more criteria are satisfied is based on a size of the handwritten text.

15. The method of claim 1, wherein changing the shape of the representation of the first handwritten input includes aligning the first line of handwritten text and the second line of handwritten text to a predefined alignment associated with the user interface region.

16. The method of claim 15, wherein aligning the first line of handwritten text and the second line of handwritten text to the predefined alignment associated with the user interface region includes:

in accordance with a determination that a detected language associated with the handwritten text is a first language, aligning the first line of handwritten text and the second line of handwritten text to a first alignment; and in accordance with a determination that the detected language associated with the handwritten text is a second language, different from the first language, aligning the first line of handwritten text and the second line of handwritten text to a second alignment, different from the first alignment.

17. The method of claim 1, wherein:

in accordance with a determination that a detected language associated with the respective portion of text of the first handwritten input is a first language, the second shape is oriented in a first direction; and in accordance with a determination that the detected language associated with the respective portion of text of the first handwritten input is a second language, different from the first language, the second shape is oriented in a second direction, different from the first direction.

18. The method of claim 1, wherein changing the baseline path of the representation of the first handwritten input to have the second shape includes:

in accordance with a determination that one or more characters in the respective portion of text of the first handwritten input corresponds to one or more first characters in a first font-based text, changing the shape of the representation of the first handwritten input to correspond to a first respective shape the one or more first characters would have in the first font-based text; and in accordance with a determination that the one or more characters in the respective portion of text of the first handwritten input corresponds to one or more second characters, different from the one or more first characters, in the first font-based text, changing the shape of the representation of the first handwritten input to correspond to a second respective shape the one or more second characters would have in the first font-based text, wherein the first respective shape is different from the second respective shape.

19. The method of claim 1, wherein the one or more criteria include a criterion that is satisfied when the user interface region is operating in a content creation mode of a first type and is not satisfied when the user interface region is operating in a content creation mode of a second type, different from the first type.

20. The method of claim 1, wherein:

the respective portion of text of the first handwritten input includes one or more letters;

the baseline path of the representation of the first handwritten input originates at a first letter of the one or more letters; and changing the baseline path to have the second shape includes maintaining a position of the first letter of the representation of the first handwritten input in the user interface region.

21. The method of claim 1, further comprising:

while receiving the first input, concurrently displaying, via the display generation component, one or more respective user interface elements for guiding the first handwritten input with the representation of the first handwritten input in the user interface region, wherein the one or more respective user interface elements are not displayed when the first input is received.

22. The method of claim 21, wherein:

displaying the one or more respective user interface elements includes displaying one or more graphical lines in the user interface region for guiding an orientation of the first handwritten input; and an orientation of the one or more graphical lines is aligned to a predefined orientation associated with the user interface region.

23. The method of claim 21, further comprising:

while receiving the first input and while displaying the one or more respective user interface elements in the user interface region:

in accordance with a determination that a portion of the representation of the first handwritten input is more than a predefined distance from a portion of the one or more respective user interface elements, displaying the portion of the one or more respective user interface elements with a first visual appearance; and in accordance with a determination that the portion of the representation of the first handwritten input is less than the predefined distance from the portion of the one or more respective user interface elements, displaying the portion of the one or more respective user interface elements with a second visual appearance, different from the first visual appearance.

24. The method of claim 21, further comprising:

while concurrently displaying the one or more respective user interface elements with the representation of the first handwritten input in the user interface region, detecting, via the one or more input devices, an end of the first input; and in response to detecting the end of the first input, ceasing display, in the user interface region, of the one or more respective user interface elements while maintaining display of the representation of the first handwritten input.

25. The method of claim 1, wherein:

the respective portion of text of the first handwritten input includes one or more handwritten marks that do not correspond to handwritten text; and changing the shape of the representation of the first handwritten input in the user interface region to change the baseline path of the representation of the first handwritten input to the second shape includes changing a visual appearance of the one or more handwritten marks.

26. An electronic device, comprising:

one or more processors;

memory; and one or more programs, wherein the one or more programs are stored in the memory and configured to be executed by the one or more processors, the one or more programs including instructions for:

while displaying, via a display generation component, a user interface region, receiving, via one or more input devices, a first input that includes first handwritten input on a surface, wherein the first input is directed to the user interface region, and wherein the first handwritten input is associated with a respective writing tool for handwritten input that is selected when the first input is received;

while receiving the first input, displaying, via the display generation component, a representation of the first handwritten input that has a baseline path with a first shape, wherein the representation of the first handwritten input is a plurality of lines of handwritten text, including a first line of handwritten text, and a second line of handwritten text;

while displaying the representation of the first handwritten input that has the baseline path with the first shape, detecting, via the one or more input devices, a respective event that indicates that a user of the electronic device has completed writing a respective portion of text; and in response to detecting the respective event and in accordance with a determination that one or more criteria are satisfied, the one or more criteria including a criterion that is satisfied when the respective writing tool is of a first type and is not satisfied when the respective writing tool is of a second type, different from the first type, changing a shape of the representation of the first handwritten input in the user interface region to change the baseline path of the representation of the first handwritten input to a second shape, different from the first shape, including changing a shape of the second line of handwritten text in addition to changing a shape of the first line of handwritten text, while maintaining the respective portion of text as handwritten text.

27. The electronic device of claim 26, wherein detecting the respective event includes detecting, via the one or more input devices, an end of the first input.

28. The electronic device of claim 26, wherein:

the representation of the first handwritten input is displayed in a first portion of the user interface region corresponding to a first line of handwritten input; and detecting the respective event includes detecting, via the one or more input devices, a second input that includes second handwritten input directed to a second portion, different from the first portion, of the user interface region corresponding to a second line of handwritten input, different from the first line of handwritten input.

29. The electronic device of claim 26, wherein:

the user interface region includes a selectable option that, when selected, causes the electronic device to change the shape of the representation of the first handwritten input in the user interface region to change the baseline path of the representation of the handwritten input to the second shape; and detecting the respective event includes detecting, via the one or more input devices, selection of the selectable option.

30. The electronic device of claim 29, wherein the selectable option is displayed within a toolbar user interface object, the toolbar user interface object including a plurality of respective selectable options.

31. The electronic device of claim 26, wherein changing the shape of the representation of the first handwritten input includes changing a separation between the first line of handwritten text and the second line of handwritten text.

32. The electronic device of claim 26, wherein changing the baseline path of the representation of the first handwritten input to have the second shape includes:

in accordance with a determination that one or more characters in the respective portion of text of the first handwritten input corresponds to one or more first characters in a first font-based text, changing the shape of the representation of the first handwritten input to correspond to a first respective shape the one or more first characters would have in the first font-based text; and in accordance with a determination that the one or more characters in the respective portion of text of the first handwritten input corresponds to one or more second characters, different from the one or more first characters, in the first font-based text, changing the shape of the representation of the first handwritten input to correspond to a second respective shape the one or more second characters would have in the first font-based text, wherein the first respective shape is different from the second respective shape.

33. The electronic device of claim 26, wherein the one or more criteria include a criterion that is satisfied when the user interface region is operating in a content creation mode of a first type and is not satisfied when the user interface region is operating in a content creation mode of a second type, different from the first type.

34. The electronic device of claim 26, wherein:

the respective portion of text of the first handwritten input includes one or more letters;

the baseline path of the representation of the first handwritten input originates at a first letter of the one or more letters; and changing the baseline path to have the second shape includes maintaining a position of the first letter of the representation of the first handwritten input in the user interface region.

35. The electronic device of claim 26, wherein the one or more programs further include instructions for:

while receiving the first input, concurrently displaying, via the display generation component, one or more respective user interface elements for guiding the first handwritten input with the representation of the first handwritten input in the user interface region, wherein the one or more respective user interface elements are not displayed when the first input is received.

36. A non-transitory computer readable storage medium storing one or more programs, the one or more programs comprising instructions, which when executed by one or more processors of an electronic device, cause the electronic device to perform a method comprising:

while displaying, via a display generation component, a user interface region, receiving, via one or more input devices, a first input that includes first handwritten input on a surface, wherein the first input is directed to the user interface region, and wherein the first handwritten input is associated with a respective writing tool for handwritten input that is selected when the first input is received;

while receiving the first input, displaying, via the display generation component, a representation of the first handwritten input that has a baseline path with a first shape, wherein the representation of the first handwritten input is a plurality of lines of handwritten text, including a first line of handwritten text, and a second line of handwritten text;

while displaying the representation of the first handwritten input that has the baseline path with the first shape, detecting, via the one or more input devices, a respective event that indicates that a user of the electronic device has completed writing a respective portion of text; and in response to detecting the respective event and in accordance with a determination that one or more criteria are satisfied, the one or more criteria including a criterion that is satisfied when the respective writing tool is of a first type and is not satisfied when the respective writing tool is of a second type, different from the first type, changing a shape of the representation of the first handwritten input in the user interface region to change the baseline path of the representation of the first handwritten input to a second shape, different from the first shape, including changing a shape of the second line of handwritten text in addition to changing a shape of the first line of handwritten text, while maintaining the respective portion of text as handwritten text.

37. The non-transitory computer readable storage medium of claim 36, wherein detecting the respective event includes detecting, via the one or more input devices, an end of the first input.

38. The non-transitory computer readable storage medium of claim 36, wherein:

the representation of the first handwritten input is displayed in a first portion of the user interface region corresponding to a first line of handwritten input; and detecting the respective event includes detecting, via the one or more input devices, a second input that includes second handwritten input directed to a second portion, different from the first portion, of the user interface region corresponding to a second line of handwritten input, different from the first line of handwritten input.

39. The non-transitory computer readable storage medium of claim 36, wherein:

the user interface region includes a selectable option that, when selected, causes the electronic device to change the shape of the representation of the first handwritten input in the user interface region to change the baseline path of the representation of the handwritten input to the second shape; and detecting the respective event includes detecting, via the one or more input devices, selection of the selectable option.

40. The non-transitory computer readable storage medium of claim 39, wherein the selectable option is displayed within a toolbar user interface object, the toolbar user interface object including a plurality of respective selectable options.

41. The non-transitory computer readable storage medium of claim 36, wherein changing the shape of the representation of the first handwritten input includes changing a separation between the first line of handwritten text and the second line of handwritten text.

42. The non-transitory computer readable storage medium of claim 36, wherein changing the baseline path of the representation of the first handwritten input to have the second shape includes:

in accordance with a determination that one or more characters in the respective portion of text of the first handwritten input corresponds to one or more first characters in a first font- based text, changing the shape of the representation of the first handwritten input to correspond to a first respective shape the one or more first characters would have in the first font-based text; and in accordance with a determination that the one or more characters in the respective portion of text of the first handwritten input corresponds to one or more second characters, different from the one or more first characters, in the first font-based text, changing the shape of the representation of the first handwritten input to correspond to a second respective shape the one or more second characters would have in the first font-based text, wherein the first respective shape is different from the second respective shape.

43. The non-transitory computer readable storage medium of claim 36, wherein the one or more criteria include a criterion that is satisfied when the user interface region is operating in a content creation mode of a first type and is not satisfied when the user interface region is operating in a content creation mode of a second type, different from the first type.

44. The non-transitory computer readable storage medium of claim 36, wherein:

the respective portion of text of the first handwritten input includes one or more letters;

the baseline path of the representation of the first handwritten input originates at a first letter of the one or more letters; and changing the baseline path to have the second shape includes maintaining a position of the first letter of the representation of the first handwritten input in the user interface region.

45. The non-transitory computer readable storage medium of claim 36, wherein the method further comprises:

while receiving the first input, concurrently displaying, via the display generation component, one or more respective user interface elements for guiding the first handwritten input with the representation of the first handwritten input in the user interface region, wherein the one or more respective user interface elements are not displayed when the first input is received.

46. The non-transitory computer readable storage medium of claim 36, wherein:

the respective portion of text of the first handwritten input includes one or more handwritten marks that do not correspond to handwritten text; and changing the shape of the representation of the first handwritten input in the user interface region to change the baseline path of the representation of the first handwritten input to the second shape includes changing a visual appearance of the one or more handwritten marks.

47. The electronic device of claim 26, wherein:

the respective portion of text of the first handwritten input includes one or more handwritten marks that do not correspond to handwritten text; and changing the shape of the representation of the first handwritten input in the user interface region to change the baseline path of the representation of the first handwritten input to the second shape includes changing a visual appearance of the one or more handwritten marks.

* * * * *